(12) United States Patent
Josephson et al.

(10) Patent No.: US 12,236,796 B2
(45) Date of Patent: Feb. 25, 2025

(54) PREDICTIVE VIRTUAL TRAINING SYSTEMS, APPARATUSES, INTERFACES, AND METHODS FOR IMPLEMENTING SAME

(71) Applicant: Quantum Interface, LLC, Austin, TX (US)

(72) Inventors: Jonathan Josephson, Austin, TX (US); Robert William Strozier, Houston, TX (US)

(73) Assignee: Quantum Interface LLC, Austin, TX (US)

( * ) Notice: Subject to any disclaimer, the term of this patent is extended or adjusted under 35 U.S.C. 154(b) by 0 days.

(21) Appl. No.: 17/542,812

(22) Filed: Dec. 6, 2021

(65) Prior Publication Data
US 2022/0270509 A1 Aug. 25, 2022

Related U.S. Application Data

(63) Continuation of application No. PCT/US2020/037807, filed on Jun. 15, 2020.

(60) Provisional application No. 62/861,971, filed on Jun. 14, 2019.

(51) Int. Cl.
| | |
|---|---|
| *G09B 19/00* | (2006.01) |
| *G06F 3/01* | (2006.01) |
| *G06T 19/00* | (2011.01) |
| *G09B 5/06* | (2006.01) |

(52) U.S. Cl.
CPC .......... *G09B 19/003* (2013.01); *G06F 3/011* (2013.01); *G06T 19/00* (2013.01); *G09B 5/065* (2013.01); *G06F 3/012* (2013.01); *G06F 3/013* (2013.01)

(58) Field of Classification Search
CPC ........ G09B 19/003; G09B 5/065; G06F 3/011
See application file for complete search history.

(56) References Cited

U.S. PATENT DOCUMENTS

| | | | |
|---|---|---|---|
| 8,472,120 B2* | 6/2013 | Border | G02B 27/017 359/13 |
| 9,971,492 B2* | 5/2018 | Chandler | G06F 3/0485 |
| 10,242,501 B1* | 3/2019 | Pusch | H04N 21/44218 |
| 10,885,530 B2* | 1/2021 | Mercury | H04W 4/38 |
| 10,922,992 B2* | 2/2021 | Kur | G06F 3/012 |
| 11,273,283 B2* | 3/2022 | Poltorak | G16H 20/70 |
| 11,410,564 B2* | 8/2022 | Kesavadas | G11B 27/036 |
| 2012/0218172 A1* | 8/2012 | Border | G02B 27/0176 345/8 |
| 2014/0282105 A1* | 9/2014 | Nordstrom | G06F 3/016 715/753 |

(Continued)

*Primary Examiner* — Xuan M Thai
*Assistant Examiner* — Sadaruz Zaman
(74) *Attorney, Agent, or Firm* — Robert W. Strozier

(57) ABSTRACT

Apparatuses, systems, interfaces, and implementing methods including constructing training programs or routines and predictive training programs and routines implemented in a VR, AR, MR or XR environments, preparing non-predictive and/or predictive tools for use in predictive and/or non-predictive training programs or routines implemented in the VR/AR/MR/XR environments, converting non-computer assisted training programs into predictive and/or non-predictive training programs implemented in a VR and/or AR/MR/XR environments, and implementing avatars to assist trainees in performing training programs routines or any aspects thereof.

20 Claims, 89 Drawing Sheets

(56) References Cited

U.S. PATENT DOCUMENTS

| | | | |
|---|---|---|---|
| 2016/0067136 A1* | 3/2016 | Raghavan | A61B 5/225 |
| | | | 601/40 |
| 2016/0307459 A1* | 10/2016 | Chestnut | G06F 3/16 |
| 2016/0350977 A1* | 12/2016 | Doronichev | H04W 4/21 |
| 2017/0053542 A1* | 2/2017 | Wilson | G09B 19/003 |
| 2018/0121728 A1* | 5/2018 | Wells | A61B 5/1116 |
| 2018/0264347 A1* | 9/2018 | Tran | G06V 40/28 |
| 2019/0102919 A1* | 4/2019 | Josephson | G06T 11/203 |
| 2019/0108578 A1* | 4/2019 | Spivack | G09B 5/065 |
| 2019/0130788 A1* | 5/2019 | Seaton | G06F 3/0346 |
| 2019/0247662 A1* | 8/2019 | Poltroak | A61N 1/36025 |
| 2019/0380792 A1* | 12/2019 | Poltaretskyi | A61B 90/39 |
| 2020/0035112 A1* | 1/2020 | Delaney | G06F 16/24578 |
| 2020/0273254 A1* | 8/2020 | Bennett | G06F 3/04845 |
| 2020/0273365 A1* | 8/2020 | Wallace | G09B 9/00 |

* cited by examiner

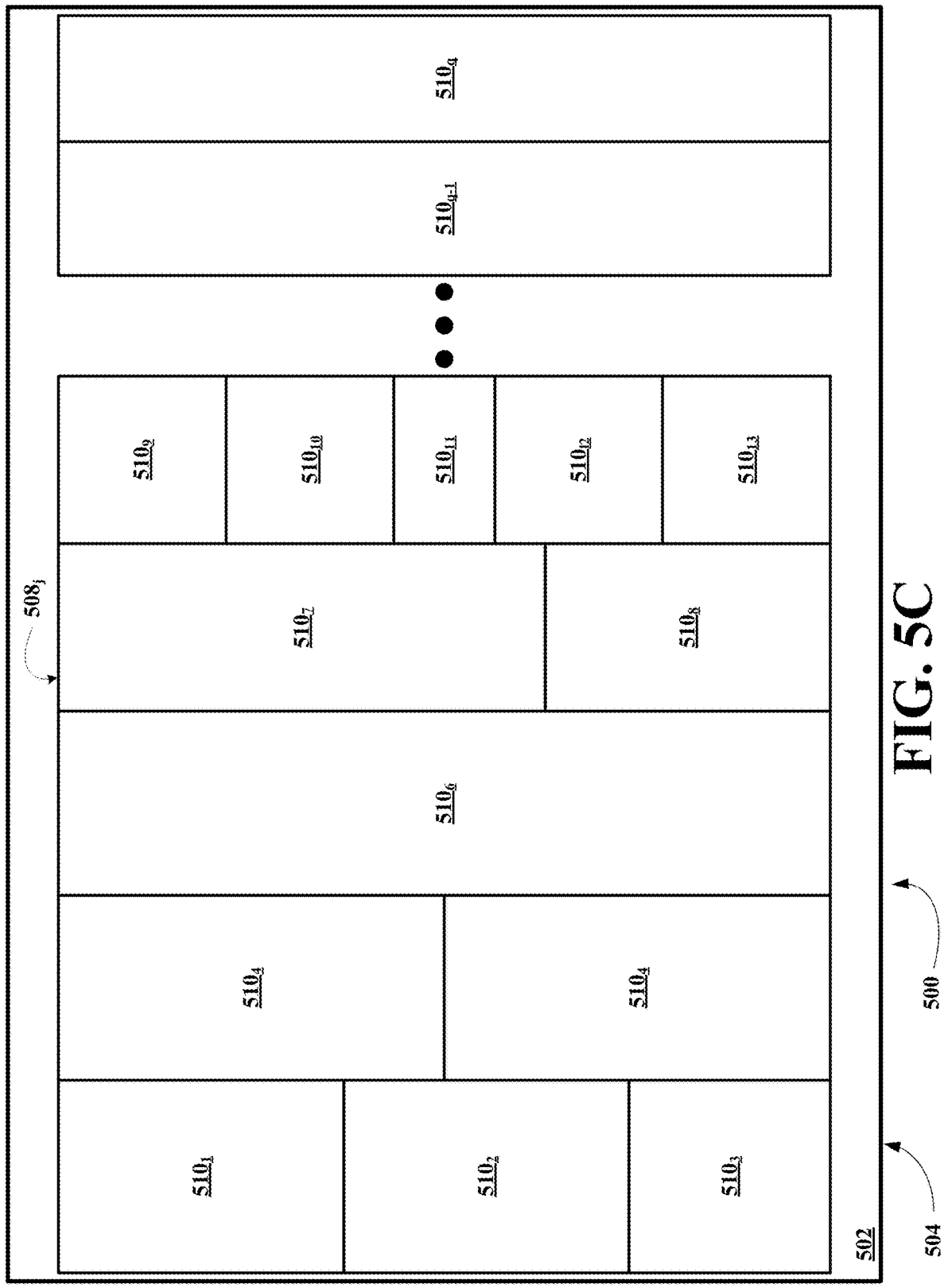

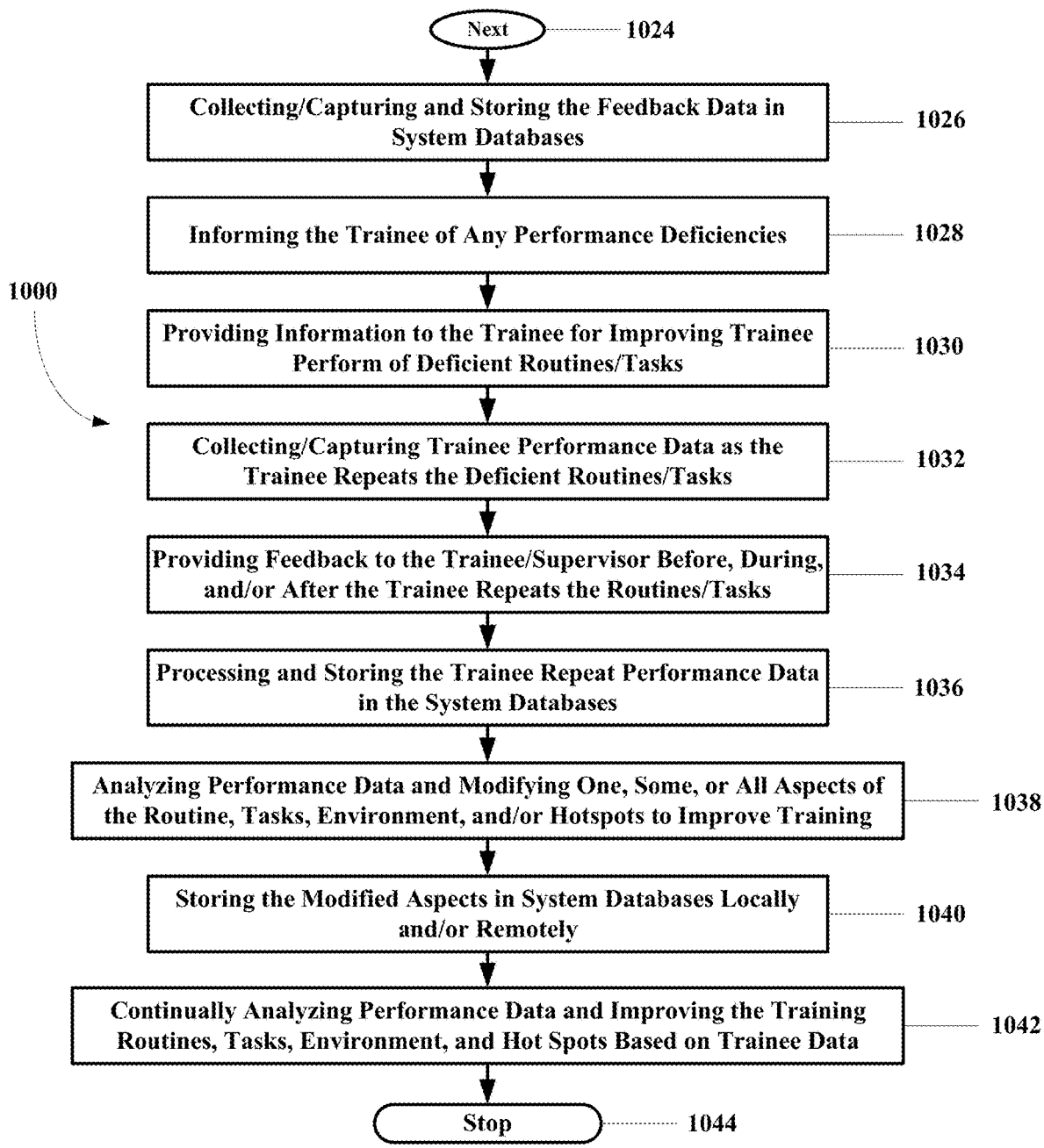
FIG. 10 - Continued

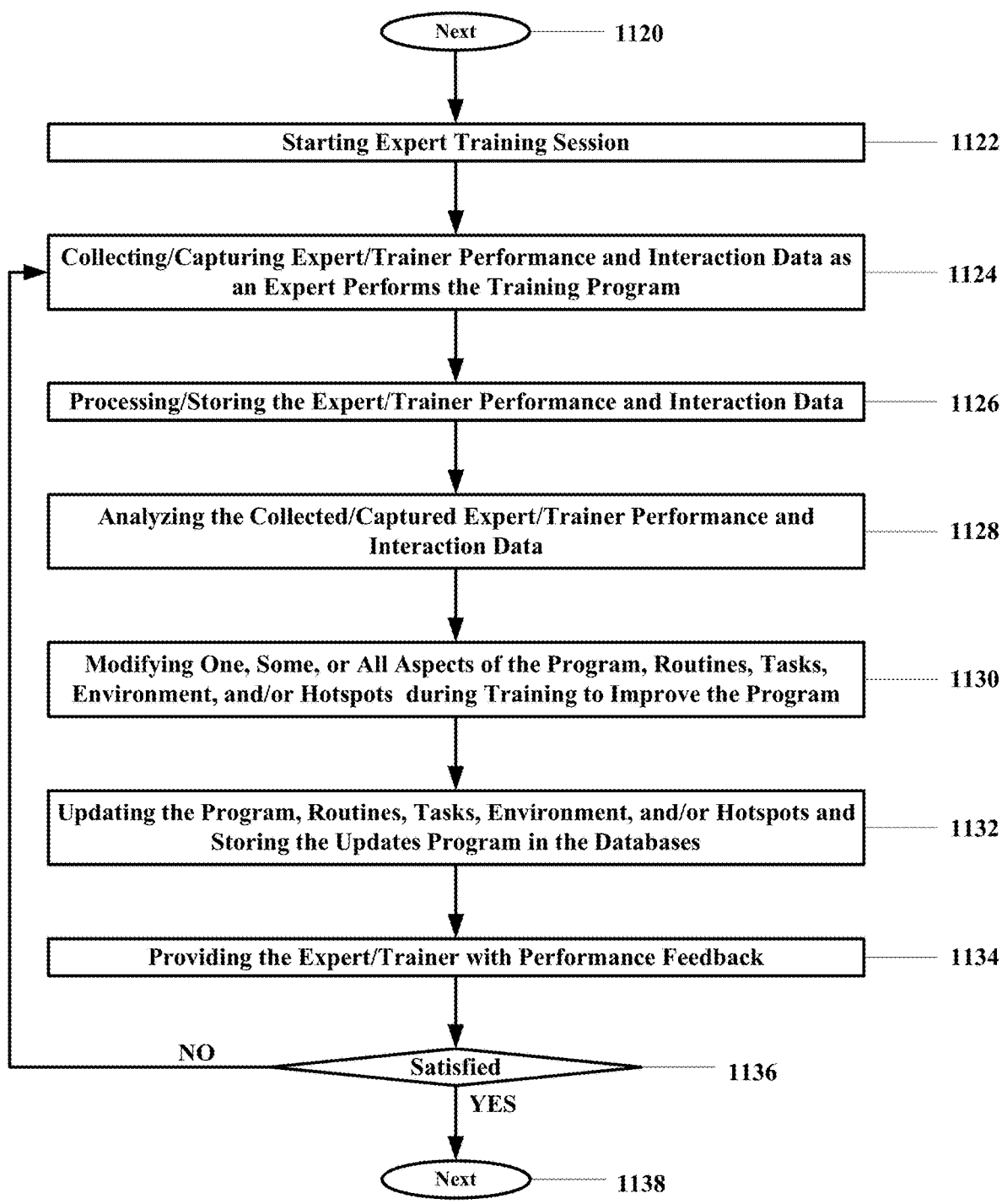
FIG. 11 - Continued

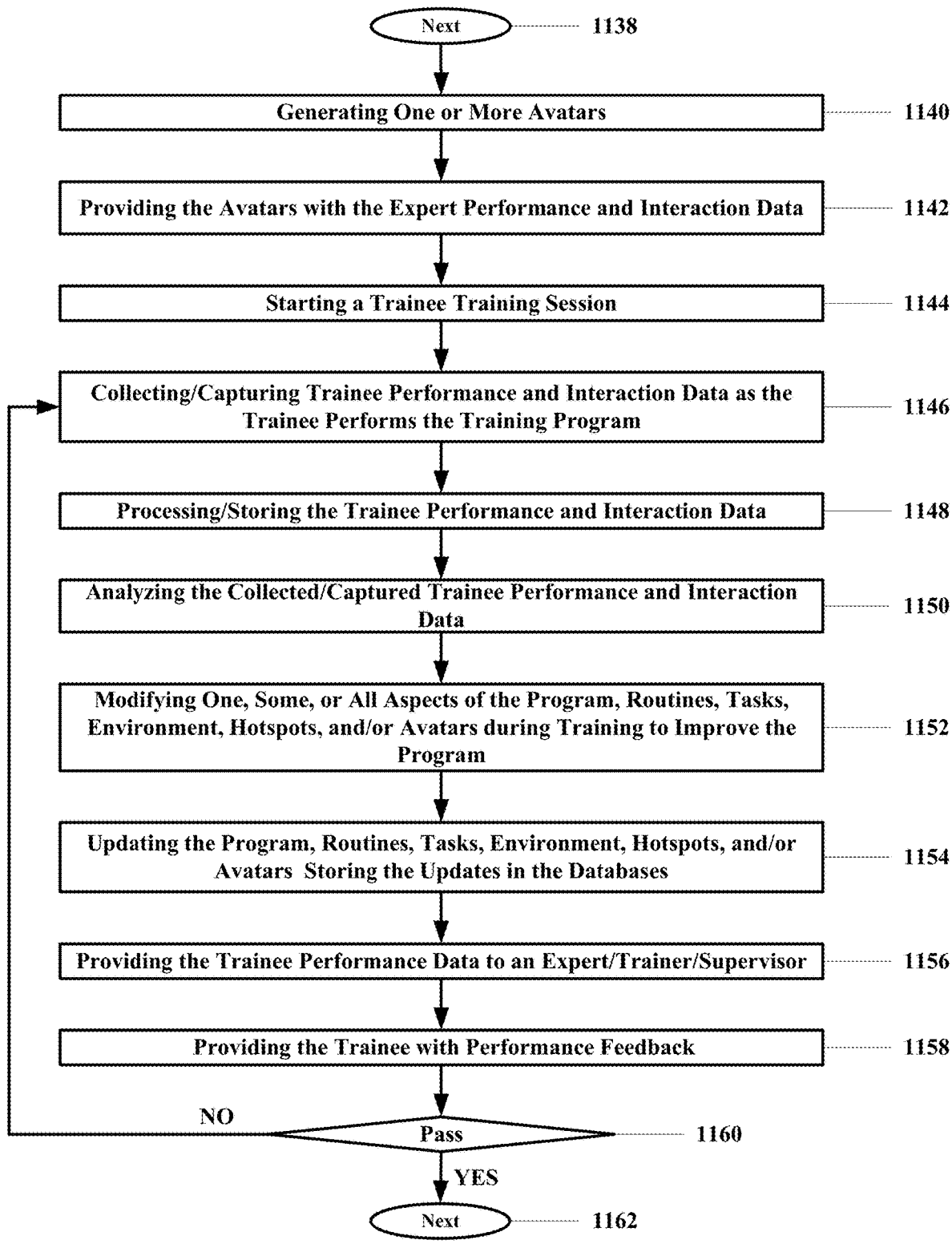
FIG. 11 - Continued

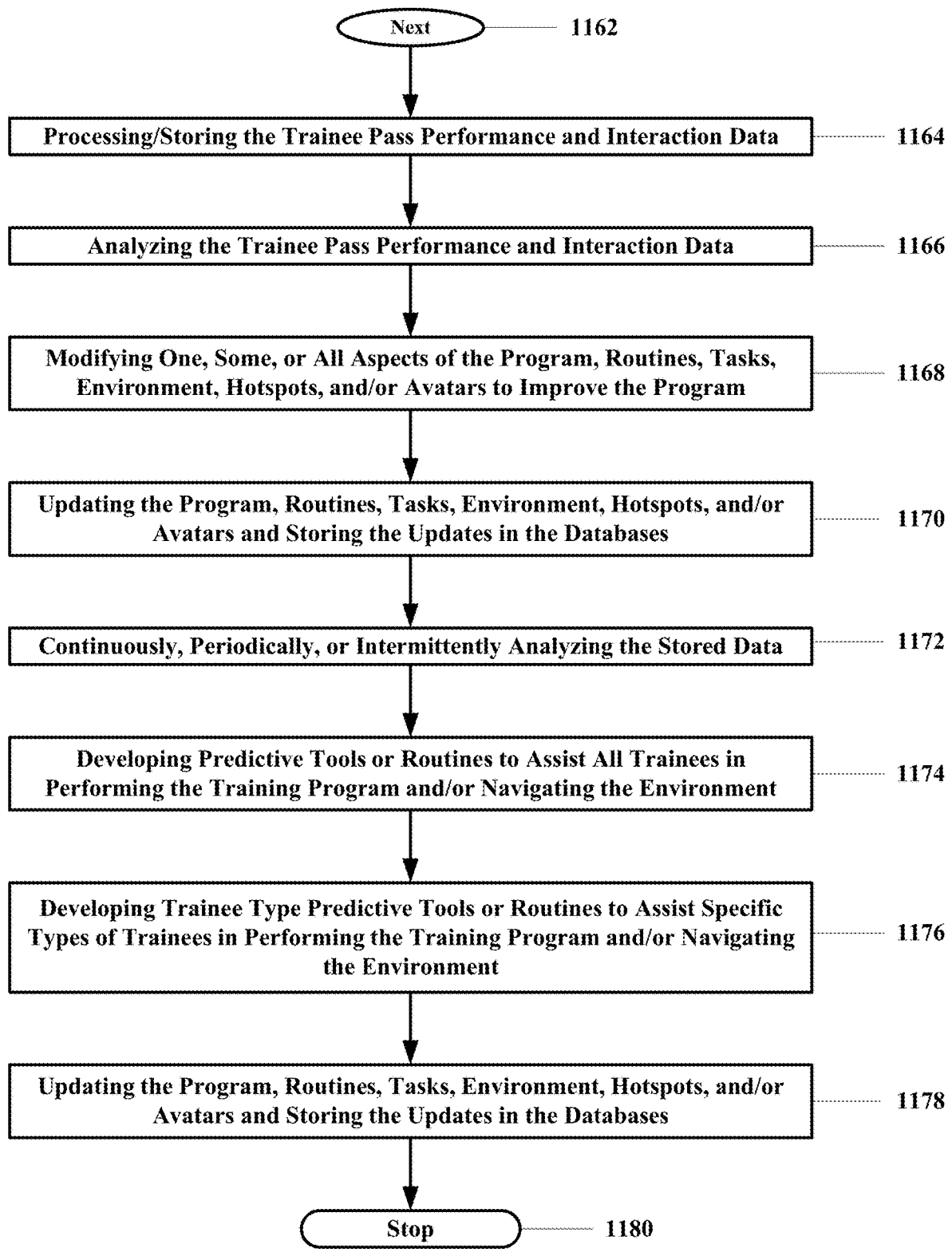
FIG. 11 - Continued

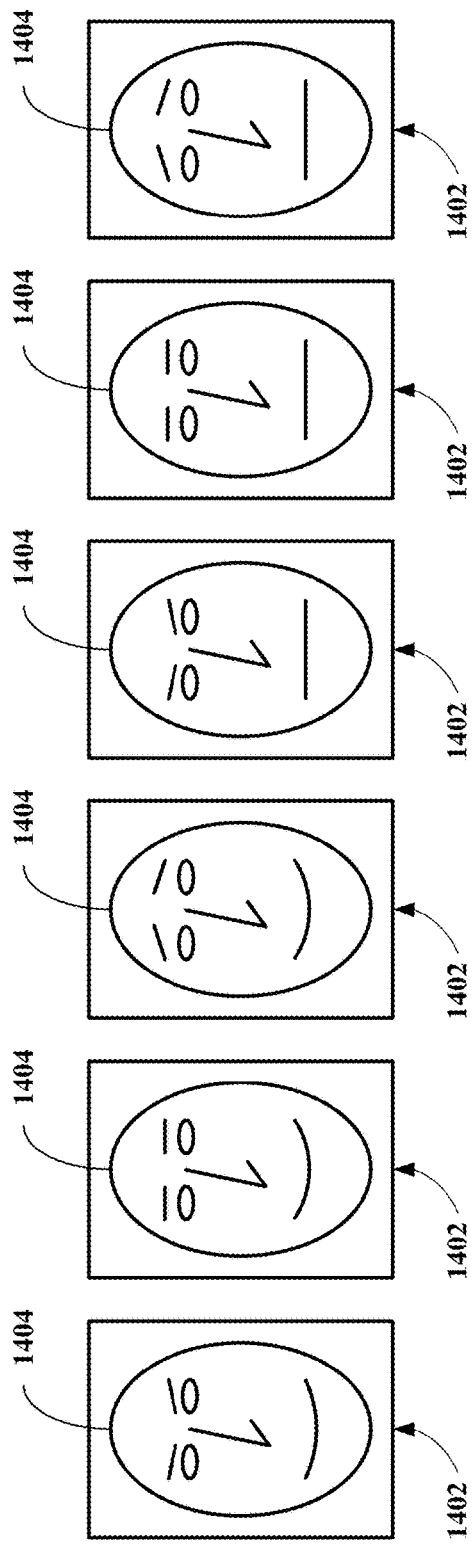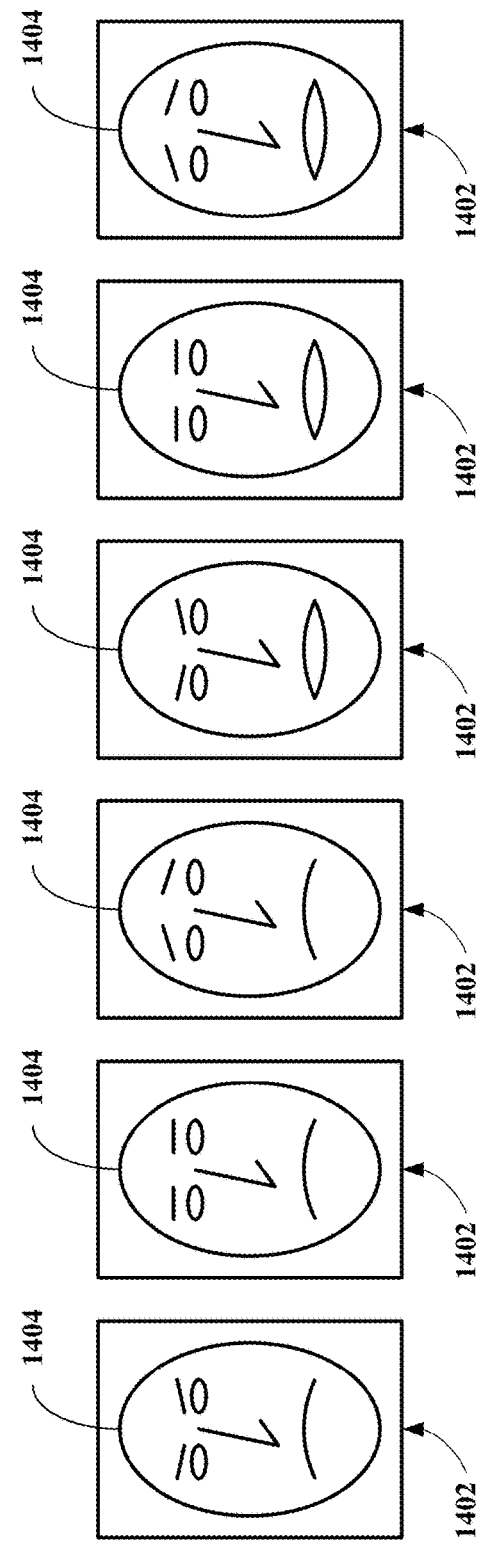

PREDICTIVE VIRTUAL TRAINING SYSTEMS, APPARATUSES, INTERFACES, AND METHODS FOR IMPLEMENTING SAME

RELATED APPLICATIONS

This application is a continuation of International Application No. PCT/US20/37807, filed 15 Jun. 2020, which claims the benefit of and priority to U.S. Provisional Patent Application Ser. No. 62/861,971 filed Jun. 14, 2019, which are incorporated by reference by operation of the closing paragraph.

(a) U.S. patent application Ser. No. 15/615,342 filed Jun. 6, 2017; (b) U.S. patent application Ser. No. 16/404,425 filed May 6, 2019; (c) U.S. patent application Ser. No. 16/702,266 filed Dec. 3, 2019; (d) U.S. patent application Ser. No. 15/968,872 filed May 2, 2018; (e) U.S. patent application Ser. No. 15/781,050 filed Jun. 1, 2018; (f) U.S. patent application Ser. No. 15/210,832 filed Jul. 14, 2016; (b) (g) U.S. patent application Ser. No. 15/781,057 filed Jun. 1, 2018; (h) U.S. patent application Ser. No. 15/781,061 filed Jun. 1, 2018; (i) U.S. patent application Ser. No. 16/625,553 filed Dec. 20, 2019; (b) (j) U.S. patent application Ser. No. 16/245,206 filed Jan. 10, 2019; (k) U.S. patent application Ser. No. 16/296,114 filed Mar. 7, 2019; and (1) U.S. patent application Ser. No. 16/404,382 filed May 6, 2019, which are incorporated by reference by operation of the closing paragraph.

(a) U.S. Pat. No. 10,628,977 issued Apr. 21, 2020; (b) U.S. Pat. No. 10,503,359 issued Dec. 10, 2019; (c) U.S. Pat. No. 10,289,204 issued May 14, 2019; (d) U.S. Pat. No. 10,263,967 issued Apr. 16, 2019; (e) U.S. Pat. No. 9,971,492 issued May 15, 2018; (f) U.S. Pat. No. 9,746,935 issued Aug. 29, 2017; (g) U.S. Pat. No. 9,703,388 issued Jul. 11, 2017; (h) U.S. Pat. No. 8,788,966 issued Jul. 22, 2014; (i) U.S. Pat. No. 7,861,188 issued Dec. 28, 2010; and (j) U.S. Pat. No. 7,831,932 issued Nov. 9, 2010, which are incorporated by reference by operation of the closing paragraph.

BACKGROUND OF THE DISCLOSURE

1. Field of the Disclosure

Embodiments of this disclosure relate to virtual training systems, apparatuses, and/or user interfaces and methods for implementing them, wherein the virtual training systems and apparatuses include at least one processing unit, at least one motion sensing device, at least one input device, and at least one display device and implementing methods and the user interface (graphic or non-graphic) are configured to receive input from the at least one motion sensing device and/or the at least one input device, to receive output from the at least one processing unit, and to use the input and output to invoke and interact with training routines in virtual reality (VR) environments, augmented reality (AR) environments, mixed reality (MR) environments, and/or any other environment the includes both real features and computer-generated (CG) features and display the training routines on the at least one display device.

More particularly, embodiments of this disclosure relate to virtual training systems, apparatuses, and/or user interfaces and methods for implementing them, wherein the virtual training systems and apparatuses implementing the methods or supporting the user interface (graphic or non-graphic) receive output from and/or include at least one processing unit, at least one motion sensing device, at least one input device, and at least one display device or other devices capable of providing user feedback of any kind, and wherein the processing unit is configured to: receive data or input from the motion sensing devices and/or the input devices; use the data for training in 2D, 3D, and/or nD virtual reality (VR) environments, augmented reality (AR) environments, mixed reality (MR) environments, and/or any other environment the includes both real features and computer-generated (CG) features; and control, activate, interact with, and/or manipulate the environments and environment content. In certain embodiments, the virtual training systems, apparatuses, and/or interfaces and methods for implementing them, permit mimicking techniques for overlaying a trainee actions onto expert actions to aid in improving trainee expertise. The virtual training systems, apparatuses, and/or interfaces and methods for implementing them, use motion-based processing to enhance virtual training and environment interaction, wherein the environments include virtual objects, adjustable attributes, and hot spots (e.g., interactive points, areas, volumes, conditions, environmental features, or objects), that may be scrolled through, selected, and activated, and/or adjusted based on motion data (e.g., any kind of output from a motion sensor), and/or motion data and timed holds, and/or motion data and predictive data, and/or motion data and hard select data, and/or motion data and voice data or tactile data, wherein the motion data may be used as the primary input data with the other data being used to confirm selection or vice-versa. In certain embodiments, the virtual training systems, apparatuses, and/or interfaces and methods for implementing them, may act on the data only if one or more data properties exceeds one or more threshold criteria associated with the particular received data.

Embodiments of this disclosure relate to training and predictive virtual training systems, apparatuses, and/or interfaces (i.e., training systems, apparatuses, and/or interfaces including virtual or computer-generated elements), and methods for implementing them, wherein the virtual training systems and apparatuses implementing the methods or supporting the user interface (graphic or non-graphic) receive output from and/or include at least one processing unit, at least one motion sensing device, at least one input device, and at least one display device, and one or more output devices such as one or more display devices, wherein the processing unit includes a virtual training program and is configured to (a) output the training program in response to user input data sensed by the sensors or received from the input devices, (b) collect user interaction data while performing the virtual training program or from other associated or non-associated inputs and/or parameters, and (c) modify, alter, change, augment, update, enhance, reformat, restructure, and/or redesign the virtual training program to better tailor the virtual training program for each user, for each user, type and/or for all users.

2. Description of the Related Art

Selection interfaces are ubiquitous throughout computer software and user interface software. Most of these interfaces require motion and selection operations controlled by hard selection protocols such as tapping, clicking, double tapping, double clicking, keys strokes, gestures, or other so-called hard selection protocols.

In previous applications, the inventor and inventors have described motion-based systems and interfaces that utilize motion and changes in motion direction to invoke command functions such as scrolling and simultaneously selection and activation commands. See for example U.S. Pat. Nos. 7,831,932 and 7,861,188, incorporated herein by operation of the closing paragraph of the specification.

More recently, the inventor and inventors have described motion-based systems and interfaces that utilize velocity and/or acceleration as well as motion direction to invoke command functions such as scrolling and simultaneously selection and activation commands. See for example U.S. Provisional Patent Application Ser. No. 61/885,453 filed Oct. 1, 2013 (1 Oct. 2013).

While there are many systems and interfaces for permitting users to select and activate a target object(s) from lists and/or sublists of target object(s) using movement properties, where the movement properties act to discriminate and attract or manipulate or influence the target object(s) or attributes of target object(s). Multiple layers of objects may have attributes changes, where the attribute of one layer may be different or to a different degree than other layers, but they are all affected and relational in some way.

Many interfaces have been constructed to interact with, control, and/or manipulate objects and attributes associated therewith so that a user is better able to view, select and activate objects and/or attributes.

Recently, motion-based interfaces have been disclosed. These interfaces use motion as the mechanism for viewing, selecting, differentiating, and activating virtual and/or real-world objects and/or attributes. However, there is still in need in the art for improved motion-based interactions and interfaces that present dynamic environments for viewing, selecting, differentiating, and activating virtual and/or real-world objects and/or real-world attributes based on object and/or attribute properties, user preferences, user recent interface interactions, user long term interface interactions, or mixtures and combinations thereof.

While many systems and methods have been purposed for allowing users to interact with virtual reality environments, there is still a need in the art for improved systems and methods for training, awareness, servicing, and mimicking systems. While many systems and methods have been purposed for allowing users to interact with virtual reality environments, there is still a need in the art for improved systems and methods for interacting with VR environments or AR/MR/XR environments and elements to improve training and to modify, alter, change, augment, update, enhance, reformat, restructure, and/or redesign a virtual training routine, exercise, program, etc. based on use, collected sensor data and/or trainee data captured during training routines, exercises, programs, etc. to better tailor the training routines, exercises, programs, etc. for each user or for all users, where the changes may be implemented before, during and after a training session, and may even include other machine learning or other parameters that can influence the system and elements.

SUMMARY OF THE DISCLOSURE

Virtual Training Systems, Apparatuses, Interfaces, and Methods Implementing them Embodiments of this disclosure provide methods including (a) receiving trainee images and/or image sequences and trainer images and/or image sequences, (b) overlaying the captured trainee images and/or image sequence onto the capture trainer images and/or image sequences, (c) constructing a polygon fitted surface, a tessellated surface, or rendered representation of the trainee and the trainer, (d) applying the trainee surface representation to the trainee images and/or image sequence and the trainer surface representation to the trainer images and/or image sequence to construct a trainee polygon fitted, rendered, or tessellated surface images and/or polygon fitted, rendered, or tessellated surface image sequence and a trainer polygon fitted, rendered, or tessellated surface images and/or polygon fitted, rendered, or tessellated surface image sequence in the at least one processing unit, (e) time and space scaling the trainee polygon fitted, rendered, or tessellated surface images and/or polygon fitted, rendered, or tessellated surface image sequence and the trainer polygon fitted, rendered, or tessellated surface images and/or polygon fitted, rendered, or tessellated surface image sequence in the at least one processing unit, (f) overlaying the scaled trainee polygon fitted, rendered, or tessellated surface images and/or polygon fitted, rendered, or tessellated surface image sequence onto the scaled trainer polygon fitted, rendered, or tessellated surface images and/or polygon fitted, rendered, or tessellated surface image sequence in the at least one processing unit, (g) comparing the trainee and the trainer scaled polygon fitted, rendered, or tessellated surface images and/or polygon fitted, rendered, or tessellated surface image sequences to illustrate differences, and (h) repeating the steps until the trainee movements conform or substantially conform to the trainer movements in the at least one processing unit. The invocation and manipulation of all aspects of the method are performed via motion-based processing without the need for a hard invocation protocol such as a mouse click, a tap on a screen, or similar interrupt driven execution protocol or process.

Virtual Training Systems, Apparatuses, Interfaces, and Methods Implementing them Including Two or More User Input Devices or System Devices and/or User Feedback Elements and/or Devices Embodiments of this disclosure relate to systems, apparatuses, and/or interfaces and methods for implementing them on, with the aid of, or in a computer, wherein the systems, apparatuses, and/or interfaces and methods are constructed to interact with 3D or n-dimensional (nD) environments using at least two user interface elements or devices.

The systems, apparatuses, and/or interfaces include at least one motion sensor (including, in all cases herein, the output of and/or the inclusion of at least one motion senor), at least one processing unit (including, in all cases herein, the output of and/or the inclusion of at least one processing unit), and at least two user feedback elements and/or units (including, in all cases herein, the output of and/or the inclusion of at least two user feedback elements and/or units). The systems, apparatuses, and/or interfaces permit the ability to control, interact, manipulate, traverse, and/or navigate 2D, 3D, and/or nD environments. The feedback elements and/or units generally comprise a display device and an eye and/or head tracking device, wherein a cursor (herein included and throughout, a cursor is a feedback mechanism in any form, and typically represented as a reticle or visible indicator) is included for controlling, interacting with, manipulating, traversing, and/or navigating a 2D, 3D, or nD environment. The feedback head tracking device may provide feedback in the form of controlling a cursor, reticle or other feedback attribute on a display, device, or environment.

Embodiments of this disclosure provide apparatuses comprising an interface configured to receive first input corresponding to first movement of at least one cursor in a handheld controller or virtual version thereof controlling device; and receiving second input corresponding to moving the device within a VR or AR environment corresponding to the device moving in the real-world and displaying the environment; and/or displaying an indication that the device has moved in the real-world in accord with the movement in the environment.

In other embodiments, the apparatuses further comprise the display device. In other embodiments, the first input and the second input are received from the same input device. In other embodiments, the apparatuses further comprise the input device. In other embodiments, the input device comprises an eye tracking device or a motion sensor. In other embodiments, the first input is received from a first input device and wherein the second input is received from a second input device that is distinct from the first input device.

Embodiments of this disclosure provide apparatuses, systems, and interfaces and method implementing them, wherein the processing unit or processor collects and/or captures trainee data as the trainee is engaged in a training session and uses, modifies, alters, changes, and/or augments the training routine during or after the training session. The modifications, changes, alterations, and/or augmentations may be performed at any time and additionally, the routine may be changed, modified, altered, and/or augmented for each trainee. Additionally, the apparatuses, systems, and interfaces and method implementing them may be configured so that different versions of the routing may be saved to accommodate different needs for different groups of trainees. For example, if the apparatuses, systems, and interfaces and method implementing them detect that a group of trainees is having problems mastering one particular task, then the training routine version that these trainees would invoke would be designed to improve the trainee's competency in the task. As another example, different versions may be constructed based on a trainee's learning proclivities so that the training routines may better accommodate the different learning patterns of trainees—emphasizing more visual features for visual learners, more audio features for auditory learners, mixed visual and audio features for learners that learn both visual and auditory learners. The apparatuses, systems, and interfaces and method implementing them may also include tactile features to improve non visual, audio, or audiovisual learning.

Embodiments of this disclosure also provide predictive virtual training systems, apparatuses, and/or interfaces and methods for implementing them, wherein the systems, apparatuses, and/or interfaces receive input from or include one or more processing units, one or more motion sensing devices or motion sensors, optionally one or more non-motion sensors, one or more input devices, and one or more output devices such as one or more display devices, wherein the processing unit includes a virtual training program and is configured to (a) output the training program in response to user input data sensed by the sensors or received from the input devices, (b) collect user interaction data while performing the virtual training program, and (c) modify, alter, change, augment, update, enhance, reformat, restructure, and/or redesign the virtual training program to better tailor the virtual training program for each user, for each user, type and/or for all users.

The predictive training systems, apparatuses, and/or interfaces and methods for implementing them, wherein the virtual training systems, apparatuses, and/or interfaces include at one or more processing units, one or more motion sensing devices, one or more other sensors, one or more input devices, and/or one or more output devices, wherein the processing unit is configured to: receive data from the motion sensing devices, other sensors, and/or the input devices; use the data for training in 2D, 3D, 4D, and/or nD virtual reality (VR) environments or AR/MR/XR environments, and/or any other environment the includes both real content or features and computer-generated (CG) content or features; and control, activate, interact with, and/or manipulate the environments and environment features and/or content.

In certain embodiment, the virtual training systems, apparatuses, and/or interfaces and methods for implementing them, permit mimicking techniques for overlaying trainee actions onto expert actions to compare/contrast the two and/or aid in improving trainee expertise. The virtual training systems, apparatuses, and/or interfaces and methods for implementing them, use motion-based processing to enhance virtual training and environment interaction, wherein the environments include virtual objects, adjustable attributes, and hot spots that may be scrolled through, selected and activated, and/or adjusted attributes based on motion data, and/or motion data and timed holds, and/or motion data and predictive data, and/or motion data and hard select data, and/or motion data and voice data or tactile data, wherein the motion data may be used as the primary input data with the other data being used to confirm selection. In certain embodiments, the virtual training systems, apparatuses, and/or interfaces and methods for implementing them, may act on the data only if one or more data properties exceed one or more threshold criteria associated with the particular received data.

The systems, apparatuses, interfaces and methods implementing them are designed to allow the processing unit to collect data from the sensors and capture trainee data as the trainee trains with the training program or exercise and to use the data to modify, alter, change, augment, update, enhance, reformat, restructure, and/or redesign a virtual training routine, exercise, program, etc. to better tailor the training routine, exercise, program, etc. for each user or for all users, where the changes may be implemented before, during and after a training session. The processing unit is therefore configured to receive data from the sensors and the input devices and to use the data for training and/or awareness, servicing and logistics in a virtual reality (VR) environment or in an environment including real content and virtual or computer-generated content sometime referred to as AR/MR/XR environments and wherein the processing unit collects data from the sensors and the input devices and captures trainee data as the trainee interact with the training program or exercise and uses the data to modify, alter, change, augment, update, enhance, reformat, restructure, and/or redesign a virtual training routine, exercise, program, etc. to better tailor the training routine, exercise, program, etc. for each user or for all users, where the changes may be implemented before, during and after a training session. In certain embodiments, the virtual training and predictive training systems, apparatuses, and/or interfaces and methods for implementing them of this disclosure are directed to training users to use a device in a proper way, especially medical devices such as automatic injector systems for administering medication for treating diseases, cancers, autoimmune diseases, or any other medical malady requiring periodic administration of medications.

BRIEF DESCRIPTION OF THE DRAWINGS OF THE DISCLOSURE

The disclosure can be better understood with reference to the following detailed description together with the appended illustrative drawings in which like elements are numbered the same:

Schematic Flow Charts Virtual Training Methods

Figure 2:
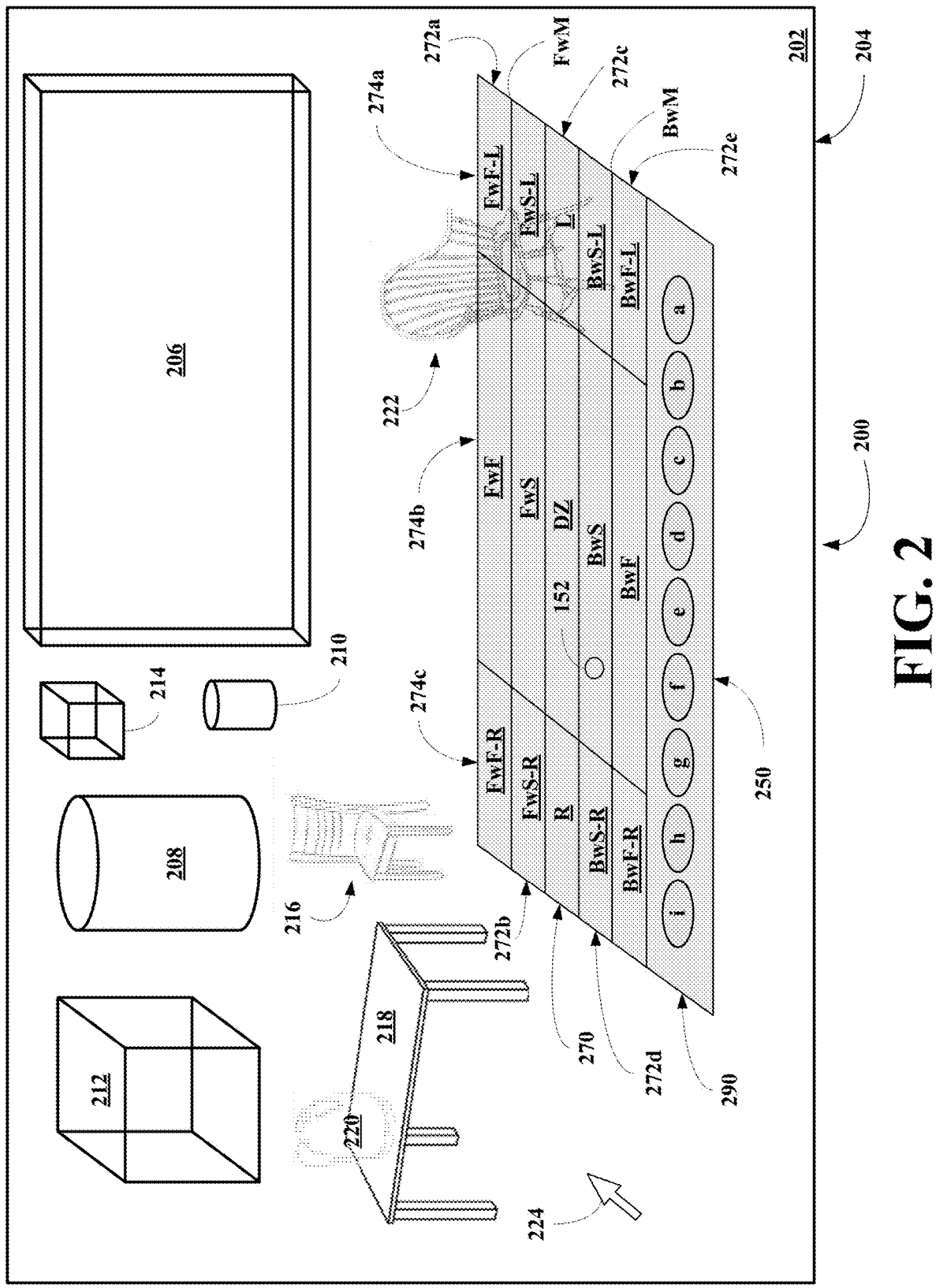

Virtual Training nD Systems Featuring Multiple User Input and/or Feedback Devices FIG. 2 depicts another embodiment of an embodiment of systems, apparatuses, and/or interfaces of this disclosure using two user feedback devices, a display device displaying a 3D environment and eye/head-tracking glasses projecting a control interface into or onto the 3D environment such as a VR or AR environment.

Figure 3A:
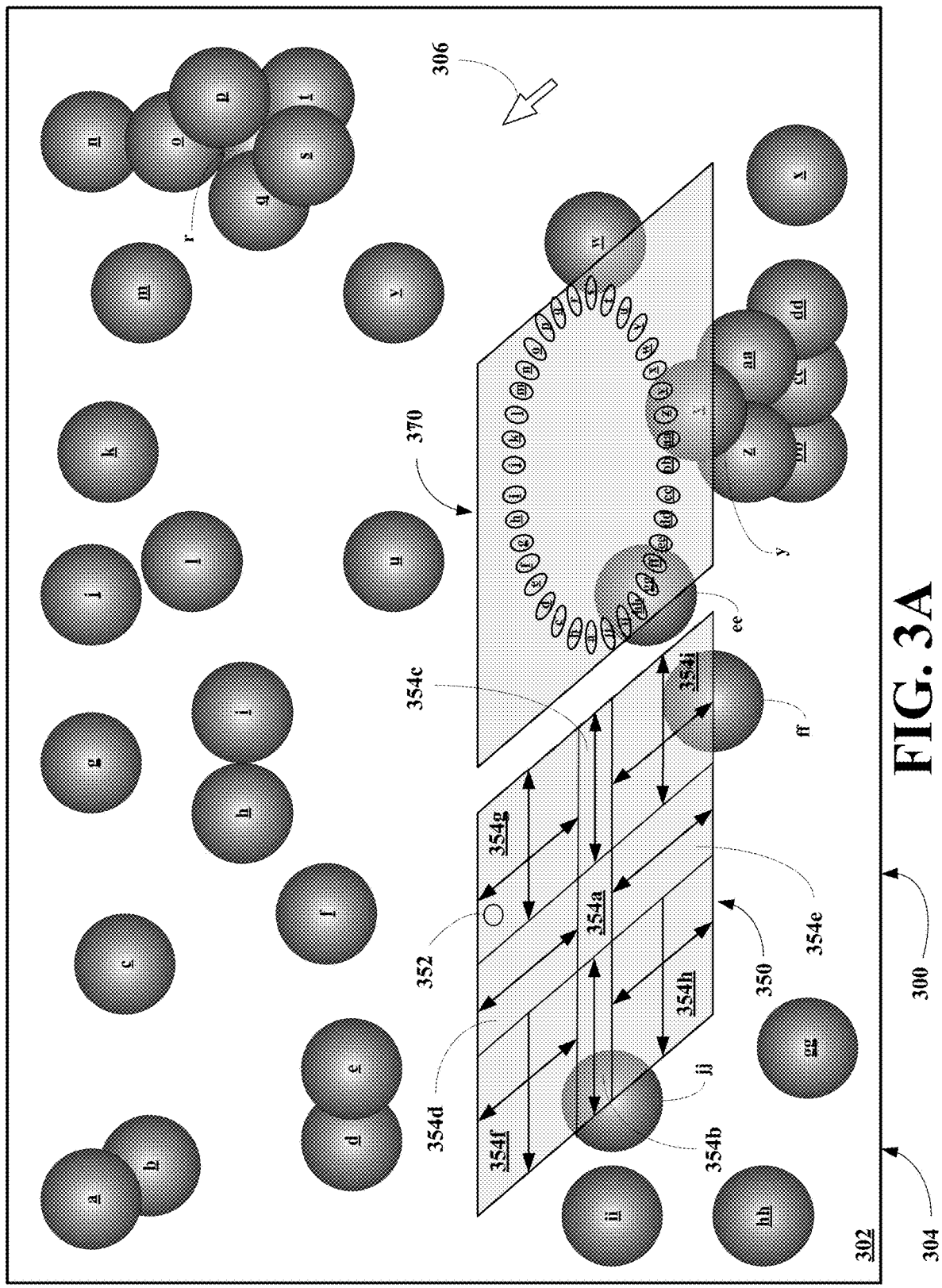

FIG. 3A depicts another embodiment of an embodiment of systems, apparatuses, and/or interfaces of this disclosure using two user feedback devices, a display device displaying a 3D environment and eye/head-tracking glasses projecting a control interface into or onto the 3D environment such as a VR or AR environment.

Figure 3B:
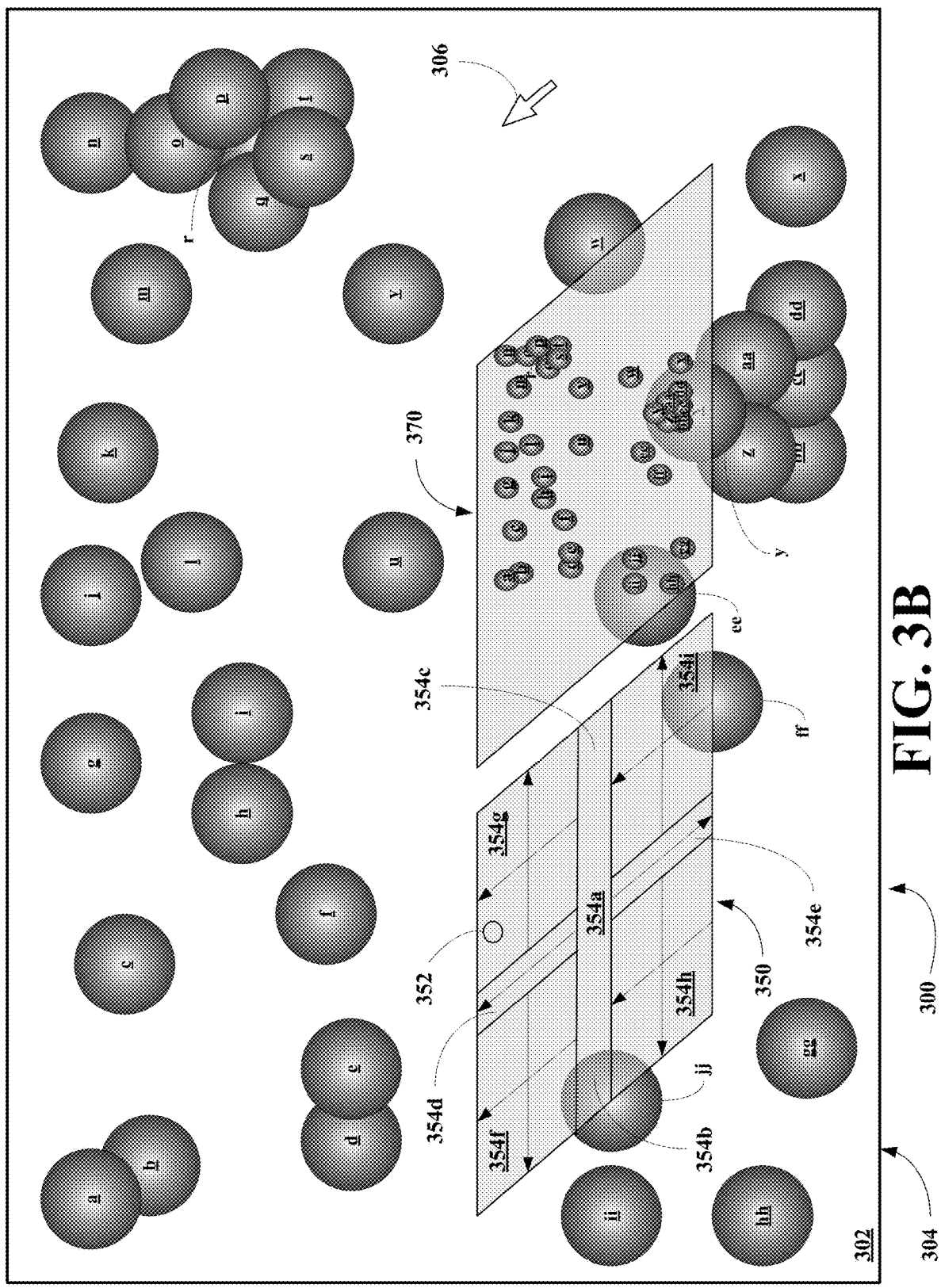

FIG. 3B depicts another embodiment of an embodiment of systems, apparatuses, and/or interfaces of this disclosure using two user feedback devices, a display device displaying a 3D environment and eye/head-tracking glasses projecting a control interface into or onto the 3D environment such as a VR or AR environment.

Figure 4:
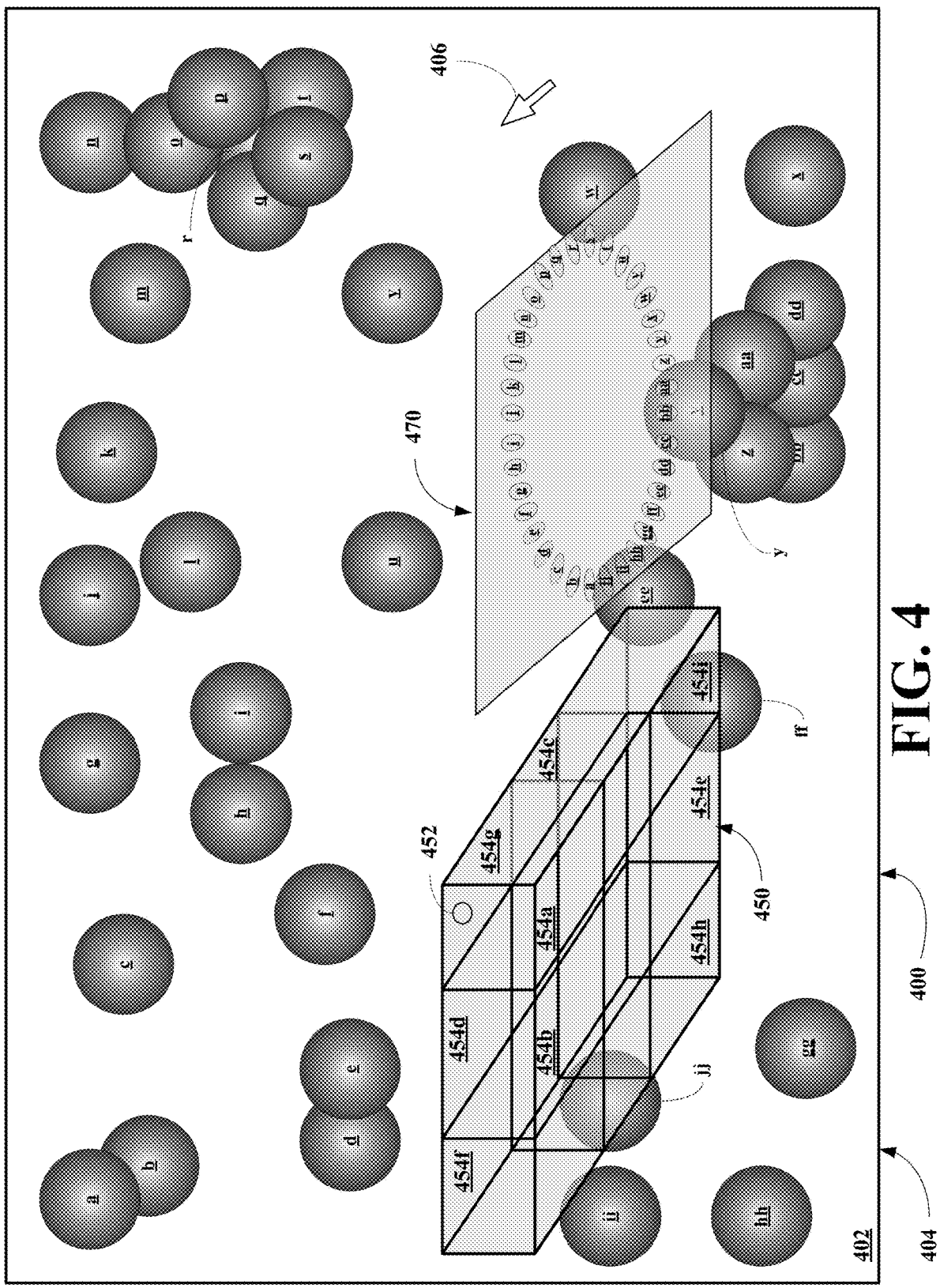

FIG. 4 depicts another embodiment of an embodiment of systems, apparatuses, and/or interfaces of this disclosure using two user feedback devices, a display device displaying a 3D environment and eye/head-tracking glasses projecting a control interface into or onto the 3D environment such as a VR or AR environment using a 3D construct.

FIGS. 5A-D depict another embodiment of an embodiment of systems, apparatuses, and/or interfaces of this disclosure using two user feedback devices, a display device displaying a 3D environment and eye/head-tracking glasses projecting a control interface into or onto the 3D environment such as a VR or AR environment.

Illustrative Virtual Training System Implementations

FIGS. 6A-D depict another embodiment of an embodiment of systems, apparatuses, and/or interfaces of this disclosure using two user feedback devices, a display device displaying a 3D environment and eye/head-tracking glasses projecting a control interface into or onto the 3D environment such as a VR or AR environment.

FIGS. 7A-D depict another embodiment of an embodiment of systems, apparatuses, and/or interfaces of this disclosure using two user feedback devices, a display device displaying a 3D environment and eye/head-tracking glasses projecting a control interface into or onto the 3D environment such as a VR or AR environment.

FIGS. 8A-D depict another embodiment of an embodiment of systems, apparatuses, and/or interfaces of this disclosure using two user feedback devices, a display device displaying a 3D environment and eye/head-tracking glasses projecting a control interface into or onto the 3D environment such as a VR or AR environment.

FIGS. 9A-I depict another embodiment of an embodiment of systems, apparatuses, and/or interfaces of this disclosure using two user feedback devices, a display device displaying a 3D environment and eye/head-tracking glasses projecting a control interface into or onto the 3D environment such as a VR or AR environment.

Schematic Flow Charts Virtual Training Methods

Figure 10:
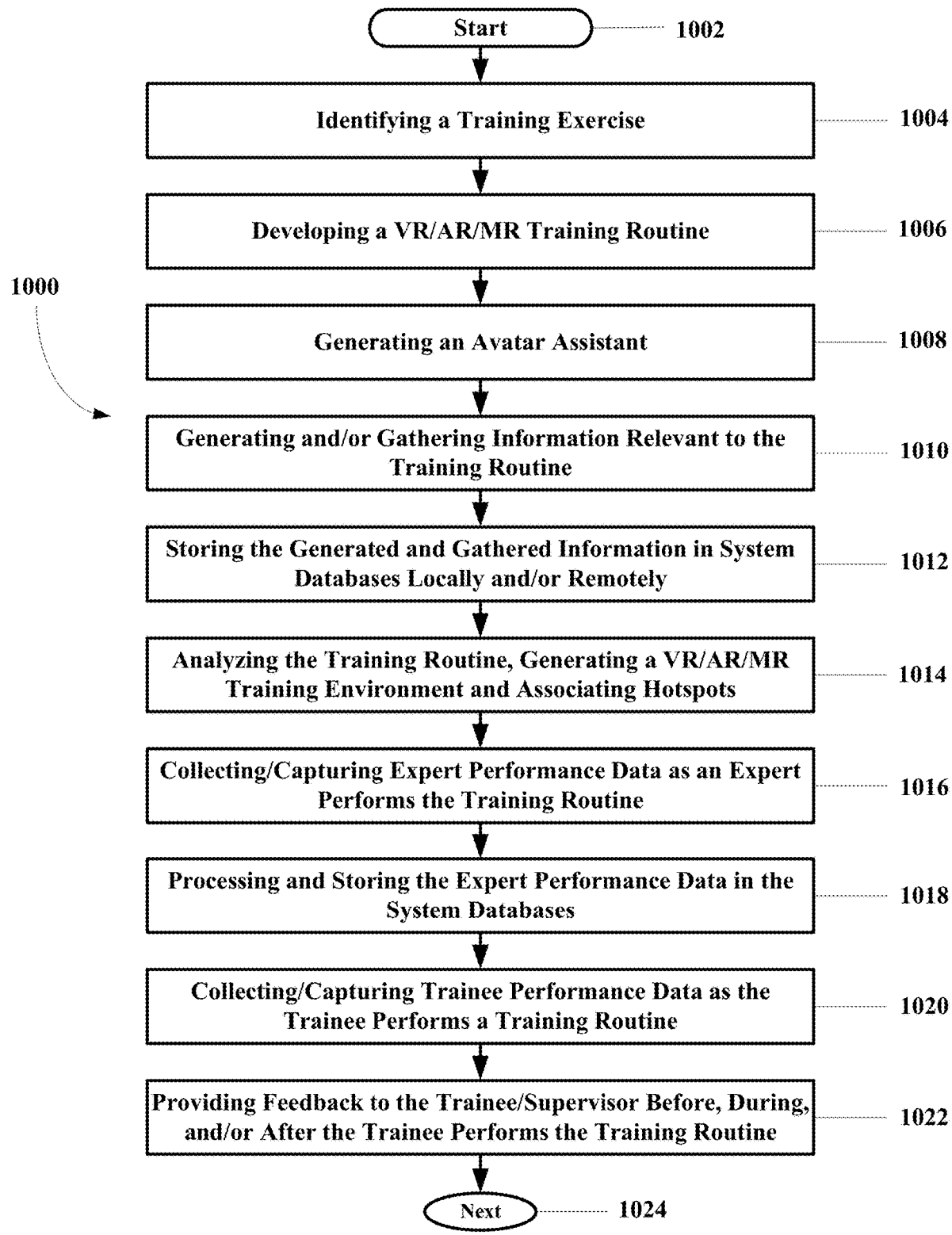

FIG. 10 depict another embodiment of a schematic flow chart of a method of training.

Schematic Flow Charts Predictive Virtual Training Methods

Figure 11:
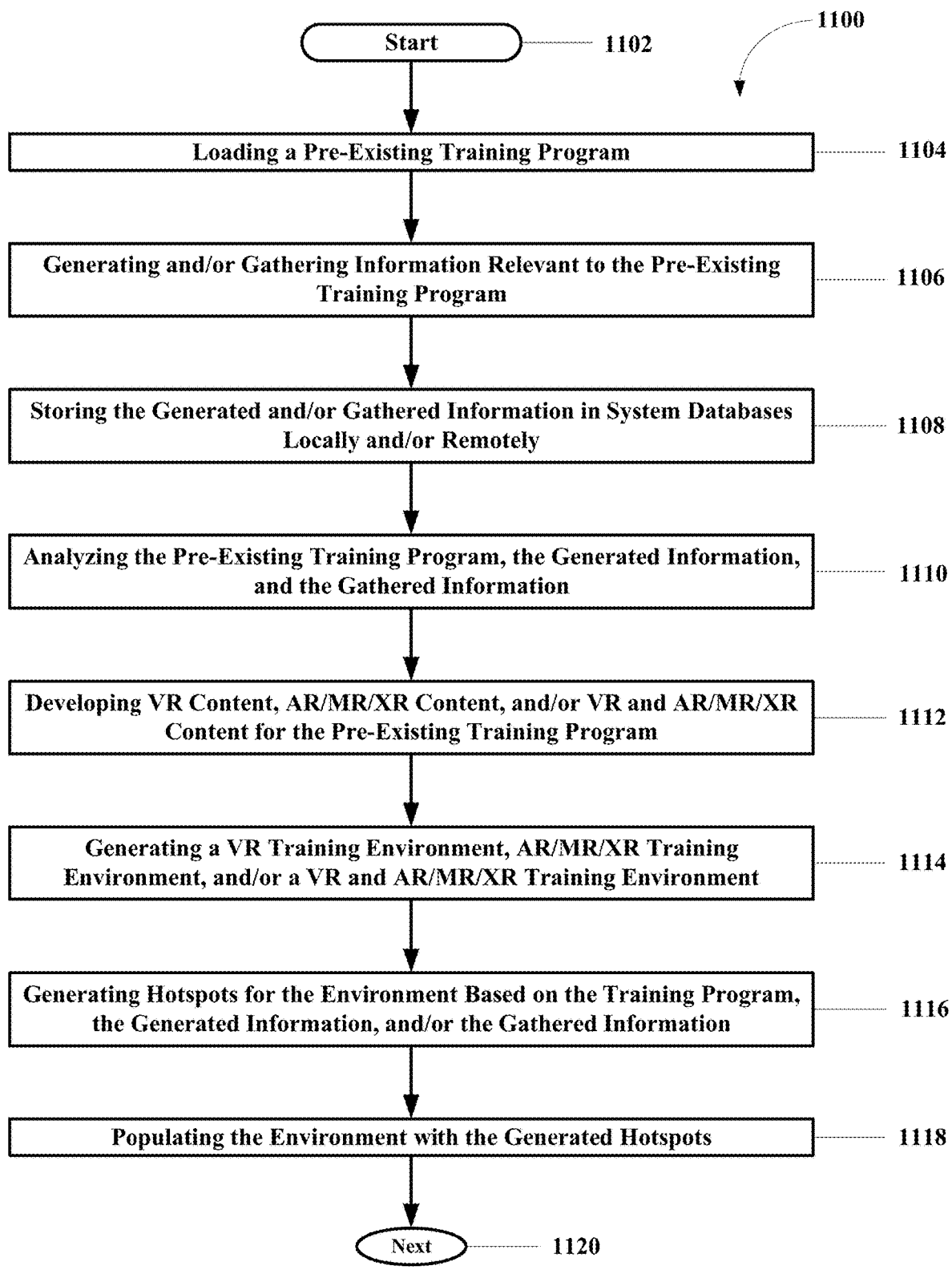

FIG. 11 depicts another embodiment of a schematic flow chart of a method of training.

Modify Routine Based on Interaction

FIGS. 12A-D depict modifying cockpit hot spots based on user interaction.

Interacting with the Routine Based on Motion

FIGS. 13A-J depict user interaction with the cockpit training routine via motion-based selecting and information retrieval.

Avatar Expressions

Figures 14M, 14N, 14O, 14P:
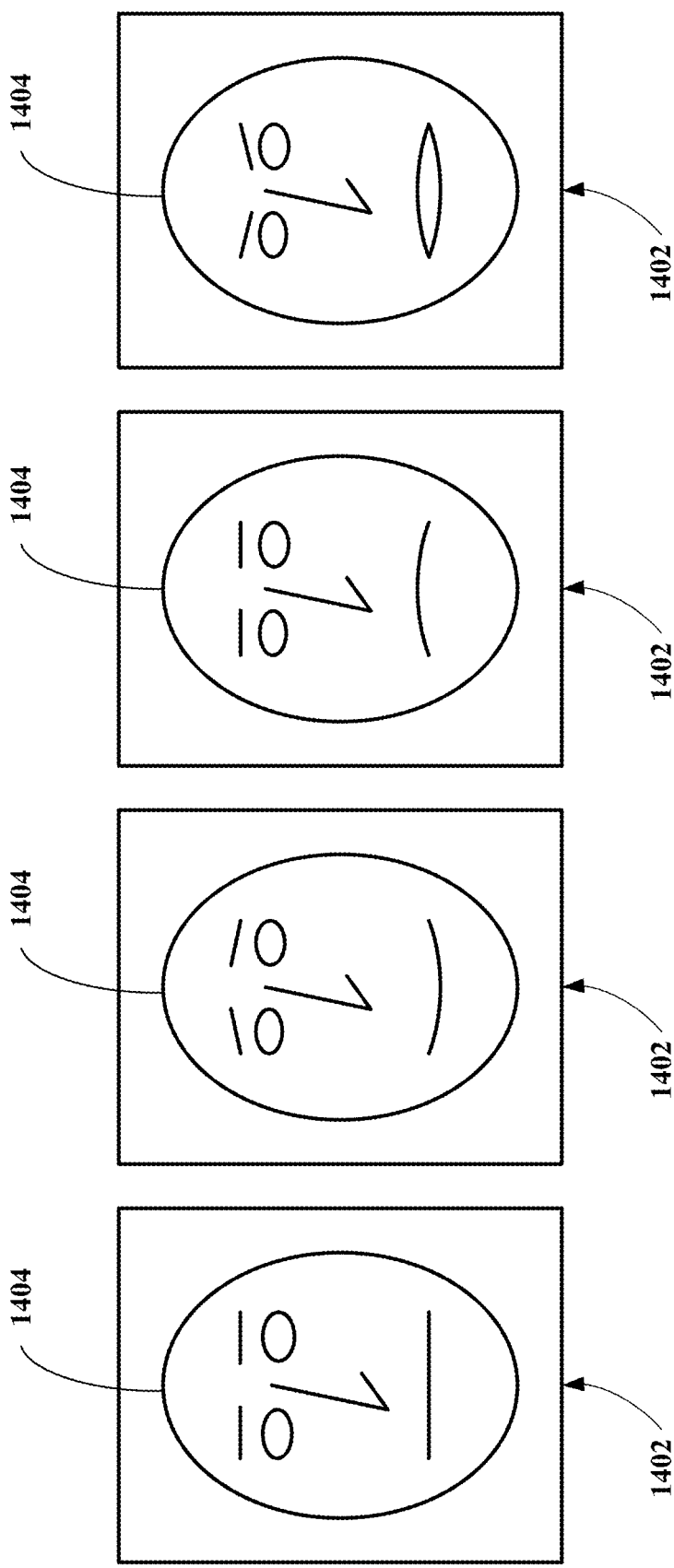
Figures 14Q, 14R, 14S, 14T:
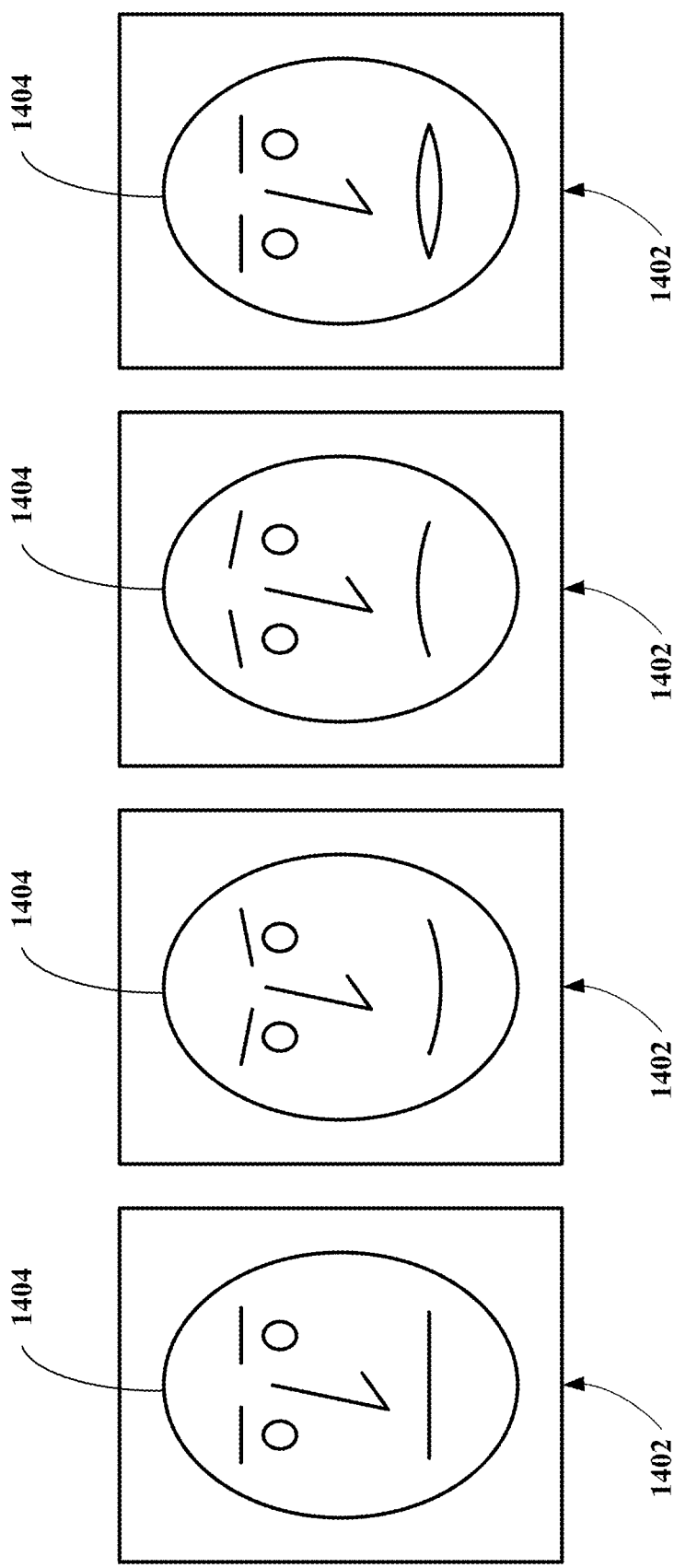

FIGS. 14A-T depict avatar facial expressions that may be associated with a trainee's performance of the routine.

FIGS. 15A-F depict avatar body expressions that may be associated with a trainee's performance of the routine.

Figure 16A:
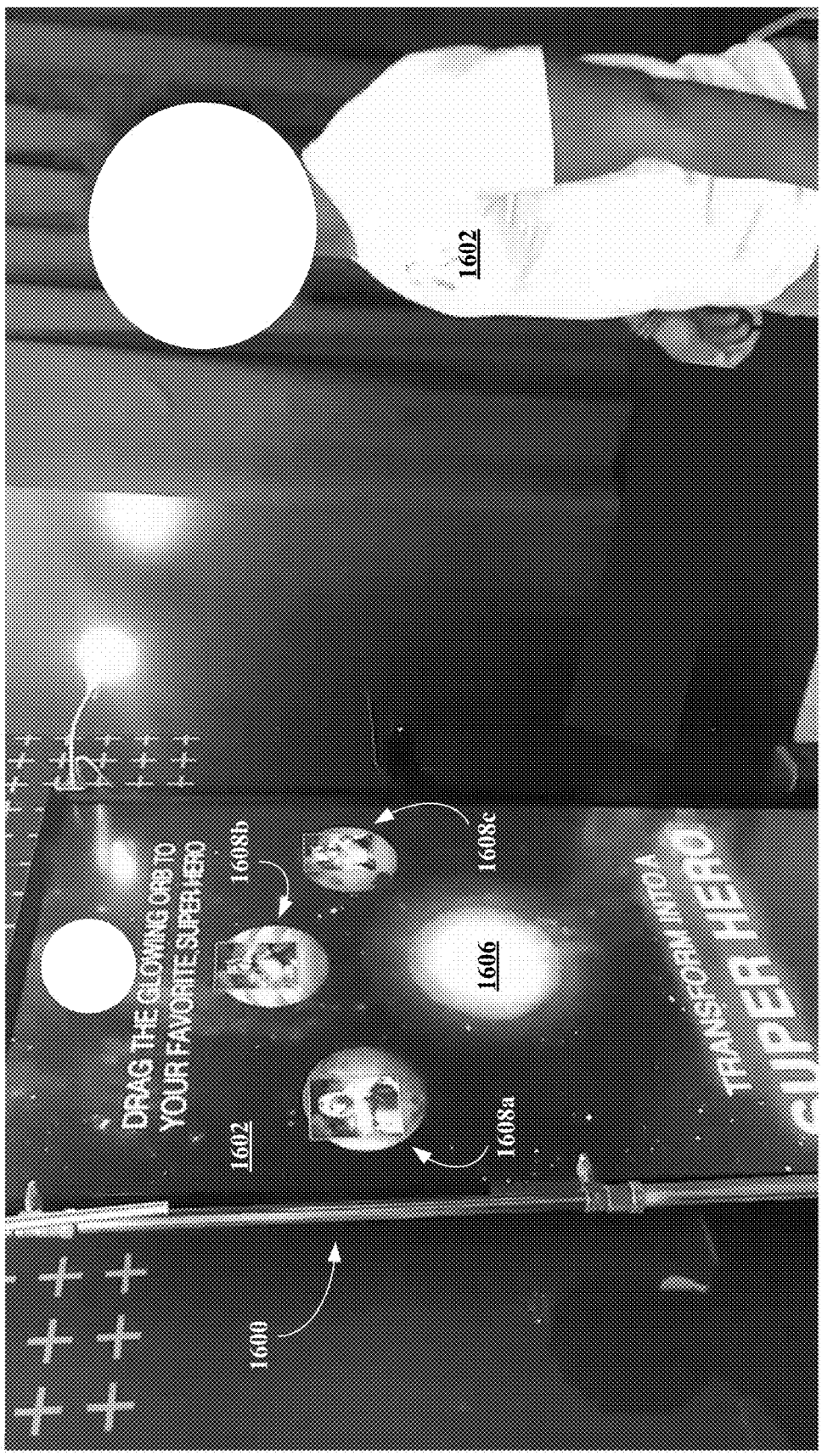
Figure 16B:
Figure 16C:
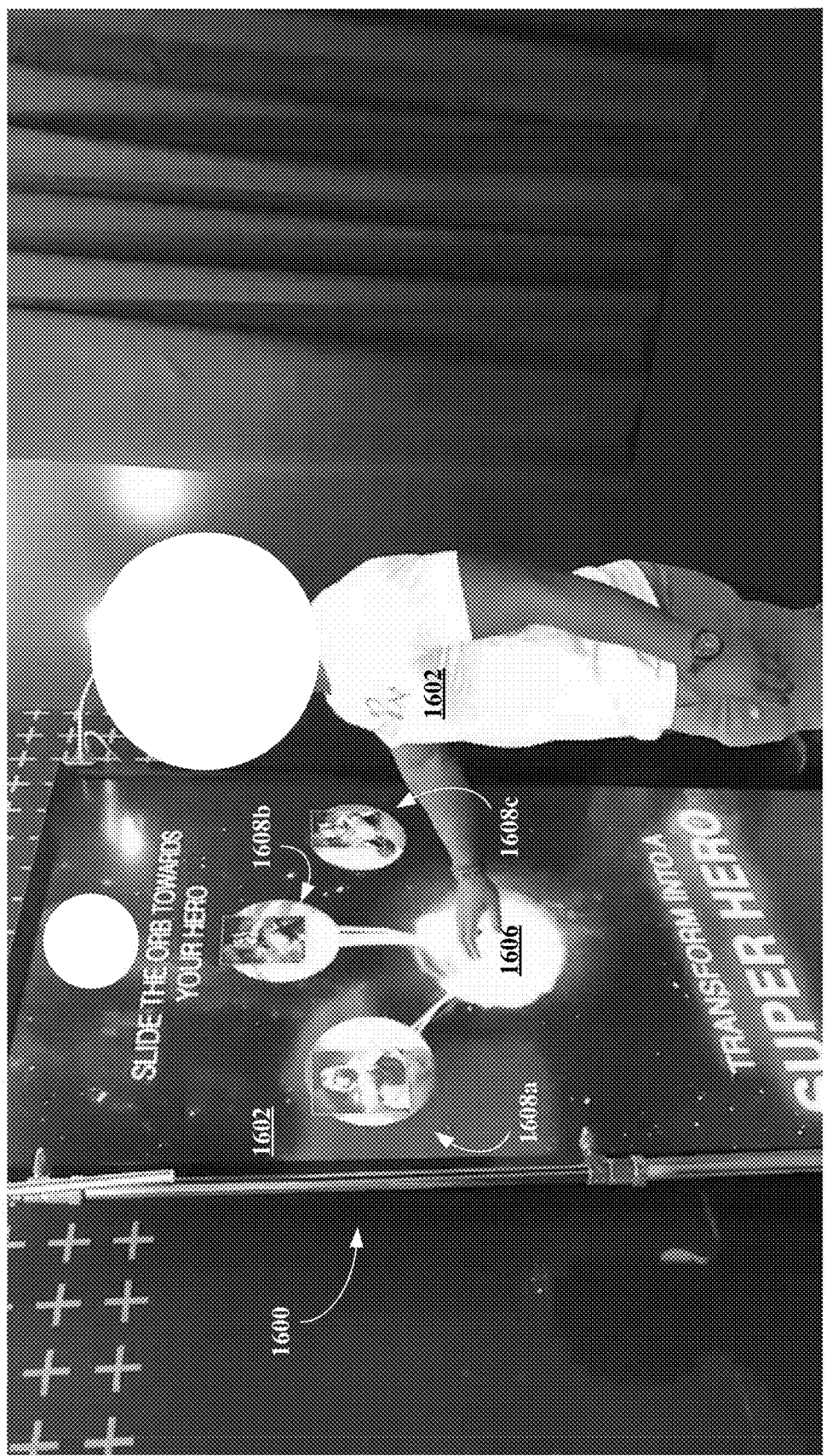
Figure 16D:
Figure 16E:
Figure 16F:
Figure 16G:

FIGS. 16A-AF depict an interaction with a system, apparatus, interface, and implementing methods being used to activate a user capture session illustrating the capture of the user performing a series of postures.

DEFINITIONS USED IN THE DISCLOSURE

The term "at least one", "one or more", and "one or a plurality" mean one thing or more than one thing with no limit on the exact number; these three terms may be used interchangeably within this application. For example, at least one device means one or more devices or one device and a plurality of devices.

The term "about" means that a value of a given quantity is within ±20% of the stated value. In other embodiments, the value is within ±15% of the stated value. In other embodiments, the value is within ±10% of the stated value. In other embodiments, the value is within ±7.5% of the stated value. In other embodiments, the value is within ±5% of the stated value. In other embodiments, the value is within ±2.5% of the stated value. In other embodiments, the value is within ±1% of the stated value.

The term "substantially" or "essentially" means that a value of a given quantity is within ±10% of the stated value. In other embodiments, the value is within ±7.5% of the stated value. In other embodiments, the value is within ±5% of the stated value. In other embodiments, the value is within ±2.5% of the stated value. In other embodiments, the value is within ±1% of the stated value. In other embodiments, the value is within ±0.5% of the stated value. In other embodiments, the value is within ±0.1% of the stated value.

The term "hard select" or "hard select protocol" or "hard selection" or "hard selection protocol" means a mouse click or double click (right and/or left), keyboard key strike, tough down event, lift off event, touch screen tab, haptic device touch, voice command, hover event, eye gaze event, or any other action that required a user action to generate a specific output to affect a selection of an object or item displayed on a display device. The term "voice command" means an audio command sensed by an audio sensor. The term "neural command" means a command sensed by a sensor capable of reading neuro states.

The term "motion" and "movement" are often used interchangeably and mean motion or movement that is capable of being detected by a motion sensor within an active zone of the sensor, wherein the motion may have properties including direction, speed, velocity, acceleration, magnitude of acceleration, and/or changes of any of these properties over a period of time. Thus, if the sensor is a forward viewing sensor and is capable of sensing motion within a forward extending conical active zone, then movement of anything within that active zone that meets certain threshold detection criteria, will result in a motion sensor output, where the output may include at least direction, angle, distance/displacement, duration (time), velocity, and/or acceleration. Moreover, if the sensor is a touch screen or multitouch screen sensor and is capable of sensing motion on its sensing surface, then movement of anything on that active zone that meets certain threshold detection criteria, will result in a motion sensor output, where the output may include at least direction, angle, distance/displacement, duration (time), velocity, and/or acceleration. Of course, the sensors do not need to have threshold detection criteria, but may simply generate output anytime motion or any kind is detected. The processing units can then determine whether the motion is an actionable motion or movement and a non-actionable motion or movement.

The term "motion sensor" or "motion sensing component" means any sensor or component capable of sensing motion of any kind by anything with an active zone area or volume, regardless of whether the sensor's or component's primary function is motion sensing. Of course, the same is true of sensor arrays regardless of the types of sensors in the arrays or for any combination of sensors and sensor arrays.

The term "gaze controls" means taking gaze tracking input from sensors and converting the output into control features including all type of commands. The sensors may be eye and/or head tracking sensors, where the sensor may be processors that are in communication with mobile or non-mobile apparatuses including processors. In VR/AR/MR/XR applications using mobile or non-mobile devices, the apparatuses, systems, and interfaces of this disclosure may be controlled by input from gaze tracking sensors, from processing gaze information from sensors on the mobile devices or non-mobile devices or communication with the mobile devices or non-mobile devices that are capable of determine gaze and/or posture information, or mixtures and combinations.

The term "eye tracking sensor" means any sensor capable of tracking eye movement such as eye tracking glasses, eye tracking cameras, or any other eye tracking sensor.

The term "head tracking sensor" means any sensor capable of tracking head movement such as head tracking helmets, eye tracking glasses, head tracking cameras, or any other head tracking sensor.

The term "face tracking sensor" means any sensor capable of tracking face movement such as any facial head tracking gear, face tracking cameras, or any other face tracking sensor.

The term "gaze" or "pose" or "pause" means any type of fixed motion over a period of time that may be used to cause an action to occur. Thus, in eye tracking, a gaze is a fixed stare of the eyes or eye over a period of time greater than a threshold, in body, body part, or face tracking, a pose is a stop in movement of the body or body part or holding a specific body posture or body part configuration for a period of time greater than a threshold, and a pause is a stop in motion for a period of time greater than a threshold, that may be used by the systems, apparatuses, interfaces, and/or implementing methods to cause an action to occur.

The term "real object" or "real-world object" means real-world device, attribute, or article that is capable of being controlled by a processing unit. Real or real-world objects include objects or articles that have real-world presence including physical, mechanical, electro-mechanical, magnetic, electro-magnetic, electrical, or electronic devices, waveform devices, or any other real-world device that may be controlled by a processing unit.

The term "virtual object" means any construct generated in or attribute associated with a virtual world or by a computer and may be displayed by a display device and that are capable of being controlled by a processing unit. Virtual objects include objects that have no real-world presence, but are still controllable by a processing unit or output from a processing unit(s). These objects include elements within a software system, product or program such as icons, list elements, menu elements, applications, files, folders, archives, generated graphic objects, 1D, 2D, 3D, and/or nD graphic images or objects, generated real-world objects such as generated people, generated animals, generated devices, generated plants, generated landscapes and landscape objects, generate seascapes and seascape objects, generated sky scapes or sky scape objects, 1D, 2D, 3D, and/or nD zones, 2D, 3D, and/or nD areas, 1D, 2D, 3D, and/or nD groups or areas, volumes, attributes or characteristics such as quantity, shape, zonal, field, affecting influence changes or the like, or any other generated real-world or imaginary objects or attributes. Augmented and/or Mixed reality is a combination of real and virtual objects and attributes.

The term "entity" means a human or an animal or robot or robotic system (autonomous or non-autonomous or virtual representation of a real or imaginary entity.

The term "entity object" means a human or a part of a human (fingers, hands, toes, feet, arms, legs, eyes, head, body, etc.), an animal or a part of an animal (fingers, hands, toes, feet, arms, legs, eyes, head, body, etc.), or a real-world object under the control of a human or an animal or a robot and include such articles as pointers, sticks, or any other real-world object that can be directly or indirectly controlled by a human or animal or a robot. In VR/AR environments, the entity object may also include virtual objects.

The term "mixtures" means different objects, attributes, data, data types or any other feature that may be mixed together or controlled together.

The term "combinations" means different objects, attributes, data, data types or any other feature that may be packages or bundled together but remain separate.

The term "sensor data" means data derived from at least one sensor including user data, motion data, environment data, temporal data, contextual data, historical data, waveform data, other types of data, and/or mixtures and combinations thereof.

The term "user data" means user attributes, attributes of entities under the control of the user, attributes of members under the control of the user, information or contextual information associated with the user, or mixtures and combinations thereof.

The terms "user features", "entity features", and "member features" means features including: (a) overall user, entity, or member shape, texture, proportions, information, matter, energy, state, layer, size, surface, zone, area, any other overall feature, attribute or characteristic, and/or mixtures or combinations thereof; (b) specific user, entity, or member part shape, texture, proportions, characteristics, any other part feature, and/or mixtures or combinations thereof; (c) particular user, entity, or member dynamic shape, texture, proportions, characteristics, any other part feature, and/or mixtures or combinations thereof; and (d) mixtures or combinations thereof. For certain software programs, routines, and/or elements, features may represent the manner in which the program, routine, and/or element interact with other software programs, routines, and/or elements operate or are controlled. All such features may be controlled, manipulated, and/or adjusted by the motion-based systems, apparatuses, and/or interfaces of this disclosure.

The term "motion data" or "movement data" means data generated by one or more motion sensor or one or more sensors of any type capable of sensing motion/movement comprising one or a plurality of motions/movements detectable by the motion sensors or sensing devices.

The term "motion properties" or "movement properties" means properties associated with the motion data including motion/movement direction (linear, curvilinear, circular, elliptical, etc.), motion/movement distance/displacement, motion/movement duration (time), motion/movement velocity (linear, angular, etc.), motion/movement acceleration (linear, angular, etc.), motion signature or profile manner of motion/movement (motion/movement properties associated with the user, users, objects, areas, zones, or combinations of thereof), dynamic motion properties such as motion in a given situation, motion learned by the system based on user interaction with the systems, motion characteristics based on the dynamics of the environment, influences or affectations, changes in any of these attributes, and/or mixtures or combinations thereof. Motion-based or movement-based data is not restricted to the movement of a single body, body part, and/or member under the control of an entity, but may include movement of one or any combination of movements of any entity and/or entity object. Additionally, the actual body, body part and/or member's identity is also considered a movement attribute. Thus, the systems/apparatuses, and/or interfaces of this disclosure may use the identity of the body, body part and/or member to select between different set of objects that have been pre-defined or determined based on environment, context, and/or temporal data.

The term "gesture" or"predetermine movement pattern" means a predefined movement or posture preformed in a particular manner such as closing a fist lifting a finger that is captured compared to a set of predefined movements that are tied via a lookup table to a single function and if and only if, the movement is one of the predefined movements does a gesture based system actually go to the lookup and invoke the predefined function.

The term "environment data" means data associated with the user's surrounding or environment such as location (GPS, etc.), type of location (home, office, store, highway, road, etc.), extent of the location, context, frequency of use or reference, attributes, characteristics, and/or mixtures or combinations thereof.

The term "temporal data" means data associated with duration of motion/movement, events, actions, interactions, etc., time of day, day of month, month of year, any other temporal data, and/or mixtures or combinations thereof.

The term "historical data" means data associated with past events and characteristics of the user, the objects, the environment and the context gathered or collected by the systems over time, or any combinations of these.

The term "contextual data" means data associated with user activities, environment activities, environmental states, frequency of use or association, orientation of objects, devices or users, association with other devices and systems, temporal activities, any other content or contextual data, and/or mixtures or combinations thereof.

The term "predictive data" means any data from any source that permits that apparatuses, systems, interfaces, and/or implementing methods to use data to modify, alter, change, augment, update, enhance, reformat, restructure, and/or redesign a virtual training routine, exercise, program, etc. to better tailor the training routine, exercise, program, etc. for each user or for all users, where the changes may be implemented before, during and after a training session.

The term "simultaneous" or "simultaneously" means that an action occurs either at the same time or within a small period of time. Thus, a sequence of events is considered to be simultaneous if they occur concurrently or at the same time or occur in rapid succession over a short period of time, where the short period of time ranges from about 1 nanosecond to 5 second. In other embodiments, the period ranges from about 1 nanosecond to 1 second. In other embodiments, the period ranges from about 1 nanosecond to 0.5 seconds. In other embodiments, the period ranges from about 1 nanosecond to 0.1 seconds. In other embodiments, the period ranges from about 1 nanosecond to 1 millisecond. In other embodiments, the period ranges from about 1 nanosecond to 1 microsecond. It should be recognized that any value of time between any stated range is also covered.

The term "and/or" means mixtures or combinations thereof so that whether an "and/or" connectors is used, the "and/or" in the phrase or clause or sentence may end with "and mixtures or combinations thereof".

The term "spaced apart" means for example that objects displayed in a window of a display device are separated one from another in a manner that improves an ability for the systems, apparatuses, and/or interfaces to discriminate between objects based on movement sensed by motion sensors associated with the systems, apparatuses, and/or interfaces.

The term "maximally spaced apart" means that objects displayed in a window of a display device are separated one from another in a manner that maximizes a separation between the objects to improve an ability for the systems, apparatuses, and/or interfaces to discriminate between objects based on motion/movement sensed by motion sensors associated with the systems, apparatuses, and/or interfaces.

The term "s" means one or more seconds. The term "ms" means one or more milliseconds ($10^{-3}$ seconds). The terms "µs" means one or more micro seconds ($10^{-6}$ seconds). The term "ns" means nanosecond ($10^{-9}$ seconds). The term "ps"

means pico second ($10^{-12}$ seconds). The term "fs" means femto second ($10^{-15}$ seconds). The term "as" means femto second ($10^{-18}$ seconds).

The term "hold" means to remain stationary at a display location for a finite duration generally between about 1 ms to about 2 s.

The term "brief hold" means to remain stationary at a display location for a finite duration generally between about 1 μs to about 1 s.

The term "microhold" or "micro duration hold" means to remain stationary at a display location for a finite duration generally between about 1 as to about 500 ms. In certain embodiments, the microhold is between about 1 fs to about 500 ms. In certain embodiments, the microhold is between about 1 ps to about 500 ms. In certain embodiments, the microhold is between about 1 ns to about 500 ms. In certain embodiments, the microhold is between about 1 μs to about 500 ms. In certain embodiments, the microhold is between about 1 ms to about 500 ms. In certain embodiments, the microhold is between about 100 us to about 500 ms. In certain embodiments, the microhold is between about 10 ms to about 500 ms. In certain embodiments, the microhold is between about 10 ms to about 250 ms. In certain embodiments, the microhold is between about 10 ms to about 100 ms.

The term "VR" means virtual reality and encompasses computer-generated simulations of a two-dimension, three-dimensional and or four-dimensional, or multi-dimensional images and/or environments that may be interacted with in a seemingly real or physical way by a person using special electronic equipment, such as a helmet with a screen inside or gloves fitted with sensors.

The term "AR" means augmented reality, which is a technology that superimposes a computer-generated image on a user's view of the real-world, thus providing a composite view.

The term "MR" means mixed reality is a blend of physical and virtual worlds that includes both real and computer-generated objects. The two worlds are "mixed" together to create a realistic environment. A user can navigate this environment and interact with both real and virtual objects. Mixed reality (MR) combines aspects of virtual reality (VR) and augmented reality (AR). It is sometimes called "enhanced" AR since it is similar to AR technology, but provides more physical interaction.

The term "XR" means extended reality and refers to all real-and-virtual combined environments and human-machine interactions generated by computer technology and wearables. The levels of virtuality range from partially sensory inputs to immersion virtuality, also called VR.

The terms VR is generally used to mean environments that are totally computer-generated, while AR, MR, and XR are sometimes used interchangeably to mean any environment that includes real content and virtual or computer-generated content. We will often use the AR/MR/XR as a general term for all environments that including real content and virtual or computer-generated content, and these terms may be used interchangeably.

DETAILED DESCRIPTION OF THE DISCLOSURE

The inventors have found that systems, apparatuses, interfaces, and methods for implementing them may be constructed including training routines and environments that greatly enhance training effectiveness and efficiency by first creating new content (audio, audiovisual, video, visual, textual, image, tactile, etc.) and/or gathering existing content (audio, audiovisual, video, visual, textual, image, tactile, etc.) and storing the content in system databases, on dedicated secure servers or secure cloud based servers, and then generating a VR/AR/MR training routine including a VR/AR/MR training environment, analyzing the environment and associating the content with hot spots within the environment, and populating the environment with the hot spots that provide a pathway to the hot spot content generally in the form of activatable objects, textual words or phrases, icons or any other content identifying activatable feature or computer-generated (CG) construct. The content may be stored in local databases, in remote databases located in the "cloud" and/or on dedicated servers so that the content is available as a trainee traverses the training routine. The systems, apparatuses, interfaces, and methods for implementing them include tools for storing, updating, modifying, and/or changing the content in the databases. The content may be structured in many different formats such as structuring the content according to position or location, and/or chronologically such as on a frame by frame bases or in accord with an image sequence or based on some other timing element. The systems, apparatuses, interfaces, and methods for implementing them include attaching system, apparatus or interface functions/attributes/analytics/logic or other software algorithmic elements with the contents so that the content and functions/attributes/analytics/logic or other software algorithmic elements respond to user intent and/or interactions during training activities. The content may be arranged and stored hierarchically so that once a particular content feature is activated, the systems, apparatuses, interfaces, and methods for implementing them will show the content in activatable object form so that the trainee may view all levels of content using any type of technique for traversing hierarchical structure data especially using the motion-based processing of this invention, where motion alone is used to stroll and select and active content at any level.

Once the content is positioned in space/time, and the functions and configurations are assigned, the systems, apparatuses, interfaces, and methods for implementing them populates and configures the VR/AR/MR training environment with the content generally in hot spot objects distributed in the VR/AR/MR training environment according to space and time relevancy. After constructing the VR/AR/MR training environment, a trainee performs the training allowing the trainee to interact with the configured VR/AR/MR training environment. The systems, apparatuses, interfaces, and methods for implementing them may be configured to operate by touch, gaze, motion, mouse navigation, joy stick navigation, gesture navigation, and/or any combination thereof depending on the device being used and the format, but it could be any device running any software capable of displaying a VR/AR/MR training environment and allowing a trainee to interact with the environment and all of its features and content as the trainee undergoes training using the systems, apparatuses, interfaces, and methods for implementing them. Before, during, and/or after training, the systems, apparatuses, interfaces, and methods for implementing them analyzes the interactions, stores the training session data in the system databases, determines performance metrics from the session data, stores the performance metrics in the system databases, and reports the metrics to the trainees and supervisors during and/or after training or during and/or after performing a given training task. The systems, apparatuses, interfaces, and methods for implementing them utilizes or are configure to use the metrics to analyze qualitative, quantitative, confidence, and/or base metric criteria, to determine performance competency criteria, retention criteria, cognition criteria, and/or other performance metric criteria, and to improve, refine, and/or modify qualitative, quantitative, confidence, and/or base metric criteria, environment features, hot spot locations, and hot spot content to improve the training experience. The systems, apparatuses, interfaces, and methods for implementing them may also use CG avatars as guides or assistants to assist the trainee in becoming competent in each task in the training routine and to achieve overall competency. The systems, apparatuses, interfaces, and methods for implementing them may fashion an avatar based on trainee input, may use a pre-structured CG avatar or an on the fly generated CG avatar having characteristic derived from the context of the training and the task being performed. Additionally, the CG avatars may undergo changes on a task-by-task basis or a scene-by-scene basis or any combination thereof, where the changes correlated with changes in the task or scene. The systems, apparatuses, interfaces, and methods for implementing them are configured to collected relevant training data each time the training routine is used and to use the collected data to improve any, some, or all aspects of one, some or all important, relevant, meaningful, and/or interesting features, attributes, properties, and/or characteristics associated with the training routine and all important, relevant, meaningful, and/or interesting features, attributes, properties, and/or characteristics associated with any and all equipment used in the training routine or associated with the training routine. The systems, apparatuses, interfaces, and methods for implementing them are constructed to work seamlessly across all hardware and software platforms.

Embodiments of the systems, apparatuses, and interfaces and methods implementing them include identifying a training routine, which includes a plurality of training tasks. The methods also include developing a VR/AR/MR/XR training routine and generating a trainer avatar as an assistant for trainees participating in the routine. An Avatar may be: a virtual construct of a person or thing, or may represent the view/perspective of the user or another person, or group of perspectives. The methods also include: (a) generating information about all important, relevant, meaningful, and/or interesting features, attributes, properties, and/or characteristics associated with the training routine and all important, relevant, meaningful, and/or interesting features, attributes, properties, and/or characteristics associated with any and all equipment used in the training routine or associated with the training routine and/or (b) gathering information about all important, relevant, meaningful, and/or interesting features, attributes, properties, and/or characteristics associated with the training routine and all important, relevant, meaningful, and/or interesting features, attributes, properties, and/or characteristics associated with any and all equipment used in the training routine or associated with the training routine. The methods also include storing the gathered information in system databases both locally and/or remotely, e.g., databases in the cloud or dedicated servers. The methods also include analyzing the training routine, generating a VR/AR/MR environment for training, and associating/populating hot spots with all relevant, meaningful, or interesting features, attributes, properties, and/or characteristics associated with the training environment and all important, relevant, meaningful, and/or interesting features, attributes, properties, and/or characteristics associated with any and all equipment used in the training environment or associated with the training routine. The methods also include collecting/capturing expert data as an expert goes through the training routine in the training environment, wherein the data includes data on how the expert accomplished each training task, data on what hot spots the trainee activates, data on the duration of time the expert spends in each hot spot and data on the type of information viewed, data indicating a level of competency in each task, data indicating an overall competency, and data associated with ease of using each task, ease of using the entire training routine, and each of using and interacting with the environment. The methods also include collecting/capturing trainee data as a trainee goes through the training routine in the training environment, wherein the data includes data on how the trainee accomplished each training task, data on what hot spots the trainee activates, data on the duration of time the trainee spends in each hot spot and data on the type of information viewed, data indicating a level of competency in each task, data indicating an overall competency, and data associated with ease of using each task, ease of using the entire training routine, and each of using and interacting with the environment. The methods also include providing feedback to the trainee and/or to the supervisors before, during, and/or after each task or before, during, and/or after the entire training routine to the trainee and collecting and storing all feedback data and evaluation data made by supervisors. The methods also include informing the trainee of any deficiencies and providing information on how to improve the trainee performance including showing the trainee performance overlaid on an experts performance for the same task or suggesting way to improve performance. The methods also include analyzing performance data and modifying the hot spots to aid the trainee in those deficient tasks and allowing the trainee to redo the training task or the entire training session. The methods also include repeating the deficient tasks or the entire routine until proficient at each task and the entire routine to a given level of competency. The methods also include analyzing each training session, determining areas that trainees are having problems, and revising the training routine, avatar, and/or environment, and based on the analyses and determinations improving the routine, environment, avatar, hot spots, and/or hot spot content. The methods also include continuing the analyzing, determining, and improving the routine, environment, avatar, hot spots, and/or hot spot content, wherein the improving may include revising, adding, deleting, modifying, and/or changing any some or all aspects of the training routine, environment, avatar, hot spots, and/or hot spot content to enhance its effectiveness over time.

Attractive/Repulsive/Manipulative Apparatuses, Systems, and/or Interfaces

The inventor has found that selection attractive or manipulative apparatuses, systems, and/or interfaces may be constructed that use motion or movement within an active sensor zone of a motion sensor translated to motion or movement of a selection object (seen or unseen) on or within a user feedback device: 1) to discriminate between selectable objects based on the motion, 2) to attract target selectable objects towards the selection object based on properties of the sensed motion including direction, angle, distance/displacement, duration, speed, acceleration, or changes thereof, and 3) to select and simultaneously, synchronously or asynchronously activate a particular or target selectable object or a specific group of selectable objects or controllable area or an attribute or attributes upon "contact" of the selection object with the target selectable object(s), where contact means that: 1) the selection object actually touches or moves inside the target selectable object, 2) touches or moves inside an active zone (area or volume) surrounding the target selectable object, 3) the selection object and the target selectable object merge, 4) a triggering event occurs based on a close approach to the target selectable object(s) or its associated active zone or 5) a triggering event based on a predicted selection meeting a threshold certainty. The touch, merge, or triggering event causes the processing unit to select and activate the object(s), select and activate object attribute lists, select, activate and adjustments of an adjustable attribute.

The objects may represent real and/or virtual objects including: 1) real-world devices under the control of the apparatuses, systems, or interfaces, 2) real-world device attributes and real-world device controllable attributes, 3) software including software products, software systems, software components, software objects, software attributes, active areas of sensors, 4) generated EMF fields, RF fields, microwave fields, or other generated fields, 5) electromagnetic waveforms, sonic waveforms, ultrasonic waveforms, or any other waveform or entity, and/or 6) mixture and combinations thereof. The apparatuses, systems and interfaces of this disclosure may also include remote control units in wired or wireless communication therewith.

The inventor has also found that a velocity (speed and direction) of motion or movement or any other movement property may be used by the apparatuses, systems, or interfaces to pull or attract one or a group of selectable objects toward a selection object and increasing speed may be used to increase a rate of the attraction of the objects, while decreasing motion speed may be used to slower a rate of attraction of the objects.

The inventors have also found that as the attracted object move toward the selection object, they may be augmented in some way such as changed size, changed color, changed shape, changed line thickness of the form of the object, highlighted, changed to blinking, or combinations thereof. Simultaneously, synchronously or asynchronously, sub-menus or subobjects may also move or change in relation to the movements or changes of the selected objects. Simultaneously, synchronously or asynchronously, the non-selected objects may move away from the selection object(s). It should be noted that whenever a word object is used, it also includes the meaning of objects, and these objects may be simultaneously performing separate, simultaneous, synchronous or asynchronous, and/or combined command functions or used by the processing units to issue combinational functions.

Embodiments of this disclosure relate to systems, interfaces, interactive user interfaces effective for navigating large amounts of information on small touchscreen devices, apparatuses including the interfaces, and methods for implementing the systems and interfaces where the systems and interfaces implement a 3D control methodology using 2D movements, where selection attractive or manipulation systems and interfaces use movement of in the xy plane in a ring format to simulate 3D movement for motion-based selection and activation. The 3D movement methodology permits object selection and discrimination between displayed objects and attract a target object, objects or groups of objects, or fields of objects or object attributes toward, away or at angles to or from the selection object, where the direction and speed of motion controls discrimination and attraction. Embodiments also include interactive interfaces for navigating large amounts of data, information, attributes and/or controls on small devices such as wearable smart watches, sections or areas of wearable fabric or other sensor or embedded sensor surfaces or sensing abilities, as well as in Virtual Reality (VR) or Augmented Reality (AR) environments, including glasses, contacts, touchless and touch environments, and 2D, 3D, and/or nD (n-dimensional) environments. This more specifically, in wearable devices, such as watches, music players, health monitors and devices, etc. allows for the control of attributes and information by sensing motion on any surface or surfaces of the device(s), or above or around the surfaces, or through remote controls. The systems may be autonomous, or work in combination with other systems or devices, such as a watch, a phone, biomedical or neurological devices, drones, etc., headphones, remote display, etc. The selection object may be a group of objects or a field, with a consistent or gradient inherent characteristic, created by any kind of waveform as well, and may be visible, an overlay or translucent, or partially displayed, or not visible, and may be an average of objects, such as the center of mass of a hand and fingers, a single body part, multiple body and/or objects under the control of a person, or a zone, such as an area representing the gaze of an eye(s) or any virtual representation of objects, fields or controls that do the same.

In certain embodiments, as the selection object moves toward a target object, the target object will get bigger as it moves toward the selection object. It is important to conceptualize the effect we are looking for. The effect may be analogized to the effects of gravity on objects in space. Two objects in space are attracted to each other by gravity proportional to the product of their masses and inversely proportional to the square of the distance between the objects. As the objects move toward each other, the gravitational force increases pulling them toward each other faster and faster. The rate of attraction increases as the distance decreases, and they become larger as they get closer. Contrarily, if the objects are close and one is moved away, the gravitational force decreases, and the objects get smaller. The opposite of these attributes may also be true, or any attributes that are desired.

In the present disclosure, motion of the selection object away from a selectable object may act as a rest, returning the display back to the original selection screen or back to the last selection screen much like a "back" or "undo" event. Thus, if the user feedback unit (e.g., display) is one level down from the top display, then movement away from any selectable object, would restore the display back to the main level. If the display was at some sublevel, then movement away from selectable objects in this sublevel would move up a sublevel. Thus, motion away from selectable objects acts to drill up, while motion toward selectable objects that have sublevels results in a drill down operation. Of course, if the selectable object is directly activatable, then motion toward it selects and activates it. Thus, if the object is an executable routine such as taking a picture, then contact with the selection object, contact with its active area, or triggered by a predictive threshold certainty selection selects and simultaneously, synchronously or asynchronously activates the object.

Once the interface is activated, the selection object and a default menu of items may be activated on or within the user feedback unit. If the direction of motion towards the selectable object or proximity to the active area around the selectable object is such that the probability of selection is increased, the default menu of items may appear or move into a selectable position, or take the place of the initial object before the object is actually selected such that by moving into the active area or by moving in a direction such that a commit to the object occurs, and simultaneously, synchronously or asynchronously causes the subobjects or submenus to move into a position ready to be selected by just moving in their direction to cause selection or activation or both, or by moving in their direction until reaching an active area in proximity to the objects such that selection, activation or a combination of the two occurs. The selection object and the selectable objects (menu objects) are each assigned a mass equivalent or gravitational value of 1. The difference between what happens as the selection object moves in the display area towards a selectable object in the present interface, as opposed to real life, is that the selectable objects only feel the gravitation effect from the selection object and not from the other selectable objects. Thus, in the present disclosure, the selectable object is an attractor, while the selectable objects are non-interactive, or possibly even repulsive to each other. So as the selection object is moved in response to motion by a user within the motion sensors active zone such as motion of a finger in the active zone the processing unit maps the motion and generates corresponding movement or motion of the selection object towards selectable objects in the general direction of the motion.

The processing unit then determines the projected direction of motion and based on the projected direction of motion, allows the gravitational field or attractive force of the selection object to be felt by the predicted selectable object or objects that are most closely aligned with the direction of motion. These objects may also include submenus or subobjects that move in relation to the movement of the selected object(s). This effect would be much like a field moving and expanding or fields interacting with fields, where the objects inside the field(s) would spread apart and move such that unique angles from the selection object become present so movement towards a selectable object or group of objects can be discerned from movement towards a different object or group of objects, or continued motion in the direction of the second or more of objects in a line would cause the objects to not be selected that had been touched or had close proximity, but rather the selection would be made when the motion stops, or the last object in the direction of motion is reached, and it would be selected.

The processing unit causes the display to move those objects toward the selection object. The manner in which the selectable object moves may be to move at a constant velocity towards a selection object or to accelerate toward the selection object with the magnitude of the acceleration increasing as the movement focuses in on the selectable object. The distance moved by the person and the speed or acceleration may further compound the rate of attraction or movement of the selectable object towards the selection object. In certain situations, a negative attractive force or gravitational effect may be used when it is more desired that the selected objects move away from the user. Such motion of the objects would be opposite of that described above as attractive. As motion continues, the processing unit is able to better discriminate between competing selectable objects and the one or ones more closely aligned are pulled closer and separated, while others recede back to their original positions or are removed or fade. If the motion is directly toward a particular selectable object with a certainty above a threshold value, which has a certainty for example greater than 50%, then the selection and selectable objects merge and the selectable object is simultaneously, synchronously, or asynchronously selected and activated. Alternatively, the selectable object may be selected prior to merging with the selection object if the direction, angle, distance/displacement, duration, speed and/or acceleration of the selection object is such that the probability of the selectable object is enough to cause selection, or if the movement is such that proximity to the activation area surrounding the selectable object is such that the threshold for selection, activation or both occurs. Motion continues until the processing unit is able to determine that a selectable object has a selection threshold of greater than 50%, meaning that it more likely than not the correct target object has been selected. In certain embodiments, the selection threshold will be at least 60%. In other embodiments, the selection threshold will be at least 70%. In other embodiments, the selection threshold will be at least 80%. In yet other embodiments, the selection threshold will be at least 90%. Alternatively, the selection may be relative so that the selection certainty may be such that the certainty associated with one particular object is higher by 50% or more than the certainties associated with other potentially selectable objects.

In certain embodiments, the selection object will actually appear on the display screen, while in other embodiments, the selection object will exist only virtually in the processor software. For example, for motion sensors that require physical contact for activation such as touch screens, the selection object may be displayed and/or virtual, with motion on the screen used to determine which selectable objects from a default collection of selectable objects will be moved toward a perceived or predefined location of a virtual section object or toward the selection object in the case of a displayed selection object, while a virtual object simply exists in software such as at a center of the display or a default position to which selectable object are attracted, when the motion aligns with their locations on the default selection. In the case of motion sensors that have active zones such as cameras, IR sensors, sonic sensors, or other sensors capable of detecting motion within an active zone and creating an output representing that motion to a processing unit that is capable of determining direction, angle, distance/displacement, duration, speed and/or acceleration properties of the sensed or detected motion, the selection object is generally virtual and motion of one or more body parts of a user is used to attract a selectable object or a group of selectable objects to the location of the selection object and predictive software is used to narrow the group of selectable objects and zero in on a particular selectable object, objects, objects and attributes, and/or attributes. In certain embodiments, the interface is activated from a sleep condition by movement of a user or user body part into the active zone of the motion sensor or sensors associated with the interface.

Once activated, the feedback unit, such as a display associated with the interface. displays or evidences, in a user discernible manner, a default set of selectable objects or a top level set of selectable objects. The selectable objects may be clustered in related groups of similar objects or evenly distributed about a centroid of attraction if no selection object is generated on the display or in or on another type of feedback unit. If one motion sensor is sensitive to eye motion, then motion of the eyes will be used to attract and discriminate between potential target objects on the feedback unit such as a display screen. If the interface is an eye only interface, then eye motion is used to attract and discriminate selectable objects to the centroid, with selection and activation occurring when a selection threshold is exceeded greater than 50% confidence that one selectable object is more closely aligned with the direction of motion than all other objects. The speed and/or acceleration of the motion along with the direction are further used to enhance discrimination by pulling potential target objects toward the centroid quicker and increasing their size and/or increasing their relative separation. Proximity to the selectable object may also be used to confirm the selection.

Alternatively, if the interface is an eye and other body part interface, then eye motion will act as the primary motion driver, with motion of the other body part acting as a confirmation of eye movement selections. Thus, if eye motion has narrowed the selectable objects to a group, which may or may not dynamically change the perspective of the user (zoom in/out, pan, tilt, roll, or any combination of changes) motion of the other body part may be used by the processing unit to further discriminate and/or select/activate a particular object or if a particular object meets the threshold and is merging with the centroid, then motion of the object body part may be used to confirm or reject the selection regardless of the threshold confidence. In other embodiments, the motion sensor and processing unit may have a set of predetermined actions that are invoked by a given structure of a body part or a given combined motion of two or more body parts. For example, upon activation, if the motion sensor is capable of analyzing images, a hand holding up different number of figures from zero, a fist, to five, an open hand may cause the processing unit to display different base menus.

For example, a fist may cause the processing unit to display the top level menu, while a single finger may cause the processing unit to display a particular submenu. Once a particular set of selectable objects is displayed, then motion attracts the target object, which is simultaneously, synchronously, or asynchronously selected and activated. In other embodiments, confirmation may include a noised generated by the uses such as a word, a vocal noise, a predefined vocal noise, a clap, a snap, or other audio controlled sound generated by the user; in other embodiments, confirmation may be visual, audio or haptic effects or a combination of such effects. In certain embodiments, the confirmation may be dynamic, a variable sound, color, shape, feel, temperature, distortion, or any other effect or any combination thereof.

In other embodiments, the systems and apparatuses and implementing interfaces and methods utilize body tracking, body part tracking, face tracking, head tracking, eye tracking, and any other tracking sensor that detect movement of body parts over time and needs to include head worn devices (such as helmets and goggles) and devices that are not connected to our bodies (such as looking through a simulator set of glasses, screen, lenses or displays). We currently use a headworn device and use the IMU (MEMS) sensors and create a reticle (a bulls-eye) that represents the center-point of the gaze. We then use that reticle motion for controls and navigation.

In other embodiments, the methods for implementing the systems, apparatuses, and/or interfaces of this disclosure include the steps of sensing circular movement via a motion sensor, where the circular movement is sufficient to activate a scroll wheel, scrolling through a list associated with the scroll wheel, where movement close to the center causes a faster scroll, while movement further from the center causes a slower scroll and simultaneously, synchronously or asynchronously faster circular movement causes a faster scroll while slower circular movement causes slower scroll. When the user stops the circular motion, even for a very brief time, or changes direction such that it can be discerned to be no longer circular (such as moving in a z-axis when the circular motion is in an xy plane) the list becomes static so that the user may move to a particular object, hold over a particular object, or change motion direction at or near a particular object. The whole wheel or a partial amount or portion of the wheel may be displayed or just an arc may be displayed where scrolling moves up and down the arc. These actions cause the processing unit to select the particular object, to simultaneously, synchronously or asynchronously select and activate the particular object, or to simultaneously, synchronously or asynchronously select, activate, and control an attribute of the object. By beginning the circular motion again, anywhere on the screen, scrolling recommences immediately. Of course, scrolling could be through a list of values, or may actually be controlling values as well, and all motions may be in 2D, 3D, and/or nD environments as well.

In other embodiments, the methods for implementing the systems, apparatuses, and/or interfaces of this disclosure include the steps of displaying an arcuate menu layouts of selectable objects on a display field, sensing movement toward an object pulling the object toward the user's location, user's movement, or center based on a direction, a distance/displacement, a duration, a speed and/or an acceleration of the movement, as the selected object moves toward user or the center, displaying subobjects appear distributed in an arcuate spaced apart configuration about the selected object. The apparatus, system and methods can repeat the sensing and displaying operations. In all cases, singular or multiple subobjects or submenus may be displayed between the user and the primary object, behind, below, or anywhere else as desired for the interaction effect.

In other embodiments, the methods for implementing the systems, apparatuses, and/or interfaces of this disclosure include the steps of predicting an object's selection based on the properties of the sensed movement, where the properties include direction, angle, distance/displacement, duration, speed, acceleration, changes thereof, or combinations thereof. For example, faster speed may increase predictability, while slower speed may decrease predictability or vice versa. Alternatively, moving averages may be used to extrapolate the desired object desired such as vector averages, linear and non-linear functions, including filters and multiple outputs form one or more sensors. Along with this is the "gravitational", "electric" and/or "magnetic" attractive or repulsive effects utilized by the methods and systems, whereby the selectable objects move towards the user or selection object and accelerates towards the user or selection object as the user or selection object and selectable objects come closer together. This may also occur by the user beginning motion towards a particular selectable object, the particular selectable object begins to accelerate towards the user or the selection object, and the user and the selection object stops moving, but the particular selectable object continues to accelerate towards the user or selection object. In the certain embodiments, the opposite effect occurs as the user or selection objects moves away starting close to each other, the particular selectable object moves away quickly, but slows down its rate of repulsion as distance is increased, making a very smooth look. In different uses, the particular selectable object might accelerate away or return immediately to its original or predetermined position. In any of these circumstances, a dynamic interaction is occurring between the user or selection object and the particular selectable object(s), where selecting and controlling, and deselecting and controlling can occur, including selecting and controlling or deselecting and controlling associated submenus or subobjects and/or associated attributes, adjustable or invocable.

In other embodiments, the methods for implementing the systems, apparatuses, and/or interfaces of this disclosure include the steps of detecting at least one bio-kinetic characteristic of a user such as a fingerprint, fingerprints, a palm print, retinal print, size, shape, and texture of fingers, palm, eye(s), hand(s), face, etc. or at least one EMF, acoustic, thermal or optical characteristic detectable by sonic sensors, thermal sensors, optical sensors, capacitive sensors, resistive sensors, or other sensor capable of detecting EMF fields, other dynamic wave form, or other characteristics, or combinations thereof emanating from a user, including specific movements and measurements of movements of body parts such as fingers or eyes that provide unique markers for each individual, determining an identity of the user from the bio-kinetic characteristics, and sensing movement as set forth herein. In this way, the existing sensor for motion may also recognize the user uniquely, as well as the motion event associated with the user. This recognition may be further enhanced by using two or more body parts or bio-kinetic characteristics (e.g., two fingers), and even further by body parts performing a particular task such as being squeezed together, when the user enters in a sensor field. Other bio-kinetic and/or biometric characteristics may also be used for unique user identification such as skin characteristics and ratio to joint length and spacing. Further examples include the relationship between the finger(s), hands or other body parts and the wave, acoustic, magnetic, EMF, or other interference pattern created by the body parts creates a unique constant and may be used as a unique digital signature. For instance, a finger in a 3D acoustic or EMF field would create unique null and peak points or a unique null and peak pattern, so the "noise" of interacting with a field may actually help to create unique identifiers. This may be further discriminated by moving a certain distance, where the motion may be uniquely identified by small tremors, variations, or the like, further magnified by interference patterns in the noise. This type of unique identification may be used in touch and touchless applications, but may be most apparent when using a touchless sensor or an array of touchless sensors, where interference patterns (for example using acoustic sensors) may be present due to the size and shape of the hands or fingers, or the like. Further uniqueness may be determined by including motion as another unique variable, which may help in security verification. Furthermore, by establishing a base user's bio-kinetic signature or authorization, slight variations per bio-kinetic transaction or event may be used to uniquely identify each event as well, so a user would be positively and uniquely identified to authorize a merchant transaction, but the unique speed, angles, and variations, even at a wave form and/or wave form noise level could be used to uniquely identify one transaction as compared to another.

In other embodiments, the methods for implementing the apparatuses, systems, and/or interfaces include the steps of sensing movement of a first body part such as an eye, etc., tracking the first body part movement until it stops, pauses or holds on an object, within an active zone of an object, or sufficient close to the active zone of the object to insure select certainty to a threshold degree of certainty, preliminarily selecting the object, sensing movement of a second body part such as finger, hand, foot, etc., confirming the preliminary selection and selecting the object. The selection may then cause the processing unit to invoke one of the command and control functions including issuing a scroll function, a simultaneous, synchronous, or asynchronous select and scroll function, a simultaneous, synchronous, or asynchronous select and activate function, a simultaneous, synchronous, or asynchronous select, activate, and attribute adjustment function, or a combination thereof, and controlling attributes by further movement of the first or second body parts or activating the objects if the object is subject to direct activation. These selection procedures may be include tracking eye motion/movement to initiate a scrolling function through a list or over a list by the eye motion/movement or further eye motion/movement toward the list or over the list and tracking movement of another body part to select a particular member of the list such as moving a finger or hand, which motion/movement may also be used to confirm the selection and selecting an object or a group of objects or an attribute or a group of attributes. In certain embodiments, if object configuration is predetermined such that an object in the middle of several objects, then the eye may move somewhere else, but hand motion continues to scroll or control attributes or combinations thereof, independent of the eyes. Hand and eyes may work together or independently, or a combination in and out of the two. Thus, movements may be compound, sequential, simultaneous, synchronous, or asynchronous, partially compound, compound in part, or combinations thereof. the requisite movement to scroll and select or select and confirm may involve movement of two or more body parts, which are used to invoke one of the command and control functions of this disclosure—selection and activation, selection and attribute adjustment, selection and submenu or object scrolling, or combination thereof. In certain embodiments, if the object configuration is predetermined such that an object is in the middle of several other objects, then once scrolling begins, the systems, apparatuses, and/or interfaces may release the eyes so that the eyes may move somewhere else for performing other actions, while hand motion continues to scroll, select and/or control attributes or combinations thereof, independent of eye movement. Thus, the systems, apparatuses, and/or interfaces may use hand and eye movement (movement of two or more body parts) in a cooperative manner, in a coupled manner, or in an independent manner to cause the systems, apparatuses, and/or interfaces to control controllable object in different ways. The movements may be independent, coupled, compound, sequential, simultaneous, concurrent, and/or complex, i.e., combining one or more of independent, coupled, compound, sequential, simultaneous, or concurrent movements.

In other embodiments, the methods for implementing the apparatuses, systems, and/or interfaces include the steps of capturing a movement of a user during a selection procedure or a plurality of selection procedures to produce a raw user movement dataset. The apparatuses, systems, interfaces, and/or methods also include the step of reducing the raw user movement dataset to produce a refined user movement dataset, where the refinement may include reducing the movement to a plurality of linked vectors, to a fit curve, to a spline fit curve, to any other curve fitting format having reduced storage size, a reduced data point collection, or to any other fitting format. The apparatuses, systems, interfaces, and/or methods also include the step of storing the raw user movement dataset or the refined user movement dataset in an appropriate database for storage, retrieval, and/or use by the systems, apparatuses, interfaces, and/or methods of this disclosure. The apparatuses, systems, interfaces, and/or methods also include the step of analyzing the raw user movement dataset and/or refined user movement dataset to produce a predictive tool for improving the prediction of a user's selection procedures using the motion-based system or to produce a forensic tool for identifying the past behavior of the user or to produce a training tool for training the user interface to improve user interaction with the interface.

In other embodiments, the methods for implementing the systems, apparatuses, and/or interfaces include the steps of sensing movement of a plurality of body parts simultaneously, synchronously, or asynchronously or substantially simultaneously, synchronously, or asynchronously and converting the sensed movement into control functions for simultaneously, synchronously, or asynchronously controlling an object, a plurality of objects, and/or attributes associated therewith. The apparatuses, systems, interfaces, and/or methods also include controlling an attribute or a plurality of attributes, or activating an object or a plurality of objects, or any combination thereof. For example, placing a hand on a top of a domed surface for controlling an unmanned aerial vehicle (UAV), sensing movement of the hand on the dome, where a direction of movement correlates with a direction of flight, sensing changes in the movement on the top of the domed surface, where the changes correlate with changes in direction, angle, distance/displacement, duration, speed, or acceleration of functions, and simultaneously, synchronously, or asynchronously sensing movement of one or more fingers, where movement of the fingers may control other features of the UAV such as pitch, yaw, roll, camera focusing, missile firing, etc. with an independent finger(s) movement, while the hand, palm or other designated area of the hand is controlling the UAV, either through remaining stationary (continuing last known command) or while the hand is moving, accelerating, or changing distance, displacement (in 2D or 3D or in a flexible or deformable medium), or direction of acceleration. In certain embodiments where the display device is a flexible device such as a flexible screen or flexible dome, the movement may also include deforming the surface of the flexible device, changing a pressure on the surface, inside the volume of the dome, or similar surface and/or volumetric deformations. These deformations may be used in conjunction with the other motions.

In other embodiments, the methods for implementing the systems, apparatuses, and/or interfaces include the steps of populating a display field with displayed primary objects and hidden secondary objects, where the primary objects include menus, programs, applications, attributes, devices, etc. and secondary objects include submenus, attributes, preferences, etc. The methods and systems also include sensing movement, highlighting one or more primary objects most closely aligned with a direction of the movement, predicting a primary object based on the movement, and simultaneously, synchronously, or asynchronously: (a) selecting the primary object, (b) displaying secondary objects most closely aligned with the direction of motion in a spaced apart configuration, (c) pulling the primary and secondary objects toward a center of the display field or to a pre-determined area of the display field, and/or (d) removing, fading, or making inactive the unselected primary and secondary objects until making active again.

Alternately, zones in between primary and/or secondary objects may act as activating areas or subroutines that would act the same as the objects. For instance, if someone were to move in between two objects in 2D (a watch or mobile device), 3D space (virtual reality environments and altered reality environments), nD space (n-dimensional space such as x, y, z, t space represented in VR or AR environments) objects in the background may be rotated to the front and the front objects may be rotated towards the back, or to a different level.

In other embodiments, the methods for implementing the systems, apparatuses, and/or interfaces include the steps of populating a display field with displayed primary objects and offset active fields associated with the displayed primary objects, where the primary objects include menus, object lists, alphabetic characters, numeric characters, symbol characters, other text based characters. The methods and systems also include sensing movement, highlighting one or more primary objects most closely aligned with a direction of the movement, predicting a primary object based on the movement, context, and/or movement and context, and simultaneously, synchronously, or asynchronously: (a) selecting the primary object, (b) displaying secondary (tertiary or deeper) objects most closely aligned with the direction of motion/movement in a spaced apart configuration, (c) pulling the primary and secondary or deeper objects toward a center of the display field or to a pre-determined area of the display field, and/or (d) removing, making inactive, or fading or otherwise indicating a non-selection status of the unselected primary, secondary, and deeper level objects.

In other embodiments, the methods for implementing the systems, apparatuses, and/or interfaces include the steps of sensing movement of an eye and simultaneously, synchronously, asynchronously, or sequentially moving elements of a list within a fixed window or viewing pane of a display field or a display or an active object hidden or visible through elements arranged in a 2D, 3D, and/or nD matrix within the display field, where eye movement anywhere, in any direction in a display field regardless of the arrangement of elements such as icons moves through the set of selectable objects. Of course, the window may be moved with the movement of the eye to accomplish the same scrolling through a set of lists or objects, or a different result may occur by the use of both eye position in relation to a display or volume (perspective), as other motions occur, simultaneously, synchronously, asynchronously, or sequentially. Thus, scrolling does not have to be in a linear fashion, the intent is to select an object and/or attribute and/or other selectable items regardless of the manner of motion linear, arcuate, angular, circular, spiral, random, or the like. Once an object of interest is to be selected, then selection is accomplished either by movement of the eye in a different direction, holding the eye in place for a period of time over an object, movement of a different body part, or any other movement or movement type that affects the selection of an object, attribute, audio event, facial posture, and/or biometric or bio-kinetic event. These same steps may be used with body only or a combination of multiple body parts and eye or head gaze or movement.

In other embodiments, the methods for implementing the systems, apparatuses, and/or interfaces include the steps of sensing movement of an eye, selecting an object, an object attribute or both by moving the eye in a pre-described change of direction such that the change of direction would be known and be different than a random eye movement, or a movement associated with the scroll (scroll being defined by moving the eye all over the screen or volume of objects with the intent to choose). Of course, the eye may be replaced by any body part or object under the control of a body part.

In other embodiments, the methods for implementing the systems, apparatuses, and/or interfaces include the steps of sensing eye movement via a motion sensor, selecting an object displayed in a display field when the eye pauses at an object for a dwell time sufficient for the motion sensor to detect the pause and simultaneously, synchronously, asynchronously, or sequentially activating the selected object, repeating the sensing and selecting until the object is either activatable or an attribute capable of direct control. In certain embodiments, the methods also comprise predicting the object to be selected from characteristics of the movement and/or characteristics of the manner in which the user moves. In other embodiments, eye tracking using gaze instead of motion for selection/control via eye focusing (dwell time or gaze time) on an object and a body motion (finger, hand, etc.) scrolls through an associated attribute list associated with the object, or selects a submenu associated with the object. Eye gaze selects a submenu object and body motion confirms selection (selection does not occur without body motion), so body motion actually effects object selection.

In other embodiments, eye tracking—using motion for selection/control—eye movement is used to select a first word in a sentence of a word document. Selection is confirmed by body motion of a finger (e.g., right finger) which holds the position. Eye movement is then tracked to the last word in the sentence and another finger (e.g., the left finger) confirms selection. Selected sentence is highlighted due to second motion defining the boundary of selection. The same effect may be had by moving the same finger towards the second eye position (the end of the sentence or word). Movement of one of the fingers towards the side of the monitor (movement is in different direction than the confirmation movement) sends a command to delete the sentence. Alternatively, movement of eye to a different location, followed by both fingers moving generally towards that location results in the sentence being copied to the location at which the eyes stopped. This may also be used in combination with a gesture or with combinations of motions and gestures such as eye movement and other body movements concurrently—multiple inputs at once such as UAV controls described below.

In other embodiments, looking at the center of picture or article and then moving one finger away from center of picture or center of body enlarges the picture or article (zoom in). Moving finger towards center of picture makes picture smaller (zoom out). What is important to understand here is that an eye gaze point, a direction of gaze, or a motion of the eye provides a reference point for body motion and location to be compared. For instance, moving a body part (say a finger) a certain distance away from the center of a picture in a touch or touchless, 2D or 3D environment (area or volume as well), may provide a different view. For example, if the eye(s) were looking at a central point in an area, one view would appear, while if the eye(s) were looking at an edge point in an area, a different view would appear. The relative distance of the motion would change, and the relative direction may change as well, and even a dynamic change involving both eye(s) and finger, could provide yet another change of motion. For example, by looking at the end of a stick and using the finger to move the other end of it, the pivot point would be the end the eyes were looking at. By looking at the middle of the stick, then using the finger to rotate the end, the stick would pivot around the middle. Each of these movements may be used to control different attributes of a picture, screen, display, window, or volume of a 3D projection, etc. What now takes two fingers may be replaced by one due to the eye(s) acting as the missing finger.

These concepts are useable to manipulate the view of pictures, images, 3D data or higher dimensional data, 3D renderings, 3D building renderings, 3D plant and facility renderings, or any other type of 3D or higher dimensional (nD) pictures, images, or renderings. These manipulations of displays, pictures, screens, etc. may also be performed without the coincidental use of the eye, but rather by using the motion of a finger or object under the control or a user, such as by moving from one lower corner of a bezel, screen, or frame (virtual or real) diagonally to the opposite upper corner to control one attribute, such as zooming in, while moving from one upper corner diagonally to the other lower corner would perform a different function, for example zooming out. This motion may be performed as a gesture, where the attribute change might occur in at predefined levels, or may be controlled variably so the zoom in/out function may be a function of time, space, and/or distance. By moving from one side or edge to another, the same predefined level of change, or variable change may occur on the display, picture, frame, or the like. For example, a TV screen displaying a picture and zoom-in may be performed by moving from a bottom left corner of the frame or bezel, or an identifiable region (even off the screen) to an upper right portion. As the user moves, the picture is magnified (zoom-in). By starting in an upper right corner and moving toward a lower left, the system causes the picture to be reduced in size (zoom-out) in a relational manner to the distance or speed the user moves. If the user makes a quick diagonally downward movement from one upper corner to the other lower corner, the picture may be reduced by 50% (for example). This eliminates the need for using two fingers that is currently popular as a pinch/zoom function.

By the user moving from a right side of the frame or bezel or predefined location towards a left side, an aspect ratio of the picture may be changed so as to make the picture tall and skinny By moving from a top edge toward a bottom edge, the picture may cause the picture to appear short and wide. By moving two fingers from one upper corner diagonally towards a lower corner, or from side to side, a "cropping" function may be used to select certain aspects of the picture.

By taking one finger and placing it near the edge of a picture, frame, or bezel, but not so near as to be identified as desiring to use a size or crop control, and moving in a rotational or circular direction, the picture could be rotated variably, or if done in a quick gestural motion, the picture might rotate a predefined amount, for instance 90 degrees left or right, depending on the direction of the motion.

By moving within a central area of a picture, the picture may be moved "panned" variably by a desired amount or panned a preset amount, say 50% of the frame, by making a gestural or dynamic motion in the direction of a desired panning. Likewise, these same motions may be used in a 3D environment for simple manipulation of object attributes. These are not specific motions using predefined pivot points as is currently used in CAD programs, but is rather a way of using the body (eyes or fingers for example) in broad areas. These same motions may be applied to any display, projected display or other similar device. In a mobile device, where many icons (objects) exist on one screen, where the icons include folders of "nested" objects, by moving from one lower corner of the device or screen diagonally toward an upper corner, the display may zoom in, meaning the objects would appear magnified, but fewer would be displayed. By moving from an upper right corner diagonally downward, the icons would become smaller, and more could be seen on the same display. Moving in a circular motion near an edge of the display may cause rotation of the icons, providing scrolling through lists and pages of icons. Moving from one edge to an opposite edge would change the aspect ratio of the displayed objects, making the screen of icons appear shorter and wider, or taller and skinny, based on the direction moved.

In other embodiments, looking at a menu object then moving a finger away from object or center of body opens up sub menus. If the object represents a software program such as excel, moving away opens up spreadsheet fully or variably depending on how much movement is made (expanding spreadsheet window).

In other embodiments, instead of being a program accessed through an icon, the program may occupy part of a 3D space that the user interacts with a field coupled to the program acting as a sensor for the program through which the user to interacts with the program. In other embodiments, if object represents a software program such as Excel and several (say 4) spreadsheets are open at once, movement away from the object shows 4 spread sheet icons. The effect is much like pulling curtain away from a window to reveal the software programs that are opened. The software programs might be represented as "dynamic fields", each program with its own color, say red for excel, blue for word, etc. The objects or aspects or attributes of each field may be manipulated by using motion. For instance, if a center of the field is considered to be an origin of a volumetric space about the objects or value, moving at an exterior of the field cause a compound effect on the volume as a whole due to having a greater x value, a greater y value, or a great z value—say the maximum value of the field is 5 (x, y, or z), moving at a 5 point would be a multiplier effect of 5 compared to moving at a value of 1 (x, y, or z) providing a gradient of values to interact with. The inverse may also be used, where moving at a greater distance from the origin may provide less of an effect on part or the whole of the field and corresponding values. Changes in color, shape, size, density, audio characteristics, or any combination of these and other forms of representation of values could occur, which may also help the user or users to understand the effects of motion on the fields. These may be preview panes of the spreadsheets or any other icons representing these. Moving back through each icon or moving the finger through each icon or preview pane, then moving away from the icon or center of the body selects the open programs and expands them equally on the desktop, or layers them on top of each other, etc. These actions may be combined, i.e., in AR/VR environments, where motion of the eyes and finger and another hand (or body) may each or in combination have a predetermined axis or axes to display menus and control attributes or choices that may be stationary or dynamic, and may interact with each other, so different combinations of eye, body and hand may provide the same results (redundantly), or different results based on the combination or sequence of motions and holds, gazes, and even pose or posture in combination with these. Thus, motion in multiple axes may move in compound ways to provide redundant or different effects, selection and attribute controls.

In other embodiments, four word processor documents (or any program or web pages) are open at once. Movement from bottom right of the screen to top left reveals the document at bottom right of page, effect looks like pulling curtain back. Moving from top right to bottom left reveals a different document. Moving from across the top, and circling back across the bottom opens all, each in its quadrant, then moving through the desired documents and creating circle through the objects links them all together and merges the documents into one document. As another example, the user opens three spreadsheets and dynamically combines or separates the spreadsheets merely via motions or movements, variably per amount and direction, angle, distance/displacement, and/or duration of the motion or movement. Again, the software or virtual objects are dynamic fields, where moving in one area of the field may have a different result than moving in another area, and the combining or moving through the fields causes a combining of the software programs, and may be done dynamically. Furthermore, using the eyes to help identify specific points in the fields (2D or 3D) would aid in defining the appropriate layer or area of the software program (field) to be manipulated or interacted with. Dynamic layers within these fields may be represented and interacted with spatially in this manner. Some or all the objects may be affected proportionately or in some manner by the movement of one or more other objects in or near the field. Of course, the eyes may work in the same manner as a body part or in combination with other objects or body parts. For instance, looking at the desired object and using a touch or touchless no-look user interface (UI) such as moving in a certain direction for selection, another for scrolling, etc. allows the user to look and control with a combination of gaze and touch/touchless controls. In all cases, contextual, environmental, prioritized, and weighted averages or densities and probabilities may affect the interaction and aspect view of the field and the data or objects associated with the field(s). For instance, creating a graphic representation of values and data points containing RNA, DNA, family historical data, food consumption, exercise, etc., would interact differently if the user began interacting closer to the RNA zone than to the food consumption zone, and the filed would react differently in part or throughout as the user moved some elements closer to others or in a different sequence from one are to another. This dynamic interaction and visualization would be expressive of weighted values or combinations of elements to reveal different outcomes.

In other embodiments, the eye selects (acts like a cursor hovering over an object and object may or may not respond, such as changing color to identify it has been selected), then a motion or gesture of eye or a different body part confirms and disengages the eyes for further processing.

In other embodiments, the eye selects or tracks and a motion or movement or gesture of second body part causes a change in an attribute of the tracked object—such as popping or destroying the object, zooming, changing the color of the object, etc. finger is still in control of the object.

In other embodiments, eye selects, and when body motion and eye motion are used, working simultaneously, synchronously, asynchronously, or sequentially, a different result occurs compared to when eye motion is independent of body motion, e.g., eye(s) tracks a bubble, finger moves to zoom, movement of the finger selects the bubble and now eye movement will rotate the bubble based upon the point of gaze or change an attribute of the bubble, or the eye may gaze and select and/or control a different object while the finger continues selection and/or control of the first object or a sequential combination could occur, such as first pointing with the finger, then gazing at a section of the bubble may produce a different result than looking first and then moving a finger; again a further difference may occur by using eyes, then a finger, then two fingers than would occur by using the same body parts in a different order.

In other embodiments, the methods for implementing the systems, apparatuses, and/or interfaces include the steps of: controlling helicopter with one hand on a domed interface, where several fingers and hand all move together and move separately. In this way, the whole movement of the hand controls the movement of the helicopter in altitude, direction, yaw, pitch and roll, while the fingers may also move simultaneously, synchronously, asynchronously, or sequentially to control cameras, artillery, or other controls or attributes, or both. Thus, the systems, apparatuses and interfaces may process multiple movement outputs from one or a plurality of motion sensors simultaneously, congruently, or sequentially, where the movements may be dependent, partially dependent, partially coupled, fully coupled, partially independent or fully independently. The term dependent means that one movement is dominant and all other movements are dependent on the dominant movement. For examples, in control of a UAV or traversing a VR/AR environment, the set of controllables may including altitude, direction, angle, distance/displacement, duration, speed, velocity, acceleration, yaw, pitch, roll, etc., where in certain circumstances, altitude may be the dominate controllable and all other are dependent on the altitude being so that all other controllables are performed at a designated altitude. The term partially dependent means that a set of movement outputs include a dominate output and the other member of the set are dependent on the dominant movement. For example, considering the same set of controllables, velocity and altitude may be independent and other sets tied to each one of them. The term partially coupled means that some of the movement outputs are coupled to each other so that they act in a pre-defined or predetermine manner, while others are independent. For example, considering the same controllables, altitude, direction, angle, distance/displacement, duration, velocity and acceleration may be coupled as the UAV is traveling a predefined path, while the other controllables are independently controllable. The term fully coupled means that all of the movement outputs are coupled to each other so that they act in a pre-defined or predetermine manner. For example, all of the UAV sensors may all be coupled so that all of the sensors are tracking one specific target. The term partially independent means that some of the movement outputs are independent, while some are either dependent or coupled. For example, all of the sensors may be tracking one specific target, while the UAV positioning controls may all be independently controlled. The term fully independent means that each movement output is processed independently of the other outputs. Thus, movement of multiple inputs may be simultaneously, synchronously, asynchronously, sequentially, congruently or independently utilized to control objects and attributes thereof.

In certain embodiments, the perspective of the user as gravitational effects and object selections are made in 3D space. For instance, as we move in 3D space towards subobjects, using our previously submitted gravitational and predictive effects, each selection may change the entire perspective of the user so the next choices are in the center of view or in the best perspective. This may include rotational aspects of perspective, the goal being to keep the required movement of the user small and as centered as possible in the interface real estate. This is really showing the aspect, viewpoint or perspective of the user, and is relative. Since we are saying the objects and fields may be moved, or saying the user may move around the field, it is really a relative.

In other embodiments, the methods for implementing the systems, apparatuses, and/or interfaces include the steps of sensing movement of a button or knob with motion controls associated therewith, either on top of or in 3D, 3 space, on sides (whatever the shape), predicting which gestures are called by direction, distance/displacement, angle, duration, and/or speed of motion (may be amendment to gravitational/predictive application). By definition, a gesture has a pose-movement-pose then lookup table, then command if values equal values in lookup table. We may start with a pose, and predict the gesture by beginning to move in the direction of the final pose. As we continue to move, we would be scrolling through a list of predicted gestures until we may find the most probable desired gesture, causing the command of the gesture to be triggered before the gesture is completed. Predicted gestures could be dynamically shown in a list of choices and represented by objects or text or colors or by some other means in a display. As we continue to move, predicted end results of gestures would be dynamically displayed and located in such a place that once the correct one appears, movement towards that object, representing the correct gesture, would select and activate the gestural command. In this way, a gesture could be predicted and executed before the totality of the gesture is completed, increasing speed and providing more variables for the user.

For example, in a keyboard application, current software uses shapes of gestures to predict words. Goggle® uses zones of letters (a group of letters), and combinations of zones (gestures) to predict words. We would use the same gesture-based system, except we be able to predict which zone the user is moving towards based upon one or more movement properties, meaning we would not have to actually move into the zone to finish the gesture, but moving towards the zone would select or bring up choice bubbles, and moving towards the bubble would select that bubble. Once a word is chosen, a menu of expanding option could show, so one could create a sentence by moving through a sentence "tree".

In another example, instead of using a gesture such as "a pinch" gesture to select something in a touchless environment, movement towards making that gesture would actually trigger the same command So instead of having to actually touch the finger to the thumb, just moving the finger towards the thumb would cause the same effect to occur. Most helpful in combination gestures where a finger pointing gesture is followed by a pinching gesture to then move a virtual object. By predicting the gesture, after the point gesture, the beginning movement of the pinch gesture would be faster than having to finalize the pinching motion.

In other embodiments, the methods for implementing the systems, apparatuses, and/or interfaces include the steps of: sensing movement via a motion sensor within a display field displaying a list of letters from an alphabet, predicting a letter or a group of letters based on the motion, if movement is aligned with a single letter, simultaneously, synchronously, asynchronously, or sequentially selecting the letter or simultaneously, synchronously, asynchronously, or sequentially moving the group of letter forward until a discrimination between letters in the group is predictively certain and simultaneously, synchronously, asynchronously, or sequentially selecting the letter, sensing a change in a direction of motion, predicting a second letter or a second group of letter based on the motion, if movement is aligned with a single letter, simultaneously, synchronously, asynchronously, or sequentially selecting the letter or simultaneously, synchronously, asynchronously, or sequentially moving the group of letters forward until a discrimination between letters in the group is predictively certain and simultaneously, synchronously, asynchronously, or sequentially select the letter, either after the first letter selection or the second letter selection or both, display a list of potential letters, words, and/or phrases beginning with either the first letter or the second letter, selecting a word from the word list by movement of a second body part simultaneously, synchronously, asynchronously or sequentially selected the word and resetting the original letter display, and repeating the steps until a message is completed.

Thus, the current design selects a letter simply by changing one or more motion properties at or near a letter. A faster process would be to use movement toward a letter, then changing one or more motion properties before reaching the letter and moving towards a next letter and changing one or more motion properties again before getting to the next letter may better predict words, and might change the first letter selection. Selection bubbles may appear and be changing while moving, so one or more movement properties may be used to predict the word, not necessarily having to move over the exact letter or very close to it, though moving over the exact letter may be a positive selection of that letter and this effect could be better verified by a slight pausing or slowing down of movement. (Of course, this may be combined with current button like actions or lift-off events or touch-up events, and more than one finger or hand may be used, both simultaneously, synchronously, asynchronously, or sequentially to provide the spelling and typing actions.) This is most effective in a touchless environment where relative motion can be leveraged to predict words on a keyboard rather than the actual distance required to move from key to key. The distance from a projected keyboard and movement of finger using angles of motion to predict letters. Predictive word bubbles may be selected with a z movement. Move below the letters of a keyboard to select, or shape the letter buttons in such a way that they extend downward (like a tear drop) so actual letters can be seen while selecting instead of covering the letters (the touch or active zones are offset from the actual keys. This may also be used with predictive motions to create a very fast keyboard where relative motions are used to predict keys and words while more easily being able to see the key letters. Bubbles may also appear above or besides the keys, or around them, including in an arcuate or radial fashion to further select predicted results by moving towards the suggested words.

In other embodiments, the methods for implementing the systems, apparatuses, and/or interfaces include the steps of: maintaining all software applications in an instant on configuration—on, but inactive, resident, but not active, so that once selected the application which is merely dormant, is fully activate instantaneously (or may be described as a different focus of the object), sensing movement via a motion sensor with a display field including application objects distributed on the display in a spaced apart configuration. In certain embodiments, a maximally spaced apart configuration is invoked so that the movement results in a fast predict selection of an application object, pulling an application object or a group of application objects toward a center of the display field, if movement is aligned with a single application, simultaneously, synchronously, asynchronously, or sequentially select and instant on the application, or continue monitoring the movement until a discrimination between application objects is predictively certain and simultaneously, synchronously, asynchronously, or sequentially selecting and activating the application object.

Thus, the industry must begin to start looking at everything as always on and what is on is always interactive, and may have different levels of interactivity. For instance, software should be an interactive field. Excel and word should be interactive fields where motion through them may combine or select areas, which correspond to cells and texts being intertwined with the motion. Excel sheets should be part of the same 3D field, not separate pages, and should have depth so their aspects can be combined in volume. The software desktop experience needs a depth where the desktop is the cover of a volume, and rolling back the desktop from different corners reveals different programs that are active and have different colors, such as word being revealed when moving from bottom right to top left and being a blue field, excel being revealed when moving from top left to bottom right and being red; moving right to left lifts desktop cover and reveals all applications in volume, each application with its own field and color in 3D space.

In other embodiments, the systems, apparatuses, and/or interfaces include an active screen area having a delete or backspace region. When the user moves the active object (cursor) toward the delete or backspace region, then the selected objects will be released one at a time or in groups or completely depending on attributes of movement toward the delete of backspace region. Thus, if the movement is slow and steady, then the selected objects are released one at a time. If the movement is fast, then multiple selected objects are released. Thus, the delete or backspace region is variable. For example, if the active display region represents a cell phone dialing pad (with the number distributed in any desired configuration from a traditional grid configuration to a arcuate configuration about the active object, or in any other desirable configuration), when by moving the active object toward the delete or backspace region, numbers will be removed from the number, which may be displayed in a number display region of the display. Alternatively, touching the backspace region would back up one letter; moving from right to left in the backspace region would delete (backspace) a corresponding number of letters based on the distance (and/or speed) of the movement, The deletion could occur when the motion is stopped, paused, or a lift off event is detected. Alternatively, a swiping motion (jerk, or fast acceleration) could result in the deletion (backspace) the entire word. All these may or may not require a lift off event, but the motion dictates the amount deleted or released objects such as letters, numbers, or other types of objects. The same is true with the delete key, except the direction would be forward instead of backwards. Lastly, the same may be true in a radial menu (or linear or spatial), where the initial motion towards an object or on an object, or in a zone associated with an object, that has a variable attribute. The motion associated with or towards that object may provide immediate control.

In other embodiments, the systems, apparatuses, and/or interfaces utilize eye movement to select and body part movement is used to confirm or activate the selection. Thus, eye movement is used as the selective movement, while the object remains in the selected state, then the body part movement confirms the selection and activates the selected object. Thus, specifically stated the eye or eyes look in a different direction or area, and the last selected object would remain selected until a different object is selected by motion of the eyes or body, or until a time-out deselects the object. An object may be also selected by an eye gaze, and this selection would continue even when the eye or eyes are no longer looking at the object. The object would remain selected unless a different selectable object is looked at, or unless a timeout deselects the object occurs.

In all of the embodiments set forth above, the motion or movement may also comprise lift off events, where a finger or other body part or parts are in direct contract with a touch sensitive feedback device such as a touch screen, then the acceptable forms of motion or movement will comprise touching the screen, moving on or across the screen, lifting off from the screen (lift off events), holding still on the screen at a particular location, holding still after first contact, holding still after scroll commencement, holding still after attribute adjustment to continue an particular adjustment, holding still for different periods of time, moving fast or slow, moving fast or slow or different periods of time, accelerating or decelerating, accelerating or decelerating for different periods of time, changing direction, changing distance/displacement, changing duration, changing speed, changing velocity, changing acceleration, changing direction for different periods of time, changing speed for different periods of time, changing velocity for different periods of time, changing acceleration for different periods of time, or any combinations of these motions may be used by the systems and methods to invoke command and control over real-world or virtual world controllable objects using on the motion only. Lift off or other events could "freeze" the state of menu, object or attribute selection, or combination of these, until another event occurs to move to a different event or state, or a time-out function resets the system or application to a pre-configured state or location. A virtual lift off could accomplish the same effect in a VR, AR, or real environment, by moving in a different direction or designated direction with no physical lift off event. Of course, if certain objects that are invoked by the motion sensitive processing of the systems and methods of this disclosure require hard select protocols—mouse clicks, finger touches, etc., the invoked object's internal function will not be augmented by the systems or methods of this disclosure unless the invoked object permits or supports system integration. In place of physical or virtual lift offs or confirmations could be sounds, colors or contextual or environmental triggers.

The systems, apparatuses, and/or interfaces and the methods for implementing them are disclosed herein where command functions for selection and/or control of real and/or virtual objects may be generated based on a change in velocity at constant direction, a change in direction at constant velocity, a change in both direction and velocity, a change in a rate of velocity, or a change in a rate of acceleration or a change in distance/displacement and time. Once detected by an detector or sensor, these changes may be used by a processing unit to issue commands for controlling real and/or virtual objects. A selection or combination scroll, selection, and attribute selection may occur upon the first movement. Such motion may be associated with doors opening and closing in any direction, golf swings, virtual or real-world games, light moving ahead of a runner, but staying with a walker, or any other motion having compound properties such as direction, angle, distance/displacement, duration, velocity, acceleration, and changes in any one or all of these primary properties; thus, direction, angle, distance/displacement, duration, velocity, and acceleration may be considered primary motion properties, while changes in these primary properties may be considered secondary motion or movement properties. The system may then be capable of differentially handling of primary and secondary motion or movement properties. Thus, the primary properties may cause primary functions to be issued, while secondary properties may cause primary function to be issued, but may also cause the modification of primary function and/or secondary functions to be issued. For example, if a primary function comprises a predetermined selection format, the secondary motion or movement properties may expand or contract the selection format.

In another example of this primary/secondary format for causing the system to generate command functions may involve an object display. Thus, by moving the object in a direction away from the user's eyes or using changes in angle, distance/displacement, velocity, acceleration, or time, the state of the display may change, such as from a graphic to a combination graphic and text, to a text display only, while moving side to side or moving a finger or eyes from side to side may scroll the displayed objects or change the font or graphic size, while moving the head to a different position in space might reveal or control attributes or submenus of the object. Thus, these changes in motions may be discrete, compounded, or include changes in velocity, acceleration. and rates of these changes to provide different results for the user. These examples illustrate two concepts: 1) the ability to have compound motions which provide different results that the motions separately or sequentially, and (2) the ability to change states or attributes, such as graphics to text solely or in combination with single or compound motions, or with multiple inputs, such as verbal, touch, facial expressions, or bio-kinetically, all working together to give different results, or to provide the same results in different ways.

It must be recognized that the present disclosure while based on the use of sensed velocity, acceleration, and changes and rates of changes in these properties to effect control of real-world objects and/or virtual objects, the present disclosure may also use other properties of the sensed motion in combination with sensed velocity, acceleration, and changes in these properties to effect control of real-world and/or virtual objects, where the other properties include direction, angle, distance/displacement, duration and change in direction, angle, distance/displacement, duration of motion, where the motion has a constant velocity. For example, if the motion sensor(s) senses velocity, acceleration, changes in velocity, changes in acceleration, and/or combinations thereof that is used for primary control of the objects via motion of a primary sensed human, animal, part thereof, real-world object under the control of a human or animal, or robots under control of the human or animal, then sensing motion of a second body part may be used to confirm primary selection protocols or may be used to fine tune the selected command and control function. Thus, if the selection is for a group of objects, then the secondary motion or movement properties may be used to differentially control object attributes to achieve a desired final state of the objects.

It must be recognized that the present disclosure while based on the use of sensed velocity, acceleration, and changes and rates of changes in these properties to effect control of real-world objects and/or virtual objects, the present disclosure may also use other properties of the sensed motion in combination with sensed velocity, acceleration, and changes in these properties to effect control of real-world and/or virtual objects, where the other properties include direction, angle, distance/displacement, duration and change in direction, angle, distance/displacement, duration of motion, where the motion has a constant velocity. For example, if the motion sensor(s) senses velocity, acceleration, changes in velocity, changes in acceleration, and/or combinations thereof that is used for primary control of the objects via motion of a primary sensed human, animal, part thereof, real-world object under the control of a human or animal, or robots under control of the human or animal, then sensing motion of a second body part may be used to confirm primary selection protocols or may be used to fine tune the selected command and control function. Thus, if the selection is for a group of objects, then the secondary motion or movement properties may be used to differentially control object attributes to achieve a desired final state of the objects.

For example, suppose the apparatuses of this disclosure control lighting in a building. There are banks of lights on or in all four walls (recessed or mounted) and on or in the ceiling (recessed or mounted). The user has already selected and activated lights from a selection menu using motion to activate the apparatus and motion to select and activate the lights from a list of selectable menu items such as sound system, lights, cameras, video system, etc. Now that lights has been selected from the menu, movement to the right would select and activate the lights on the right wall. Movement straight down would turn all of the lights of the right wall down—dim the lights. Movement straight up would turn all of the lights on the right wall up—brighten. The velocity of the movement down or up would control the rate that the lights were dimmed or brighten. Stopping movement would stop the adjustment or removing the body, body part or object under the user control within the motion sensing area would stop the adjustment.

For even more sophisticated control using motion or movement properties, the user may move within the motion sensor active area to map out a downward concave arc, which would cause the lights on the right wall to dim proportionally to the arc distance from the lights. Thus, the right lights would be more dim in the center of the wall and less dim toward the ends of the wall.

Alternatively, if the movement was convex downward, then the light would dim with the center being dimmed the least and the ends the most. Concave up and convex up would cause differential brightening of the lights in accord with the nature of the curve.

Now, the apparatus may also use the velocity of the movement of the mapping out the concave or convex movement to further change the dimming or brightening of the lights. Using velocity, starting off slowly and increasing speed in a downward motion would cause the lights on the wall to be dimmed more as the motion moved down. Thus, the lights at one end of the wall would be dimmed less than the lights at the other end of the wall.

Now, suppose that the motion is a S-shape, then the light would be dimmed or brightened in a S-shaped configuration. Again, velocity may be used to change the amount of dimming or brightening in different lights simply by changing the velocity of movement. Thus, by slowing the movement, those lights would be dimmed or brightened less than when the movement is speed up. By changing the rate of velocity—acceleration—further refinements of the lighting configuration may be obtained.

Now suppose that all the lights in the room have been selected, then circular or spiral motion would permit the user to adjust all of the lights, with direction, angle, distance/displacement, duration, velocity and acceleration properties being used to dim and/or brighten all the lights in accord with the movement relative to the lights in the room. For the ceiling lights, the circular motion may move up or down in the z direction to affect the luminosity of the ceiling lights. Thus, through the sensing of motion or movement within an active sensor zone area and especially volume, a user can use simple or complex motion to differentially control large numbers of devices simultaneously, synchronously, asynchronously or sequentially. By scrolling through the area (pointing the finger at each light) and stopping motion at each light desired it would be selected, then moving in a different direction would allow for attribute of only the selected lights. The same would hold for virtual objects in a 2D or 3D (VR/AR) environment. Thus, a user is able to select groups of objects that may represent real or virtual objects and once the group is selected, movement of the user may adjust all object and/or device attribute collectively. This feature is especially useful when the interface is associated with a large number of objects, subobjects, and/or devices and the user wants to selected groups of these objects, subobjects, and/or devices so that they may be controlled collectively. Thus, the user may navigate through the objects, subobjects and/or devices and select any number of them by moving to each object pausing so that the system recognizes to add the object to the group. Once the group is defined, the user would be able to save the group as a predefined group or just leave it as a temporary group. Regardless, the group would not act as a single object for the remainder of the session. The group may be deselected by moving outside of the active field of sensor, sensors, and/or sensor arrays.

This differential control through the use of sensed complex motion permits a user to nearly instantaneously change lighting configurations, sound configurations, TV configurations, or any configuration of systems having a plurality of devices being simultaneously, synchronously, asynchronously, or sequentially controlled or of a single system having a plurality of objects or attributes capable of simultaneous, synchronous, asynchronous, or sequential control. For examples, in a computer game including large numbers of virtual objects such as troops, tanks, airplanes, etc., sensed complex motion would permit the user to quickly deploy, redeploy, rearrangement, manipulated and generally quickly reconfigure all controllable objects and/or attributes by simply conforming the movement of the objects to the movement of the user sensed by the motion detector. This same differential device and/or object control would find utility in military and law enforcement, where command personnel by motion or movement within a sensing zone of a motion sensor quickly deploy, redeploy, rearrangement, manipulated and generally quickly reconfigure all assets to address a rapidly changing situation.

The all of these scenarios set forth above are designed to illustrate the control of a large number of devices using properties and/or characteristics of the sensed motion including, without limitation, relative distance of the motion for each object (real like a person in a room using his/her hand as the object for which motion is being sensed or virtual representations of the objects in a virtual or rendered room on a display apparatus), direction of motion, distance/displacement of motion, duration of motion, speed of motion, acceleration of motion, changes an any of these properties, rates of changes in any of these properties, or mixtures and combinations thereof to control a single controllable attribute of the object such as lights. However, the systems, apparatuses, and methods of this disclosure are also capable of using motion or movement properties and/or characteristics to control two, three, or more attributes of an object. Additionally, the systems, apparatuses, and methods of this disclosure are also capable of using motion or movement properties and/or characteristics from a plurality of moving objects within a motion sensing zone to control different attributes of a collection of objects. For example, if the lights in the above figures are capable of color as well as brighten, then the motion or movement properties and/or characteristic may be used to simultaneously, synchronously, asynchronously, or sequentially change color and intensity of the lights or one sensed motion could control intensity, while another sensed motion could control color. For example, if an artist wanted to paint a picture on a computer-generated canvas, then motion or movement properties and/or characteristic would allow the artist to control the pixel properties of each pixel on the display using the properties of the sensed motion from one, two, three, etc. sensed motions. Thus, the systems, apparatuses, and methods of this disclosure are capable of converting the motion or movement properties associated with each and every object being controlled based on the instantaneous properties values as the motion traverse the object in real space or virtual space.

The systems, apparatuses and methods of this disclosure activate upon motion being sensed by one or more motion sensors. This sensed motion then activates the systems and apparatuses causing the systems and apparatuses to process the motion and its properties activating a selection object and a plurality of selectable objects. Once activated, the motion or movement properties cause movement of the selection object accordingly, which will cause a pre-selected object or a group of pre-selected objects, to move toward the selection object, where the pre-selected object or the group of pre-selected objects are the selectable object(s) that are most closely aligned with the direction of motion, which may be evidenced by the user feedback units by corresponding motion of the selection object.

Another aspect of the systems or apparatuses of this disclosure is that the faster the selection object moves toward the pre-selected object or the group of preselected objects, the faster the pre-selected object or the group of preselected objects move toward the selection object. Another aspect of the systems or apparatuses of this disclosure is that as the pre-selected object or the group of pre-selected objects move toward the selection object, the pre-selected object or the group of pre-selected objects may increase in size, change color, become highlighted, provide other forms of feedback, or a combination thereof. Another aspect of the systems or apparatuses of this disclosure is that movement away from the objects or groups of objects may result in the objects moving away at a greater or accelerated speed from the selection object(s). Another aspect of the systems or apparatuses of this disclosure is that as motion continues, the motion will start to discriminate between members of the group of pre-selected object(s) until the motion results in the selection of a single selectable object or a coupled group of selectable objects.

Once the selection object and the target selectable object touch, active areas surrounding the objection touch, a threshold distance between the object is achieved, or a probability of selection exceeds an activation threshold, the target object is selected and non-selected display objects are removed from the display, change color or shape, or fade away or any such attribute so as to recognize them as not selected. The systems or apparatuses of this disclosure may center the selected object in a center of the user feedback unit or center the selected object at or near a location where the motion was first sensed. The selected object may be in a corner of a display on the side the thumb is on when using a phone, and the next level menu is displayed slightly further away, from the selected object, possibly arcuately, so the next motion is close to the first, usually working the user back and forth in the general area of the center of the display. If the object is an executable object such as taking a photo, turning on a device, etc., then the execution is simultaneous, synchronous, asynchronous or sequential with selection. If the object is a submenu, sublist or list of attributes associated with the selected object, then the submenu members, sublist members or attributes are displayed on the screen in a spaced apart format. The same procedure used to select the selected object is then used to select a member of the submenu, sublist or attribute list. Thus, the interfaces have a gravity like or anti-gravity like action on display objects. As the selection object(s) moves, it attracts an object or objects in alignment with the direction of the selection object's motion pulling those object(s) toward it and may simultaneously, synchronously, asynchronously or sequentially repel non-selected items away or indicate non-selection in any other manner so as to discriminate between selected and non-selected objects As motion continues, the pull increases on the object most aligned with the direction of motion, further accelerating the object toward the selection object until they touch or merge or reach a threshold distance determined as an activation threshold. The touch or merge or threshold value being reached causes the processing unit to select and activate the object(s).

Additionally, the sensed motion may be one or more motions detected by one or more movements within the active zones of the motion sensor(s) giving rise to multiple sensed motions and multiple command function that may be invoked simultaneously, synchronously, asynchronously, or sequentially. The sensors may be arrayed to form sensor arrays. If the object is an executable object such as taking a photo, turning on a device, etc., then the execution is simultaneous, synchronous, asynchronous or sequential with selection. If the object is a submenu, sublist or list of attributes associated with the selected object, then the submenu members, sublist members or attributes are displayed on the screen in a spaced apart format. The same procedure used to select the selected object is then used to select a member of the submenu, sublist or attribute list. Thus, the interfaces have a gravity like action on display objects. As the selection object moves, it attracts an object or objects in alignment with the direction of the selection object's motion pulling those objects toward it. As motion continues, the pull increases on the object most aligned with the direction of motion, further accelerating the object toward the selection object until they touch or merge or reach a threshold distance determined as an activation threshold to make a selection. The touch, merge or threshold event causes the processing unit to select and activate the object.

The sensed motion may result not only in activation of the systems, apparatuses, and/or interfaces, but may result in select, attribute control, activation, actuation, scroll or combination thereof.

In other embodiments, the systems, apparatuses, and/or interfaces may utilize different unit feedback formats including haptic or tactile outputs, audio outputs, any other cognizable feedback formats to indicate or evident user interaction with the systems, apparatuses, and/or interfaces. For example, if the user moves through radial zones, different objects may produce different buzzes or sounds, and the intensity or pitch may change while moving in that zone to indicate whether the object is in front of or behind the user.

Compound motions may also be used so as to provide different control functions than the motions made separately or sequentially. This includes combination attributes and changes of both state and attribute, such as tilting the device to see graphics, graphics and text or text, along with changing scale based on the state of the objects, while providing other controls simultaneously, synchronously, asynchronously, sequentially. or independently, such as scrolling, zooming in/out, or selecting while changing state. These features may also be used to control chemicals being added to a vessel, while simultaneously, synchronously, asynchronously, or sequentially controlling the amount. These features may also be used to change between operating systems such as between Windows® 8 and Windows® 7 with a tilt while moving icons or scrolling through programs at the same time.

Audible or other communication medium may be used to confirm object selection or in conjunction with motion so as to provide desired commands (multimodal) or to provide the same control commands in different ways.

In other embodiments, the systems, apparatuses, and/or interfaces and the methods for implementing them may also include artificial intelligence (AI) components (e.g., any AI component including or containing, but is not limited to, a Machine Learning (ML), Deep Learning (DL), Neural Network (NN) and any other multi-parameter, self-learning component) that learn from a user's interaction with the systems, apparatuses, and/or interfaces including movement characteristics, environmental characteristics (e.g., motion sensor types, processing unit types, or other environment properties), controllable object environmental characteristics, historical characteristics, etc. to improve the performance of the systems, apparatuses, and/or interfaces and to improve prediction capability of the systems, apparatuses, and/or interfaces to anticipate user activities, or to modify the content or processes. The AI components may be utilized to affect modification to the training routines to enhance the training routine by including actions taken by a majority (greater than 50%) of individuals utilizing the training routine. For example, if the AI component determines that additional specific information and training exercises are required for a given task or task component, the AI routine may cause the systems, interfaces, elements, or apparatuses and the methods implementing them to update the task or task component, content, and/or processes by incorporating new content/information about the task or task component or updating aspects of the task or task component to improve task or task component completion and proficiency. Moreover, the AI analysis may be used to update an entire training routine or any task or component of the training routine. Again, the AI routine will generally update the training routine if a majority of trainers and/or trainees respond to the training routine, component, task, or task component in a similar fashion or manner. The AI components may also be used to analyze trainer interaction for determining trainer proclivities for performing the routine, components, tasks and/or task components and/or trainee interaction for determining trainee proclivities for performing the routine, components, tasks and/or task components and modify the training routine for specific types of trainees like determining whether a student is an auditory or visual or mixed learner. Thus, the systems, interfaces, or apparatuses and the methods implementing them may include trainer and/or trainee type specific implementations of the training routine. The systems, interfaces, or apparatuses and the methods implementing them would then have a preliminary interaction procedure, wherein a new trainee or a new trainer would perform some preliminary tasks designed to determine the trainers and/or trainees learning proclivities and select a type specific implementation that would best accommodate the new trainer and/or trainee improving the trainee's ability to complete a training routine with increase proficiency. This same AI system or elements may be used to approximate, replicate or predict motion events, gestures, and any function(s) of scrolling, selecting, activating, or attribute control or any combination of these. For instance, using AI, the system could determine a certain vector is being selected and the change in motion rate that normally would occur along that vector can be recreated probabilistically through parameters and algorithms. These may them be combined with real motion and other real parameters to provide the effect/outcomes of artificial motion events, where the real motion did not need to occur. Artificial Vectors and vector attributes can be created and used in the same way.

Embodiments of this disclosure further relate to systems for selecting and activating virtual or real objects and their controllable attributes including at least one motion sensor having an active sensing zone, at least one processing unit, at least one power supply unit, and one object or a plurality of objects under the control of the processing units. The sensors, processing units, and power supply units are in electrical communication with each other. The motion sensors sense motion including motion or movement properties within the active zones, generate at least one output signal, and send the output signals to the processing units. The processing units convert the output signals into at least one command function. The command functions include (1) a start function, (2) a scroll function, (3) a select function, (4) an attribute function, (5) an attribute control function, (6) a simultaneous, synchronous, asynchronous or sequential control function including: (7) a select and scroll function, (8) a select, scroll and activate function, (9) a select, scroll, activate, and attribute control function, (10) a select and activate function, (11) a select and attribute control function, (12) a select, activate, and attribute control function, or (13) combinations thereof, or (14) combinations thereof. The start functions activate at least one selection or cursor object and a plurality of selectable objects upon first sensing motion by the motion sensors and selectable objects aligned with the motion direction move toward the selection object or become differentiated from non-aligned selectable objects and motion continues until a target selectable object or a plurality of target selectable objects are discriminated from non-target selectable objects resulting in activation of the target object or objects. The motion or movement properties include a touch, a lift off, a direction, a distance/displacement, a duration, a velocity, an acceleration, a change in direction, a change in distance/displacement, a change in duration, a change in velocity, a change in acceleration, a rate of change of direction, a rate of change of distance/displacement, a rate of change of duration, a rate of change of velocity, a rate of change of acceleration, stops, holds, timed holds, or mixtures and combinations thereof. The objects comprise real-world objects, virtual objects and mixtures or combinations thereof, where the real-world objects include physical, mechanical, electro-mechanical, magnetic, electro-magnetic, electrical, or electronic devices or any other real-world device that can be controlled by a processing unit and the virtual objects include any construct generated in a virtual world or by a computer and displayed by a display device and that are capable of being controlled by a processing unit. The attributes comprise activatable, executable and/or adjustable attributes associated with the objects. The changes in motion or movement properties are changes discernible by the motion sensors sensor outputs, and/or the processing units.

In certain embodiments, the start functions further activate the user feedback units and the selection objects and the selectable objects are discernible via the motion sensors in response to movement of an animal, human, robot, robotic system, part or parts thereof, or combinations thereof within the motion sensor active zones. In other embodiments, the system further includes at least on user feedback unit, at least one battery backup unit, communication hardware and software, at least one remote control unit, or mixtures and combinations thereof, where the sensors, processing units, power supply units, the user feedback units, the battery backup units, the remote control units are in electrical communication with each other. In other embodiments, faster motion causes a faster movement of the target object or objects toward the selection object or causes a greater differentiation of the target object or object from the non-target object or objects. In other embodiments, if the activated objects or objects have subobjects and/or attributes associated therewith, then as the objects move toward the selection object, the subobjects and/or attributes appear and become more discernible as object selection becomes more certain. In other embodiments, once the target object or objects have been selected, then further motion within the active zones of the motion sensors causes selectable subobjects or selectable attributes aligned with the motion direction to move towards the selection object(s) or become differentiated from non-aligned selectable subobjects or selectable attributes and motion continues until a target selectable subobject or attribute or a plurality of target selectable objects and/or attributes are discriminated from non-target selectable subobjects and/or attributes resulting in activation of the target subobject, attribute, subobjects, or attributes. In other embodiments, the motion sensor is selected from the group consisting of digital cameras, optical scanners, optical roller ball devices, touch pads, inductive pads, capacitive pads, holographic devices, laser tracking devices, thermal devices, acoustic devices, any other device capable of sensing motion, arrays of motion sensors, and mixtures or combinations thereof. In other embodiments, the objects include lighting devices, cameras, ovens, dishwashers, stoves, sound systems, display systems, alarm systems, control systems, medical devices, robots, robotic control systems, hot and cold water supply devices, air conditioning systems, heating systems, ventilation systems, air handling systems, computers and computer systems, chemical plant control systems, computer operating systems, virtual reality systems, augmented reality systems, graphics systems, business software systems, word processor systems, internet browsers, accounting systems, military systems, control systems, other software systems, programs, routines, objects and/or elements, remote control systems, or mixtures and combinations thereof. In other embodiments, if the timed hold is brief, then the processing unit causes an attribute to be adjusted to a preset level. In other embodiments, if the timed hold is continued, then the processing unit causes an attribute to undergo a high value/low value cycle that ends when the hold is removed. In other embodiments, the timed hold causes an attribute value to change so that (1) if the attribute is at its maximum value, the timed hold causes the attribute value to decrease at a predetermined rate, until the timed hold is removed, (2) if the attribute value is at its minimum value, then the timed hold causes the attribute value to increase at a predetermined rate, until the timed hold is removed, (3) if the attribute value is not the maximum or minimum value, then the timed hold causes randomly selects the rate and direction of attribute value change or changes the attribute to allow maximum control, or (4) the timed hold causes a continuous change in the attribute value in a direction of the initial motion until the timed hold is removed. In other embodiments, the motion sensors sense a second motion including second motion or movement properties within the active zones, generate at least one output signal, and send the output signals to the processing units, and the processing units convert the output signals into a confirmation command confirming the selection or at least one second command function for controlling different objects or different object attributes. In other embodiments, the motion sensors sense motions including motion or movement properties of two or more animals, humans, robots, or parts thereof, or objects under the control of humans, animals, and/or robots within the active zones, generate output signals corresponding to the motions, and send the output signals to the processing units, and the processing units convert the output signals into command function or confirmation commands or combinations thereof implemented simultaneously, synchronously, asynchronously or sequentially, where the start functions activate a plurality of selection or cursor objects and a plurality of selectable objects upon first sensing motion by the motion sensor and selectable objects aligned with the motion directions move toward the selection objects or become differentiated from non-aligned selectable objects and the motions continue until target selectable objects or pluralities of target selectable objects are discriminated from non-target selectable objects resulting in activation of the target objects and the confirmation commands confirm the selections.

The inventors have found that systems and methods implemented on a processing unit such as a computer may be constructed that permit the creation of dynamic environments for object and/or attribute display, manipulation, differentiation, and/or interaction, where the systems include one processing unit or a plurality of processing units, one motion sensor or a plurality of motion sensors, one user interface or a plurality of user interfaces and dynamic environment software for generating, displaying, and manipulating the dynamic environments and the objects and/or attributes included therein. The dynamic environments are produced via user interaction with the sensor(s), which are in electronic communication with the processing unit(s), and comprise a set of objects and associated attributes displayed on the user interface(s) so that the objects and/or attributes are differentiated one from the other. The differentiation may evidence priority, directionality, content, type, activation procedures, activation parameters, control features, other properties that are associated with the objects and/or attributes or combinations thereof. The differentiation and distribution of the objects and/or attributes may change based on user interaction with the motion sensors and/or locations of the motion sensors, where at least one motion sensor or sensor output is associated with a mobile or stationary device or where at least one motion sensor or sensor output is associated with a mobile device and at least one motion sensor or sensor output is associated with a stationary device, and mixtures or combinations thereof. Of course, these same procedures may be used with objects and/or attributes at any level of drill down.

In certain embodiments, the systems and methods of this disclosure activation of the system causes a plurality of selectable objects to be displayed on a display device of a user interface associated with the systems. The selectable objects may represent: (1) objects that may directly invoked, (2) objects that have a single attribute, (3) objects that have a plurality of attributes, (4) objects that are lists or menus that may include sublists or submenus, (5) any other selectable item, or (6) mixtures and combinations thereof. The objects may represent virtual or real objects. Virtual objects may be any object that represents an internal software component. Real object may be executable programs or software application or may be real-world devices that may be controlled by the systems and/or methods. The displayed selectable objects may be a default set of selectable objects, pre-defined set of selectable objects, or a dynamically generated set of selectable objects, generated based on locations of the sensors associated with mobile devices and the motion sensors associated with stationary devices. The systems and methods permit the selectable objects to interact with the user dynamically so that object motion within the environments better correlates with the user ability to interact with the objects. The user interactions include, but are not limited to: (a) object discrimination based on sensed motion, (b) object selection base on sensed motion, (c) menu drill down based on sensed motion, (d) menu drill up based on sensed motion, (e) object selection and activation based on sensed motion and on the nature of the selectable object, (f) scroll/selection/activation based on sensed motion and on the nature of the selectable object, and (g) any combination of the afore listed interactions associated with a collection of linked objects, where the linking may be pre-defined, based on user gained interaction knowledge, or dynamically generated based on the user, sensor locations, and the nature of the sensed motion. The systems and methods may also associate one or a plurality of object differentiation properties with the displayed selectable objects, where the nature of the differentiation for each object may be predefined, defined based on user gained interaction knowledge, or dynamically generated based on the user, sensor locations, and/or the nature of the sensed motion. The differentiation properties include, but are not limited to: color; color shading; spectral attributes associated with the shading; highlighting; flashing; rate of flashing; flickering; rate of flickering; shape; size; movement of the objects such as oscillation, side to side motion, up and down motion, in and out motion, circular motion, elliptical motion, zooming in and out, etc.; rate of motion; pulsating; rate of pulsating; visual texture; touch texture; sounds such as tones, squeals, beeps, chirps, music, etc.; changes of the sounds; rate of changes in the sounds; any user discernible object differentiation properties, or any mixture and combination thereof. The differentiation may signify to the user a sense of direction, object priority, object sensitivity, etc., all helpful to the user for dynamic differentiation of selectable objects displayed on the display derived from the user, sensed motion, and/or the location of the mobile and stationary sensors.

For example, one displayed object may pulsate (slight zooming in and out, or expanding and contracting) at a first rate, while another displayed object may pulsate a second rate, where the first and second rates may be the same or different, and a faster pulsation rate may be associated with a sense of urgency relative to objects having a slower rate of pulsation. These rates may change in a pre-defined manner, a manner based on knowledge of the user, or dynamically based on the user, sensor locations, and/or the nature of the sensed motion.

In another example, a set of objects may slightly move to the right faster than they move back to the left, indicating that the user should approach the objects from the right, instead from another direction.

In certain embodiments, a main object may have one or a plurality of sub-objects moving (constant or variable rate and/or direction) around or near the main object, indicating the nature of the sub-objects. In this case, sub-objects revolving around the main object may represent that they need to be interacted with in a dynamic, motion-based way, whereas the main object may be interacted with in a static manner such as a vocal command, hitting a button, clicking, or by any other non-dynamic or static interaction.

In other embodiments, a main object may have a certain color, such as blue, and its associated sub-objects have shades of blue, especially where the sub-objects dynamically transition from blue to off-blue or blue-green or other related colors, displaying they come from the primary blue object, whereas a red Object next to the blue one might have sub-objects that transition to orange, while a sub-object that transitions to purple might represent it is a sub-set of blue and red and can be accessed through either.

In other embodiments, the objects or sub-objects may fade in or out, representing changes of state based on a time period that the user interacts with them. By fading out, the systems may be notifying the user that the program or application (e.g., water flow in a building) will be entering a sleep or interruption state. The rate of the fade out may indicate how quickly the program or application transitions into a sleep state and how quickly they reactivate. A fade-in might relay the information that the object will automatically initiate over a given time automatically vs. manually.

In other embodiments, an array of objects, such as the screen of applications on a mobile device, the objects pulsing might represent programs that are active, whereas the objects that are static might represent programs that are inactive. Programs that are pulsing at a slower rate might represent programs running occasionally in the background. Of course, other dynamic indicators, such as changes in color, intensity, translucency, size, shape, or any recognizable attribute, may be used to relay information to the user.

Another example of the operation of the systems and methods of this disclosure may be in a medical context. In such a case, the objects displayed on the user interface may be an array of sensors active in an operating room including, but not limited to, oxygen sensors, blood flow sensors, pulse rate sensors, heart beat rate, blood pressure sensors, brain activity sensors, etc. The different dynamic changes in color, shape, size, sound, and/or movement of the objects may represent data associated with the sensors, providing multiple points of information in a simple, compounded way to the user. If color represented oxygen level, size represented pressure, and dynamic movement of the object represented heartbeat, one object could represent a great deal of information to the user.

The characteristics of associated sub-objects seen simultaneously, synchronously, asynchronously or sequentially after the primary objects are selected and may likewise provide much more information than just letting the user know more information exists in this case, the primary object would be labeled with the corresponding body position and the sub-object representing oxygen level past and current data might be pulsing or intensifying dynamically in color, while the blood pressure sub-object might be slightly growing larger or smaller with each heartbeat, representing minimal change in blood pressure, and the heartbeat might be represented by the object rotating clockwise (CW), then counter clockwise (CAW) with each heartbeat.

In another example, one object (or word in a word document) swapping places with another might represent the need to change the word to provide better grammar for a sentence. Spelling changes might be represented by pulsing words, and words that are acceptable, but have a better common spelling might be represented by words that pulse at a slower rate. Dynamic changes of color might also be associated with the words or other characteristics to draw attention to the user and give secondary information at the same time, such as which words that might be too high or too low of a grade level for the reader in school books.

Thus, any combination of dynamic characteristics may be used to provide more information to the user than a static form of information, and may be used in conjunction with the static information characteristic.

In certain embodiments, objects (such as application icons) may have several possible states and display states. An object may be in an unselected state, a present state (available for selection but with no probability of being selected yet), a pre-selected (now probable, but not meeting a threshold criteria for being selected), a selected state (selected but not opened or having an execute command yet issued), or an actuated state (selected and having an attribute executed (i.e., on (vs. off), variable control ready to change based on moving up or down, or a submenu is displayed and ready to be selected). If the object is in a group of objects, as the user moves towards that group, the zone and/or the group of objects may display or present a different characteristic that represents they are ready to be selected; this may be identified as a pre-selected state. In each state, the objects may display different characteristics to convey information to the user, such as change of shape, size, color, sound, smell, feel, pulse rate, different dynamic directional animations, etc. For instance, before a user touches a mobile device (one with a touch sensor), the objects may be in an unselected state, displaying no attribute other than the common static display currently employed. Once a user touches the screen, the items that need attention might change in color (present, but no different probability of being selected than any others). As the user begins to move in the direction of an object desired, the more likely objects may begin to display differently, such as increasing in size, or begin pulsing, and as the probability increases, the pulse rate may increase, but objects in more urgent need of attention may pulse differently or even faster than others in the same group or zone—pre-selected. Once the correct object(s) is selected, it may show and even different state, such as displaying subobjects, changing color, or making a sound, but it still may not be open or actuated yet. If the attribute is volume control, it may be selected, but would not control volume until it is actuated by moving up or down, adjusting the volume. Of course, objects in an unselected state may show dynamic characteristics (pulsing for example) as well to convey information to the user, such as activity or priority. In this way, it may have a dynamic characteristic while in a static state.

In another example, for applications in the corner of a mobile device, when, head or eye gaze is directed towards that zone or objects, they may be in an unselected, preselected, or selected but not actuated state, and they may demonstrate dynamic indicators/attributes to convey intent, attributes, sub-attributes, or mixed or combination content or attributes with changing environments. They may display differently at any state, or only at one particular state (such as selected), and this may be a preset value, or something dynamic, such as contextual or environmental factors. An example of this last dynamic characteristic indicator would be in a vehicle or virtual reality display where the song playlist would cause a pulsing effect on preferred songs, but different songs would pulse differently when another occupant or player enters the environment, indicating the suggested objects would change due a combination of user preferences, and the dynamic display characteristics of all or some of the objects would change to indicate a combination preferential selections).

The dynamic environment systems of this disclosure may also be used in virtual reality systems and/or augmented reality systems so that players or users of these virtual reality systems and/or augmented reality systems through motion and motion properties are able to select, target, and/or deselect features, menus, objects, constructs, constructions, user attributes, weapons, personal attributes, personal features, any other selectable or user definable features or attributes of the virtual space or augmented reality space. Thus, as a user enters first enters a virtual reality space or augment reality space, all of the selectable or definable features and/or attributes of the space would be displayed about the user in any desired form—2D and/or 3D semicircular or hemispherical array with user at center, 2D and/or 3D circular or spherical array with user at center, 2D and/or 3D matrix array with user at center or off-center, any other 2D and/or 3D display of features and attributes, or mixtures and combinations thereof. As the user moves a body part associated with the motion detectors used to interface with the space (visual—eye tracking sensors, hand part sensors gloves or the like, body sensors body suits, or other sensors), the sensed motions and motion properties such as direction, angle, distance/displacement, duration, speed, acceleration, and/or changes in any of these motion properties cause features and/or attributes to display differently based on state and information to display to the user, and may move toward the user based on the motion and motion or movement properties of the object and/or the user, while the other features and/or attributes stay static or move away from the user. An example of this is to move towards a particular tree in a group of trees in a game. As the user looks toward a particular tree, the tree might shake while the others sway gently, as the user moves toward the tree, the tree may begin to move towards the user at a faster rate, if has a special prize associated with it, or at a slower rate in no prize. If the special prize is a one of a kind attribute, the tree may change color or size at it moves towards the user and the user is moving towards the tree. Once the tree is selected via a threshold event, it may change shape into the prize it held, and then the start to act like that prize when it is selected by the user moving the hand towards a designated area of the object enough to actuate. These different attributes or characteristics are part of a dynamic environment where the speed, direction, angle, distance/displacement, duration, state, display characteristics and attributes are affected by motion of the user and object, or any combination of these. In another example, where it is desired to choose one object, as the motion or motion properties of user(s), object(s) or both continue, the features and/or attributes are further of user, objects or both are discriminated, and the target features and/or attributes may move closer. Once the target is fully differentiated, then all subfeatures and/or subobjects may become visible. As motion continues, features and/or attributes and/or subfeatures and/or subobjects are selected and the user gains the characteristics or features the user desires in the space. All of the displayed features and/or attributes and/or subfeatures and/or subobjects may also include highlighting features such as sound (chirping, beeping, singing, etc.), vibration, back and forth movement, up and down movement, circular movement, etc.

Embodiments of this disclosure relate broadly to computing devices, comprising at least one sensor or sensor output configured to capture data including user data, motion data, environment data, temporal data, contextual data, and/or mixtures and combinations thereof. The computing device also includes at least one processing unit configured, based on the captured data, to generate at least one command function. The command functions comprise: (1) a single control function including (a) a start function, (b) a scroll function, (c) a select function, (d) an attribute function, (e) an activate function, or (f) mixtures and combinations thereof. The command functions also comprise: (2) a simultaneous, synchronous, asynchronous, or sequential control function including (a) a combination of two or more of the functions (1a-1e), (b) a combination of three or more of the functions (1a-1e), (c) a combination of four or more of the functions (1a-1e), (d) mixtures and combinations thereof. The command functions may also comprise (3) mixtures and combinations of any of the above functions. In certain embodiments, the at least one sensor comprises touch pads, touchless pads, inductive sensors, capacitive sensors, optical sensors, acoustic sensors, thermal sensors, optoacoustic sensors, electromagnetic field (EMF) sensors, wave or waveform sensors, strain gauges, accelerometers, any other sensor that senses movement or changes in movement, or mixtures and combinations thereof. In other embodiments, a first control function is a single control function. In other embodiments, a first control function is a single control function and a second function is a simultaneous, synchronous, asynchronous or sequential control function. In other embodiments, a first control function is a simultaneous, synchronous, asynchronous, or sequential control function. In other embodiments, a first control function is a simultaneous, synchronous, asynchronous, or sequential control function and a second function is a simultaneous, synchronous, asynchronous, or sequential control function. In other embodiments, a plurality of single and simultaneous, synchronous, asynchronous, or sequential control functions are actuated by user determined motion.

Embodiments of this disclosure relate broadly to computer implemented methods, comprising under the control of a processing unit configured with executable instructions, receiving data from at least one sensor configured to capture the data, where the captured data includes user data, motion data, environment data, temporal data, contextual data, or mixtures and combinations thereof. The methods also comprise processing the captured data to determine a type or types of the captured data; analyzing the type or types of the captured data; and invoking a control function corresponding to the analyzed data. The control functions comprise: (1) a single control function including: (a) a start function, (b) a scroll function, (c) a select function, (d) an attribute function, (e) an activate function, or (f) mixtures and combinations thereof, or (2) a simultaneous, synchronous, asynchronous or sequential control function including: (a) a combination of two or more of the functions (1a-1e), (b) a combination of three or more of the functions (1a-1e), (c) a combination of four or more of the functions (1a-1e), (d) mixtures and combinations thereof, or (3) mixtures and combinations thereof. In certain embodiments, the at least one sensor comprises touch pads, touchless pads, inductive sensors, capacitive sensors, optical sensors, acoustic sensors, thermal sensors, optoacoustic sensors, electromagnetic field (EMF) sensors, strain gauges, accelerometers, any other sensor that senses movement or changes in movement, or mixtures and combinations thereof. In other embodiments, a first control function is a single control function. In other embodiments, a first control function is a single control function and a second function is a simultaneous, synchronous, asynchronous, or sequential control function. In other embodiments, a first control function is a simultaneous, synchronous, asynchronous, or sequential control function. In other embodiments, a first control function is a simultaneous, synchronous, asynchronous, or sequential control function and a second function is a simultaneous, synchronous, asynchronous, or sequential control function. In other embodiments, a plurality of single and simultaneous, synchronous, asynchronous, or sequential control functions are actuated by user determined motion.

Embodiments of this disclosure relate broadly to non-transitory computer readable storage media storing one or more sequences of instructions that, when executed by one or more processing units, cause a computing system to: (a) receive data from at least one sensor configured to capture the data, where the captured data includes user data, motion data, environment data, temporal data, contextual data, or mixtures and combinations thereof; (b) process the captured data to determine a type or types of the captured data; (c) analyze the type or types of the captured data; and (d) invoke a control function corresponding to the analyzed data. The control functions comprise (1) a single control function including: (a) a start function, (b) a scroll function, (c) a select function, (d) an attribute function, (e) an activate function, or (f) mixtures and combinations thereof, or (2) a simultaneous, synchronous, asynchronous or sequential control function including: (a) a combination of two or more of the functions (1a-1e), (b) a combination of three or more of the functions (1a-1e), (c) a combination of four or more of the functions (1a-1e), (d) mixtures and combinations thereof, or (3) mixtures and combinations thereof. In certain embodiments, the at least one sensor comprises touch pads, touchless pads, inductive sensors, capacitive sensors, optical sensors, acoustic sensors, thermal sensors, optoacoustic sensors, electromagnetic field (EMF) sensors, strain gauges, accelerometers, any other sensor that senses movement or changes in movement, or mixtures and combinations thereof. In other embodiments, a first control function is a single control function. In other embodiments, a first control function is a single control function and a second function is a simultaneous, synchronous, asynchronous, or sequential control function. In other embodiments, a first control function is a simultaneous, synchronous, asynchronous, or sequential control function. In other embodiments, a first control function is a simultaneous, synchronous, asynchronous, or sequential control function and a second function is a simultaneous, synchronous, asynchronous, or sequential control function. In other embodiments, a plurality of single and simultaneous, synchronous, asynchronous, or sequential control functions are actuated by user determined motion.

Embodiments of this disclosure relate broadly to computer-implemented systems comprising a digital processing device comprising at least one processor, an operating system configured to perform executable instructions, and a memory; a computer program including instructions executable by the digital processing device to create a gesture-based navigation environment. The environment comprises a software module configured to receive input data from a motion sensor, the input data representing navigational gestures of a user; a software module configured to present one or more primary menu items; and a software module configured to present a plurality of secondary menu items in response to receipt of input data representing a navigational gesture of the user indicating selection of a primary menu item, the secondary menu items arranged in a curvilinear orientation about the selected primary menu item. The environment operates such that in response to receipt of input data representing a navigational gesture of the user comprising motion substantially parallel to the curvilinear orientation, the plurality of secondary menu items scrolls about the curvilinear orientation; in response to receipt of input data representing a navigational gesture of the user substantially perpendicular to the curvilinear orientation, an intended secondary menu item in line with the direction of the navigational gesture is scaled and moved opposite to the direction of the navigational gesture to facilitate user access. In certain embodiments, the processing device or unit is a smart watch and the motion sensor is a touchscreen display.

Embodiments of this disclosure relate broadly to non-transitory computer-readable storage media encoded with a computer program including instructions executable by a processor to create a gesture-based or motion-based navigation environment comprising: a software module configured to receive input data from a motion sensor, the input data representing navigational movement of a user; a software module configured to present one or more primary menu items; and a software module configured to present a plurality of secondary menu items in response to receipt of input data representing a navigational gesture or movement of the user indicating selection of a primary menu item, the secondary menu items arranged in a curvilinear orientation about the selected primary menu item. The environment operates such that in response to receipt of input data representing a navigational gesture or movement of the user comprising motion substantially parallel to the curvilinear orientation, the plurality of secondary menu items scrolls about the curvilinear orientation; and in response to receipt of input data representing a navigational gesture or movement of the user substantially perpendicular to the curvilinear orientation, an intended secondary menu item in line with the direction of the navigational gesture or movement is scaled and moved opposite to the direction of the navigational gesture or movement to facilitate user access. In certain embodiments, the processor is a smart watch or wearable device and the motion sensor is a touchscreen display.

Embodiments of this disclosure relate broadly to systems for selecting and activating virtual or real objects and their controllable attributes comprises: at least one motion sensor having an active sensing zone, at least one processing unit, at least one power supply unit, one object or a plurality of objects under the control of the processing units. The sensors, processing units, and power supply units are in electrical communication with each other. The motion sensors sense motion including motion or movement properties within the active zones, generate at least one output signal, and send the output signals to the processing units. The processing units convert the output signals into at least one command function. The command functions comprise: (1) a start function, (2) a scroll function, (3) a select function, (4) an attribute function, (5) an attribute control function, (6) a simultaneous, synchronous, asynchronous, or sequential control function, and/or (7) combinations thereof. The simultaneous, synchronous, asynchronous, or sequential control functions include: (1) a select and scroll function, (2) a select, scroll, and activate function, (3) a select, scroll, activate, and attribute control function, (4) a select and activate function, (5) a select and attribute control function, (6) a select, activate, and attribute control function, or (7) combinations thereof. The start functions activate at least one selection or cursor object and a plurality of selectable objects upon first sensing motion by the motion sensors and selectable objects aligned with the motion direction move toward the selection object or become differentiated from non-aligned selectable objects and motion continues until a target selectable object or a plurality of target selectable objects are discriminated from non-target selectable objects resulting in activation of the target object or objects. The motion or movement properties include a touch, a lift off, an angle, a direction, a distance/displacement, a duration, a velocity, an acceleration, a change in direction, a change in distance/displacement, a change in duration, a change in velocity, a change in acceleration, a rate of change of direction, a rate of change of distance/displacement, a rate of change of duration, a rate of change of velocity, a rate of change of acceleration, stops, holds, timed holds, and/or mixtures and combinations thereof. The objects comprise real-world objects, virtual objects and mixtures or combinations thereof, where the real-world objects include physical, mechanical, electro-mechanical, magnetic, electro-magnetic, electrical, or electronic devices or any other real-world device that can be controlled by a processing unit and the virtual objects include any construct generated in a virtual world or by a computer and displayed by a display device and that are capable of being controlled by a processing unit. The attributes comprise selectable, activatable, executable and/or adjustable attributes associated with the objects. The changes in motion or movement properties are changes discernible by the motion sensors and/or the processing units. In certain embodiments, the start functions further activate the user feedback units and the selection objects and the selectable objects are discernible via the motion sensors in response to movement of an animal, human, robot, robotic system, part or parts thereof, or combinations thereof within the motion sensor active zones. In other embodiments, the systems further comprise: at least on user feedback unit, at least one battery backup unit, communication hardware and software, at least one remote control unit, or mixtures and combinations thereof. The sensors, processing units, power supply units, the user feedback units, the battery backup units, the remote control units are in electrical communication with each other. In other embodiments, the systems further comprise: at least one battery backup unit, where the battery backup units are in electrical communication with the other hardware and units. In other embodiments, faster motion causes a faster movement of the target object or objects toward the selection object or objects or causes a greater differentiation of the target object or objects from non-target object or objects. In other embodiments, the non-target object or objects move away from the selection object as the target object or objects move toward the selection object or objects to aid in object differentiation. In other embodiments, the target objects and/or the non-target objects are displayed in list, group, or array forms and are either partially or wholly visible or partially or wholly invisible. In other embodiments, if the activated object or objects have subobjects and/or attributes associated therewith, then as the object or objects move toward the selection object, the subobjects and/or attributes appear and become more discernible as the target object or objects becomes more certain. In other embodiments, the target subobjects and/or the non-target subobjects are displayed in list, group, or array forms and are either partially or wholly visible or partially or wholly invisible. In other embodiments, once the target object or objects have been selected, then further motion within the active zones of the motion sensors causes selectable subobjects or selectable attributes aligned with the motion direction to move towards, away and/or at an angle to the selection object(s) or become differentiated from non-aligned selectable subobjects or selectable attributes and motion continues until a target selectable subobject or attribute or a plurality of target selectable objects and/or attributes are discriminated from non-target selectable subobjects and/or attributes resulting in activation of the target subobject, attribute, subobjects, or attributes. In other embodiments, the motion sensor is selected from the group consisting of digital cameras, optical scanners, optical roller ball devices, touch pads, inductive pads, capacitive pads, holographic devices, laser tracking devices, thermal devices, acoustic devices, any other device capable of sensing motion, arrays of motion sensors, waveform sensors, sensing devices, and mixtures or combinations thereof. In other embodiments, the objects include lighting devices, cameras, ovens, dishwashers, stoves, sound systems, display systems, alarm systems, control systems, medical devices, robots, robotic control systems, hot and cold water supply devices, air conditioning systems, heating systems, ventilation systems, air handling systems, computers and computer systems, chemical plant control systems, computer operating systems, software elements, software routines, graphics systems, business software systems, word processor systems, internet browsers, accounting systems, military software systems, virtual reality systems, augmented reality systems, mixed reality systems, software controlling mixed, augmented, and/or virtual reality environments, biometric systems, neurological systems, drone controls, and systems, software control systems, other software systems, programs, routines, objects and/or elements, remote control systems, and/or mixtures and combinations thereof. In other embodiments, if the timed hold is brief, then the processing unit causes an attribute to be adjusted to a preset level. In other embodiments, if the timed hold is continued, then the processing unit causes an attribute to undergo a high value/low value cycle that ends when the hold is removed. In other embodiments, the timed hold causes an attribute value to change so that (1) if the attribute is at its maximum value, the timed hold causes the attribute value to decrease at a predetermined rate, until the timed hold is removed, (2) if the attribute value is at its minimum value, then the timed hold causes the attribute value to increase at a predetermined rate, until the timed hold is removed, (3) if the attribute value is not the maximum or minimum value, then the timed hold causes randomly selects the rate and direction of attribute value change or changes the attribute to allow maximum control, or (4) the timed hold causes a continuous change in the attribute value in a direction of the initial motion until the timed hold is removed. In other embodiments, the motion sensors sense a second motion including second motion or movement properties within the active zones, generate at least one output signal, and send the output signals to the processing units, and the processing units convert the output signals into a confirmation command confirming the selection or at least one second command function for controlling different objects or different object attributes. In other embodiments, the motion sensors sense motions including motion or movement properties of two or more animals, humans, robots, or parts thereof, or objects under the control of humans, animals, and/or robots within the activate zones, generate output signals corresponding to the motions, and send the output signals to the processing units, and the processing units convert the output signals into command function or confirmation commands or combinations thereof implemented simultaneously, synchronously, asynchronously, or sequentially, where the start functions activate a plurality of selection or cursor objects and a plurality of selectable objects upon first sensing motion by the motion sensor and selectable objects aligned (co-linear with or the same angle) with the motion directions move toward the selection objects or become differentiated from non-aligned selectable objects and the motions continue until target selectable objects or pluralities of target selectable objects are discriminated from non-target selectable objects resulting in activation of the target objects and the confirmation commands confirm the selections.

Embodiments of this disclosure relate broadly to methods for controlling objects comprising: sensing motion including motion or movement properties within an active sensing zone of at least one motion sensor, where the motion or movement properties include a direction, an angle, a distance/displacement, a duration, a velocity, an acceleration, a change in direction, a change in distance/displacement, a change in duration, a change in velocity, a change in acceleration, a rate of change of direction, a rate of change of distance/displacement, a rate of change of duration, a rate of change of velocity, a rate of change of acceleration, stops, holds, timed holds, and/or mixtures and combinations thereof, producing an output signal or a plurality of output signals corresponding to the sensed motion, converting the output signal or signals via a processing unit in communication with the motion sensors into a command function or a plurality of command functions. The command functions comprise: (1) a start function, (2) a scroll function, (3) a select function, (4) an attribute function, (5) an attribute control function, (6) a simultaneous, synchronous, asynchronous, or sequential control function including: (7) a select and scroll function, (8) a select, scroll and activate function, (9) a select, scroll, activate, and attribute control function, (10) a select and activate function, (11) a select and attribute control function, (12) a select, activate, and attribute control function, or (13) combinations thereof, or (14) combinations thereof. The methods also include processing the command function or the command functions simultaneously, synchronously, asynchronously, or sequentially, where the start functions activate at least one selection or cursor object and a plurality of selectable objects upon first sensing motion by the motion sensor and selectable objects aligned with the motion direction move toward the selection object or become differentiated from non-aligned selectable objects and motion continues until a target selectable object or a plurality of target selectable objects are discriminated from non-target selectable objects resulting in activation of the target object or objects, where the motion or movement properties include a touch, a lift off, a direction, an angle, a distance/displacement, a duration, a velocity, an acceleration, a change in direction, a change in angle, a change in distance/displacement, a change in duration, a change in velocity, a change in acceleration, a rate of change of direction, a rate of change of distance/displacement, a rate of change of angle, a rate of change of duration, a rate of change of velocity, a rate of change of acceleration, stops, holds, timed holds, and/or mixtures and combinations thereof. The objects comprise real-world objects, virtual objects, attributes associated therewith, and/or mixtures and combinations thereof, where the real-world objects include physical, mechanical, electro-mechanical, magnetic, electro-magnetic, electrical, or electronic devices or any other real-world device that can be controlled by a processing unit and the virtual objects include any construct generated in a virtual world or by a computer and displayed by a display device and that are capable of being controlled by a processing unit. The attributes comprise activatable, executable and/or adjustable attributes associated with the objects.

The changes in motion or movement properties are changes discernible by the motion sensors and/or the processing units. In certain embodiments, the motion sensor is selected from the group consisting of digital cameras, optical scanners, optical roller ball devices, touch pads, inductive pads, capacitive pads, holographic devices, laser tracking devices, thermal devices, acoustic devices, any other device capable of sensing motion, arrays of motion sensors, and mixtures or combinations thereof. In other embodiments, the objects include lighting devices, cameras, ovens, dishwashers, stoves, sound systems, display systems, alarm systems, control systems, medical devices, robots, robotic control systems, hot and cold water supply devices, air conditioning systems, heating systems, ventilation systems, air handling systems, computers and computer systems, chemical plant control systems, computer operating systems, systems, graphics systems, business software systems, word processor systems, internet browsers, accounting systems, military systems, virtual reality systems, augmented reality systems, control systems, other software systems, programs, routines, objects and/or elements, remote control systems, or mixtures and combinations thereof. In other embodiments, if the timed hold is brief, then the processing unit causes an attribute to be adjusted to a preset level. In other embodiments, if the timed hold is continued, then the processing unit causes an attribute to undergo a high value/low value cycle that ends when the hold is removed. In other embodiments, the timed hold causes an attribute value to change so that (1) if the attribute is at its maximum value, the timed hold causes the attribute value to decrease at a predetermined rate, until the timed hold is removed, (2) if the attribute value is at its minimum value, then the timed hold causes the attribute value to increase at a predetermined rate, until the timed hold is removed, (3) if the attribute value is not the maximum or minimum value, then the timed hold causes randomly selects the rate and direction of attribute value change or changes the attribute to allow maximum control, or (4) the timed hold causes a continuous change in the attribute value in a direction of the initial motion until the timed hold is removed. In other embodiments, the methods further comprise: sensing second motion including second motion or movement properties within the active sensing zone of the motion sensors, producing a second output signal or a plurality of second output signals corresponding to the second sensed motion, converting the second output signal or signals via the processing units in communication with the motion sensors into a second command function or a plurality of second command functions, and confirming the selection based on the second output signals, or processing the second command function or the second command functions and moving selectable objects aligned with the second motion direction toward the selection object or become differentiated from non-aligned selectable objects and motion continues until a second target selectable object or a plurality of second target selectable objects are discriminated from non-target second selectable objects resulting in activation of the second target object or objects, where the motion or movement properties include a touch, a lift off, a direction, an angle, a distance/displacement, a duration, a velocity, an acceleration, a change in direction, a change in angle, a change in distance/displacement, a change in duration, a change in velocity, a change in acceleration, a rate of change of direction, a rate of change of angle, a rate of change of distance/displacement, a rate of change of duration, a rate of change of velocity, a rate of change of acceleration, stops, holds, timed holds, and/or mixtures and combinations thereof. In certain embodiments, sensing motions including motion or movement properties of two or more animals, humans, robots, and/or parts thereof within the active zones of the motion sensors, producing output signals corresponding to the motions, converting the output signals into command function or confirmation commands or combinations thereof, where the start functions activate a plurality of selection or cursor objects and a plurality of selectable objects or attributes upon first sensing motion by the motion sensor and selectable objects aligned with the motion directions move toward the selection objects or become differentiated from non-aligned selectable objects and the motions continue until target selectable objects or pluralities of target selectable objects are discriminated from non-target selectable objects resulting in activation of the target objects and the confirmation commands confirm the selections.

Systems Including Controller Apparatuses

The inventor has found that controller apparatuses may be fabricated that detect motion and determine motion or movement properties to control physical or real objects, physical or real objects navigating through real-world environments, virtual or augmented reality objects representing real objects in virtual or augmented representations of real environments, virtual or augmented reality objects in virtual or augmented reality environments, and/or virtual or augmented reality environments or attributes associated with any of these environments. The inventor has found that the apparatus may be in the form of apparatuses including a plurality of sensors, a sensor array and/or a plurality of sensor arrays, communication hardware and software, and at least one processing unit (generally, a digital processing unit) in communication with the sensors or sensor arrays and the communication hardware, where the sensors or arrays are capable of detecting motion and determining motion or movement properties in 1 dimension (e.g., x, y, z, t, $\theta$, $\varphi$, etc.), 2 dimensions (e.g., xy, xz, yz, xt, yt, zt, rt, r$\theta$, r$\varphi$, $\theta$t, $\varphi$t, etc.), 3 dimensions (e.g., xyz, r$\theta$h, r$\theta\varphi$, etc.), 4 dimensions (e.g., xyzt, r$\theta$ht, r$\theta\varphi$t, etc.), or higher dimensions. It should be recognized that in virtual or augmented reality environments, the dimensionality may be higher than 4, while in real environments, the time-space has only 4 dimensions, while the objects may have may more dimensions associated therewith, where the dimension may be attributes or parameters defining the object. The controller apparatuses of this disclosure may be used to control real devices such as manned or unmanned planes, drones, robots, boats, motor vehicles, trains, submarines, matter, space (and any attributes associated with these) and any other device that is capable of moving on land, sea, sky, outer space, or mixtures and combinations thereof. The controller apparatuses may also be used to control virtual or augmented reality objects representing real devices or attributes or control virtual or augmented reality objects that exist on in virtual or augmented reality environments.

Embodiments of the systems of this disclosure including apparatuses in the form of 3D constructs (solid, hollow, or mixture thereof) including at least one processing unit (e.g., a digital or analog processing unit), one or a plurality of sensors or sensor arrays, and communication software and hardware. The 3D constructs are designed to be held by a user. In certain embodiments, the sensors and/or sensor arrays include at least one gyroscope and at least one accelerometer. In other embodiments, the sensors or arrays may also include pressure sensors, temperature sensors, humidity sensors, field sensors, magnetometers, compass(es), optical sensors (UV, visible, near infrared (NIR), infrared (IR), microwave, radio frequency (Rf), etc. sensors), acoustic sensors, any other sensor, or mixtures and combinations thereof. In other embodiments, the 3D constructs including regular 3D constructs such as spheres, ellipsoids, cylinders, prisms, pyramids, cubes, rectangular solids, icosahedrons, dodecahedrons, octahedrons, cones, tetrahedrons, or any other regular 3D construct, or irregular 3D constructs such as distorted and/or irregular versions of the regular 3D constructs.

Embodiments of the sensors and/or sensor arrays are configured in or on the solid object so that they are capable of sensing motion and motion or movement properties, when the 3D object is moved. The motion or movement properties including motion direction (linear, angular, rotational, etc., or mixtures and combinations thereof), motion distance/displacement, motion duration, motion velocity (linear, angular, rotational, etc., or mixtures and combinations thereof), motion acceleration (linear, angular, rotational, etc., or mixtures and combinations thereof), and/or changes in any of these properties over time. In other embodiments, the apparatus is in the form of an object including indentations or recesses for accommodating a user fingertips, fingers, or fingers and palm to facilitate holding of the apparatus. In other embodiments, the systems of this disclosure may include two or more such apparatuses being controlled by the same or multiple users. For example, a single user may be have one apparatus in each hand or two or more users may have apparatuses in one or both hands so that the systems of this disclosure detects motion from all apparatuses and determined motion or movement properties from all apparatuses and utilizes the collective motion to control physical or real objects, physical or real objects navigating through real-world environments, virtual or augmented reality objects representing real objects in virtual or augmented representations of real environments, virtual or augmented reality objects in virtual or augmented reality environments, and/or virtual or augmented reality environments. These may also work with or include biometric, neurological, or other types of input or influencing forces.

Embodiments of the systems or apparatuses of this disclosure include at least one processing unit (e.g., a digital or analog processing unit), one or a plurality of sensors or sensor arrays, and communication software and hardware. In certain embodiments, the sensors and/or sensor arrays include at gyroscopes, accelerometers, compasses, magnetometers, pressure sensors, temperature sensors, humidity sensors, field sensors, optical sensors (UV, visible, NIR, IR, microwave, Rf, etc. sensors), acoustic sensors, any other sensor, or mixtures and combinations thereof. The sensors and/or arrays are configured to create a two-handed approach to navigate through virtual or augment reality environments or virtual or augmented reality representations of real environments, where the controllers are manifested in the virtual or augmented reality environment as virtual control objects.

The present disclosure describes apparatuses that provide easier ways to control real and/or virtual objects (e.g., real object include any real devices such as drones, entertainment systems, motor vehicles, air planes, etc. or virtual object include any virtual feature, construct, element, etc.). We have previously described the use of changes of motion and combinations of motion with touch, gestures and verbal interfaces and modalities to select, scroll, activate, and control objects and/or object attributes. Sensors now available, such as accelerometers, gyroscopes, compasses, GPS, near-field locators, optical cameras, and sensors, etc., allow us to provide new ways to interact with and/or control real objects, virtual objects, real-world and virtual environment content, and/or real-world or virtual environments.

Embodiments of the controller apparatuses of this disclosure comprises a physical ball or sphere. This same controller may be used in or with a virtual environment or may be a virtual representation of a physical controller to control virtual and/or real objects, attributes, zones, data, etc. The controller apparatuses may be in the form of a ball (virtual ball in a virtual environment) or a physical ball or any 3D shape. The 3D shape may be symmetrical, asymmetrical, irregular, smooth, faceted, textured, colored, etc. In certain embodiments, the 3D constructs are symmetrical. In other embodiments, the 3D constructs are spherical. In other embodiments, the 3D constructs are generally spherical having slight faceting with no sharp edges or corners. The controller may include sensors providing for detecting location and changes in location such as global positioning system (GPS) data, NFC data, way point data, or any other location data and degrees of motion such as angular and/or rotational motion such as pitch, yaw, roll, etc., linear motion up (+z), down (−z), left (−x), right (+x), in (+y), out (−y), any other motion, changes of any motion over time (velocity, acceleration, etc.), and/or any combination thereof. In certain embodiments, the controller apparatuses of this disclosure are configured to control a drone, unmanned vehicle, unmanned space craft, unmanned boat, unmanned air plane, unmanned submergible, unmanned air ship, or other similar device, or for locomotion or influencing environments.

In certain embodiments, the ball controller may be activated by grasping it with the fingers (as opposed to holding it with an open palm) and moving of the ball correlates to the movement of the drone. In a virtual environment, moving close enough or in proximity with a grasped palm position, without having to actually be too close, would be the activation). Once the ball controller is activated, moving it upwards begins the command to move the drone upwards. The distance and speed moved upwards (or change in other movement properties) prescribes the vector(s), associated attributes, and any acceleration value. Beginning to move up begins the drone moving upwards, the further the ball controller is moved up, the faster the drone goes up. At the point the ball movement is stopped (a hold function), or by relaxing the grip on the ball controller, the current attribute and intensity continues. A change in direction of the ball controller changes the direction of the drone, based on real-time changes of vectorial motion of the ball controller, and intensity based on speed and distance of the ball controller moved. The range of motion correlates to the attribute control of the drone; i.e., once the ball controller is activated, −6 to 0 to +6 inches (total of 12 inches) represents the full range of attribute (such as 0 to 30 mph, or total distance ability of the device). It is preferable that the attribute ranges being in increments so small movements of the hand do not adversely affect the device. Compared with typical joystick controllers, where holding the sticks still keeps attributes at a current value, holding the ball controller still keeps the attributes the same by relaxing the grip a threshold amount.

Rotating the ball controller rotates the drone, based on acceleration, velocity, and direction of the ball controller motion. The systems of this disclosure may be designed so that rotation of the ball controller, while moving the ball controller cause the system to perform multiple selection and attribute control functions, synchronously, asynchronously or sequentially.

Another embodiment of the controllers of this disclosure may include a plurality of independently rotatable sections such as a top section(s), a horizontal middle section(s), a bottom section(s), a right section(s), a left section(s), a vertical middle section(s), other rotatable sections, and mixtures or combinations thereof. For example, a spherical control apparatus may include a top section, a middle ring section, and a bottom section, which may be rotated independently. In other embodiments, the spherical controllers may include multiple sections and each section may include one or a plurality of rings. Controllers including multiple rotatable sections will provide more control aspects. Twisting action may be used to leverage motion so instead of moving the whole ball, a twist may cause the systems to execute an identical or similar control function, without moving the controller, i.e., the controller stays in place. A twist may also indicate a different device or groups of devices to be controlled by the same controller. The systems and methods may use twisting and moving to control objects and/or object attributes.

In other embodiments, the controller may include a vertical or horizontal member, such as a stick, rod, etc., attached, affixed or integral with a top, side, or bottom of the controller. The constructs may have a virtual extension of the physical extension pointing towards the ground or towards a desired location or direction for orientation or controls, such as a ray of light or a field distortion. The member may be used to keep the controller at a specific distance from the ground or other surface so that all motion is relative to the specific location of the controller relative to the member. It may also be used to guide the user in making decisions or providing other feedback or data for controls, decision-making, or locating of desired attributes or objects. Motion or movement about the member may also provide another layer of motion sensing and object and/or object attribute control.

The controller apparatuses may also be used in much the same way to navigate through virtual or augmented reality environment and/or space, except instead of controlling a physical device moving through a physical environment or a virtual or augmented reality representation of a physical environment, the systems and methods use controller motion to move through the virtual or augmented reality environment and/or space and/or to control VR/AR objects and VR/AR object attributes. For example, motion of the controller may cause a viewing angle to move (such as a camera through space), or may cause a scene to move in respect to a viewer's perspective. In this way by moving the controller forward (away from the user), the environment may appear to move towards the user in the same perspective and leveraged way as descried above (12 inches equals 0 to full speed of virtual "motion" of the scene). By moving the controller through an arc from left to right, the direction of turning of the environment is performed. By moving controller away from the body at the same time, a forward moving and turning of the environment is performed. By moving the controller upwards, a moving of the sky or ceiling down is performed. All of these type of motions may be done in combination, and in a small actual range of movement. The systems and methods may also response to the tilting of the controller. Such tilting may be combined with directional and rotational movement to provide additional functionality. For example, moving, rotating, and tilting may cause the system to move the physical object or VR/AR object in the indicated direction and rotation at an angle or at an offset determined by the tilt properties. A ring or other form of assistance may be attached or part of the controller to assist in holding on to the controller.

The systems and methods of the disclosure may also include a preview feature. The preview feature of the scene can be shown to represent the movement, while simultaneously, synchronously, asynchronously, or sequentially showing the existing scene. With a hold, voice command, trigger or button push, a tighter grip or opening of the hand, the view would transition from the previous scene to the previewed scene in a "portal", "jerk", dissolve, or other transition display event so the user is at the new desired location. For instance, if a wall had a door and another room beyond the door, a grasping motion towards the controller and a movement of the controller towards the door (away from the body indicating moving forward), and a continued hold or even further motion away from the body, would take the user into the next room with a "ghost" or wire frame look of the new location is overlaid on top of the existing color scene, so both scenes may be seen simultaneously, synchronously, asynchronously, or sequentially, but with enough of a different look that the user can tell the difference between the existing stationary scene and the moving, controllable previewed scene. Once the user "squeezes" the virtual device (or for a real device pulls a trigger or holds the device upright), the scene immediately transitions from the previous screen to the new location.

This same control may be performed with no devices being represented (using just hand or body motions), with a virtual controller being controlled by hand, body (eyes, etc.), or by motions of one or more real devices. Using two hands, a hand and a real or virtual device, or two real or virtual devices, more controls may be provided. With two points, a plane or zone, or two or more planes or zones, or two sets of 3-axis planes or zones, may be moved, controlled, and represented at once. Using the gaze of face, head or eyes could provide yet another set of planes and/or zones. Two hands may form two edges of a virtual plane. A plane may be represented by one hand, possibly centered in a palm area and rotates as the hand is rotates. Two hands may therefore represent two different planes, and an intersection of these planes may be changed based upon a relative distance between the two hands and/or a relative angle formed by the two hands. Instead of moving two hands, two stick controllers, two ball controllers, or any other virtual or real controller. These may then be used to represent one previewed scene with one hand and another with the other hand, creating an entirely new way to move from one location to another, or by combining previews associated with each hand, then instantly being "moved" to this new hybrid location with a selection event. One hand may represent a color or an intensity or other attribute effect that provide overlaid information to the other hand displayed attributes. One hand laid directly over the other may perform a mirrored effect between the two with a gradient of effects between the two. One hand may perform a zoom-in or zoom out function while the other performs location selection or movement. So one may preview where they want to go and scale the view. Of course this may be performed with one hand, but two may provide a better experience.

Another benefit to this approach is that the apparent "horizon" or stable "line of site" remains for the viewer while a "ghosted", foveated, or non-similar image is displayed simultaneously, synchronously, asynchronously, or sequentially, so the user can virtually move through space without the nausea effects of moving the actual scene. This also allows the user to see where they have been (the actual scene) and where they are going (the preview), simultaneously, synchronously, asynchronously, or sequentially. This same effect may be used to control a drone with an augmented reality set of glasses or device. On the glasses display, the image of the camera view of the drone (or any other device) may be displayed, so that the user sees what the camera is seeing. By virtually previewing the area (say by using a satellite image to create a virtual "world" around the drone), one may be able see through a virtual "eye", while simultaneously, synchronously, asynchronously, or sequentially seeing the real-world through a real camera "eye". Once the previewed area is selected, the device may then move to a new location with the camera view lining up with the previewed scene, or in whatever predetermined scaled amount desired. This may be done for any attribute such as viewing angle, sound, amplitude, orientation, color speed, or any combination of attributes. The same is true of head or eye tracking, or the ball example above. These are two different embodiments of the same principles.

Methods for Secondary Device for Object Control

In certain embodiments, the systems, apparatuses, and/or interfaces of this disclosure and methods implementing them include using one device, say a phone, to control a display of another device, such as a second phone, where a menuing and controls of this disclosure installed on one device permits control the other device(s) and/or their associated displays, attributes, or hardware or software. This methodology would allow one object to control one or more objects even if the objects use different operating systems, have different environments, and/or have different hardware. This ability for one device or object to control other devices or objects is another example of the use case of our predictive dynamic motion controllers.

Deliberate Movement Differentiated from Spontaneous or Non-Deliberate Movement In certain embodiments, the systems, apparatuses, and/or interfaces of this disclosure and the methods implementing them include sensing deliberate or intentional, generally predefined, movements, outputting the sensed movement as an output, and converting the output into a command and control function including, without limitation, a select function, an activate function, a scroll function, an attribute control function, and/or combination thereof. The deliberate or intentional movements may be associated with eye tracking or head tracking motion sensors or with any other motion sensor or deliberate or intentional movements associated with a specific body part or member under the control of an entity. The deliberate or intentional movements may be to move an eye or the eyes across a displayed selectable object, then to change a speed a predetermined amount so a desire function is invoked. For example, for the systems, apparatuses, and/or interfaces including a display and an eye-tracking sensor, when the user looks across a particular object or a set of objects or stares at a particular object or set of objects, then a particular function may be invoked such as a select function, a select and activate function or a select, activate and adjust attribute value function, but if the user looks across a face of the object at a preset speed, then a particular function may be invokes such as a select and activate function. It should be recognized that in the case of eye movement, the deliberate or intentional movements including its movement properties must be discernibly distinct from normal eye movement. In certain embodiments, the systems, apparatuses, and/or interfaces sense motion from one or more motion sensors and monitor the movement until the movement meets one or more criterion sufficient to distinguish the movement from normal eye movement threshold criteria are satisfied. For example, the deliberate or intentional movement may be a slow but continuous movement, a pause at a corner and a look quickly towards another corner (diagonally), or some other change of rate of speed or acceleration that is distinguishable from normal eye movement.

Another example of deliberate or intentional movements may involve differentiating normal viewing behavior from viewing behavior that is deliberate. Users typically do not look directly at a middle of a displayed object, but rather look at the whole object or just below a center, i.e., the users focus is not on the center of the object. Thus, a deliberate movement may be just to stare at a center of an object or to stare at some other location in an object; provided, however, that the movement is sufficient for the systems, apparatuses, and/or interfaces to distinguish the movement from normal eye movement. A person may look at an object, and when it is determined by a sensor that an object is generally being looked at, a center or centroid of the object may be displayed differently (or just be active without appearing differently), such as a square or circle showing the centroid area so that the systems, apparatuses, and/or interfaces may use the motion sensor output associated with looking into the area or volume or moving through this area or volume and converting the output into a command and control function. Of course, the triggering area or volume may not be the center, but may be another location within the object. Therefore, looking at or towards an object may cause the systems, apparatuses, and/or interfaces to pre-select the object, but only when the user moves the gaze into the active area/volume (generally predefined) does the systems, apparatuses, and/or interfaces invoke a particular command and control function. Alternatively, the deliberate movements may involve moving across a predefined area, where speed of the motion does not matter, only that a traversal to a certain threshold is reached. Additionally, other movement properties (e.g., speed, velocity, and/or acceleration or changes of these) may be used as part of the predefined movement to invoke a particular function or functions. This same technique may be applied to users that have certain type of maladies that prevent them from smooth movement, the systems, apparatuses, and/or interfaces may be tailored to determine difference(s) between normal user movement and deliberate user movement even though the difference(s) may be subtle.

Constructs with Continuous Properties

In certain embodiments, the systems, apparatuses, and/or interfaces of this disclosure and the methods implementing them may utilize constructs having continuous properties (e.g., continuous values analog instead of discrete values digital). In such environments (all objects are waveforms that are capable of interacting), the movement may navigate through the continuous properties with a change in movement or a deliberate movement may result in the selection of a particular value of a continuous property or a set of continuous properties. Thus, waveform and waveform interactions may be manipulated, adjusted, altered, etc. and viewed. Additionally, given interaction patterns may cause the systems, apparatuses, and/or interfaces to invoke a particular function or set of functions. Attribute may be a subset or other attribute of an object, but may also be associated with a change in a waveform, that is different from scrolling, in that scrolling must have integer values (or stops along a path). It like a guitar, where scrolling would be moving through frets, but sliding the string sideways (bending) the string produces frequency changes with no preset integer values, where systems, apparatuses, and/or interfaces may use both outputs to invoke a different function or set of functions, which may be predefined or determined from context on the fly.

Real-Time Prediction of User Intent

People move typically in a straighter line, and faster when they know what they want or are choosing something. In certain embodiments, the systems, apparatuses, and/or interfaces may be used to predict to a certain probability, what a particular user choice may be based on how fast and/or straight the user moves towards a particular selectable object. In some cases, such as movement of the thumb, where the movement comprises rotating about a thumb joint, the motion may be arcuate, and moving in a non-arcuate manner may be seen as more intentional, thus providing a higher probability. Other things that may affect the confidence of making a selection (or the probability), include proximity (closer to one object than another), time spent in different zones or in proximity to objects, changes in directions, slowing down as approaching a particular object (changes in direction, distance, duration, speed, velocity, acceleration, etc.) such as decelerating when moving towards a particular letter on a keyboard, then moving away at an increased acceleration (after choosing a letter on a keyboard and moving to the next) and rates of these changes.

The systems, apparatuses and/or interfaces may improve real-time confidence determinations by using artificial intelligence (AI) routines (including algorithms, parameters and elements). The AI routines may improve confidence determinations based on confidence data including all trainee performance data, trainee specific type performance data, historical performance data, environmental data that affects trainee or trainer performance, or contextual data that affects trainee or trainer performance. These data are stored in libraries and/or databases may be used to update or modify the routine, routine components, task, and/or task components or may be coupled with the above movement properties to enhance predictive confidence determinations and to update or modify the routine, routine components, task, and/or task components. The AI may also be used to forensically, or in real time, identify parameters, events or data. The AI routines may be based on any AI methodology including, without limitation, neural networks AI routines, gradient-based learning AI routines, deep Boltzman machine learning AI routines, large-scale unsupervised learning AI routines, deep convolutional activation feature for generic visual recognition AI routines, convolution neural network AI routines, recurrent neural network AI routines, back-propagation neural network AI routines, stochastic gradient descent AI routines, learning rate annealing or adaptive learning rates AI routines, dropout AI routines, maximum pooling AI routines, batch normalization AI routines, long short-term memory AI routines, skip-gram AI routines, continuous bag of words AI routines, transfer learning AI routines, fuzzy logic AI routines, expert AI routines, perceptron AI routines, decision management AI routines, Naive Bayes AI routines, support vector machine AI routines, linear regression AI routines, logistic regression AI routines, K-nearest-neighbor AI routines, K-means AI routines, decision tree AI routines, random forest AI routines, CART AI routines, a priori machine learning algorithm based AI routines, principal component analysis AI routines, CatBoost AI routines, Iterative Dichotomiser 3 AI routines, hierarchical clustering AI routines, back-propagation AI routines, AdaBoost AI routines, deep learning AI routines, gradient boosting algorithm AI routines, Hopfield network AI routines, C4.5 AI routines, any other AI routine, any waveform analysis and use routine, or any combination of AI routines.

Self-Centering User Interface (SCUI)

In certain embodiments, the systems, apparatuses, and/or interfaces of this disclosure and the methods implementing them relate to novel self-centering interface (SCUI) for controlling objects (software, hardware, attributes, waveforms or any other selectable, scrollable, activatable, scrollable or otherwise controllable thing) such as controlling drones through head motions using head motion sensors. For example, picture a compass rose with a hole in its middle and divided into 4 quarters: NE, NW, SW, and SE. As the user moves leftward in the SW quadrant, the systems, apparatuses, and/or interfaces may cause the drone to move to the left and a distance of the movement to the left controls the speed of the drone's movement to the left. Thus, the further the user moves to the left within the SW quadrant the faster the drone moves to the left. Similarly, as the user moves rightward in the SE quadrant, the systems, apparatuses, and/or interfaces may cause the drone to move to the right and a distance of the movement to the right controls the speed of the drone's movement to the right. Thus, the further the user moves to the right within the SE quadrant the faster the drone moves to the right. In this way, the user may use a pair of glasses (such as AR/VR/MR glasses, etc.) and see the drone, and move the drone while using a semi-transparent UI design, when using an intentional speed of head movement, i.e., deliberate head movement. So, by moving quickly, the UI may not cause the drone to move as the systems, apparatuses, and/or interfaces may determine that such movement does not represent a deliberate movement sufficient for drone control. Thus, if the movement is determined by the systems, apparatuses, and/or interfaces to be a deliberate movement, then the UI may cause the drone to undergo are corresponding movement. By moving in a specific deliberate manner, a menu may be activated, the view centered along the focus or gaze direction (self-centering) and the menu objects or elements arranged in a spaced apart configuration (e.g., concentrically) about a center of the user head or eye position, i.e., arranged about the gaze point. In this donut compass rose example, when the gaze is in the center, or donut hole area, the systems, apparatuses, and/or interfaces cause the drone to transition into a stationary state, which may be a hover state or a state of constant motion-based on the last set of head/eye movements. The systems, apparatuses, and/or interfaces may discriminate between a hover state and a constant motion state based on the duration of the gaze (duration of a timed hold), on where in the center area the gaze is fixed. Moving left and right (x-axis) moves the drone left and right. Moving up and down (y axis) moves the drone up and down. Moving in a combination of x and y movement, moves the drone similarly. Additionally, other movements within different quadrants such as the movement within NW or NE quadrants may control rotation of the drone on its axis, left or right, respectively, or may control pitch, yaw, roll, or other motions.

In other embodiments, the systems, apparatuses, and/or interfaces of this disclosure and the methods implementing them relate to novel user interfaces comprising three different control object formats: screen locked, world locked absolute, and world lock relative. Screen locked means that an object, a plurality of objects, an attribute, and/or a plurality of attributes remain in the user field of view at all times regardless of where in the "world" the user view is. World locked absolute means that an object, a plurality of objects, an attribute, and/or a plurality of attributes may become associated with or transitioned to a specific world view object or a specific world view location remain fixed to that object or location and do not move. Therefore, if the user movement moves that view so that the object or location moves outside of the current view, then the control objects and/or attributes associated with the object or location will be no longer visible. World locked relative means that an object, a plurality of objects, an attribute, and/or a plurality of attributes may be associated with or transitioned to the world view, but the object, the objects, the attribute, and/or the attributes may follow the user gaze, but lag behind so that they may not be accessible until the movement stops or stops for a specific period of time. For drone controls, certain drone controls may be screen located, while other drone controls may be world locked absolute, while other may be world locked relative. For example, a target and/or target attributes may be world locked absolute, a drone position controls for moving the drone along a path to the target may be world locked relative, and camera controls or weapon controls may be screen locked. Of course, the user may change the objects and attributes that are screen locked, world locked absolute, or world locked relative.

Putting these concepts together, sensing a deliberate movement causes the systems, apparatuses, and/or interfaces to activate the UI or to begin user interaction with the UI and causes an image of the drone to appear in the world view. The UI comprises three locked formats. Then, sensing movement to the left within the SW quadrant, the systems, apparatuses, and/or interfaces causes the drone to move left, where the speed of drone movement to the left is controlled by the distance the sensed movement of the user to the left within the SW quadrant. As the drone moves, the screen locked object, objects, attribute, and/or attributes move with the users; the world locked absolute object, objects, attribute, and/or attributes remain fixed to an object in the world or a location in the world; and the world locked relative object, objects, attribute, and/or attributes track the movement of the drone. The tracking may appear as it the object, objects, attribute, and/or attributes are screen locked—they move in direct correlation to the drone, or they are move at a slower rate or they move so that only after user movement stop that they move back into the user view. Optionally, the world locked relative object, objects, attribute, and/or attributes may move in front of the drone so that the has a preview of the drone's course and may adjust it accordingly. When the user head or eye movement stops at a gaze point (user gaze at a fixed location in the world view), then the drone movement will either stop or the drone continues to move in accord with the movement at the time the user movement stops, where a type of gaze—duration, gaze center, etc., determines whether the gaze cause the drone to hover in place or continue to move in accord with the last movement properties. In certain embodiment, once a fixed gaze is detected, then the world locked relative object, objects, attribute, and/or attributes, which have been following the user movement, catches up to the gaze point, and become centered about the gaze point. Because the UI is controlling the drone, the drone now centers itself in alignment with the UI, which is centered around the gaze point. In other embodiments, the UI lags slightly behind the gaze point, and the drone lags slightly behind the UI.

This same UI may also be used to control z-axis motions by either using 3D sensor data (from head motion sensor or other motion sensors), or by using a unique 2D construct that provides 3D controls. An example of this is the same compass rose (or circular/radial UI menu/controller) with a donut hole, but now adding a designated z-axis area as described herein. In one embodiment, the UI is in the shape of a funnel as set forth herein, providing a slim, pure z-axis control wedge zone centered within the z-control wedge. Moving towards or away from the center of this z-zone moves the drone along the z-axis. The UI is divided into two parts, with a dead zone. The center area provides 3D x/y/z axis controls, while the outer part of the funnel is 2D and provides only x/y control (as described above). In the 3D area, if the user moves out of the Z-zone, but remains in the inner section, then the motion represents a combination of x, y, and z. If the user moves into the outer zone, only x/y controls are provided.

Systems, Methods and Interfaces Including at Least Two User Feedback Devices

More particularly, embodiments of this disclosure relate to systems, apparatuses, and/or interfaces and methods for implementing them on or in a computer, where the systems, apparatuses, and/or interfaces and methods of interacting with 3D or n-dimensional (nD) environments using at least two user interface devices, where the systems, apparatuses, and/or interfaces include at least one motion sensor, at least one processing unit, and at least two user feedback unit for controlling, interacting, and manipulating motion in 2D, 3D, and/or nD environments.

Analytics Using the Same Motions that Control Things

In certain embodiments, the systems, apparatuses, and/or interfaces may use historical data to predict user intent and cause actions (such as selections) to happen faster without have to move to an object. Thus, by analyzing past user behavior and movement characteristics, the systems, apparatuses, and/or interfaces may be able to more quickly, which object aligned with a particular movement is more likely the target. The same vectors that change with speed and direction (and these changes provide controls) also tell us many things about the user. For instance, scrolling back and forth (say x-axis movement) between two out of five items, then moving towards a particular object (say y axis movement), selects and activates that object. But knowing the other objects lets the systems, apparatuses, and/or interfaces classify alternate choices, that may be ranked based on historical data. The use of analytics may find particular application in advertising or training methods using the motion-based systems, apparatuses, and/or interfaces of this disclosure.

In other embodiments, systems, apparatuses, and/or interfaces may use these predictive methodologies that cause objects to move towards the user or a selection object to predict zones for foveated rendering. In VR or other mixed reality environments, graphics rendering is extremely time consuming. To compensate for this, graphics rendering at the highest resolution is generally restricted to an area or areas associated with a center of vision. By restricting the high resolution rendering to these areas provides the user with a good experience. Thus, the high resolution graphics rendering doesn't need to be performed on zones, areas, or volumes not being looked at. In this way, prediction of where the user will be looking may assist in foveated rendering, so that part of the display may be rendering the predicted zones, so the user sees no apparent delay in rendering.

In other embodiments, the systems, apparatuses, and/or interfaces of this disclosure and the methods implementing them, where the systems, apparatuses, and/or interfaces include at least one eye and/or head tracking sensor, at least one processing unit, and at least one user feedback unit. The systems, apparatuses, and/or interfaces permit two different pinning modes. The first pinning mode is that the tracking sensor includes information about objects displayed in a tracking based manner viewable at a left and right edge of the viewing plane. These objects may be selected by moving the head and/or eyes toward the tracking pinned objects causing them to appear in the center of the field so that they can be controlled by further head and/or eye movement. As the user views a real-world object in a real-world environment, an object in a AR environment or an object in a VR environment, the user may transition the selection format from a tracking pinned format to a world pinned format. In the tracking pinned format, the selection and control function for the object under the control of the systems, apparatuses, and/or interfaces remain with the tracking sensor and may be accessed at any time, but once the user sees an object pauses at the object or moves in a predetermined manner toward that object, the systems, apparatuses, and/or interfaces pins the object control functions to the object. The pinning may be permanent or relative. Permanent pinning ties the control functions to the object so that you may return to the object to be able to control its attributes. Relative pinning means that the object control function travels with the world view either directly or with a lag as it follows the eye and/or head movement.

Systems, Apparatuses, and/or Interfaces and Methods Using Blob Data

The inventor has found that movement based systems, apparatuses, and/or interfaces and methods implement them, where the systems, apparatuses, and/or interfaces include at least one sensor, at least one processing unit, at least one user cognizable feedback unit, and one real and one real or virtual object or a plurality of real and/or virtual objects controllable by the at least one processing unit, where the at least one sensor senses blob data associated with touch and/or movement on or within an active zone of the at least one sensor and generates an output and/or a plurality of outputs representing the blob data, and where the at least one processing unit converts that blob data outputs into a function or plurality of functions for controlling the real and/or virtual object and/or objects.

In certain embodiments, the systems, apparatuses, and/or interfaces of this disclosure and methods implementing them include using blob data as a source of movement data for analyzing, determining, and predicting movement and movement properties, where movement is understood to mean sensing movement meeting a threshold measure of motion by a motion sensor, a plurality of motion sensors or an array of motion sensor for use in motion-based object control, manipulation, activation and/or adjustment. Blob data comprises raw motion sensor data representing sensor elements that have been activated by presence and/or movement within an active area, volume or zone of the proximity and/or motion sensor(s). In the case of a touch screen including a large plurality of touch elements, touching the screen produces raw output data corresponding to all touch elements activated by the area of contact with the screen and comprise the blob data for touch screen or other pressure sensors or field density sensor or sensor including activatable pixels or any other sensor that include elements that are activated when a threshold value associated with the element is exceeded (pressure, intensity, color, field strength, weight, etc.). The term "activate" as it relates to touch elements means that touch elements within the contact area produce touch element outputs above a threshold level set either by the manufacturer or set by the user. For other types of sensors, movement within an active sensing zone of the sensors (e.g., areas for 2D devices, volumes for 3D devices) will activate an area and/or a volume within the zone. These areas and volumes represent the "blob" data for each type of device and comprise elements having a value exceeding some threshold value for activating the elements. For image based sensors, the activate elements will generally comprise pixels having a threshold value of pixel values. For capacitive sensors or inductive sensors or electromagnetic field (EMF) sensors, the blob data will relate to areas or volumes corresponding to sensor elements that meet a threshold output for the sensors.

The blob data (activate element area or volume) will change with changes in contact, pressure, and/or movement of any kind. The blob data represents an additional type of data to control, manipulate, analyze, determine, and predict movement and movement properties. The blob data may be used to identify a particular finger, to differentiate between different fingers, to determine finger orientations, to determine differences in pressure distributions, to determine tilt orientations, and/or to determine any other type of change in the blob data.

In the biokinetic applications, the blob data with or without the addition of filtered data (center of contact, center of pressure, or other types of centroid data) may be used to create a proportionate and/or unique user identifier. Not only may blob and centroid data be biometric identifiers, but the relationship between the two is a more unique biometric, or electro-biometric identifier. The systems, apparatuses, and/or interfaces of this disclosure may also include sensing, determining, and analyzing the blob data and determining and analyzing filtered data or centroid data for use in analyzing, determining, and predicting movement and movement properties for use in motion-based object control, manipulation, activation and/or adjustment of this disclosure. For example, a user places a thumb on a phone touch screen. In doing so, the blob data may be used to identify which thumb is being used or to confirm that the thumb belongs to a particular user. If the touch screen also may include temperature sensors, then the blob data may not only be used to differentiate and identify particular thumbs (or fingers, irises, retinas, palms, etc.) alone or in conjunction with other movement data based on a shape of the blob data or output signal and a direction to which the blob data or blob data and centroid data may be pointing or oriented. This technique may be used to directly turn a knob using a pivoting movement versus using movement of a centroid, where the thumb is represented as a point and movement of the centroid from one point to another is used to determine direction. Using blob data allows the user to select zones, control attributes, and/or select, scroll, activate, and/or any combination of these, the systems and methods of this disclosure simply by pivoting the thumb. Then moving the thumb in a direction may be used to activate different commands, where the blob data movements may be used to accentuate, to confirm, to enhance, and/or to leverage centroid data. For examples, pivoting the thumb while in contact with the touch screen results in blob data that may be used to determine finger orientation and/or tilt, allowing the user to select between groups or fields of objects (for example), or through pages of data or objects. Once the user scrolls and selects a particular group or field, further movement results in a different set of set of controls, instructions, commands, attributes, etc. The systems and methods may use the blob data to "see" or anticipate movement attributes (direction, pressure distribution, temperature distribution, speed (linear and angular), velocity (linear and angular), acceleration (linear and angular), etc. The systems and methods may use the blob data, the centroid data or a combination of the two types of data to analyze, determine and/or predict or anticipate user movement. The transition from blob data to centroid data may also be used to see or anticipate user intent. For example, as a user twists or pivots the thumb, then begins to move towards an object, zone or location, the thumb may begin to roll in a lifting motion, rolling up towards the tip of the thumb, providing less of a pattern and more of a typical centroid touch pattern on the screen. This transition may also provide user intent through not only movement in an x/y plane, but also providing shape distinctions that may be used for commands and other functions. The rocking of the thumb or finger (rocking from a flat orientation to a tip orientation) may also provide z-axis attributes or functions. This may also be combined with movement while rocking. In 3D environments, the blob and/or centroid data (along with other movement attributes such as direction, pressure distribution, temperatures distribution, etc.) may be used, but instead of blob data, pixilation in 3D in any environment, or volumetric differences (sensed in any way) along axes (plural) may be used in the same way as blob and/or centroid data to analyze, determine, anticipate, and/or predict user intent. These aspects may also be seen or used as a "field" of influence determinative. In these embodiments, temperature may be used for a number of different purposes. First, the temperature data may be used to ensure that the motion sensor is detecting a living person. Second, the temperature data may be used as data to ensure that the user sensed within the active zones of the sensor or sensors is indeed the user that has access to the systems and methods on the particular device. Of course, temperature data is not the only data that the sensors may determine. The sensors may also capture other user specific data.

In certain embodiments, the systems and methods of this disclosure include controlling a hologram remotely or by interacting with it. Pivoting the hand in parallel with a field may provide one control, while changing an angle of the hand may be perceived as a "blob" data change, a transition to centroid data, or a combination thereof. This transition may also be represented on a display as going from a blob to a point, and the transition may be shown as a line or vector with or without gradient attributes. Putting these into the hologram example, changing from blob data to centroid data, and seeing a vector and a gradient of change of volume or area along the vector may be used to change the display in the hologram of a shoe (for example) so the shoe may change size and direction according to the movement of the user. This methodology may be performed in any conceivable predetermined or dynamically controllable way, where attributes may be any single or combination of intent, attribute, selection, object, command, or design. These movements and/or movement attributes may be simultaneously or sequentially used in any environment, and in whole or part, and include gradients of attributes based on changes of perceived mass, pressures, temperature, volume, area, and/or influence. These changes may be sensed and defined by any sensor or software reproduction ability (software may be used to replicate movement or the effects of movement). This also allows for a 2D sensor to provide 3D controls. All this may also be used to determine unique BioKinetic identifiers as well and in combination with these attributes.

In certain embodiments, the systems and methods of this disclosure include using blob data to orient a menu appropriately, where the blob data comprises raw sensor output data based on a number of sensing elements being activated above the threshold activation. For example, in the case of a touch screen, when a user touches the screen with a fingertip or other part of a finger, the sensor generates a blob of data comprising all sensing elements activated (based on some threshold activation value). The data is generally used to determine a centroid of the contact and that value is then used in further processing. However, the blob data may be used not only to differentiate different users, but may also be used to predict or anticipate user movement and ascertain movement and changes in movement. By knowing which thumb or finger is located at what area of the screen, the displayed menu upon a touch or entry into a sensor area may be positioned to provide a best heuristic or positioning based on the touch area and or user movement. For instance, touching the right thumb on a right side of a phone screen in a lower quadrant may signal the systems or methods to display a menu along a radius just above the thumb, while an angle of the thumb when touching a middle of the screen may result in displaying a radial menu just below the thumb if the thumb was pointing upwards towards an opposite corner, or above the thumb if the thumb was pointing towards a bottom left corner.

In certain embodiments, the systems and methods of this disclosure include one menu appearing when touching an upper part of the screen and a different menu appearing when touching a different part of the screen such as a lower part of the screen. If the finger is flat and not angled when touching the screen, different menus may be activated. So the position of the finger, finger angle, finger direction, finger pressures distribution, and/or combinations thereof may result in different menu sets, object sets, attribute sets, command sets, etc., and/or mixtures of combinations thereof for further processing based on movement data. Of course, all of these concepts may be equally applied to 2D, 3D, 4D, or other multi-dimensional environments both real, augments and/or virtual.

Systems and Methods Using Bread Crumb Procedures

In certain embodiments, the systems and methods of this disclosure include using "bread crumbs" or "habits" to determine direction of movement in an active zone or field of a sensor, of a plurality of sensors, and/or of a sensor array. When a user moves towards a desired location on a screen of a phone, especially across the screen to make a touch event, the sensor(s) will begin to "see" data associated with the user's movement, but not necessarily in a continuous manner. Instead, the sensor(s) will see a series of points, with increasing frequency, intensity, and/or coverage area, and will begin to be sensed as the user movement comes closer to "contact" with a desired screen location. This data may be used to determine speed and direction, which in turn may be used to predict or anticipate user intent, which objects or attributes are active for choosing attributes rather than objects first is another application that you have filed. This provides a verification aspect so the objects and/or attributes may be selected before a physical confirmation occurs (a touch event), or to cause objects and/or attributes to begin to respond (with color changes, sounds, tactile feedback, shape, animations, etc.) before a confirmatory touch or action occurs. In this way, movement and then a touch may represent a unique signature or identifier as well. It should be recognized that the bread crumbs or habits may be positive attributes and/or reactions or negative attributes and/or reactions.

In certain embodiments, the systems, apparatuses, interfaces, and/or methods of this disclosure include a user performing a movement or gesture then verbally identifying or confirming what attribute, command, or function to associate with the movement or gesture. This may be simultaneously or sequentially performed. Again, in the context of this disclosure, simultaneous means events that occur concurrently or event that occur in rapid succession within in a "short" time frame (e.g., a short time frame is between about 1 as and about 1 s), while sequentially means that the actions occur sequentially over a "long" time frame (e.g., a long time frame is between about 1 s and about 10 s). For example, a user moving in an upward direction, while saying "volume up" results in controlling and increasing a volume of a sound. A user may instead say "base" or "base up", and a base intensity increases instead of the volume.

In certain embodiments, the above describe aspect may be used as a security identifier, where a movement and a voice command may be used to unlock a locked menu, object, and/or attribute or act as a unique identifier for activating a menu, object, and/or attribute. By moving with a right finger or thumb from left to right, and saying "open", a locked phone may be unlocked, or any other command or function may occur. Both aspects may provide for biometric identification as well. Another example is facial recognition plus a specific gesture or dynamic motion event. These changes may be sequential changes collected over a long time frame and/or simultaneous changes collected over a short time frame allowing further refinement of user identification, verification and/or authentication. This may also include multiple touches or sensed points, multiple words or commands, or any combination of these. Instead of words, sounds, notes, or any audible or other kind of wave form may be used. Touching a zone or location on a screen, while saying a desired attribute, command, or any other desired choice is another way this may be used. Another benefit of this is the ability to quickly associate commands or attributes (scrolls, selections, actuations, or attributes), training a system or interface in an easy way. In this way, controls can easily be customized to the user preferences.

Another example of this methodology is to use an area of a touch on the screen. By touching the upper right quadrant of the screen (or moving in that direction) and saying "travel", the system may be trained or programmed so that this touch may display a travel menu of objects or other attributes. By touching or moving in (or towards) the bottom right quadrant and saying "food", a menu of restaurants may be displayed. From that point on, touching or moving towards the associated location or area may provide a different menu, selection or attribute than moving towards or touching a different area. In another example, saying "lights" may invoke a display of controllable lights on a mobile device or in a virtual or augmented environment. By aligning a finger or gaze with the "lights" object, the user may say "hallway" and the hallway light would move under the user's finger or gaze, just as if it had been selected by moving towards it (as described in other applications). A color wheel may be displayed and the user move into the color wheel to select a color, or the user may say "warm" and a sliding scale of yellow-based colors would move or appear under the user's finger, which the user could then move to select the desired hue. By having a motion-based architecture already established, any motion may be replaced by a voice command, and any voice command may be replaced by a motion, or a combination of the two. As the User moves towards the bedroom light icon and says "warm", the sliding scale would show under the user's finger (or gaze) and immediate attribute control would be possible. This is also true in 3D environments such as an augmented or virtual reality environment, where gestures or movement may be associated with controls, selections, menu items or attributes by performing the desired gesture or motion and saying (simultaneously or sequentially) what the associated attribute and/or selection is. This may be performed in virtual space or on real displays, so that areas or volumes or locations in 2D and 3D space may operate in the same way.

In certain embodiments, the, apparatuses, interfaces, and/or methods of this disclosure include locating an object at a point where it may have been before, or a 3D camera in a structure so it is the optimal distance from walls or other objects in a space. One way of doing this is to take a phone (or any device with sensors) and touch a wall or come close enough to be considered a threshold event (for example) with the phone and a trigger of some kind (touching a control object on the phone or saying "start" or other kind of triggering command, and begin to walk towards a perceived location in the middle of a room. The phone displays a visual "chord" or vector from where the wall was touched to your location. This may be done by using the compass, magnetometer, gyroscope, accelerometer, or any other sensor of the phone and the steps as measure by other sensors of the phone (such as changes in the accelerometer data of the phone). Repeating this with each wall, or at least one or two points, and as the user moves, the intersection of these vectors can be determined and seen on a screen. By running spatial algorithms, the central part of the room can be determined. This can then be repeated later using different wall points to locate the center at a later point. By also using the distance from each wall or using corners or a wall at a specific height, accuracy is greatly enhanced. This ability to "drag" a set of vectors makes it easy for a user to move and locate the point they wish to recreate or find by using a display, processor, and sensor combination. A central point or center of area can be determined as well as a previous point. In this way, a camera may be set at the same point over time to get sequential pictures from the same location.

The zoom level may also be set by a hold or other event, such as a touch, a "bounce" or "jerk" movement or gesture (of any kind), or verbal command, or any combination of these in motion-based processing systems and methods described herein.

Zoom levels may be set by common parameters that are sensed, i.e., a distance from the face (most people will have a preferred distance to read, and this may be preset, or set at some point), and then holding the device at that point (within a range) triggers the capability.

Certain real content (real-world objects or images seen through a camera or sensed by other sensors in real time, sounds heard in real time by a microphone or other sensor), imaged content (web pages, images, videos, any other content shown on a device, or any kind of content not being seen as real content), virtual content (animated or extra image content that is associated with imaged or real content—i.e., when looking at a picture of a shirt either through the camera of a device, or while looking at an image of a shirt from a web site may trigger an animated 3D person wearing the shirt and walking on a sidewalk to provide further content to a user), or any data (commonly called metadata) associated with any content—any of these, or combination of these, may trigger a set point or to cause the systems to activate with a certain preset zoom and/or pan level.

Multi-User Combinational Controls

Embodiments of this disclosure also relate to systems and methods that include motion-based sensor subsystems that support a plurality of users interacting with the sensor subsystem so that the systems are methods change the attributes of the displayed object(s), attribute(s), and/or environment(s) by combining the user interactions resulting in a combinationally changed object(s), attribute(s), and/or environment(s). For example, if the display is a hologram or picture, the sensor subsystems will sense movement by each user as each user interacts with a motion-based processing subsystem of this disclosure. The systems and methods of this disclosure then combines the user interactions to change the picture or hologram to reflect a combination of the individual system interactions. For example, if the multiple users are interacting with a hologram and each select a color for the hologram, then the color actually displayed will constitute a color that is an addition of the colors selected by the users. If one user selected blue and another selects red, then the resulting color will be purple. The actual color may also be based on a "strength" of the selection or a "manner" of selection or a "timing of the selection. Thus, if the blue user is first to select, then the resulting color may be a bluer purple, while if the red user is first to select, then the resulting color may be a redder purple. If the blue user, make a more the blue selection immediately, while the red user took longer to select, then the resulting color may be a bluer purple. In virtual or augmented reality environments, interactions by multiple users within the environments may result in objects, features and/or attributes of the environments changing in a combinational manner based on a synthesis of the individual user interactions. For example, if the environment represents a game played by multiple users, then the systems and methods of this disclosure would change the objects, features, and/or attributes of the gaming environment based on a synthesis of the user interactions. Such combinational interactions may be used to alter the gaming environment as the game is being played in a manner wholly unexpected by the users. The same type of synthetic changes may be used in other type of systems including image processing, website design, data processing, financial processing, tread analyses, etc., where the system integrates all user interactions to display a combinational analysis of the processing results. In other embodiments, the systems and methods will capture sensor data relating to the size, proportions, other physical attributes of the users, objects, entities, etc. that are moving within the active zone or zones of the sensor or sensors or sensor array or sensor arrays.

Triggers

In certain embodiments, the systems, apparatuses, and/or interfaces of this disclosure and methods implementing them use a marker or an image/character recognition feature to trigger a menu or metadata that may then be used with menuing systems of this disclosure or any other menuing system. These markers or features are similar to a 2D or 3D barcode, emoticons, or any object or feature that may be recognized as a trigger. The trigger may be used to unlock certain locked menus or lists for special access. The triggers may also be used for tailoring triggers to cause the systems, apparatuses, and/or interfaces to invoke specific and pre-defined menus, objects, programs, devices, or other specific or pre-defined items under the control of the systems, apparatuses, and/or interfaces.

The inventors have found that motion-based eye and/or head tracking apparatuses, interfaces, systems, and methods for implementing them may be constructed, where the interface is associated with a mobile device, a lap top computer, or a stationary computer or desk top computer having at least one display device and at least one processing unit and include at least one eye tracking glasses, head tracking device, or other eye tracking or head tracking device (collectively eye tracking sensor), which may be a sensor associated with the mobile device, the lap top computer, or the stationary computer or desk top computer or may be a separate device in communication with the mobile device, the lap top computer, or the stationary computer or desk top computer.

In certain embodiments the interface operates as follows. The at least one eye tracking sensor senses eye motion or movement as the eye, eyes, or head traverse a plurality of selectable icons or objects displayed on the at least one display device. The at least one processing unit may be configured to receive an output signal(s) from the at least one eye tracking sensor as the eye, eyes, and/or head traverse the icons or objects. The at least one processing unit may also be configured to (1) immediately activate a particular icon or object, when the eye movement moves in, on, or at the particular icon or object; or (2) activate a particular icon or object, when the eye movement moves in, on or at the particular icon or object and stops for a microhold in, on, or at the particular icon or object. The at least one processing unit may also be configured to display a list of attribute icons or objects, if the particular object or icon has associated attributes. The at least one processing unit may also be configured to receive output signal(s) from the at least one eye tracking sensor relating to further eye movement towards a particular attribute icon and to activate the attribute icon. The particular attribute icon may be (1) an adjustable attribute so that further eye movement in one direction will increase the value of the attribute, while eye movement the opposite direction will decrease the value of the attribute, (2) the particular attribute icon may be associated with a sublist, where further eye movement towards as item in the sublist will activate the item, or (3) the particular attribute icon may be associated with values set for in a matrix format, where further eye movement in, on, or at a matric location will set the attribute value. In certain, embodiments, the at least one processing unit may also highlight a particular icon or object, when the eye movement moves in, on, or at the particular icon or object, where the highlighting may be enlargement or any other highlighting effect the will discriminate the particular icon or object from the other icons or displays. Additionally, the enlargement may cover non-selected icon or objects that are deactivated by the eye movement in, on, or at the particular icon or object.

In other embodiments the interface operates as follows. The at least one eye tracking sensor senses eye motion or movement as the eye, eyes, or head traverse a plurality of selectable icons or objects displayed on the at least one display device. The at least one processing unit may be configured to receive an output signal(s) from the at least one eye tracking senor as the eye, eyes, and/or head traverse the icons or objects. The at least one processing unit may also be configured to highlight a particular icon or object, when the eye movement moves in, on, or at the particular icon or object. The at least one processing unit may also be configured to (1) receive further eye movement in, on, or at a portion of the highlighted icon or object to confirm the selection of the particular icon or object; and (2) activate the particular icon or object after eye movement confirmation. Alternately, the at least one processing unit may also be configured to (1) receive further eye movement in, on, or at a area or portion of the highlighted icon or object to confirm selection; and (2) to immediately activate the particular icon or object. In another alternative, the at least one processing unit may also be configured to (1) receive further eye movement in, on, or at a portion of the highlighted icon or object and stop for a microhold to confirm selection; and (2) activate the particular icon or object after the microhold confirmation. The at least one processing unit is also configured to display a list of attribute icons or objects, if the particular object or icon has associated attributes. The at least one processing unit is also configured to receive output signal(s) from the at least one eye tracking sensor relating to further eye movement towards a particular attribute icon and to activate the attribute icon and a microhold in, on, or at the particular attribute icon. The particular attribute icon may be (1) an adjustable attribute so that further eye movement in one direction will increase the value of the attribute, while eye movement the opposite direction will decrease the value of the attribute, (2) the particular attribute icon may be associated with a sublist, where further eye movement towards as item in the sublist will activate the item, or (3) the particular attribute icon may be associated with values set for in a matrix format, where further eye movement in, on, or at a matric location will set the attribute value. In certain, embodiments, the at least one processing unit may also highlight a particular icon or object, when the eye movement moves in, on, or at the particular icon or object, where the highlighting may be enlargement or any other highlighting effect the will discriminate the particular icon or object from the other icons or displays. Additionally, the enlargement may cover non-selected icon or objects that are deactivated by the eye movement in, on, or at the particular icon or object.

In other embodiments the interface operates as follows. The at least one eye tracking sensor senses eye motion or movement as the eye, eyes, or head traverse a plurality of selectable icons or objects displayed on the at least one display device. The at least one processing unit may be configured to (1) receive an output signal(s) from the at least one eye tracking senor as the eye, eyes, and/or head traverse the icons or objects; (2) highlight a particular icon or object, when the eye movement moves in, on, or at the particular icon or object; (3) display a confirmation icon within the highlighted icon or object, (4) receive a microhold on the confirmation icon; and (5) activate the highlighted icon. The at least one processing unit is also configured to display a list of attribute icons or object, if the particular object or icon has associated attributes. The at least one processing unit is also configured to receive output signal(s) from the at least one eye tracking sensor relating to further eye movement towards a particular attribute icon and to activate the attribute icon and a microhold in, on, or at the particular attribute icon. The particular attribute icon may be (1) an adjustable attribute so that further eye movement in one direction will increase the value of the attribute, while eye movement the opposite direction will decrease the value of the attribute, (2) the particular attribute icon may be associated with a sublist, where further eye movement towards as item in the sublist will activate the item, or (3) the particular attribute icon may be associated with values set for in a matrix format, where further eye movement in, on, or at a matric location will set the attribute value. In certain, embodiments, the at least one processing unit may also highlight a particular icon or object, when the eye movement moves in, on, or at the particular icon or object, where the highlighting may be enlargement or any other highlighting effect the will discriminate the particular icon or object from the other icons or displays. Additionally, the enlargement may cover non-selected icon or objects that are deactivated by the eye movement in, on, or at the particular icon or object.

In other embodiments, the processing unit may be configured to highlight each icon or object as the eye movement passes onto, at, into an icon or object and activate the icon only if the eye movement includes a change in direction within the icon or object screen area, otherwise the icon or object is restored to its normal configuration.

It should be recognized that eye movement that continues beyond the highlight icon will result in the processing unit removing the highlighting and await further eye movement. It should also be recognized that the processing unit may be configured to only populate the display after a threshold movement event occurs or after a correct login event occurs, which may be a biokinetic identifier.

Another aspect of the interfaces of this disclosure is that the faster the selection object moves toward the pre-selected selectable object or the group of pre-selected selectable objects, the faster the pre-selected selectable object or the group of preselected selectable objects move toward the selection object or the faster the objects may move in a different direction, such as away or at angles to the user's motion.

Another aspect of the interfaces of this disclosure is that as the pre-selected selectable object or the group of pre-selected selectable objects move toward the selection object, the pre-selected selectable object or the group of pre-selected selectable objects or zone or active areas may also increase in size, change color, become highlighted, have other effects change, or mixtures or combinations thereof.

Another aspect of the interfaces of this disclosure is that each object that has at least one adjustable attribute may include an adjustable active area associated with each adjustable attribute associated with the objects that become displayed as the selectable object is augmented by the motion. Moreover, as the selectable object becomes more certain of selection, the adjustable active areas may increase in size as the selection object moves toward the selectable object or "gravity" pulls the selectable object toward the selection object. The active area permits selection to be made prior to any actual contact with the object, and allows selection to be made merely by moving in the direction of the desired object. The active area may be thought of as a halo effect surrounding the object activated by motion toward the object.

Another aspect of the interfaces of this disclosure is that as motion continues, the motion will start to discriminate between members of a group of pre-selected objects until the motion results in the selection of a single displayed (discernible) object or a group of displayed (discernible) objects. As the motion continues, the display will begin to discriminate between objects that are aligned with the motion and objects that are not, emphasizing the selectable objects aligned with the motion (i.e., objects in the direction of motion) and de-emphasizing the non-selectable objects not aligned with the motion (i.e., objects away from the direction of motion), where the emphasis may be any change in object(s) properties, changes in object(s) positions, or a combination thereof and the de-emphasis may be any change in the object(s) properties, changes in object(s) positions, or combination thereof.

Another aspect of the interfaces of this disclosure is the display, movement, and positioning of sublist members or attributes associated with object(s) may be simultaneous and synchronous or asynchronous with the movement and display of the selectable object(s) or display object(s) being influenced by the motion of the selection object(s). Once the selection object and a selectable display object touch or the selection object and a selectable display object active area touch or the selection object and a selectable display object is predicted with a threshold degree of certainty, a triggering threshold event (this may be the distance of proximity or probability without ever touching), the selectable object(s) is selected and non-selected display object are removed from the display or fade away or become less prominent or change in such a way that they are recognizable as the non-selected object(s) and the selected object is centered within the display or at a predetermined position, is adjusted to a desired amount if an adjustable attribute, or is executed if the selected object(s) is an attribute or selection command, or any combination of these. If the object is an executable object such as taking a photo, launching an application, changing a display orientation, scale, or aspect, adjusting the volume, turning on a device, etc., then the execution is simultaneous or acts in a predetermined way with selection. If the object has a submenu, sublist or list of attributes associated with the selected object, then the submenu members, sublist members or attributes may become displayed on the screen is a spaced apart or differentiated format either after selection or during the selection process, with their distribution becoming more defined as the selection becomes more and more certain. The same procedure used to select the selected object is then used to select a member of the submenu, sublist, or attribute list. This same effect may occur with a combination of executable, submenu, sublist, and listing attributes. Thus, the interfaces have a gravity or attractive or distortion or highlighting, or combination of these like action(s) on displayed selectable objects. As the selection object moves, it attracts an object or objects in alignment with the direction of the selection object's motion pulling those objects toward it, and may simultaneously repel other objects not aligned with the selection object's motion, causing them to move away or be identified as non-selected objects. The area, zone or volume of the objects may be simultaneously affected so as to magnify, reduce, or have other effect on the displayed or active area(s) associated with the object(s). As motion continues or a velocity or acceleration of the motion increase, the pull increases on the object(s) most aligned with the direction of motion, further accelerating the object toward the selection object until they touch, merge, or cause a triggering selection event, or a combination thereof. If two objects are along the same line or zone, and the closer of the two is attracted or selected as motion occurs toward the user, and motion continues in line, the first object may be treated like a non-wanted object and the second desired object is selected. If motion is stopped, stopped with a predetermined hold or dwell, or slowed to a predetermined threshold amount at the first object, it is considered selected. If motion continues at the first object, it is considered not selected. The touch, merge, or triggering event causes the processing unit to select and activate the object, active a sublist or menu, or active an attribute for control, or a combination thereof.

A combination or compound action of these events may occur as well, such as the eye gaze or eye motion acting as a selection object, and a secondary object of the pointing of a finger or touch on a surface acting as another, so the combination provides an enhanced or different effect than either one of the objects acting alone. One example in particular is where eye motion is used in a VR/AR environment to highlight or cause an effect on a zone of objects, such as expanding an area most associated with the direction or movement of the eye(s) and having objects least probable to diminish or move away from the zone being looked at or towards, or displaying a system of objects or menus associated with the objects (attributes), and a finger direction of motion, or a selection object, or an area or volume representing a selectable zone, further defines or selects the selectable objects, attributes or zones. Another example would be to touch a watch or wearable device to begin a selection or scrolling process, while tilting the watch further affects the selection, scrolling or attribute process, dynamically affecting the zones and/or objects as described above. Another example would be to move in one direction to adjust the brightness or volume of a wearable or mobile device with motion of a finger, on or a surface of the device, and having the display expand the audio zone signifying volume change, then synchronously or asynchronously changing the zonal size of the song choice by moving the device in a different direction or axis, or even in the same direction, but being able to differentiate the motion from the motion of the finger(s), and causing a different scroll, attribute or selection, or combination of these, to occur more easily based on the relevant zonal size of motion with what is most relevant to the first motion. In this example, using a hand or finger motion above the watch may change the volume, and rolling the wrist might advance or rewind the song based on direction of roll, while moving the wrist up or down may play or stop. While beginning to move in the second direction, the probability of changing the song increases as more motion is applied, and the attribute of adjusting volume diminishes until it is non-selectable while changing the song.

Methods

Embodiments of this disclosure provide methods for implementing the selection protocol using the user interfaces of this disclosure. The methods include selecting and activating selectable objects, selecting and activating members of a selectable list of virtual and/or real objects, selecting and activating selectable attributes associated with the objects, selecting and activating and adjusting selectable attributes, zones, areas, or combinations thereof, where the interfaces include at least one display or other user feedback unit, at least one motion sensor (or data received therefrom), and at least one processing unit in communication with the user feedback units and the motion sensors or motion sensor data. The interfaces also may include power supplies, battery backups, and communications software and hardware for remote control and/or remote monitoring. The methods include sensing motion or movement sensed by the motion sensor(s), generating an output signal and sending the output signal to the processing unit. The methods also include converting the output signal into a command output via the processing unit. The command output may be a start command, which activates the feedback unit or activates the feedback unit and generates at least one selection or cursor object or activates the feedback unit and generates at least one selectable object or activates the feedback unit and generates at least one selection or cursor object and at least one selectable object. The selection object may be discernible or not (displayed or not). The motion may be generated by an animal or body part or parts, a human or body part or parts, a machine, or a real-world object under control of an animal, a human, or a robot or robotic system, especially when the motion being sensed is within a 3D active sensing volume or zone. Once activated, the methods monitor sensed motion or movement within the active zone(s) of the motion sensor(s), which is used to move the selection object on or within the user feedback unit in accord with the motion properties (direction, velocity, acceleration, and changes of one or more of these properties) toward a selectable object or a group of selectable objects or a pre-selected object or a group of pre-selected objects, zones or areas. At the same time, the methods either move the non-selected objects away from the selection object(s), cause the non-selected object to fade, disappear or other change other properties of the non-selected objects, or combinations thereof. The pre-selected object or the group of pre-selected objects are the selectable object(s) that are most closely aligned with the direction of motion of the selection object.

Another aspect of the methods of this disclosure is that movement towards an executable area, such as a close/expand/maximize/minimize function area(s) or object(s) of a software window in an upper right corner may cause an executable function(s) to occur, such as causing the object(s) to expand or move apart so as to provide more space between them and to make it easier to select each individual object or a group of objects.

Another aspect of the methods of this disclosure include interfaces is that object selection or menu selection may be grouped together such that as movement is made towards a group of objects, the group of objects simultaneous rearrange themselves so as to make individual object selection or menu selection easier, including moving arcuately or to corners of a designated area so as to make discrimination of the desired selection easier.

Another aspect of the interface is that proximity to the selection object may cause the selectable objects, zones or areas most aligned with the properties of the sensed motion to expand, separate, or otherwise move in such a way so as to make object discrimination easier, which in turn may cause associated subobjects or submenus to be able to be selected by moving the subobjects or submenus towards the selection object. Additionally, they could be selected or activated by moving into an active area designated by distance, area or volume from or around such objects, thereby selecting the object functions, menus or subobjects or submenus. The movement or attribute change of the subobjects or submenus may occur synchronously or asynchronously with the movement of the primary object(s).

Another aspect of the interfaces is that the faster the selection object moves toward the pre-selected object or the group of preselected objects, the faster the pre-selected object or the group of preselected objects move toward the selection object(s), and/or the faster the unselected objects may move away from the selection object(s). Of course, any differentiation of direction may be used, where the unselected objects move towards the user and the preselected objects move away.

Another aspect of the interfaces is that as the pre-selected (meaning the objects that are most closely aligned with the properties of the motion) object or the group of pre-selected objects move toward the selection object, the pre-selected object or the group of pre-selected objects may either increase in size, change color, become highlighted, change some other effect, change some characteristic or attribute, or a combination thereof. These same, similar, or opposite changes may occur to the unselected objects or unselected group of objects. Another aspect is that, based upon a user's previous choices, habits, motions or predicted motions, the attributes of the objects may be changed such that they move faster, increase in size or zone, or change in such a way that the object with the highest percentage of user intent is the easiest and most likely to be selected as shown in FIGS. 4A-D and described in the associated text below.

Another aspect of the interfaces is that as motion continues, the motion will start to discriminate between members of the group of pre-selected object until the motion results in the selection of a single selectable or displayed object or a single group of selectable objects, or zone or group of zones, or any combination(s) of these. Once the selection object and a selectable object active area touch or the selection object and a selectable display object is predicted with a threshold degree of certainty, a triggering threshold event (this may be the distance of proximity or probability without ever touching), the selectable object is selected and non-selected object are removed from the display or fade away or become less prominent or change in such a way that they are recognizable as non-selected object(s). Once selected, the selected object may become centered within the display or at a predetermined position within the display. If the selected object has a single adjustable attribute, then motion may adjust the attribute a desired or pre-defined amount. If the selected object is executable, then the selected object is invoked. If the selected object is an attribute or selection command, then the attribute may be adjusted by additional motion or the selection may invoke a command function. Of course, the systems may do all or any combination of these processes. If the object is an executable object such as taking a photo, turning on a device, etc., then the execution is simultaneous or acts in a predetermined way with the selection. If the object is a submenu, sublist, or list of attributes associated with the selected object, then the submenu members, sublist members, or attributes are displayed on the screen in a spaced apart format or appear as the selection becomes more certain and then persist once selection is certain or confirmed, and may be displayed at one or more levels, and any or all synchronously, asynchronously, or simultaneously. The same procedure used to select the selected object is then used to select a member of the submenu, a member of the sublist, or a particular attribute. Thus, the interfaces have a gravity like action on displayed selectable objects that move them toward the selection objection as certainty increases. As the selection object moves, it attracts an object or objects in alignment or relation with the properties of the sensed motions (direction, speed, acceleration, or changes in any of these primary properties) of the selection object pulling the object(s) meeting this criterion toward the selection object. Simultaneously, synchronously or asynchronously, submenus or subobjects may become visible if they were not so to begin with and may also move or change in relation to the movement or changes of the selected objects. Simultaneously, synchronously, or asynchronously, the non-selected objects may move or change away from the selection object(s). As motion continues, the pull increases on the object most aligned with the properties (e.g., direction) of motion or movement, further moving or accelerating the object toward the selection object until they touch, merge, or reach a triggering event close enough to touch an active area or to predicted the selection to a threshold certainty. The touch, merge, or triggering event causes the processing unit to select and activate the object. The object(s) may also be defined as an area in between objects, giving a gate-like effect to provide selection of sub-menu or sub-objects that are aligned with the motion of the selection object and are located between, behind, or at the same angle but a different distance than this gate. Furthermore, a back object or area may be incorporated to undo or reverse effects or changes or motions that have occurred to objects, whether selectable or not.

Embodiments of this disclosure provide Embodiments of this disclosure relate to systems and methods implements on a processing unit or distributed network of processing units, where the systems include at least one processing unit, at least one motion sensor, at least one user interface, and dynamic environment software and methods include software steps to implement the software systems on the processing units, where the dynamic environment software produces dynamic environments for object and attribute display, manipulation, and/or interaction.

More particularly, this disclosure relate to systems and methods implements on a processing unit or distributed network of processing units, where the systems include at least one processing unit, at least one motion sensor or at least one sensor output, at least one user interface, and dynamic environment software and methods include software steps to implement the software systems on the processing units, where the dynamic environment software produces dynamic environments for object and attribute display, manipulation, and/or interaction, where the dynamic environment software produces dynamic environments for object and attribute display, manipulation, and/or interaction, where the dynamic environments are produced by the dynamic environment software and include a plurality of objects and associated attributes so that the objects and/or attributes are highlighted and/or differentiated one from the other, where the highlighting may evidence priority, directionality, content, type, activation procedures, activation parameters, control features, or other properties that are associated with the objects and/or attributes and motion sensed by the motion sensors in electronic communication with the processing units permit manipulation and/or interaction with the elements of the dynamic environments either causing the environment to change in response to the sensed motion or causing object and/or attribution selection and/or activation.

Control Constructs Viewable Through Eye Tracking Glasses

Embodiments of this disclosure broadly relate to methods including displaying, via a processing unit, a virtual reality (VR), augmented reality (AR), or a mixed reality (MR) environment including a plurality of objects, a plurality of scenes, and/or a plurality of attributes associated with the environment and/or objects or scenes on a display device in communication with processing unit. The methods also include viewing, via the processing unit, the environment through eye tracking glasses in communication with the processing unit and superimposing, in or on the environment via the processing unit, an interactive control construct including a plurality active control area. The methods also include displaying, via the processing unit, a selection object for visualizing eye movement from the glasses in the environment or in or on the control construct, sensing eye movement via the glasses and moving the selection object correspondingly, and if the movement is on or in a particular active control area of the construct, then converting the movement into a construct function associated with the particular active control area of the construct or if the movement is on or in the environment, then converting the movement into a selection and/or activation function of a particular object or a selection, activation, and/or attribute function of the environment.

In certain embodiments, the methods further include repeating the sensing and if steps, until an exit or stop command is selected. In other embodiments, the methods also include prior to the environment displaying step, sensing a first eye movement, wherein the first movement includes at least one property exceeding a threshold value. In other embodiments, the control areas comprise a fast forward movement area, a no movement area, a backward movement area, a pan left area, a pan right area, and a no pan area, wherein each area has a corresponding movement function or a corresponding panning function associated therewith. In other embodiments, the control areas comprise a plurality of bands, each of the bands having a plurality of regions. In other embodiments, the bands comprise a fast forward band, a slow forward band, a stop or no motion-band, a fast backward band, and a slow forward band, wherein each band has a corresponding movement function associated therewith, and the regions comprise a pan left region, a pan right region and a no pan region interposed therebetween, wherein each band has a corresponding panning function associated therewith. In certain embodiments, the methods further include sensing eye movement via the glasses and moving the selection object correspondingly, if the movement is on or in a particular band and a particular region of the particular band, then converting the movement into the corresponding movement function and panning function and moving through the environment accordingly or if the movement is on or in the environment, then converting the movement into a selection and/or activation function of a particular object or a selection, activation, and/or attribute function of the environment. In certain embodiments, the methods further include prior to the if steps, confirming the selection of the particular area of the construct, or confirming the selection of the object or attribute in the environment.

Embodiments of this disclosure broadly relate to apparatuses including a display device, an input device, eye tracking glasses, and a processor in communication with the display device, the glasses and the input device. The processor is configured to (a) display a virtual reality (VR), augmented reality (AR), or a mixed reality (MR) environment including a plurality of objects, a plurality of scenes, and/or a plurality of attributes associated with the environment, objects and/or scenes on the display device, (b) initiate the glasses to view the environment, (c) superimpose, in or on the environment, an interactive control construct including a plurality active control areas viewable through the glasses, (c) display a selection object for visualizing eye movement from the glasses in or on the environment or in or on the control construct, (d) sense eye movement via the glasses and moving the selection object correspondingly, and (e) if the movement is on or in a particular active control area of the construct, then converting the movement into a function associated with the particular active control area of the construct; or if the movement is on or in the environment, then converting the movement into a selection and/or activation function of a particular object or a selection, activation, and/or attribute adjustment function of a particular attribute of the particular object or of the environment.

In certain embodiments, the process is further configured to prior to the environment display, sense a first movement from the glasses or from the input device, wherein the first movement includes at least one movement property exceeding a threshold value. In other embodiments, the device comprises a mobile device including the display device, the input device, and the processing unit. In other embodiments, the device comprises a mobile device including the display device, the input device, and the processing unit. In other embodiments, the display device comprises a touchscreen and the input device is a motion sensor. In other embodiments, the mobile device comprises a cell phone, a wearable device, a tablet computer, or a laptop computer.

Eye Tracking Methods and Apparatuses for Controlling Icons

Embodiments of this disclosure broadly relate to methods including displaying, via a processing unit, a plurality of icon on a display device in communication with the processing unit. The methods also include sensing, via the processing unit, eye movement via eye tracking glasses in communication with the processing unit, where the movement is discernibly towards a particular icon and expanding, via the processing unit, the particular icon. The methods also include activating, via the processing unit, the particular icon once the movement enters the particular icon and displaying, via the processing unit, one or a plurality of attribute icons associated with the particular icon. The methods also include sensing, via the processing unit, further eye movement via the glasses discernibly towards a particular attribute icon, selecting and activating the particular attribute icon and if the particular attribute icon is adjustable, sensing further eye movement via the glasses to adjust the attribute value.

In certain embodiments, the methods further include repeating the steps. In other embodiments, the methods further include prior to the displaying icon step, sensing a first eye movement, wherein the first movement includes at least one property exceeding a threshold value. In other embodiments, the expanding step further includes displaying a confirmation icon within the expanded particular icon and the activating step comprises sensing eye movement via the glasses towards the confirmation icon and activating the particular icon when the movement stop for a microhold over the confirmation icon. In other embodiments, the activating step further includes a microhold over the particular icon. In other embodiments, the selecting and activating the particular attribute icon step further includes a microhold over the particular attribute icon. In other embodiments, the selecting and activating the particular attribute icon step further includes expanding the particular attribute icon and displaying a confirmation icon within an expanded particular icon and the activating step comprises sensing eye movement via the glasses towards the confirmation icon, selecting and activating the particular attribute icon, and if the particular attribute icon is adjustable, sensing further eye movement via the glasses to adjust the attribute value.

Embodiments of this disclosure broadly relate to apparatuses including a display device, an input device, eye tracking glasses, and a processor, in communication with the display device, the glasses and the input device. The processor is configured to (a) display a plurality of icon on a display device in communication with the processing unit, (b) sense eye movement via eye tracking glasses, where the movement is discernibly towards a particular icon, (c) expand the particular icon, (d) activate the particular icon once the movement enters the particular icon, (e) display one or a plurality of attribute icons associated with the particular icon, (f) sense further eye movement via the glasses discernibly towards a particular attribute icon, (g) select and activate the particular attribute icon, (h) if the particular attribute icon is adjustable, sense further eye movement via the glasses to adjust the attribute value.

In certain embodiments, the processor is further configured to repeat the display, sense, expand, activate, display, select and activate and attribute adjust. In other embodiments, the processor is further configured to prior to the display icons, sense a first eye movement, wherein the first movement includes at least one property exceeding a threshold value. In other embodiments, the expand further includes display of a confirmation icon within the expanded particular icon and the activate comprises sense eye movement via the glasses towards the confirmation icon and activate the particular icon when the movement stop for a microhold over the confirmation icon. In other embodiments, the activate further includes a microhold over the particular icon. In other embodiments, the select and activate the particular attribute icon step further includes a microhold over the particular attribute icon. In other embodiments, In other embodiments, the select and activate the particular attribute icon step further includes expand the particular attribute icon and display a confirmation icon within an expanded particular icon, and the activate comprises sense eye movement via the glasses towards the confirmation icon, select and activate the particular attribute icon, and if the particular attribute icon is adjustable, sense further eye movement via the glasses to adjust the attribute value.

Training Methods and Apparatuses Using Computer-Generated Constructs

Embodiments of this disclosure broadly relate to methods including (1) capturing, via a processing unit, trainee images or a trainee image sequence and trainer images and/or a trainer image sequence from at least one motion sensor corresponding to a specific task; (2) constructing, via the processing unit, constructs of the trainee images or the trainee image sequence and constructs of the trainer images or the trainer image sequence on an image by image basis and on a feature by feature basis; (3) scaling, via the processing unit, the trainee and/or trainer constructs on an image by image and on a feature by feature basis so that the constructs are spatially and temporally conformed; (4) comparing, via the processing unit, the scaled constructs on an image by image basis and on a feature by feature basis; (5) determining, via the processing unit, differences between the scaled constructs on an image by image basis and on a feature by feature basis; (6) overlaying, via the processing unit, the scaled trainee construct onto the scaled trainer construct on an image by image basis; and (7) displaying, via the processing unit, the overlaid constructs on an image by image basis on a display device in communication with the processing unit.

In certain embodiments, the methods further include (8) highlighting, via the processing unit, the differences on an image by image basis and on a feature by feature basis on the display device. In other embodiments, the methods further include (9) repeating the steps (1)-(7) until a stop function is invoked to stop the training exercise or the differences satisfy at least one completion criteria. In other embodiments, the at least one completion criteria comprises conformity or substantially conformity between the trainee scaled construct and the trainer scaled construct on an image by image basis or the at least one completion criteria comprise minimizing one, some or all of differences as evidenced by changes in the differences upon repeating the exercise being less than a minimal value, where the minimal value is less than or equal to 5%, less than or equal to 2.5%, less than or equal to 2%, or less than or equal to 1%. In other embodiments, the start and stop functions may be activated by motion-based processing, gesture-based processing or a hard select processing.

Embodiments of this disclosure broadly relate to apparatuses including a display device, an image capture device, an input device, an interface, and a processor. The interface is configured to capture trainee images or a trainee image sequence from the image capture device and trainer images or a trainer image sequence from the image capture device and receive input from the input device to invoke a start function or a stop function. The processor is configured to construct a trainee image by image construct and a trainer image by image construct; scale the trainee image by image construct and/or trainer image by image construct so that the constructs are conformed spatially and temporally; compare the scaled constructs on an image by image basis; determine differences between the scaled constructs on an image by image basis; overlay the scaled trainee construct onto the scaled trainer construct on an image by image basis; and display the overlaid constructs on an image by image basis.

In certain embodiments, the processor is further configured to highlight the differences on an image by image basis and a feature by feature basis. In other embodiments, the processor is further configured to repeat the construct, scale, compare, determine, overlay and display events until a stop function is invoked to stop the training exercise or the differences satisfy at least one completion criteria. In other embodiments, the at least one completion criteria comprises conformity or substantially conformity between the trainee scaled construct and the trainer scaled construct on an image by image basis or the at least one completion criteria comprise minimizing one, some or all of differences as evidenced by changes in the differences upon repeating the exercise being less than a minimal value, where the minimal value is less than or equal to 5%, less than or equal to 2.5%, less than or equal to 2%, or less than or equal to 1%. In other embodiments, the start and stop functions may be activated by motion-based processing, gesture-based processing or a hard select processing.

Information and Communications System

360IVX Training

Quantum Interface has created a hands-free AR and VR-based training, service, logistics and awareness tool to associate interactive content to any point is virtual or real space. It is based on our patented use of motion interactions, so content and controls can be added to any environment, augmented, interacted with, and analyzed in real time for the user confidence while interacting. It may be deployed across any hardware or software with the same User Interaction, providing a consistent Universal Interface every time, no matter what is used (Cardboard, PC, VR, AR, XR, touch, mobile, etc.). This enables existing mediums, such as 360 videos, to become entire training systems, digital libraries and curricula, and the same builds may be transferred to AR and touch environment. We make it easy to use, so a non-programmer can get immediate results through an easy to use interface. The embedded QI interaction technology provides the fastest, most natural experience with the highest cognition and retention available. Protected by US and international patents and patents pending.

There is a need for a new way to communicate information for training, logistics, servicing (like in, assessment and awareness (such as situational awareness). The needs may be separate or combined. The problem with current systems is they do not provide the deeper understanding necessary to know things comprehensively, and the content is not presented in a way that the brain has the maximum cognition and retention.

An example of this is with a training system. In trying to meet the need for students to learn a process as fast as possible, different formats are used. Text, audio, video, 360 video (VR), simulated training, hands-on, etc. are used. The students then combines all these different formats and associated information in their heads. What is missing is the ability to combine these different formats together so they can be seen, heard, and interacted with simultaneously, or in one location.

In a previous application, we have described "Hot spots" or interactive points where content may be added, and multiple layers of it, to any point in space (virtual or real).

An example is that one may take a document or image and attach videos, images, XR experiences, audio, hyperlinks, etc.

In an earlier application, we disclosed performing cloud services in the cloud where the interactions would occur on a device, but calculations for the processes and other aspects could be performed in the "Cloud"—a system of servers, CPUs and data storage groups that may be accessed via the web or other methods so content and processing may be accessed from any location with data communication abilities.

In certain embodiments, the virtual training systems, apparatuses, and/or interfaces and methods for implementing them, may include any, some, or all of the following devices and/or abilities set forth below.

Devices

In certain embodiment, the virtual training systems, apparatuses, and/or interfaces and methods for implementing them, include devices capable of interacting with a user such as motion sensing devices (e.g., cameras, accelerometer devices, joy sticks, ball controllers, mouses, touch screens, etc.), audible sensing devices (e.g., microphones, etc.), haptic devices, smell devices, body tracking devices (e.g., eye tracking devices, head tracking devices, VR goggle devices, VR body suit devices, glove devices, etc.), any other devices capable of generating output data derived from user activity, or any combination of these devices.

Interaction Points or Hot Spots

In certain embodiment, the virtual training systems, apparatuses, and/or interfaces and methods for implementing them, include the ability to attach or associate interaction points or hot spots to one or more places or locations within a VR, AR, MR, and/or XR environment, wherein the hot spots may be pre-defined and populated at places or locations according to a protocol implemented by the virtual training systems, apparatuses, and/or interfaces and methods for implementing them, at start up and/or during different training aspects or sessions. For example, if the training is for air craft, then the virtual training systems, apparatuses, and/or interfaces and methods for implementing them, may associated hot spots all equipment in the air craft, with various features, properties, and/or structures in the sky (clouds, winds, sheers, storms, other planes, targets, etc.) and/or ground (mountains, valleys, other features and/or properties, building and/or other man-made structures, flight control centers, highways, targets, etc.). For example, in the case of videos or other streaming media (time based), then the virtual training systems, apparatuses, and/or interfaces and methods for implementing them, may associated hot spots with any feature and/or property in the video or streaming media at any time during the video or media, wherein the hot spots may change with the nature of each scene in the video, and/or each training segment or session, and/or based on certain criteria that a user may activate while playing the video or media.

Single Input or Multiple Input Processing

In certain embodiment, the virtual training systems, apparatuses, and/or interfaces and methods for implementing them, include the ability to use various input data, independently or collectively, to control, manipulate, activate, adjust, alter, and/or modify any controllable feature, property, characteristic, and/or attribute of the environment, wherein the input data may come from one or more of the devices set forth above.

Tools to Create, Edit, and/or Augment Environmental Content

In certain embodiment, the virtual training systems, apparatuses, and/or interfaces and methods for implementing them, include the ability and/or tools to create, delete, edit, alter, modify, augment, etc. content, media, controls, hot spots, adjustable attributes, features, structures, properties, attributes, characteristics, etc. associated with the environment.

Content Uploading or Downloading

In certain embodiment, the virtual training systems, apparatuses, and/or interfaces and methods for implementing them, include the ability to upload and/or download content to the cloud and/or another remote storage location.

Cloud Based Computing

In certain embodiment, the virtual training systems, apparatuses, and/or interfaces and methods for implementing them, include the ability use the tools that activate or deactivate various input devices locally and/or input devices resident in the cloud and/or other remote storage location.

Input Data Types

In certain embodiment, the virtual training systems, apparatuses, and/or interfaces and methods for implementing them, include the ability to interact with the environment using body part input data (e.g., eyes, head, fingers, hand, etc.), using touch data, using touchless or motion data, audio data, using visual data, using audiovisual data, using controller data, using remote controller data, using robot or robotics data, and/or any other user input data.

Real-time Interaction Confidence, Cognition, And/or Retention

In certain embodiment, the virtual training systems, apparatuses, and/or interfaces and methods for implementing them, include the ability to measure real-time confidence, cognition, and/or retention through the interface provided on the devices or via the web.

Use of Analytics

In certain embodiment, the virtual training systems, apparatuses, and/or interfaces and methods for implementing them, include the ability to use analytics (AI, calculations, functions or other ways of providing metrics).

Use of Analytics for Determining Competencies Assessments

In certain embodiment, the virtual training systems, apparatuses, and/or interfaces and methods for implementing them, include the ability to take those metrics (real-time and/or cloud AI) and use by themselves or working together to provide metrics for user competencies, testing of any kind, and assessment of awareness and cognition, etc.

Generating Reports

In certain embodiment, the virtual training systems, apparatuses, and/or interfaces and methods for implementing them, include the ability to generate reports and/or other reporting measures.

Using Metrics to Recommend Characteristics of Training

In certain embodiment, the virtual training systems, apparatuses, and/or interfaces and methods for implementing them, include the ability to take the metrics and suggest to trainers or trainee subjects or characteristics that the trainee may need more training and suggest techniques that the trainee may use to improve the trainees competencies in the subject or characteristic such as providing more or better information and/or the communication of information concerning the subject or characteristic needing improvement or suggesting an overlay construct to assist the trainee mimic a trainers actions.

Automating the Training

In certain embodiment, the virtual training systems, apparatuses, and/or interfaces and methods for implementing them, include the ability to collect data and analytics sufficient to automate any given training exercise and to incorporate the automated training exercise into the virtual training systems, apparatuses, and/or interfaces and methods for implementing them.

Integrating the Virtual Training with Other Programs

In certain embodiment, the virtual training systems, apparatuses, and/or interfaces and methods for implementing them, include the ability to integrate scheduling abilities and/or other types of systems (such as contact managers, project management systems, calling systems, financial systems, robotics, machines, hardware, etc., and any other type of systems/software/hardware).

Integrating Security Measure or Systems

In certain embodiment, the virtual training systems, apparatuses, and/or interfaces and methods for implementing them, include the ability to integrate security measures, including profiles, signature types, passwords, etc. at any point and in combination with the system.

360° Environments

For example, the virtual training systems, apparatuses, and/or interfaces and methods for implementing them, have the capability of inputting or accessing a 360-degree video (360° video) and adding or associating one or more interactive points or hot spots to or with one or more location, objects, structures, features, attributes, properties, and/or characteristics featured in the 360° video. The interactive points or hot spots may be accessible a specific time in the 360° video, may be accessible for a specific period of time in the 360° video, or may be accessible during the entire 360° video. Additionally, the interactive points or hot spots accessible at any given time or time period during the 360° video may be the same or different and may change depending on the level of training. For example, as the level of training increases, the number of interactive points or hot spots may increase, and the information associated with them may also increase. The 360° video may show a way to do something, but by associating interactive points or hot spots that include information at different locations in the 360° video and/or different point during the 360° video, the trainee may experience improved cognition and retention of the training material. For example, while looking at an instrument on a control panel in a 360° video, the training systems may display an interactive point or hot spot (which may be a selectable object) associated with the instrument. If the interactive point or hot spot or selectable object includes a single information item (e.g., text file), then looking at the interactive point or hot spot or selectable object or otherwise activating the interactive point or hot spot or selectable object will display the text file. If the interactive point or hot spot or selectable object includes more than one item, then looking at the interactive point or hot spot or selectable object, a list of selectable information objects would appear and the trainee may use any scrolling, selecting and activating procedure available in to the systems to select and activate a particular selectable information object and to view the information, which may be textual, audio, visual (video), audiovisual, tactile, etc. Thus, the systems may associate interactive points or hot spots or selectable objects with all instruments of the control panel so that the trainee is able to obtain information about each instrument associated with the control panel. Additionally, the systems may change which of the interactive points or hot spots or selectable objects are visible and accessible at different times during the 360° video. The information associated with an instrument interactive point or hot spot or selectable object may be an animated construct to show how the instrument works and how it is related to the entire control panel or the entire contents of the 360° video. Also, the text form a resource manual may be displayed Animated or static lines (vectors) may be drawn between the elements to establish the relationship between them all and as the user interacts, using Qi technology, the objects may respond predictively and with a priority to further establish the correct cognition and retention patterns. Testing may be incorporated to assess confidence while interacting, what requirements are met, and what else needs to be learned and/or accomplished. If metrics do not meet a threshold, the User may be taken back to a place in the system to review, or more content may be introduced. Once an interactive learning environment section is complete, the video may resume and until the next section.

Interactions may also occur while the video continues to play. Several instances may play at once, where the user can move through instances of the same thing. For instance, a user may be able to see the same events each day of the week, and move through the days while the video is playing. The interaction in this case may be a UI function (Select, Activate, Scroll, Attribute Control), or may be a Hot spot that provides Attribute control and content navigation.

This system would typically work by a person taking a video and uploading it to a local device or to the cloud, or other repository. Other content, such as 3D objects, images, text, video, VR and AR content, etc. can reside in a local location, or on the cloud (web, online repository, remote server, etc.).

By using a set of tools that can reside on a device or on-line, the user can take a video and augment it by adding Interactive zones (hot spots) to it at any location, area, volume and/or time in the video. This Hot spot may contain one or more interactive attributes, control attributes, menu design attributes, content design attributes, animation attributes, time attributes, relational attributes, associative attributes, or any other kind of attributes, and may provide these individually, simultaneously or in any configured way.

The content associated with these points may then be associated with the interactive attributes. This augmented content may then be installed on a device through download, wirelessly, through a wired connection, or any other distribution means (the preferred environment is to download the experience wirelessly). The experience may also be "streamed" so the installation may be minimal or at any level, the rest of the experience being performed via the web, cloud, or other experiential medium.

As the user is in the experience, as the hot spots become interactive the video pauses until the extra layers or content is moved through as designed. These interactions may also occur while the video continues or is slowed down, or even reversed to "re-live" the experience again after initiating.

The experience may then be analyzed as it is being used (using Qi vector-based confidence metrics), providing metrics and analysis that may be used for reports, logic-based (AI) responses, modifications or stimuli, and overall analytics. This may also be combined with after-the-fact metrics, and analysis performed on the device or in the cloud, so AI, logic, or any type of analytics may be combined with real-time confidence metrics to assess the status of the user, determine competency, and or remedial or repletion needed to provide the highest cognition and retention.

Changes may be made while in the environment, from the device, exiting from the "play" program, in real-time as the environment is being experienced.

This may then be used for further enhancements or changes.

The result may be stored for further use later, and accessed on-demand from anywhere, on any device.

The environment may be a multi-user experience as well, where others may simultaneously experience, augment, or affect the outcome.

Video or other overall environmental controls may be incorporated into the experience.

The preferred interactions are through gaze-based dynamic motions (motion of the eyes/head or both), but may include using controllers, remotes, voices, audio utterances, gestures, touch surfaces or other inputs, singularly or in combination.

Though the preferred experience environment is a head-worn device (or mobile device that can be used as a head-worn), the same training, servicing, awareness, etc. and interactions can occur on a mobile device (phone, tablet, watch, etc.) or on a PC with cursor interactions, or any other environment. It may also be experienced with a projected display that is 360, 180 (or any degree), flat, holographic, or any other environment that may provide interactivity with content.

A base understanding of why this system is better is to realize how the brain learns. Our brain provides location and time data to things we remember well. When we have more time and positional stamps associated with a process or concept, it strengthens the relationship between us and that information. By causing the objects to respond as we move in a path, we create large amounts of touch points along that path, increasing the impression on our brain. Another advantage to using dynamic interactions, where objects respond to our motions as we move, in real time, is that it causes our brain to be alert at a higher level as we perceive these objects are now intelligent. The GUI system used today does not allow the objects to respond as we move to them, only after we have reached them. Our brain perceives these objects as non-sentient, and therefore we are not on the higher alert status.

By showing multiple levels of objects at once, our foveated and near peripheral view is engaged, activating the middle areas of our brain, which are the fastest processing areas. At the same time, showing the relationships between multiple objects and/or levels at once displays more spatiality to the concepts, activating the same part of the brain that groups elements together to see patterns and understand things, which causes higher cognition and retention.

The system described further above includes all these interactions, design elements and concepts. When all these are put together, the speed, quality and benefits of the system are maximized.

This is not only good for training, but even awareness, so that in AR. MR, VR, and/or XR, where the hands are being used for a task, or in VR where a battlefield assessment is needed, these same Hot spots and interaction designs are used for navigation through menus and content, and the same cognitive and retention quality is provided. When using this system to create, use, modify, analyze and improve any environment or task, the benefits are heightened awareness, faster and heightened cognition, better retention, and a more natural way to gather, process and use information and controls.

Specific Embodiments

Embodiments of this disclosure broadly relate to methods including capturing trainer images or a trainer image sequence corresponding to the trainer performing a task, routine, or program, and constructing a computer-generated trainer constructs on an image by image basis corresponding to the trainer performing the task, routine, or program. The methods also include capturing trainee images or a trainee image sequence corresponding to the trainee performing the task, routine, or program and constructing a computer-generated trainee constructs on an image by image basis corresponding to the trainee performing the task, routine, or program. The methods also include scaling the trainee constructs and trainer constructs on an image by image basis, comparing the scaled trainee constructs and trainer constructs on an image by image basis and on a feature by feature basis, and determining differences between the trainer and trainee features on an image by image basis. The method also includes overlaying the scaled trainee constructs onto the scaled trainer constructs on an image by image basis and displaying the overlaid scaled constructs. The displaying occurs as the trainer or trainee performs the task, routine, or program or any part thereof. The method also includes differences testing the differences between the trainer performance and the trainee performance on an image by image basis and feature by feature basis, if each of the differences exceed the one or more minimum difference criteria, then control is transferred to the trainee capturing step so that the trainee repeats the task, routine, or program or any part thereof, and if each of the difference is less than or equal to the one or more minimum difference criteria, then stopping. It should be recognized that the steps may be performed in different sequences.

In certain embodiments, the methods further comprise highlighting the differences according to a highlighting format, wherein the highlighting format includes color, shade, pulsating, or any highlighting technique. In other embodiments, the methods further comprise illustrating how the trainee may adjust body and/or body part positioning in each image or over a sequence of images so that the trainee sees how to adjust body and/or body part positioning in each image or over a sequence of images to minimize the highlighted differences. In other embodiments, the repeating steps continues until a stop function is invoked using an input device or the differences are less than or equal to the one or more difference criteria. In other embodiments, the minimal difference values are less than or equal to 5%, less than or equal to 2.5%, less than or equal to 2%, or less than or equal to 1%. In other embodiments, the repeating step comprises the trainee repeats the entire task, routine or program or any part of the task, routine or program or the repeating step comprises suggested parts of the task, routine or program to focus on those parts of the task, routine or program needing the most correction. In other embodiments, the repeating step comprises customized parts of the task, routine or program customized to each trainee based on trainee learning proclivities. In other embodiments, the constructs comprise a polygon construct, where all features of the images are represented by a plurality of polygons capable of being scaled so that the trainee image features are conformable to the trainer image features. In other embodiments, the constructs comprise a tessellated construct capable of being scaled so that the trainee image features are conformable to the trainer image features. In other embodiments, the constructs are a finite element constructs capable of being scaled so that the trainee image features are conformable to the trainer image features. In other embodiments, the scaling comprises spatial and temporal scaling so that the trainee image features are conformable to the trainer image features on a continuous or discrete basis. In other embodiments, the differences comprise whole body position differences, body part position differences, body position temporal differences, body part position temporal differences, any other feature differences, or any combination thereof on an image by image basis, a sequence of images basis or an entire image sequence basis. In other embodiments, the image capturing comprises capturing images on any time frame from a continuous capture or a time increment capture, wherein the time frame is between about 1 microsecond and a 10 seconds or sub time frame value.

Embodiments of this disclosure broadly relate to methods including identifying a non-animated training task, routine, or program, developing a VR or AR/MR/XR training task, routine, or program corresponding the non-animated task, routine, or program, generating information about (a) important, relevant, meaningful, and/or interesting features, attributes, properties, and/or characteristics associated with the training task, routine, or program and (b) important, relevant, meaningful, and/or interesting features, attributes, properties, and/or characteristics associated with equipment or devices used in the training task, routine, or program, gathering information about (a) important, relevant, meaningful, and/or interesting features, attributes, properties, and/or characteristics associated with the training routine and (b) important, relevant, meaningful, and/or interesting features, attributes, properties, and/or characteristics associated with equipment or devices used in the training task, routine or program, storing the generated or gathered information in local databases and/or remote databases. The methods also include analyzing the task, routine, or program, generating a VR environment or a VR/AR/MR environment for the non-animated training task, routine, or program, and associating/populating hot spots comprising the generated and/or gathered information with (a) each important, relevant, meaningful, or interesting feature, attribute, property, and/or characteristic of the task, routine, or program and (b) each important, relevant, meaningful, and/or interesting feature, attribute, property, and/or characteristic of the equipment and/or devices associated with the task, routine, or program. The methods also include collecting/capturing expert data as an expert performs the VR or the AR/MR/XR training task, routine, or program, processing the expert performance data, overall data and task data and storing the data in the system databases. The methods also include providing the expert with overall performance data and/or part performance data to gain insight from the expert on how to improve the training routine and environment, collecting/capturing trainee data as a trainee goes through the training routine in the training environment, wherein the data includes data on how the trainee accomplished each training task, data on what hot spots the trainee activates, data on the duration of time the trainee spends in each hot spot and data on the type of information viewed, data indicating a level of competency in each task, data indicating an overall competency, and data associated with ease of using each task, ease of using the entire training routine, and each of using and interacting with the environment, and providing feedback to the trainee and/or to the supervisors before, during, and/or after each task or before, during, and/or after the entire training routine to the trainee. The methods also include collecting and storing all feedback data and evaluation data made by supervisors, collecting/capturing and storing the feedback data to the system databases. The methods also include informing the trainee of any deficiencies and providing information on how to improve the trainee performance including showing the trainee performance overlaid on an experts performance for the same task or suggesting way to improve performance, providing information to the trainee to improve performance deficiencies, and repeating the deficient tasks or the entire routine until proficient at each task and the entire routine to a given level of competency, providing feedback to the trainee/supervisor before, during, and/or after the trainee repeats routine/tasks. The methods also include processing and storing the trainee repeat performance data in the databases, analyzing performance data and modifying one, some, or all aspects of the training routine, task, avatar, hot spot, and/or environment features, properties, characteristics, and/or attributes to improve the routine, tasks, hot spots, and/or environment, analyzing performance data (expert and trainee) and modifying one, some, and/or all aspects of the routine, the task, the environment, the avatar, and/or the hot spot features, properties, characteristics, and/or attributes to improve any and all aspects of the training routine, the tasks, the environment, the avatar(s), and/or the hot spots to aid the trainee in those deficient tasks and allowing the trainee to redo the training task or the entire training session, and continuing the analyzing, determining, and improving the routine, environment, avatar, hot spots, and/or hot spot content, wherein the improving may include revising, adding, deleting, modifying, and/or changing any some or all aspects of the training routine, environment, avatar, hot spots, and/or hot spot content to enhance its effectiveness over time.

In certain embodiments, the methods further comprises generating an avatar assistant, wherein the avatar is configured to change form depending on the task, routine, or program, may be generated using user input, may be generated based on past trainee performance, or may adapt a specific form to improve trainer environment and routine interaction. In other embodiments, the data includes data on how the expert accomplished each training task, data on what hot spots the trainee activates, data on the duration of time the expert spends in each hot spot and data on the type of information viewed, data indicating a level of competency in each task, data indicating an overall competency, and data associated with ease of using each task, ease of using the entire training routine, and each of using and interacting with the environment.

Embodiments of this disclosure broadly relate to methods comprising loading a pre-existing non VR or AR/MR/XR training task, routine, or program, generating information about (a) one, some, or all aspects, features, attributes, properties, and/or characteristics associated with the training task, routine, or program and/or (b) one, some, or all aspects, features, attributes, properties, and/or characteristics associated equipment and/or devices used in the training task, routine, or program, gathering information about (a) one, some, or all of the aspects, features, attributes, properties, and/or characteristics associated with the training task, routine, or program and/or (b) one, some, or all of the aspects, features, attributes, properties, and/or characteristics associated the equipment and/or the devices used in the training task, routine, or program, and storing the generated and/or gathered information in one or more local databases and/or one or more remote databases. The methods also include analyzing the pre-existing training program, the generated information, and the gathered information, developing VR content, AR/MR/XR content, and/or VR and AR/MR/XR content for the pre-existing training program, generating a VR environment, an AR/MR/XR environment, or a VR and an AR/MR/XR environment for the training program, generating hot spots for (a) one, some, or all of the aspects, features, attributes, properties, and/or characteristics associated with the training task, routine, or program and/or (b) one, some, or all of the aspects, features, attributes, properties, and/or characteristics associated the equipment and/or the devices used in the training task, routine, or program, and populating the environment with the generated hot spots. The methods also includes starting an expert training session, collecting/capturing expert/trainer performance and interaction data as an expert/trainer performs the training task, routine, or program, processing the expert/trainer performance and interaction data, storing the expert/trainer performance and interaction data in the databases, analyzing the collected/captured performance and interaction data, modifying one, some, or all aspects, features, attributes, properties, and/or characteristics of the training task, routine, or, program, the environment, and/or hot spots, during or after performing the task, routine, or program or any part thereof, updating the task, routine, or program, the environment and/or the hot spots, and storing the updated task, routine, or program in the databases. The methods also include providing feedback to the expert with overall performance and/or part performance and interaction data to gain insight from the expert on how to improve the training task, routine, or program, the environment, and/or the hot spots, conditional testing to permit the expert to repeat the entire task, routine, or program or any portion of the task, routine, or program, if the expert is not satisfied with any aspect of the trainer performance, then repeating the steps starting with the collecting/capturing step so that the expert repeats the entire task, routine, or program or any portion of the task, routine, or program. The methods also include if the expert is satisfied with the trainer performance, starting a trainee training session, collecting/capturing trainee performance and interaction data as a trainee performs the training task, routine, or program, processing the trainee performance and interaction data, storing the trainee performance and interaction data in the databases, analyzing the collected/captured trainee performance and interaction data, modifying one, some, or all aspects, features, attributes, properties, and/or characteristics of task, routine, or program, the environment, and/or hot spots, and updating the program and storing the updated program the databases, The methods also include providing feedback to an expert/supervisor before, during, and/or after the trainee performance, providing feedback to the trainee including deficient task performance data, conditional testing to permit the trainee to repeat the repeat the entire task, routine, or program or any portion of the task, routine, or program, if the trainee did not pass the training task, routine, or program or any part thereof, then repeating the steps starting with the collecting/capturing step so that the expert repeats the entire task, routine, or program or any portion of the task, routine, or program, if the trainee passes the training task, routine, or program or the part thereof, processing the trainee pass performance and interaction data, storing the trainee pass performance and interaction data in the databases, analyzing the trainee pass performance and interaction data, modifying one, some, or all aspects of the training task, routine, or program, the environment and/or the hot spots, updating the program and storing the updated training task, routine, or program in the databases, continuously, periodically, or intermittently analyzing all of the stored data, developing predictive tools or routines to assist trainees in performing the training task, routine, or program and/or navigating the environment, developing trainee type predictive tools to assist specific types of trainees in performing the training program and/or navigating the environment, and updating the task, routine, or program, the environment, the hot spots.

In certain embodiments, the training task, routine, or program includes: one or more devices, one or more device explanatory routines, one or more device training routines, one or more device training tasks, one or more question/answer sessions, one or more information presentation routines, one or more trainee pass/fail routines, one or more performance ranking routines, one or more trainee feedback routines, or any combination thereof. In other embodiments, the VR content and/or AR/MR/XR content includes purely textual content, purely non-textual content, or mixtures of textual content and non-textual content. In other embodiments, the methods further comprise analyzing the textual information and preparing CG content constructs based on the textual content, and analyzing the non-textual information and preparing CG content constructs based on the non-textual content. In other embodiments, the CG content constructs comprise CG 2D, 3D, 4D, or nD constructs. In other embodiments, the environment is fully interactive based primarily on motion-based processing, hard select processing, gesture processing, or any combination thereof. In other embodiments, the hot spots comprise (a) specific hot spots associated specific aspects, features, attributes, properties, and/or characteristics of the training task, routine, or program or the environment, or (b) general information hot spots associated with global aspects, features, attributes, properties, and/or characteristics of the training task, routine, or program or the environment. In other embodiments, the expert/trainer or trainee performance and interaction data includes: (j) data on how the expert accomplishes the entire program, (k) data on how the expert accomplishes each routine and/or task of the program, (1) data on what hot spots the expert activates, (m) data on the duration of time the expert spends in each activated hot spot, (n) data on the type of information viewed, (o) data indicating a level of competency in entire program and each routing and/or task, (p) data associated with ease of performing each of the routine and/or task, (q) data associated with the ease/difficulty of using the entire training program, (r) data associated with the ease/difficulty of using each routine or task, (s) data associated with using and interacting with the entire environment, (t) data associated with using and interacting with one, some, or all aspects, features, attributes, properties, and/or characteristics of the program, environment, routines, tasks, content, and/or hot spots, (u) data that may be used to construct predictive tools or routines for tailoring the training program to individual trainees, (v) data on how the trainee accomplishes the entire program, (w) data on how the trainee accomplishes each task of the program, (x) data on what hot spots the trainee activates, (y) data on the duration of time the trainee spends in each activated hot spot, (z) data on the type of information viewed, data indicating a level of competency in entire routing and each task, (aa) data associated with ease of performing each of the routines or tasks, ease/difficulty of using the entire training program and ease/difficulty of using each routine or task thereof, (bb) data associated with using and interacting with the entire environment and/or one, some, or all aspects, features, attributes, properties, and/or characteristics of the environment, routines, tasks, content, and/or hot spots, and (cc) mixtures or combinations thereof. In other embodiments, the processing comprises formatting the information for more efficient database storage and retrieval. In other embodiments, the methods further comprise generating one or more avatars, and providing the avatar with the expert performance and interaction data, and wherein in any of the analyzing, processing, modifying, storing, and/or updating steps, analyzing, processing, modifying, storing, and/or updating the one or more avatars.

Embodiments of this disclosure broadly relate to apparatuses, systems, or interfaces capable of performing any of the preceding claims comprising at least one processing unit, at least one motion sensor, at least one display device, at least one user feedback device, and at least one user input device, wherein the at least on processing unit is in communication with the other devices.

Embodiments of this disclosure also broadly relate to methods including displaying, via a processing unit, a virtual reality (VR), augmented reality (AR), a mixed reality (MR), or an extended reality (XR) environment including a plurality of objects, a plurality of scenes, and/or a plurality of attributes associated with the environment and/or objects or scenes on a display device in communication with at least one processing unit; viewing, via the at least one processing unit, the environment through wearable display device such as an eye tracking device, a head up display, smart phone, tablet, or any other wearable or mobile or non-mobile viewing device in communication with the processing unit; superimposing, in or on the environment via the processing unit, an interactive control construct including a plurality of active control areas; optionally displaying, via the processing unit, a selection object or indication for visualizing eye movement from the device glasses in the environment or in or on the control construct; sensing eye movement via the device glasses and moving the selection object or indication correspondingly; and if the movement is on or in a particular active control area of the construct, then converting the movement into a construct function associated with the particular active control area of the construct; or if the movement is on or in the environment, then converting the movement into a selection and/or activation function of a particular object or a selection, activation, scrolling and/or attribute function of the environment.

In certain embodiments, the methods further comprise repeating the sensing and if steps, until an exit or stop command is selected. In other embodiments, the methods further comprise prior to the environment displaying step, sensing a first eye movement, wherein the first movement includes at least one property exceeding a threshold value or configured position. In other embodiments, the control areas comprise a fast forward movement area, a no movement area, a backward movement area, a pan left area, a pan right area, and a no pan area, wherein each area has a corresponding movement function, control function or a corresponding panning function associated therewith. In other embodiments, the control areas comprise a plurality of bands, each of the bands having a plurality of regions. The bands may also include gradients of functions, attributes, groupings, or perspectives controls. the bands comprise a fast forward band, a slow forward band, a stop or no motion-band, a fast backward band, and a slow forward band, wherein each band has a corresponding movement function associated therewith, and the regions comprise a pan left region, a pan right region and a no pan region interposed therebetween, wherein each band has a corresponding panning/control function associated therewith. In other embodiments, the methods further comprise sensing eye movement via the device and moving the selection object or indicator, visible or invisible, correspondingly; if the movement is on or in a particular band and a particular region of the particular band, then converting the movement into the corresponding movement function and panning function and moving through the environment accordingly; or if the movement is on or in the environment, then converting the movement into a selection, control, and/or activation function of a particular object or a selection, activation, and/or attribute function of the environment. In other embodiments, the methods further comprise prior to the if steps, confirming the selection of the particular area of the construct, or confirming the selection of the object or attribute in the environment.

Embodiments of this disclosure also broadly relate to apparatuses such as a set of glasses in communication with a mobile or non-mobile device (e.g., smart phones, smart TV, tablets, laptop computers, desktop computer, etc. where all the processing is done on a connected device, including a display device; an input device; eye tracking device; and a processor or output from a processor, in communication with the display device, the glasses and the input device, configured to: display a virtual reality (VR), augmented reality (AR), or a mixed reality (MR) environment including a plurality of objects, a plurality of scenes, and/or a plurality of attributes associated with the environment, objects and/or scenes on the display device; initiate the glasses to view the environment; superimpose, in or on the environment, an interactive control construct including a plurality active control areas viewable through the glasses; display a selection object for visualizing eye movement from the glasses in or on the environment or in or on the control construct; sense eye movement via the glasses and moving the selection object correspondingly; and if the movement is on or in a particular active control area of the construct, then converting the movement into a function associated with the particular active control area of the construct; or if the movement is on or in the environment, then converting the movement into a selection and/or activation function of a particular object or a selection, activation, and/or attribute adjustment function of a particular attribute of the particular object or of the environment.

In certain embodiments, the processor is further configured to: prior to the environment display, sense a first movement from the glasses or from the input device, wherein the first movement includes at least one movement property exceeding a threshold value or position. In other embodiments, the device comprises a mobile device including the display device, the input device, and the processing unit. In other embodiments, the device comprises a mobile device including the display device, the input device, and the processing unit. In other embodiments, the display device comprises a touchscreen and the input device is a motion sensor. In other embodiments, the mobile device comprises a cell phone, a wearable device, a tablet computer, or a laptop computer.

Embodiments of this disclosure also broadly relate to methods including displaying, via a processing unit, a plurality of icon on a display device in communication with the processing unit; sensing, via the processing unit, eye movement via eye tracking glasses in communication with the processing unit, where the movement is discernibly towards a particular icon; expanding, via the processing unit, the particular icon; activating, via the processing unit, the particular icon once the movement enters the particular icon; displaying, via the processing unit, one or a plurality of attribute icons associated with the particular icon; sensing, via the processing unit, further eye movement via the glasses discernibly towards a particular attribute icon; selecting and activating the particular attribute icon; and if the particular attribute icon is adjustable, sensing further eye movement via the glasses to adjust the attribute value.

In certain embodiments, the methods further comprise repeating the steps. In other embodiments, the methods further comprise prior to the displaying icon step, sensing a first eye movement, wherein the first movement includes at least one property exceeding a threshold value. In other embodiments, the expanding step further includes displaying a confirmation icon within the expanded particular icon; and the activating step comprises: sensing eye movement via the glasses towards the confirmation icon; and activating the particular icon when the movement stop for a microhold over the confirmation icon. In other embodiments, the activating step further includes a microhold over the particular icon. In other embodiments, the selecting and activating the particular attribute icon step further includes a microhold over the particular attribute icon. In other embodiments, the selecting and activating the particular attribute icon step further includes: expanding the particular attribute icon and displaying a confirmation icon within an expanded particular icon; and the activating step comprises: sensing eye movement via the glasses towards the confirmation icon; selecting and activating the particular attribute icon; and if the particular attribute icon is adjustable, sensing further eye movement via the glasses to adjust the attribute value.

Embodiments of this disclosure also broadly relate to apparatuses including a display device; an input device; eye tracking glasses; and a processor, in communication with the display device, the glasses and the input device, configured to: display a plurality of icon on a display device in communication with the processing unit; sense eye movement via eye tracking glasses, where the movement is discernibly towards a particular icon; expand the particular icon; activate the particular icon once the movement enters the particular icon; display one or a plurality of attribute icons associated with the particular icon; sense further eye movement via the glasses discernibly towards a particular attribute icon; select and activate the particular attribute icon; if the particular attribute icon is adjustable, sense further eye movement via the glasses to adjust the attribute value.

In certain embodiments, the processor is further configured to: repeat the display, sense, expand, activate, display, select and activate and attribute adjust. In other embodiments, the processor is further configured to: prior to the display icons, sense a first eye movement, wherein the first movement includes at least one property exceeding a threshold value. In other embodiments, the expand further includes display of a confirmation icon within the expanded particular icon; and the activate comprises: sense eye movement via the glasses towards the confirmation icon; and activate the particular icon when the movement stop for a microhold over the confirmation icon. In other embodiments, the activate further includes a microhold over the particular icon. In other embodiments, the select and activate the particular attribute icon step further includes a microhold over the particular attribute icon. In other embodiments, the select and activate the particular attribute icon step further includes: expand the particular attribute icon and display a confirmation icon within an expanded particular icon; and the activate comprises: sense eye movement via the glasses towards the confirmation icon; select and activate the particular attribute icon; and if the particular attribute icon is adjustable, sense further eye movement via the glasses to adjust the attribute value.

Embodiments of this disclosure also broadly relate to methods including (a) capturing, via a processing unit, trainee images or a trainee image sequence and trainer images and/or a trainer image sequence from at least one motion sensor corresponding to a specific task; (b) constructing, via the processing unit, constructs of the trainee images or the trainee image sequence and constructs of the trainer images or the trainer image sequence on an image by image basis and on a feature by feature basis; (c) scaling, via the processing unit, the trainee and/or trainer constructs on an image by image and on a feature by feature basis so that the constructs are spatially and temporally conformed; (d) comparing, via the processing unit, the scaled constructs on an image by image basis and on a feature by feature basis; (e) determining, via the processing unit, differences between the scaled constructs on an image by image basis and on a feature by feature basis; (f) overlaying, via the processing unit, the scaled trainee construct onto the scaled trainer construct on an image by image basis; and (g) displaying, via the processing unit, the overlaid constructs on an image by image basis on a display device in communication with the processing unit.

In certain embodiments, the methods further comprise (h) highlighting, via the processing unit, the differences on an image by image basis and on a feature by feature basis on the display device. In other embodiments, the methods further comprise (i) repeating the steps (a)-(h) until a stop function is invoked to stop the training exercise or the differences satisfy at least one completion criteria. In other embodiments, the at least one completion criteria comprises conformity or substantially conformity between the trainee scaled construct and the trainer scaled construct on an image by image basis or the at least one completion criteria comprise minimizing one, some or all of differences as evidenced by changes in the differences upon repeating the exercise being less than a minimal value, where the minimal value is less than or equal to 5%, less than or equal to 2.5%, less than or equal to 2%, or less than or equal to 1%. In other embodiments, the start and stop functions may be activated by motion-based processing, gesture-based processing or a hard select processing.

Embodiments of this disclosure also broadly relate to apparatuses a display device; an image capture device; an input device; an interface is configured to: capture trainee images or a trainee image sequence from the image capture device and trainer images or a trainer image sequence from the image capture device; receive input from the input device to invoke a start function or a stop function; and a processor is configured to: construct a trainee image by image construct and a trainer image by image construct; scale the trainee image by image construct and/or trainer image by image construct so that the constructs are conformed spatially and temporally; compare the scaled constructs on an image by image basis; determine differences between the scaled constructs on an image by image basis; overlay the scaled trainee construct onto the scaled trainer construct on an image by image basis; and display the overlaid constructs on an image by image basis. In certain embodiments, the processor is further configured to: highlight the differences on an image by image basis and feature by feature basis. In other embodiments, the processor is further configured to: repeat the construct, scale, compare, determine, overlay and display events until a stop function is invoked to stop the training exercise or the differences satisfy at least one completion criteria.

Suitable Components for Use in the Disclosure

Motion Sensors

Suitable motion sensors include, without limitation, optical sensors, acoustic sensors, thermal sensors, optoacoustic sensors, wave form sensors, pixel differentiators, or any other sensor or combination of sensors that are capable of sensing movement or changes in movement, or mixtures and combinations thereof. Suitable motion sensing apparatus include, without limitation, motion sensors of any form such as digital cameras, optical scanners, optical roller ball devices, touch pads, inductive pads, capacitive pads, holographic devices, laser tracking devices, thermal devices, electromagnetic field (EMF) sensors, wave form sensors, any other device capable of sensing motion, changes in EMF, changes in a wave form, or the like or arrays of such devices or mixtures or combinations thereof. The sensors may be digital, analog, or a combination of digital and analog. The motion sensors may be touch pads, touchless pads, touch sensors, touchless sensors, inductive sensors, capacitive sensors, optical sensors, acoustic sensors, thermal sensors, optoacoustic sensors, electromagnetic field (EMF) sensors, strain gauges, accelerometers, pulse or waveform sensor, any other sensor that senses movement or changes in movement, or mixtures and combinations thereof. The sensors may be digital, analog, or a combination of digital and analog or any other type. For camera systems, the systems may sense motion within a zone, area, or volume in front of the lens or a plurality of lens. Optical sensors include any sensor using electromagnetic waves to detect movement or motion within in active zone. The optical sensors may operate in any region of the electromagnetic spectrum including, without limitation, radio frequency (RF), microwave, near infrared (IR), IR, far IR, visible, ultra violet (UV), or mixtures and combinations thereof. Exemplary optical sensors include, without limitation, camera systems, the systems may sense motion within a zone, area, or volume in front of the lens. Acoustic sensors may operate over the entire sonic range which includes the human audio range, animal audio ranges, other ranges capable of being sensed by devices, or mixtures and combinations thereof. EMF sensors may be used and operate in any frequency range of the electromagnetic spectrum or any waveform or field sensing device that are capable of discerning motion with a given electromagnetic field (EMF), any other field, or combination thereof. Moreover, LCD screen(s), other screens and/or displays may be incorporated to identify which devices are chosen or the temperature setting, etc. Moreover, the interface may project a virtual control surface and sense motion within the projected image and invoke actions based on the sensed motion. The motion sensor associated with the interfaces of this disclosure may also be acoustic motion sensor using any acceptable region of the sound spectrum. A volume of a liquid or gas, where a user's body part or object under the control of a user may be immersed, may be used, where sensors associated with the liquid or gas can discern motion. Any sensor being able to discern differences in transverse, longitudinal, pulse, compression or any other waveform may be used to discern motion and any sensor measuring gravitational, magnetic, electro-magnetic, or electrical changes relating to motion or contact while moving (resistive and capacitive screens) could be used. Of course, the interfaces can include mixtures or combinations of any known or yet to be invented motion sensors. The motion sensors may be used in conjunction with displays, keyboards, touch pads, touchless pads, sensors of any type, or other devices associated with a computer, a notebook computer, a drawing tablet, any mobile or stationary device, and/or device, head worn device, or stationary device.

Suitable motion sensing apparatus include, without limitation, motion sensors of any form such as digital cameras, optical scanners, optical roller ball devices, touch pads, inductive pads, capacitive pads, holographic devices, laser tracking devices, thermal devices, EMF sensors, wave form sensors, MEMS sensors, any other device capable of sensing motion, changes in EMF, changes in wave form, or the like or arrays of such devices or mixtures or combinations thereof. Other motion sensors that sense changes in pressure, in stress and strain (strain gauges), changes in surface coverage measured by sensors that measure surface area or changes in surface are coverage, change in acceleration measured by accelerometers, or any other sensor that measures changes in force, pressure, velocity, volume, gravity, acceleration, any other force sensor or mixtures and combinations thereof.

Controllable Objects

Suitable physical mechanical, electro-mechanical, magnetic, electro-magnetic, electrical, or electronic devices, hardware devices, appliances, biometric devices, automotive devices, VR objects, AR objects, MR objects, and/or any other real-world device and/or virtual object that may be controlled by a processing unit include, without limitation, any electrical and/or hardware device or appliance or VR object that may or may not have attributes, all of which may be controlled by a switch, a joy stick, a stick controller, other similar type controller, and/or software programs or objects. Exemplary examples of such attributes include, without limitation, ON, OFF, intensity and/or amplitude, impedance, capacitance, inductance, software attributes, lists, submenus, layers, sublayers, other leveling formats associated with software programs, objects, haptics, any other controllable electrical and/or electro-mechanical function and/or attribute of the device and/or mixtures or combinations thereof. Exemplary examples of devices include, without limitation, environmental controls, building systems and controls, lighting devices such as indoor and/or outdoor lights or light fixtures, cameras, ovens (conventional, convection, microwave, and/or etc.), dishwashers, stoves, sound systems, mobile devices, display systems (TVs, VCRs, DVDs, cable boxes, satellite boxes, and/or etc.), alarm systems, control systems, air conditioning systems (air conditions and heaters), energy management systems, medical devices, vehicles, robots, robotic control systems, UAVs, equipment and machinery control systems, hot and cold water supply devices, air conditioning system, heating systems, fuel delivery systems, energy management systems, product delivery systems, ventilation systems, air handling systems, computers and computer systems, chemical plant control systems, manufacturing plant control systems, computer operating systems and other software systems, programs, routines, objects, and/or elements, remote control systems, or the like virtual and augmented reality systems, holograms, and/or mixtures or combinations thereof.

Software Systems

Suitable software systems, software products, and/or software objects that are amenable to control by the interface of this disclosure include, without limitation, any analog or digital processing unit or units having single or a plurality of software products installed thereon and where each software product has one or more adjustable attributes associated therewith, or singular software programs or systems with one or more adjustable attributes, menus, lists, or other functions, attributes, and/or characteristics, and/or display outputs. Exemplary examples of such software products include, without limitation, operating systems, graphics systems, business software systems, word processor systems, business systems, online merchandising, online merchandising systems, purchasing and business transaction systems, databases, software programs and applications, internet browsers, accounting systems, military systems, control systems, VR, AR, MR systems or the like, or mixtures or combinations thereof. Software objects generally refer to all components within a software system or product that are controllable by at least one processing unit.

Processing Units

Suitable processing units for use in the present disclosure include, without limitation, digital processing units (DPUs), analog processing units (APUs), Field Programmable Gate Arrays (FPGAs), any other technology that may receive motion sensor output and generate command and/or control functions for objects under the control of the processing unit, and/or mixtures and combinations thereof.

Suitable digital processing units (DPUs) include, without limitation, any digital processing unit capable of accepting input from a plurality of devices and converting at least some of the input into output designed to select and/or control attributes of one or more of the devices. Exemplary examples of such DPUs include, without limitation, microprocessor, microcontrollers, or the like manufactured by Intel, Motorola, Ericsson, HP, Samsung, Hitachi, NRC, Applied Materials, AMD, Cyrix, Sun Microsystem, Philips, National Semiconductor, Qualcomm, or any other manufacture of microprocessors or microcontrollers, and/or mixtures or combinations thereof.

Suitable analog processing units (APUs) include, without limitation, any analog processing unit capable of accepting input from a plurality of devices and converting at least some of the input into output designed to control attributes of one or more of the devices. Such analog devices are available from manufacturers such as Analog Devices Inc.

User Feedback Units

Suitable user feedback units include, without limitation, cathode ray tubes, liquid crystal displays, light emitting diode displays, organic light emitting diode displays, plasma displays, touch screens, touch sensitive input/output devices, audio input/output devices, audio-visual input/output devices, holographic displays and environments, keyboard input devices, mouse input devices, optical input devices, and any other input and/or output device that permits a user to receive user intended inputs and generated output signals, and/or create input signals.

Predictive Training Methodology

The inventors have found that predictive virtual training systems, apparatuses, interfaces, and methods for implementing them may be constructed including one or more processing units, one or more motion sensing devices or motion sensors, optionally one or more non-motion sensors, one or more input devices, and one or more output devices such as one or more display devices, wherein the processing unit includes a virtual training program and is configured to (a) output the training program in response to user input data sensed by the sensors or received from the input devices, (b) collect user interaction data while performing the virtual training program, and (c) modify, alter, change, augment, update, enhance, reformat, restructure, and/or redesign the virtual training program to better tailor the virtual training program for each user, for each user, type and/or for all users.

DETAILED DESCRIPTION OF THE DRAWINGS OF THE DISCLOSURE

Virtual Training Conceptual Flow Chart

Figure 1A:
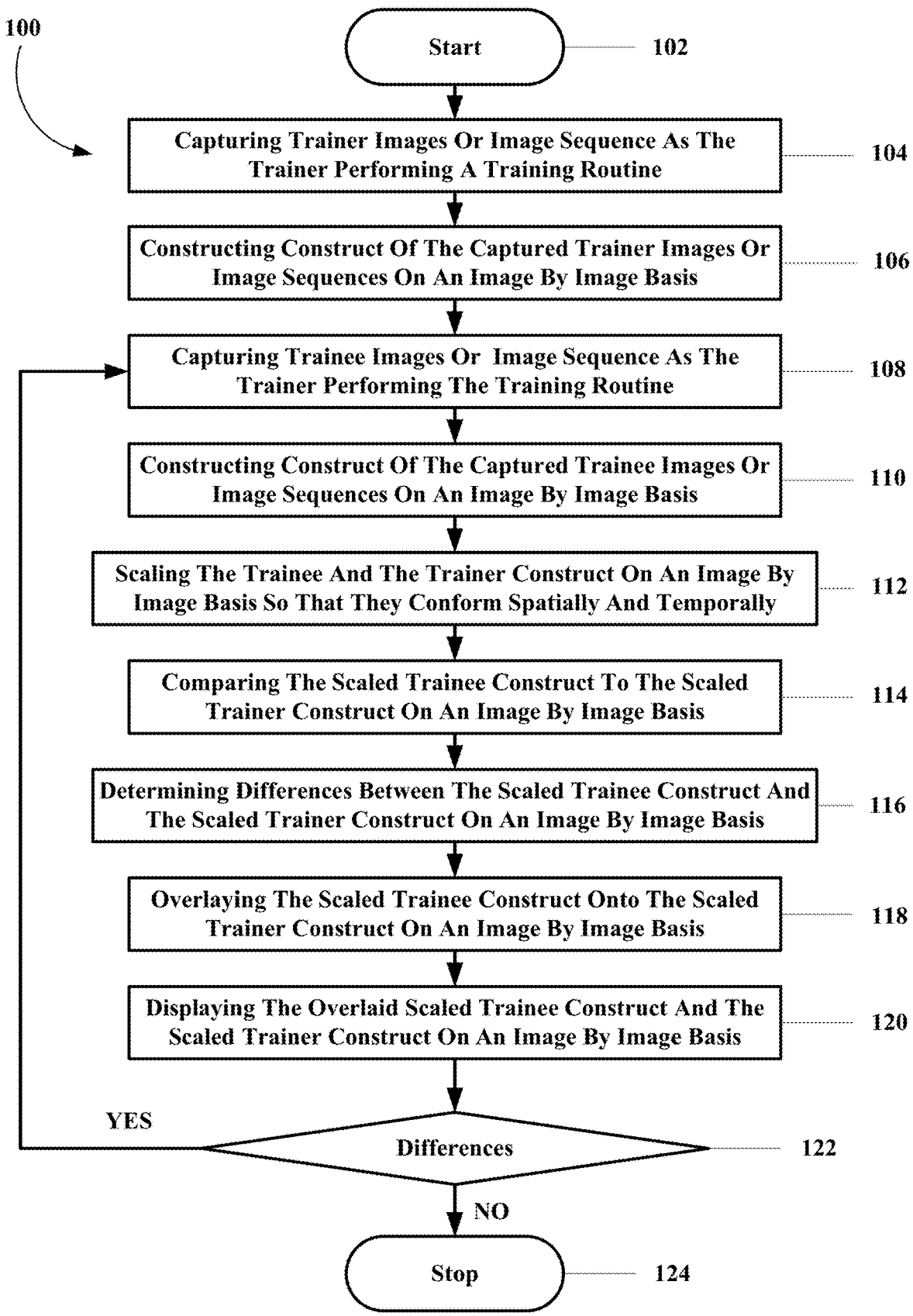
FIG. 1A depicts an embodiment of a schematic flow chart of a method of training.

Referring now to FIG. 1A, an embodiment of a schematic flow chart of a method of training, generally 100, is shown to include a start step 102. After starting, the method includes a trainer capturing step 104, where trainer images or a trainer image sequence corresponding to a trainer performing a training exercise or routine or program including, without limitation, a game such as golf, baseball, football, soccer, etc., an exercise routine, a martial art routine, a dance routine, an instrument routine, or any other training routine or program that may be captured by an imaging input device. The method also includes a trainer constructing step 106, where computer-generated trainer constructs on an image by image basis. The method also includes a trainee capturing step 108, where trainee images or a trainee image sequence corresponding to the trainee performing the training exercise or routine or program. The method also includes a trainee constructing step 110, where computer-generated trainee constructs on an image by image basis.

In certain embodiments, the construct comprises a polygon (triangles and higher polygons) construct, where all features of the images are represented by a plurality of polygons capable of being scaled so that the trainer image features may be conformed to the trainer image features for comparison and overlaying purposes. In other embodiments, the construct comprise a tessellated construct, again capable of being scaled so that the trainer image features may be conformed to the trainer image features for comparison and overlaying purposes. In other embodiments, the construct is a finite element construct, again capable of being scaled so that the trainer image features may be conformed to the trainer image features for comparison and overlaying purposes.

The method also includes a scaling step 112, where the trainee and/or trainer constructs are scaled to correspond to each other on an image by image basis. The scaling adjusts corresponding features in the trainee images to corresponding features in the trainer images. For example, the trainee body is scaled to conform to the trainer body so that the movement of the trainee and trainer may be compared. As the images are captured over time, the scaling may include both spatial and temporal scaling. The method also includes a comparing step 114, where the scaled trainee and trainer constructs are compared on an image by image basis and where comparison is on a feature by feature basis as well. The method also includes a determining step 116, where differences between the features on an image by image basis are generated. The method also includes an overlaying step 118, where the scaled trainee construct is overlaid onto the scaled trainer construct on an image by image basis. The method also includes a displaying step 120, where the overlaid scaled constructs are displayed on a display device to show the difference between the trainee performing the training exercise/routine/program and the trainer performing the training exercise/routine/program.

The method also include a differences test step 122, where the differences between the trainer performance on an image by image basis are analyzes to determine if the differences meet one or more minimum difference criteria such as whole body position differences on an image by image basis, body part position differences on an image by image basis, body position temporal difference on an image sequence basis, body part position temporal differences on an image sequence basis, any other differences, or any combination thereof, where the image sequence may be the entire number of captured images or image sequence or any part thereof. Additionally, the image capturing may be on any time frame from near continuous to images from a continuous capture based on a given time increment such as between a 1 millisecond time increment and a 10 second time increment or any increment therebetween. If the difference exceeds the one or more minimum difference criteria, then control is transferred along a NO path back to the capturing of the trainee image step 108. If the difference is less than or equal to the one or more minimum difference criteria, then control is transferred along a YES path to a stop step 124. While the method shows a specific sequence of steps, one or more of these steps may be performed in a different sequence or simultaneously or in any other combination provided that the end result is to provide a trainee information for correcting a trainee performance relative to a trainer performance.

Figure 1B:
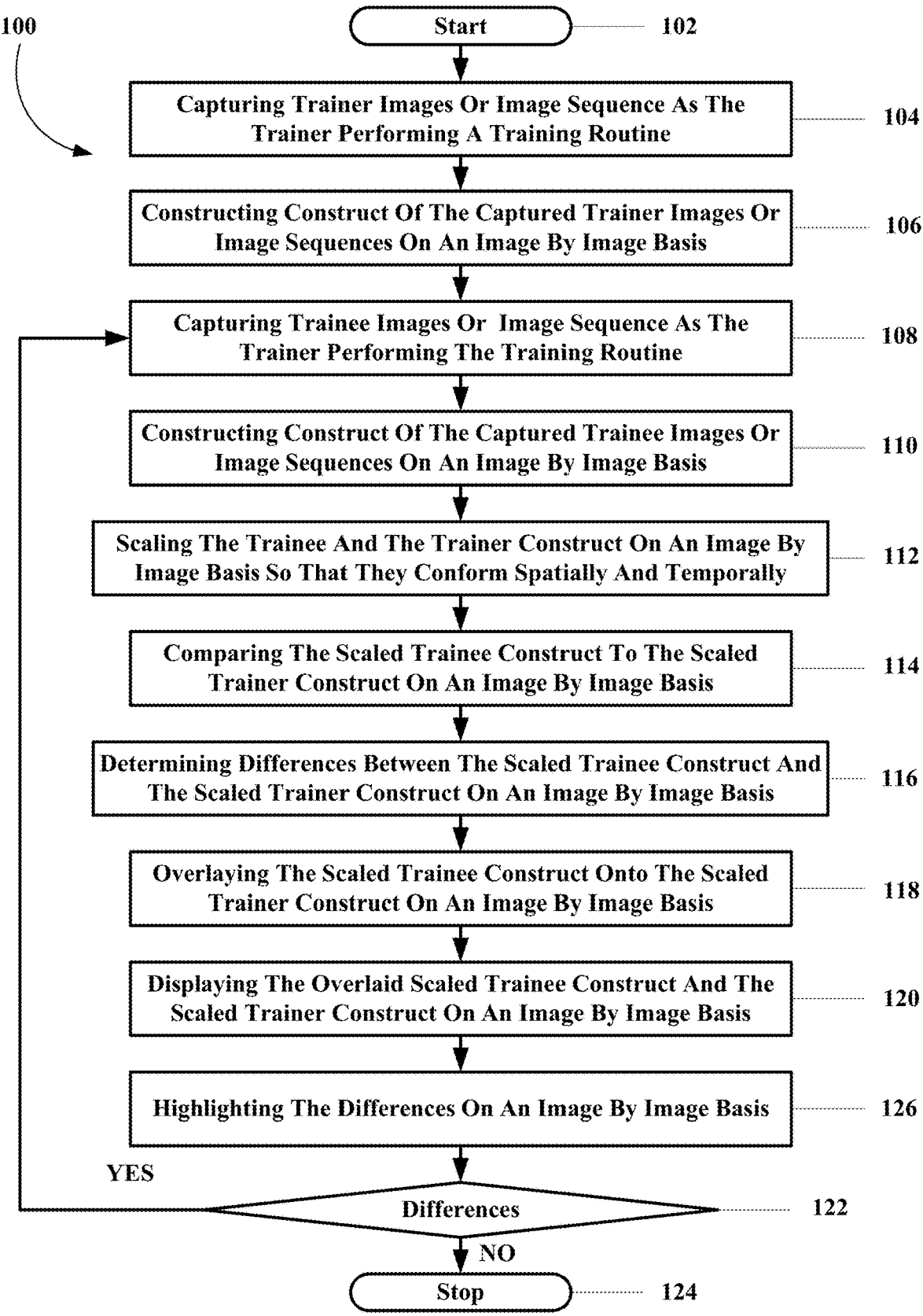
FIG. 1B depicts another embodiment of a schematic flow chart of a method of training.

Referring now to FIG. 1B, another embodiment of a schematic flow chart of a method of training, generally 100, including a start step 102. After starting, the method includes a trainer capturing step 104, where trainer images or a trainer image sequence corresponding to a trainer performing a training exercise or routine or program including, without limitation, a game such as golf, baseball, football, soccer, etc., an exercise routine, a martial art routine, a dance routine, an instrument routine, or any other training routine or program that may be captured by an imaging input device. The method also includes a trainer constructing step 106, where computer-generated trainer constructs on an image by image basis. The method also includes a trainee capturing step 108, where trainee images or a trainee image sequence corresponding to the trainee performing the training exercise or routine or program. The method also includes a trainee constructing step 110, where computer-generated trainee constructs on an image by image basis.

In certain embodiments, the construct comprises a polygon (triangles and higher polygons) construct, where all features of the images are represented by a plurality of polygons capable of being scaled so that the trainer image features may be conformed to the trainer image features for comparison and overlaying purposes. In other embodiments, the construct comprises a tessellated construct, again capable of being scaled so that the trainer image features may be conformed to the trainer image features for comparison and overlaying purposes. In other embodiments, the construct is a finite element construct, again capable of being scaled so that the trainer image features may be conformed to the trainer image features for comparison and overlaying purposes.

The method also includes a scaling step 112, where the trainee and/or trainer constructs are scaled to correspond to each other on an image by image basis. The scaling adjusts corresponding features in the trainee images to corresponding features in the trainer images. For example, the trainee body is scaled to conform to the trainer body so that the movement of the trainee and trainer may be compared. As the images are captured over time, the scaling may include both spatial and temporal scaling. The method also includes a comparing step 114, where the scaled trainee and trainer constructs are compared on an image by image basis and where comparison is on a feature by feature basis as well. The method also includes a determining step 116, where differences between the features on an image by image basis are generated. The method also includes a overlaying step 118, where the scaled trainee construct is overlaid onto the scaled trainer construct on an image by image basis. The method also includes a displaying step 120, where the overlaid scaled constructs are displayed on a display device to show the difference between the trainee performing the training exercise/routine/program and the trainer performing the training exercise/routine/program. The method also includes a highlighting step 126, where the differences are displayed on the display device in a highlighted format (color, shade, pulsating, or other highlighting property) as the constructs are being displayed so that the trainee and/or trainer may see the differences.

The method also include a differences test step 122, where the differences between the trainer performance on an image by image basis are analyzes to determine if the differences meet one or more minimum difference criteria such as whole body position differences on an image by image basis, body part position differences on an image by image basis, body position temporal difference on an image sequence basis, body part position temporal differences on an image sequence basis, any other differences, or any combination thereof, where the image sequence may be the entire number of captured images or image sequence or any part thereof. Additionally, the image capturing may be on any time frame from near continuous to images from a continuous capture based on a given time increment such as between a 1 millisecond time increment and a 10 second time increment or any increment therebetween. If the difference exceeds the one or more minimum difference criteria, then control is transferred along a NO path back to the capturing of the trainee image step 108. If the difference is less than or equal to the one or more minimum difference criteria, then control is transferred along a YES path to a stop step 124. While the method shows a specific sequence of steps, one or more of these steps may be performed in a different sequence or simultaneously or in any other combination provided that the end result is to provide a trainee information for correcting a trainee performance relative to a trainer performance.

Figure 1C:
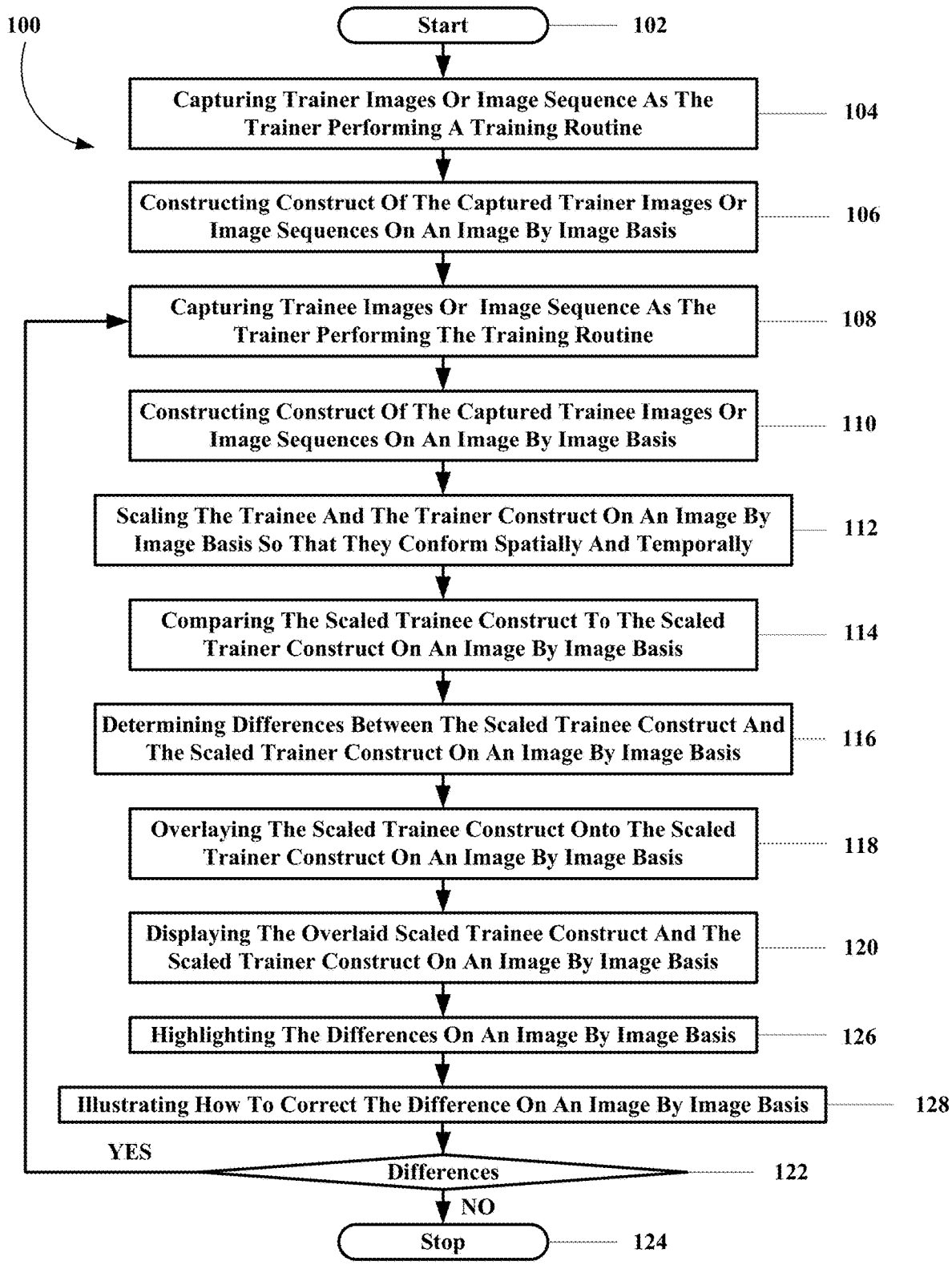
FIG. 1C depicts another embodiment of a schematic flow chart of a method of training.

Referring now to FIG. 1C, another embodiment of a schematic flow chart of a method of training, generally 100, including a start step 102. After starting, the method includes a trainer capturing step 104, where trainer images or a trainer image sequence corresponding to a trainer performing a training exercise or routine or program including, without limitation, a game such as golf, baseball, football, soccer, etc., an exercise routine, a martial art routine, a dance routine, an instrument routine, or any other training routine or program that may be captured by an imaging input device. The method also includes a trainer constructing step 106, where computer-generated trainer constructs on an image by image basis. The method also includes a trainee capturing step 108, where trainee images or a trainee image sequence corresponding to the trainee performing the training exercise or routine or program. The method also includes a trainee constructing step 110, where computer-generated trainee constructs on an image by image basis.

In certain embodiments, the construct comprises a polygon (triangles and higher polygons) construct, where all features of the images are represented by a plurality of polygons capable of being scaled so that the trainer image features may be conformed to the trainer image features for comparison and overlaying purposes. In other embodiments, the construct comprises a tessellated construct, again capable of being scaled so that the trainer image features may be conformed to the trainer image features for comparison and overlaying purposes. In other embodiments, the construct is a finite element construct, again capable of being scaled so that the trainer image features may be conformed to the trainer image features for comparison and overlaying purposes.

The method also includes a scaling step 112, where the trainee and/or trainer constructs are scaled to correspond to each other on an image by image basis. The scaling adjusts corresponding features in the trainee images to corresponding features in the trainer images. For example, the trainee body is scaled to conform to the trainer body so that the movement of the trainee and trainer may be compared. As the images are captured over time, the scaling may include both spatial and temporal scaling. The method also includes a comparing step 114, where the scaled trainee and trainer constructs are compared on an image by image basis and where comparison is on a feature by feature basis as well. The method also includes a determining step 116, where differences between the features on an image by image basis are generated. The method also includes a overlaying step 118, where the scaled trainee construct is overlaid onto the scaled trainer construct on an image by image basis. The method also includes a displaying step 120, where the overlaid scaled constructs are displayed on a display device to show the difference between the trainee performing the training exercise/routine/program and the trainer performing the training exercise/routine/program. The method also includes a highlighting step 126, where the differences are displayed on the display device in a highlighted format (color, shade, pulsating, or other highlighting property) as the constructs are being displayed so that the trainee and/or trainer may see the differences. The method also includes an illustrating step 128, where the apparatuses, systems, and/or interfaces are implemented so that they may illustrate how a trainee may adjust body and/or body part positioning in each image or over a sequence of images so that the trainee may see how to adjust to minimize the highlighted differences.

The method also include a differences test step 122, where the differences between the trainer performance on an image by image basis are analyzes to determine if the differences meet one or more minimum difference criteria such as whole body position differences on an image by image basis, body part position differences on an image by image basis, body position temporal difference on an image sequence basis, body part position temporal differences on an image sequence basis, any other differences, or any combination thereof, where the image sequence may be the entire number of captured images or image sequence or any part thereof. Additionally, the image capturing may be on any time frame from near continuous to images from a continuous capture based on a given time increment such as between a 1 millisecond time increment and a 10 second time increment or any increment therebetween. If the difference exceeds the one or more minimum difference criteria, then control is transferred along a NO path back to the capturing of the trainee image step 108. If the difference is less than or equal to the one or more minimum difference criteria, then control is transferred along a YES path to a stop step 124. While the method shows a specific sequence of steps, one or more of these steps may be performed in a different sequence or simultaneously or in any other combination provided that the end result is to provide a trainee information for correcting a trainee performance relative to a trainer performance.

In certain embodiments, the trainee performance steps are repeated until a stop function is invoked using an input device or the differences are less than or equal to the one or more difference criteria, which may be the same or different from the image capture device or the differences satisfy at least one completion criteria, where the criteria may comprise conformity or substantially conformity between the trainee scaled construct and the trainer scaled construct on an image by image basis and feature by feature basis or the at least one completion criteria comprise minimizing one, some or all of differences as evidenced by changes in the differences upon repeating the exercise being less than a minimal value. In certain embodiments, the minimal values are less than or equal to 5%, less than or equal to 2.5%, less than or equal to 2%, or less than or equal to 1%. For example, if the training exercise is a golf swing, then the features may include the club and the body and the differences may include the club and hand placement, swing propagation, club angle changes, hand, arm, shoulder, back, hip and leg motion, and/or follow through. All such differences may be highlighted during the play back. By repeating the exercise, the trainee may correct the highlighted differences until the differences are below or completion criteria or minimized.

In these embodiments, the trainee may repeat the entire routine or any part of the routine and in fact the method may suggest which part of the routine to focus on and repeat. The method of repeating the trainee performance may be customized to each trainee based on the trainee proclivities and learning process visual, auditory, etc.

Embodiment Interacting with nD Environments
Using Multiple User Feedback Devices Referring now to FIG. 2, another embodiment of systems, apparatuses, and/or interfaces using two user feedback devices, generally as 200, is shown to include a 3D environment 202 displayed on a display device 204. The 3D environment 202 include a plurality of objects distributed throughout the 3D environment. Here, the objects include a wall type object 206, a large cylindrical type object 208, a small cylindrical type object 210, a large box type object 212, a small box type object 214, a table chair 216, a table 218, a tea pot 220, and a chair 222. The display device 204 also includes a display cursor 224. The entire 3D environment 202 is viewable through a pair of eye/head tracking glasses (not shown). The two user feedback devices 200 may be a standard display device and an eye/head tracking device capable of displaying an image.

When viewed through the eye/head tracking device, a virtual interactive controller 250 appears superimposed on the environment 202 and an eye/heading tracking cursor 252 also appears superimposed on the environment 202. The controller 250 also includes a motion control area 270 and a 3D environment object control area 290. The area 270 includes five bands 272a-e. The bands 272a-e are divided into three zones 274a-c resulting in 15 subzones labeled from upper left to lower right with the following designations: FwF-L, FwS-L, L, BwS-L, BwF-L, FwF, FwS, DZ, BwS, BwF, FwF-R, FwS-R, L, BwS-R, and BwF-R. Fw means forward. Bw means backward. L means left and R means right.

The subzones FwF-L, FwS-L, L, BwS-L, BwF-L, FwF-R, FwS-R, L, BwS-R, and BwF-R are all relative zones. If the subzones FwF-L, FwS-L, L, BwS-L, BwF-L, FwF-R, FwS-R, L, BwS-R, and BwF-R are panning zones, then the closer the cursors 252 is to the left edge of the FwF-L, FwS-L, L, BwS-L, and BwF-L subzones or right edge of the FwF-R, FwS-R, L, BwS-R, and BwF-R subzones, the faster the systems pan left or right through the environment 202, while the closer to the zones FwF, FwS, DZ, BwS, or BwF, the slower the systems pans left or right through the environment 202. It should be recognized that positioning the cursors 224 and/or 252 within one of these subzones causes the systems to move left or right and simultaneously forward or backward at the indicated rate, a fate rate, a moderate rate, or a slow rate.

Alternatively, if the subzones are rotational subzones, then the closer to banner left edge or banner right edge, the faster the environment 202 rotates about the location of the cursors 224 and/or 252, while the closer to the FwF, FwS, DZ, BwS, and BwF subzones, the slower the rotation of the environment 202 about the location.

The FwF, FwS, DZ, BwS, or BwF subzones are not relative zones, but are zones that move forward or backward within the environment 202. The DZ subzone is a dead zone, meaning that locating the cursors 264 and/or 252 in this subzone causes the systems to stop all movement within the environment 202. Positioning the cursors 224 and/or 252 within the FwF subzone causes the systems to move the forward through the environment 202 at a fast rate, while positioning the cursors 224 and/or 252 within the BwF subzone causes the systems to move the backward through the environment 202 at a fast rate. Positioning the cursors 224 and/or 252 within the FwS subzone causes the systems to move the forward through the environment 202 at a slow rate, while positioning the cursors 224 and/or 252 within the BwS subzone causes the systems to move the backward through the environment 202 at a slow rate. Positioning the cursors 224 and/or 252 on the boundary of the FwF subzone and the FwS subzone causes the systems to move the forward through the environment 202 at a moderate rate, while positioning the cursors 224 and/or 252 on the boundary of the BwF subzone and the BwS subzone causes the systems to move the forward through the environment 202 at a moderate rate.

In other embodiments, the bands 272a-e may represent zoom in and zoom out controls instead of moving forwards or backwards within the 3D environment 202 without changing the aspect ratio of the view.

The 3D environment object control area 290 includes objects a through i, which corresponds to the objects in the 3D environment 202. Thus, the object a corresponds to the wall 206; the object b corresponds to the large cylinder 208; the object c corresponds to the small cylinder 210; the object d corresponds to the large box 212; the object e corresponds to the small box 214; the object f corresponds to the table chair 216; the object g corresponds to the table 218; the object h corresponds to the tea pot 220; and the object i corresponds to the chair 208. By moving the cursors 224 and/or 252 into the area 290, the systems may invoke a scroll function that scrolls through the object, with a subsequent movement of the cursors 224 and/or 252 selects a particular object. Once selected, the attributes associated with the corresponding 3D environment object may be selected and changed by motion as set forth herein.

Embodiment Interacting with nD Environments
Using Multiple User Feedback Devices Referring now to FIG. 3A, another embodiment of systems, apparatuses, and/or interfaces using two user feedback devices, generally 300, is shown to include a 3D environment 302 displayed on a display device 304 including a display cursor 306. The 3D environment 302 include a plurality of objects a through jj distributed throughout the 3D environment 302. The objects a-jj are represented here by spheres for convenience, but may actually be any type of object. The entire 3D environment 302 is viewable through a pair of eye/head tracking glasses (not shown). The two user feedback devices 200 may be a standard display device and an eye/head tracking device capable of displaying an image.

When viewed through the eye/head tracking glasses, a virtual motion control area 350, a virtual object control area 370, and an eye/heading tracking cursor 352 all appear superimposed on the environment 302. The area 350 includes nine zones 354a-i, while the area 370 includes selectable objects a-jj, which correspond to the 3D environment objects a-jj.

The zone 354a is a dead zone so that when the cursor 306 and/or 352 is moved into the zone 354a, the systems cause all movement within the 3D environment 302 to stop.

The zones 354b-e are pure relative motion zones meaning that positioning the cursor 306 and/or 352 within one of these zones causes the systems to move through the environment 302 in the indicated direction. For example, positioning the cursors 306 and/or 352 in the zone 354b causes the systems to move left at a rate determined by how close the cursors 306 and/or 352 is to the left edge of the banner 350. If the cursors 306 and/or 352 is close to the left edge, then the systems move through the environment 302 at a fast rate; while if the cursors 306 and/or 352 is close to the dead zone 354a, then the rate is slow. Positioning the cursors 306 and/or 352 in any of the other pure relative motion zones 354c-e causes the systems to move through the environment 302 similarly.

The relative motion zones 354f-i are simultaneous or compound relative motion zones meaning that positioning the cursors 306 and/or 352 causes the systems to move through the environment 302 in the indicated directions. For example, positioning the cursors 306 and/or 352 in the zone 354f causes the systems to move left and forward through the environment 302 at a rate determined by how close the cursors 306 and/or 352 is to the top/left corner. If the cursors 306 or 352 is close to top/left corner, then the systems move through the environment 302 to the left and forward at a fast rate; while if the cursors 306 and/or 352 is close to the dead zone 354a (bottom/right corner), then the left/forward motion rate is slow. Positioning the cursors 306 and/or 352 in any of the other compound relative motion zones 354g-i causes the systems to move through the environment 302 similarly.

The area 370 is a selection area so that when the cursors 306 and/or 352 is positioned within the area 370. Once inside the area 370, movement toward any direction will permit the user to select from the objects. If the direction is aligned with more than one selectable object, then the systems will cause those objects to be highlighted or draw to or pushed away from the cursors 306 or 352 so that further movement will result in discrimination between the possible selectable objects as set forth herein.

Referring now to FIG. 3B, another embodiment of systems, apparatuses, and/or interfaces using two user feedback devices, generally 300, is shown to include a 3D environment 302 displayed on a display device 304 including a display cursor 306. The 3D environment 302 include a plurality of objects a through jj distributed throughout the 3D environment 302. The objects a-jj are represented here by spheres for convenience, but may actually be any type of object. The entire 3D environment 302 is viewable through a pair of eye/head tracking glasses (not shown).

When viewed through the eye/head tracking glasses, a virtual motion control area 350, a virtual object control area 370, and an eye/heading tracking cursor 352 all appear superimposed on the environment 302. The area 350 includes nine zones 354a-i, where the zones 354b-i are all 3D relative control zones meaning that positioning the cursor 306 or 352 within any of these zones causes the systems to move in two or three directions simultaneously. The area 370 includes selectable objects a-jj, which correspond to the 3D environment objects a-jj.

The zone 354a is a dead zone so that when the cursors 306 and/or 352 is moved into the zone 354a, the systems cause all movement within the 3D environment 302 to stop.

The zones 354b-e are two directional relative motion zones meaning that positioning the cursors 306 and/or 352 within one of these zones causes the systems to move up or down and left or right or forward or backward through the environment 302. For example, positioning the cursors 306 or 352 in the zone 354b causes the systems to move left and up or down at a rate determined by how close the cursors 306 and/or 352 is to the left edge, top edge, bottom edge, right edge of the zone 354b. If the cursors 306 and/or 352 is close to the left/top edge, then the systems move through the environment 302 at a fast rate up and to the left move up pan left; while if the cursors 306 and/or 352 is close to the right/bottom edge or near the dead zone 354a, then the rate is up and left is slow move up and pan left at a slow rate. Positioning the cursors 302 and/or 352 in any of the other two directional relative motion zones 354c-e causes the systems to move through the environment 302 similarly.

The zones 354f-i are three directional relative motion zones meaning that positioning the cursors 306 or 352 causes the systems to move through the environment 302 in the three directions simultaneously. For example, positioning the cursors 306 and/or 352 in the zone 354f causes the systems to move left, forward, and up or down through the environment 302 at a rate determined by how close the cursors 306 and/or 352 is to the one of the edges or corners. If the cursors 306 and/or 352 is close to top/left corner, then the systems move through the environment 302 to the left, forward, and up at a fast rate; while if the cursors 306 and/or 352 is close to the bottom/right corner (i.e., close to the dead zone 354a), then the systems move through the environment 302 to the left, forward, and down at a slow rate. Positioning the eye/heading tracking cursors 306 or 352 in any of the other compound relative motion zones 354g-i causes the systems to move through the environment 302 similarly.

The area 370 is a selection area so that when the cursors 306 and/or 352 is positioned within the area 370, movement toward any direction will permit the user to select from the objects. If the direction is aligned with more than one selectable objects, then the systems will cause those objects to be highlighted or draw to or pushed away from the cursors 306 and/or 352 so that further movement will result in discrimination between the possible selectable object as set forth herein.

Embodiment Interacting with nD Environments Using Multiple User Feedback Devices Referring now to FIG. 4, another embodiment of systems, apparatuses, and/or interfaces using two user feedback devices, generally 400, is shown to include a 3D environment 402 displayed on a display device 404 including a display cursor 406. The 3D environment 402 includes a plurality of objects a through jj distributed throughout the 3D environment 402. The objects a-jj are represented here by spheres for convenience, but may actually be any type of object. The entire 3D environment 402 is viewable through a pair of eye/head tracking glasses (not shown).

When viewed through the eye/head tracking glasses, a virtual motion control area 450, a virtual object control area 470, and an eye/heading tracking cursor 452 all appear superimposed on the environment 402. The area 450 includes nine zones 454a-i, while the area 470 includes selectable objects a-jj, which correspond to the 3D environment objects a-jj and are arranged in a flat projection onto the area 470 in their projected positions.

The zone 454a is a dead zone so that when the cursors 406 and/or 452 is moved into the zone 454a, the systems cause all movement within the 3D environment 402 to stop.

The zones 454b-e are pure relative motion zones meaning that positioning the cursors 406 and/or 452 within one of these zones causes the systems to move through the environment 402 in the indicated direction. For example, positioning the cursors 406 and/or 452 in the zone 454b causes the systems to move left at a rate determined by how close the cursor 406 or 452 is to the left edge of the banner 450. If the cursors 406 and/or 452 is close to the left edge, then the systems move through the environment 402 at a fast rate; while if the cursors 406 and/or 452 is close to the dead zone 454a, then the rate is slow. Positioning the cursors 406 and/or 452 in any of the other pure relative motion zones 454c-e causes the systems to move through the environment 402 similarly.

The relative motion zones 454f-i are simultaneous or compound relative motion zones meaning that positioning the cursors 406 and/or 452 causes the systems to move through the environment 402 in the indicated directions. For example, positioning the cursors 406 and/or 452 in the zone 454f causes the systems to move left and forward through the environment 402 at a rate determined by how close the cursors 406 and/or 452 is to the top/left corner. If the cursor 406 or 452 is close to top/left corner, then the systems move through the environment 402 to the left and forward at a fast rate; while if the cursors 406 and/or 452 is close to the dead zone 454a (bottom/right corner), then the left/forward motion rate is slow. Positioning the cursors 406 and/or 452 in any of the other compound relative motion zones 454g-i causes the systems to move through the environment 402 similarly.

The area 470 is a selection area so that when the cursors 406 and/or 452 is positioned within the area 470. Once inside the area 470, movement toward any direction will permit the user to select from the objects. If the direction is aligned with more than one selectable object, then the systems will cause those object to be highlighted or draw to or pushed away from the cursors 406 and/or 452 so that further movement will result in discrimination between the possible selectable objects as set forth herein.

Figure 5A:
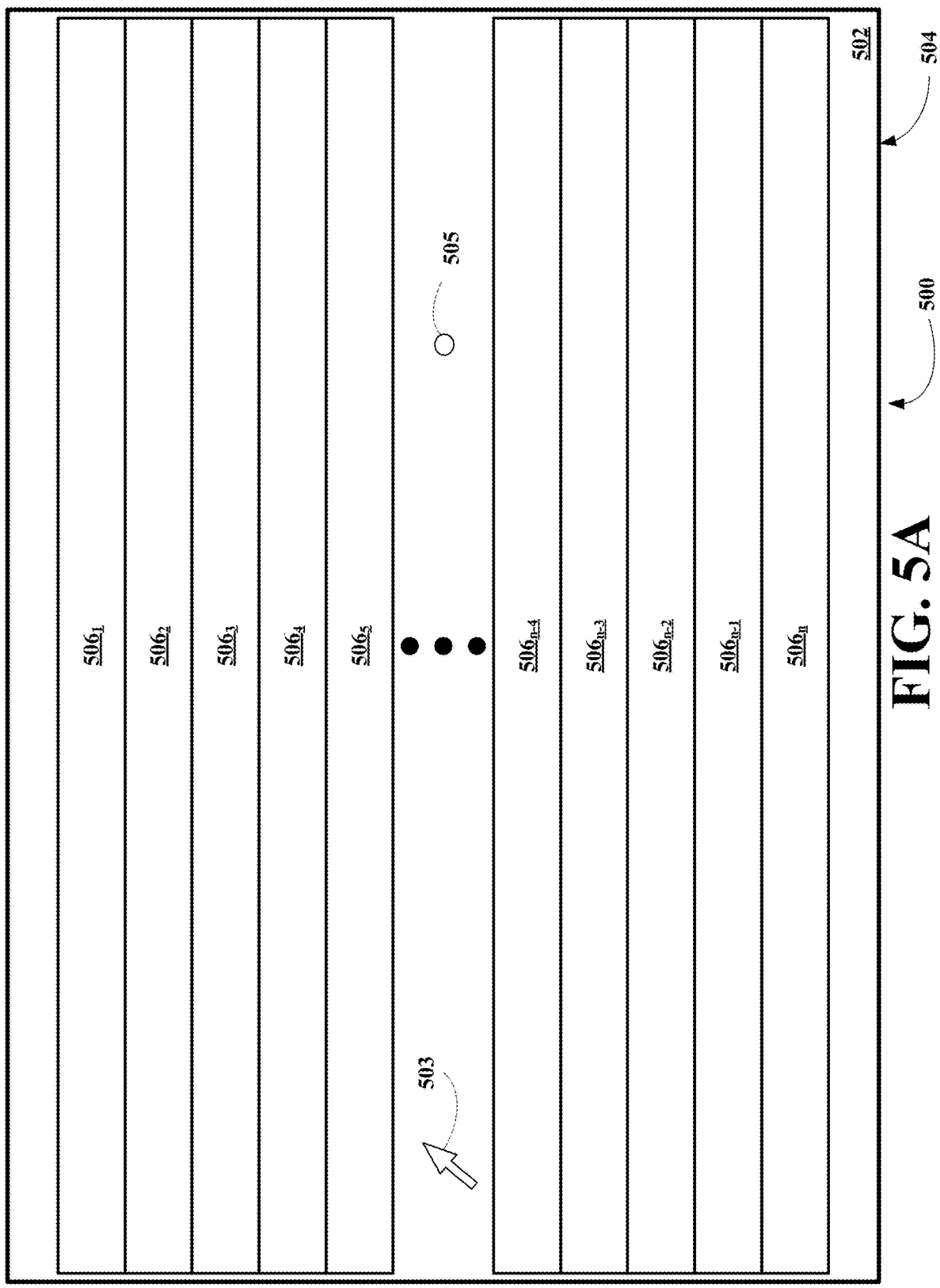
Figure 5B:
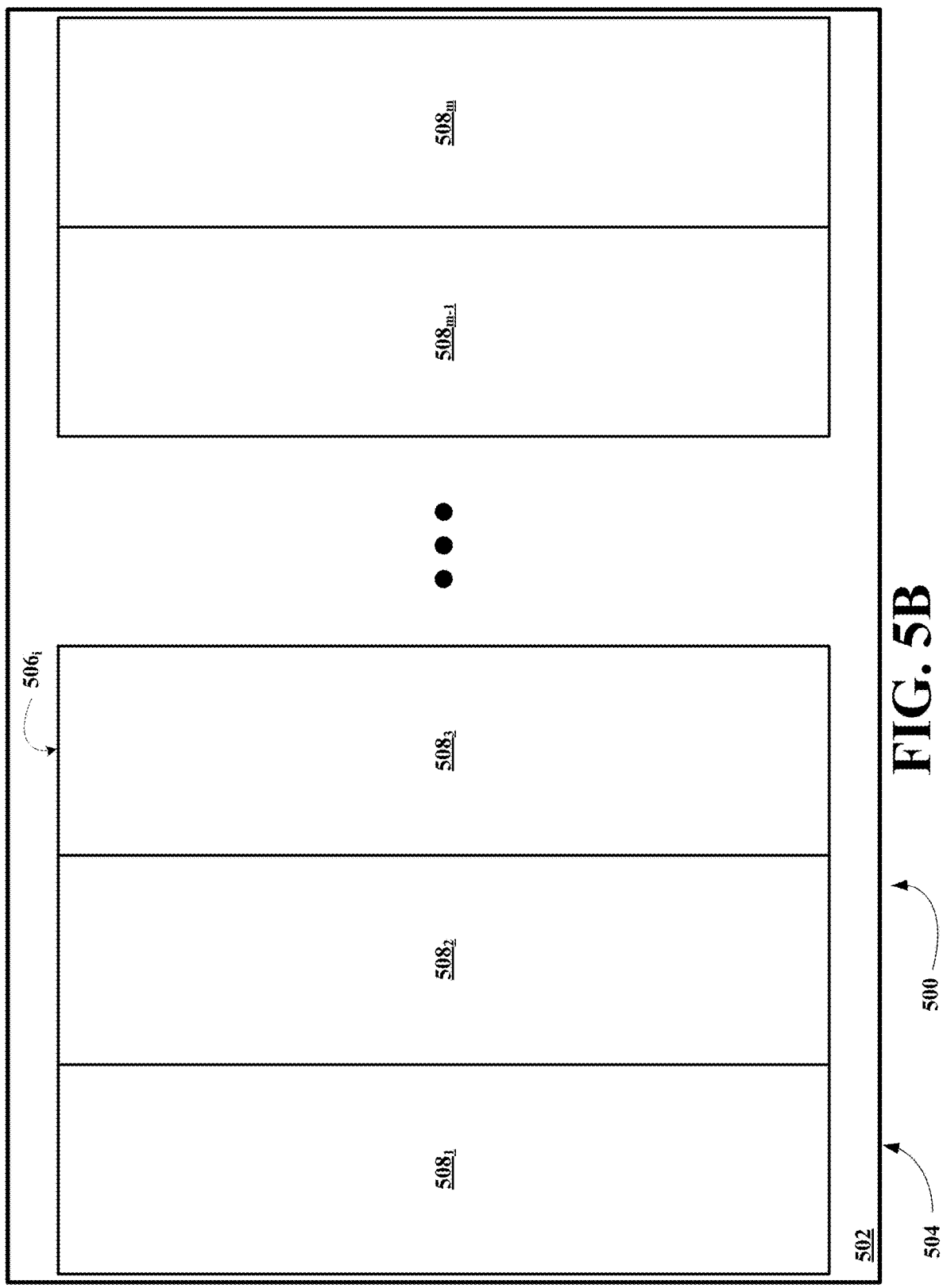
Figure 5D:
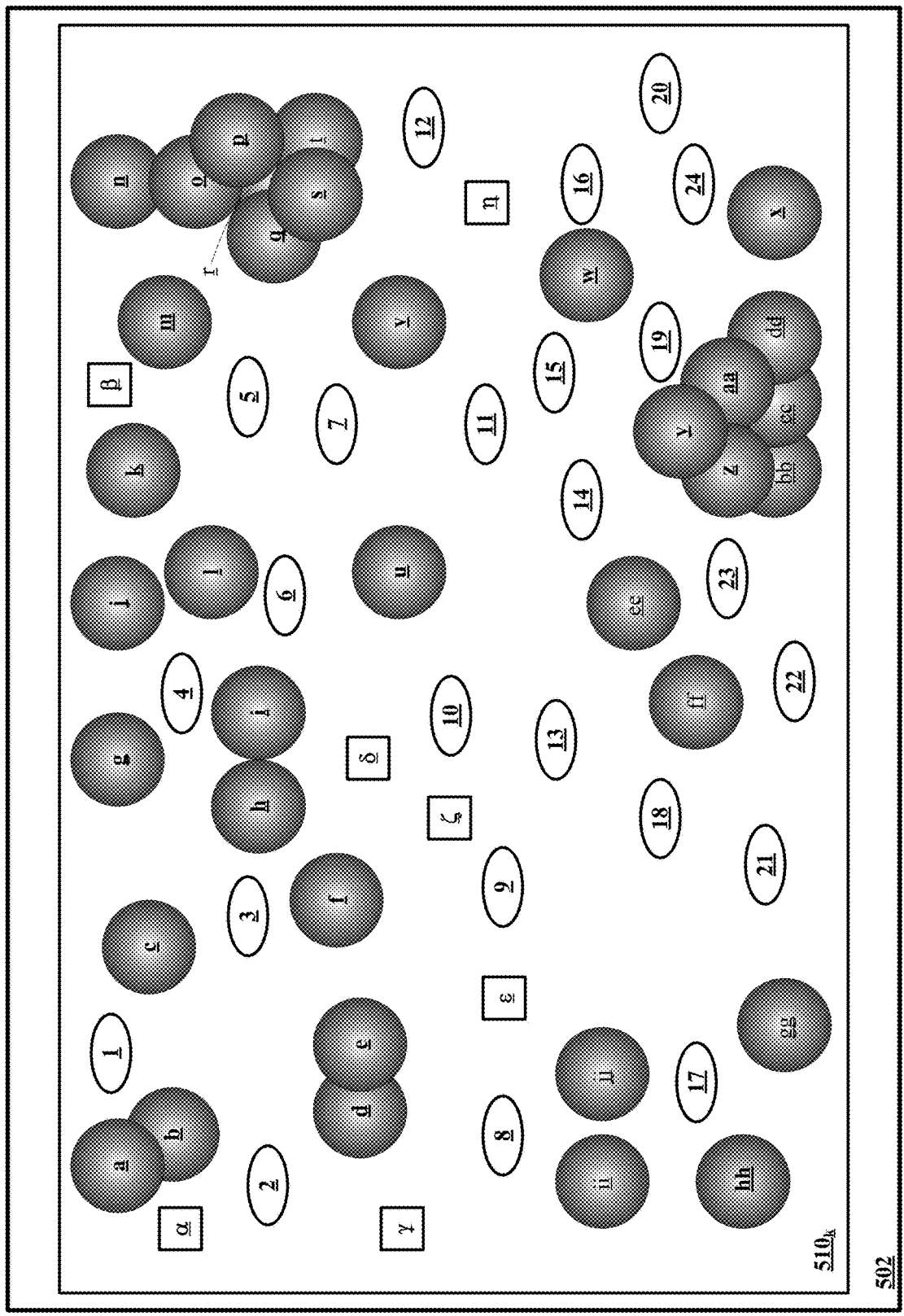

Embodiment Interacting with nD Environments Using Multiple User Feedback Devices Referring now to FIGS. 5A-D, another embodiment of systems, apparatuses, and/or interfaces using two user feedback devices, generally 500, is shown to include a 3D environment 502 displayed on a display device 504 and cursors 503 and 505. The entire 3D environment 502 includes a plurality of levels $506_{1-n}$, where n is an integer, as shown in FIG. 5A. Each level $506_i$ includes a plurality of sublevels $508_{1-m}$, where m is an integer, as shown in FIG. 5B. Each sublevel $508_j$ includes a plurality of zones $510_{1-q}$, where q is an integer, as shown in FIG. 5C. Each zone $510_k$ includes three pluralities of different type of objects a-jj, 1-24 and α, β, γ, δ, ε, ζ, and η, as shown in FIG. 5D. Traversal through the levels, sublevels, and zones may be affected using a display cursor 512 and/or a eye/head tracking cursor 514. Traversal through the levels, sublevels, and zones may use any selection methodology disclosed herein including motion only processing or using point and click methodology or other hard selection methodology. Additionally, the levels, sublevels, and/or zone may be presented as a menu or list so that any methodology of this disclosure may be used—scrolling, selecting, activating, attribute adjusting, etc. Moreover, once a zone has been selected, the eye/head tracking glasses may allow a virtual control area or areas to appear superimposed on the environment for control as set forth above.

Illustrative Virtual Training System Implementations

Geologic or Earth Teaching Embodiments

Referring now to FIGS. 6A-D, an embodiment of a system, apparatus, and/or interface of this disclosure, generally 600, illustrates a geological image and a set or plurality of hot spots or active areas used in a training routine.

Figure 6A:
Figure 6B:
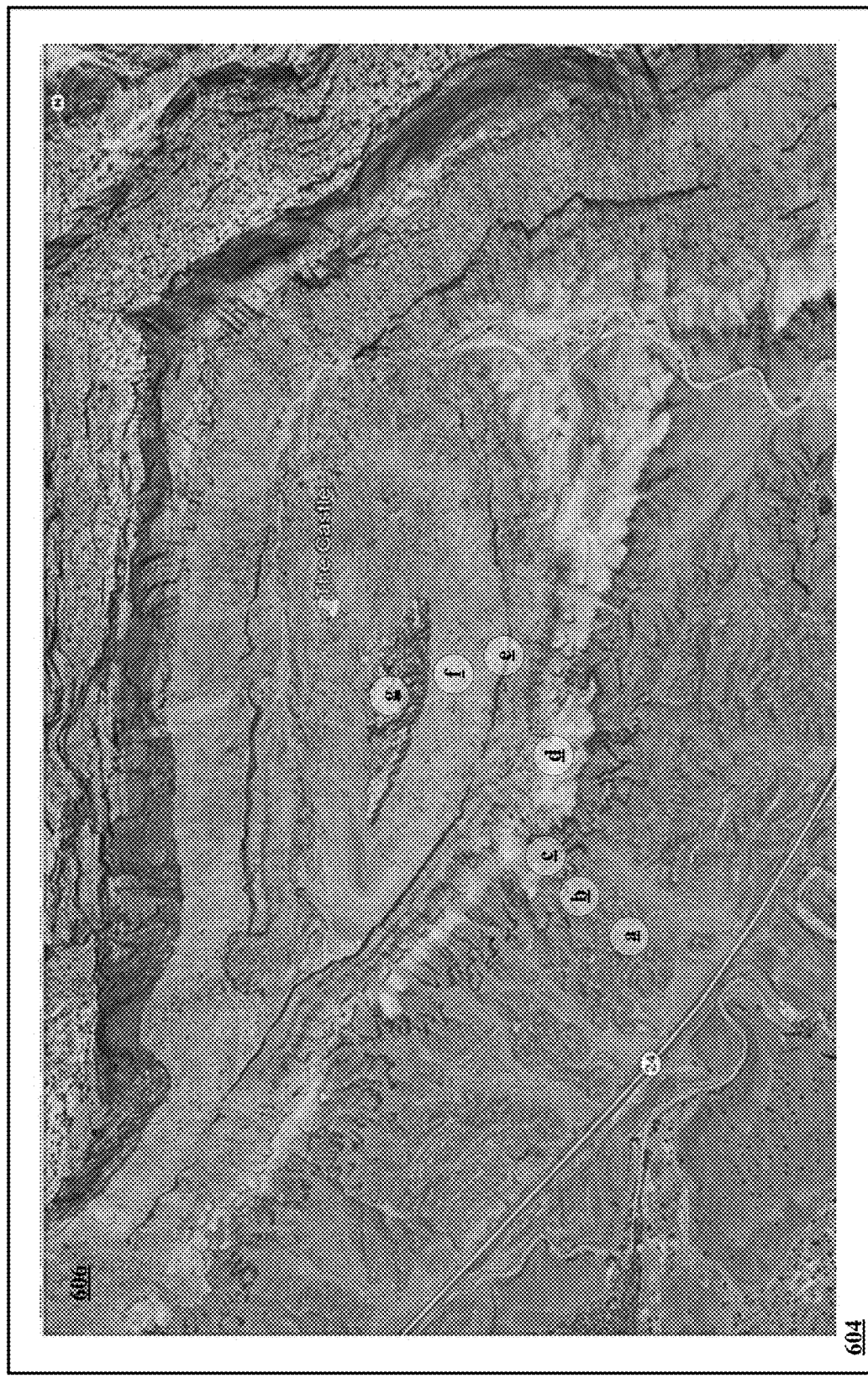

Looking at FIGS. 6A&B, the system, apparatus, and/or interface is shown to include a display device 602 and an image area 604 containing a front view of a geological image 606 and an aerial view of the geological image 606. The system, apparatus, and/or interface analyzes the image 606 and displays a set of hot spots or active areas a-g, represented by transparent circular selectable objects. The hot spots a-g are associated with certain relevant features of the geological image 606. A trainee/student may activate each of the hot spots circled a-g using any selecting procedure including motion, gestures, mouse selecting, touching, etc.

Figure 6C:
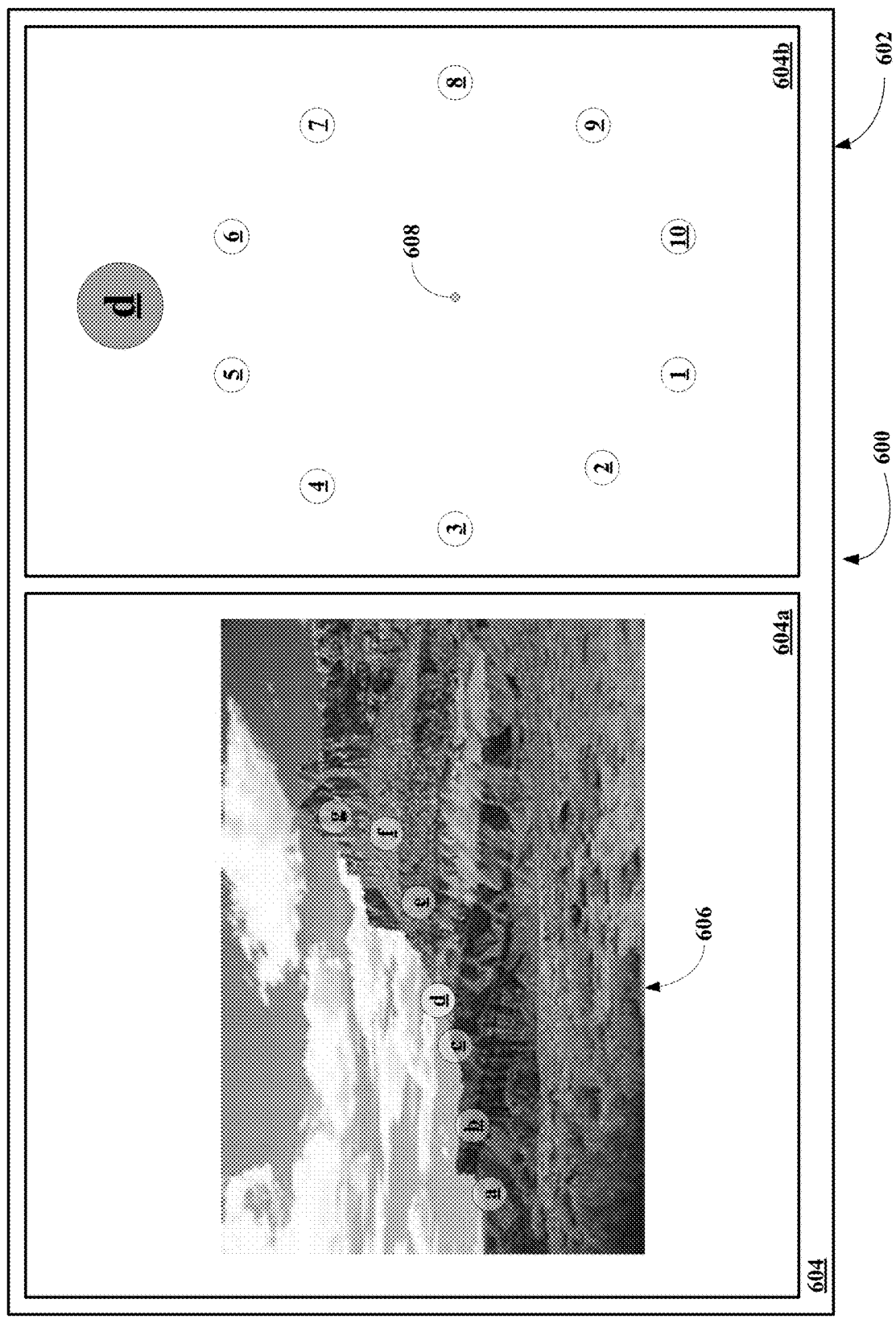

Looking at FIG. 6C, the display area 604 is split into an image display area 604a and a content display area 604b, when the trainee/student selects hot spot d indicated by the hot spot d changing color or some other attribute of the hot spot d, which also appears highlighted in the content display area 604b along with selectable content objects 1-10 associated with the hot spot d that include relevant information about the hot spot d. The selectable content objects 1-10 are shown here distributed about a central selection object 608, which may or may not be visible. Each one of the selectable objects 1-10 may include information and/or tasks that the trainee/student must master concerning the geological image 606. Of course, it should be recognized that the selectable content objects 1-10 may be distributed in any pattern within the display area 604b, including a random or ordered pattern and the number of selectable content objects may be any number from 1 to 1000 or more depending on the amount of information that may be associated with each hot spot.

Figure 6D:

Looking at FIG. 6D, in an alternate embodiment, the system, apparatus, and/or interface changes the color of the hot spot d, when selected and displays the selectable content objects 1-10 associated with the hot spot d distributed above the hot spot d. Of course, the selectable content objects 1-10 may be distributed in any pattern within the display area 604b, including a random or ordered pattern. Moreover, the non-selected hot spot a-c and e-g may disappears so that the selectable content objects 1-10 may surround the hot spot d. Selection of the selectable content objects 1-10 may be by any selection methodology.

The system, apparatus, and/or interface may also be configured to generate a 3D environment based on the geological image 606. The system, apparatus, and/or interface also associated the hot spots a-g with their associates features of the geological image 606. The trainee/student may then travel in the 3D environment changing viewpoints, looking at features, activating any of the hot spots a-g and reviewing and performing any tasks associated with the hot spots. A trainee may travel anywhere within the 3D environment. As the trainee travels through the environment, objects may be expanded and hot spots associated with different aspects of expanded components will change along with the type of information that is presented upon activating one of the hot spots. Hot spot content may also change based on the level of training and each hot spot may have training exercises associated with the feature the hot spot is associated with. The hot spots in all embodiments may provide access into any content regardless of its source so that the hot spots may allow trainees to search the web or other sites for information on a particular aspect of the component with which the hot spot is associated. The web access may be configured so that only information on that particular feature is available to the trainee. The system, apparatus, and/or interface may therefore also include a web pre-interface that acts to restrict access except to the material needed by the trainee to complete the training or to complete a given task associated with the training routine.

Aircraft Cockpit Training Embodiments

Referring now to FIGS. 7A-D, an embodiment of a system, apparatus, and/or interface of this disclosure, generally 700, illustrates to an image of an aircraft cockpit image and a set or plurality of hot spots or active areas used in a training routine.

Figure 7A:
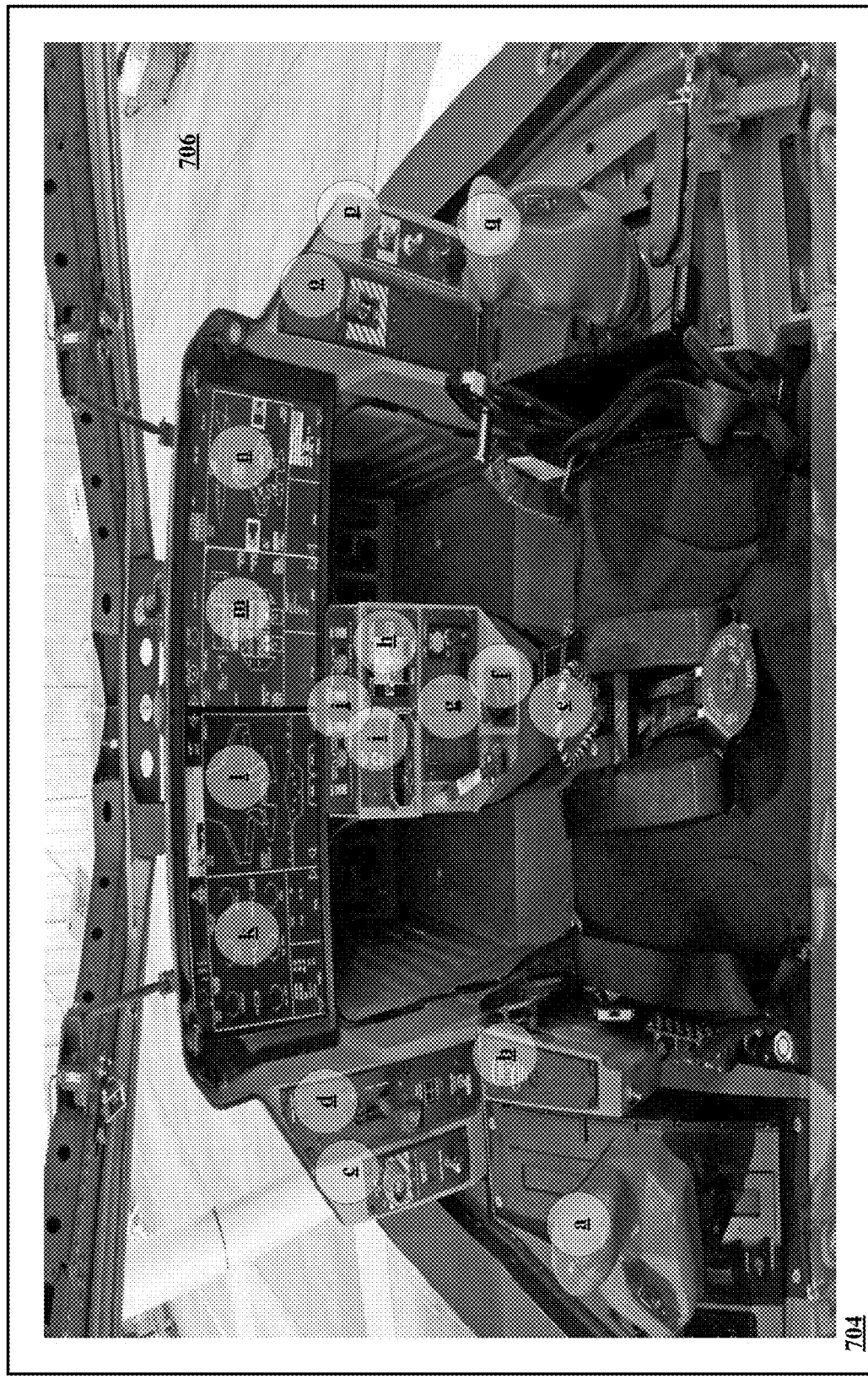

Looking at FIG. 7A, the system, apparatus, and/or interface is shown to include a display device 702 and an image area 704 containing an inside view of an aircraft cockpit image 706. The system, apparatus, and/or interface analyzes the image 706 and displays a set of hot spots or active areas a-r, represented by transparent circular selectable objects. The hot spots a-r are associated with certain relevant features of the geological image 706. A trainee/student may activate each of the hot spots circled a-r using any selecting procedure including motion, gestures, mouse selecting, touching, etc.

Figure 7B:
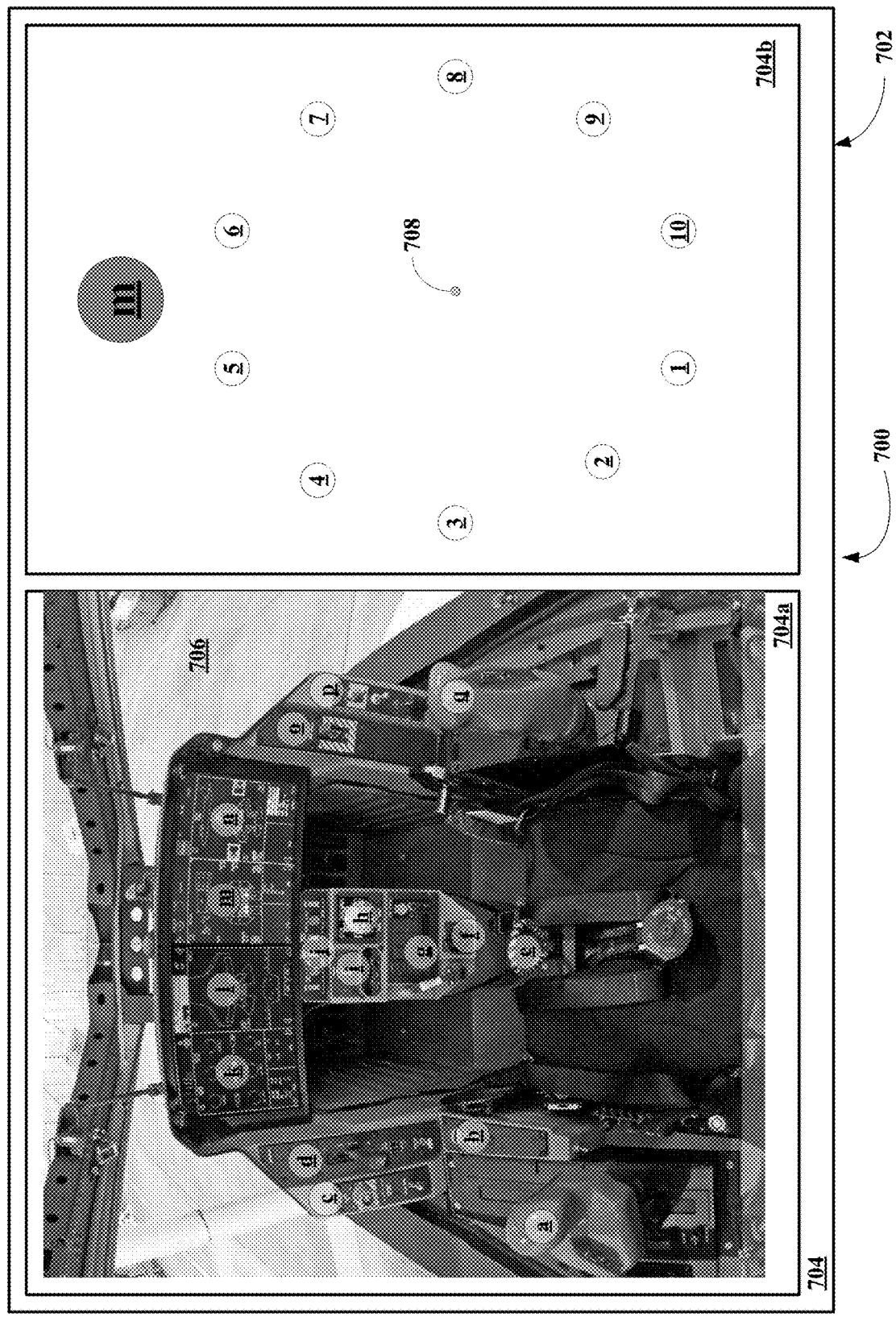

Looking at FIG. 7B, the display area 704 is split into an image display area 704*a* and a content display area 704*b*, when the trainee/student selects hot spot m indicated by the hot spot m changing color or some other attribute of the hot spot m, which also appears highlighted in the content display area 704*b* along with selectable content objects 1-10 associated with the hot spot m that include relevant information about the hot spot m. The selectable content objects 1-10 are shown here distributed about a central selection object 708, which may or may not be visible. Each one of the selectable objects 1-10 may include information and/or tasks that the trainee/student must master concerning the geological image 706. Of course, it should be recognized that the selectable content objects 1-10 may be distributed in any pattern within the display area 704*b*, including a random or ordered pattern and the number of selectable content objects may be any number from 1 to 1000 or more depending on the amount of information that may be associated with each hot spot.

Figure 7C:
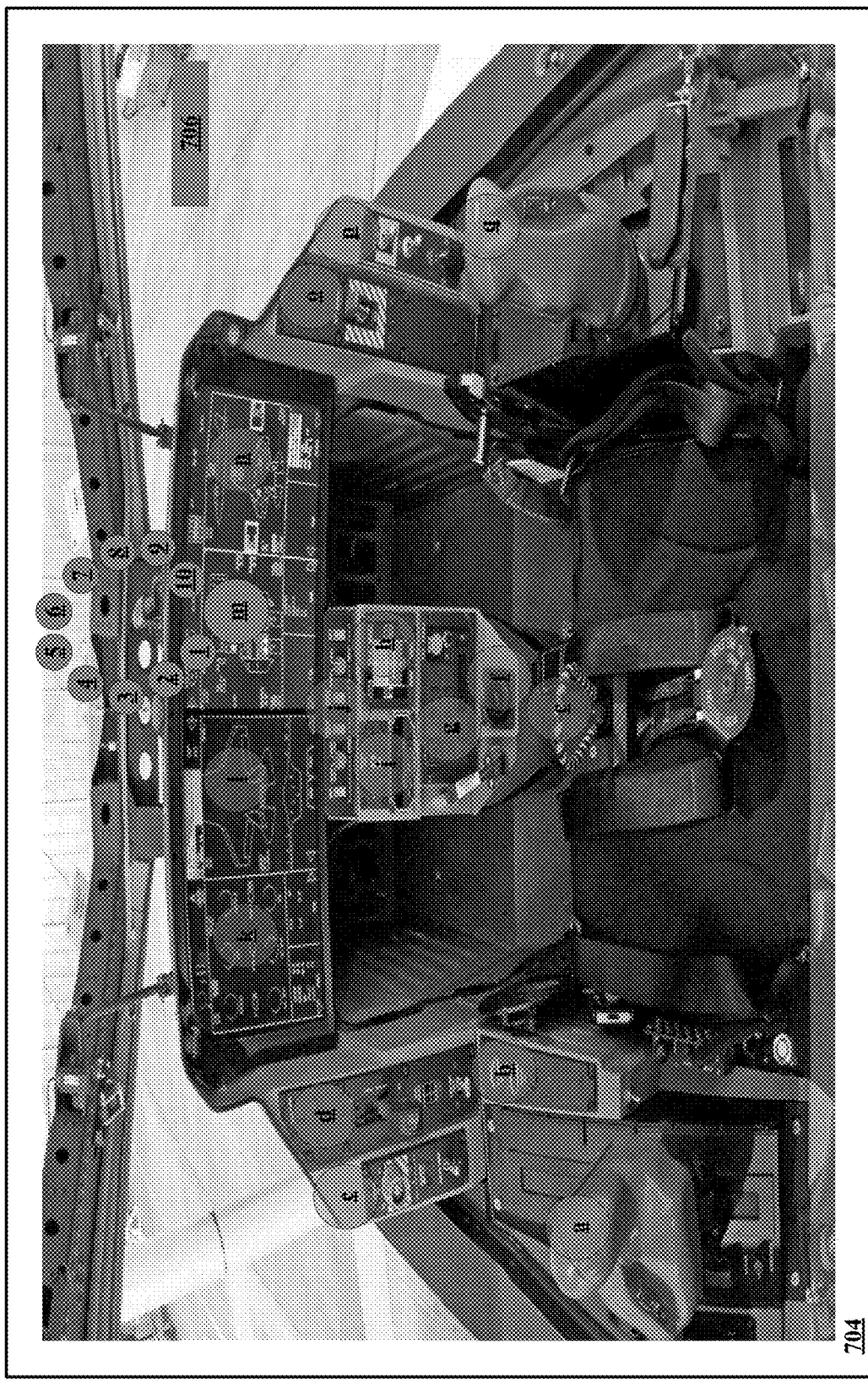

Looking at FIG. 7C, in an alternate embodiment, the system, apparatus, and/or interface changes the color of the hot spot m, when selected and displays the selectable content objects 1-10 associated with the hot spot m distributed above the hot spot m. Of course, the selectable content objects 1-10 may be distributed in any pattern within the display area 704*b*, including a random or ordered pattern. Moreover, the non-selected hot spot a-l and n-r may disappear so that the selectable content objects 1-10 may surround the hot spot m. Selection of the selectable content objects 1-10 may be by any selection methodology.

Figure 7D:
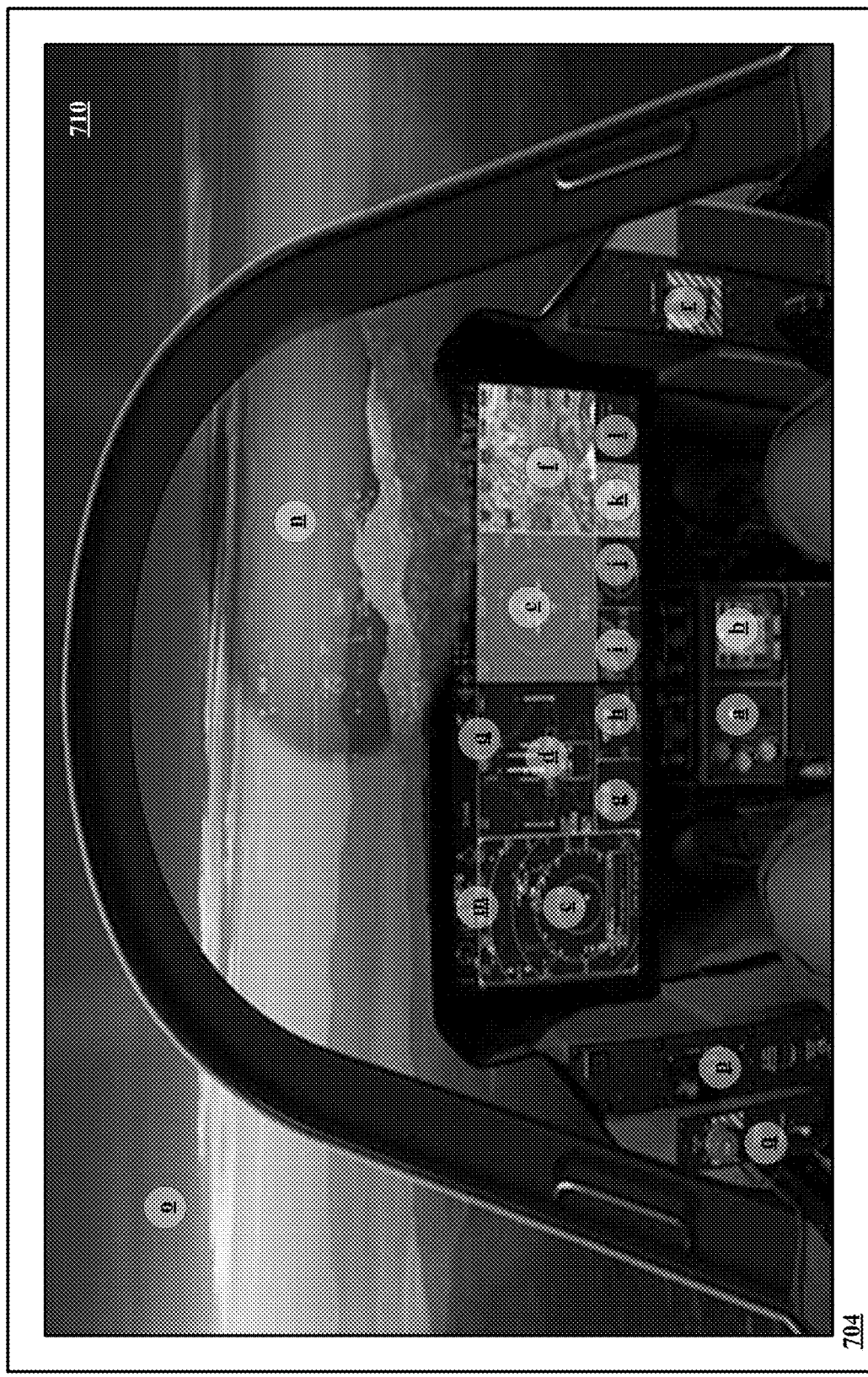

Referring now to FIG. 7D, the system, apparatus, and/or interface generates a 3D environment 710 based on the cockpit image 706. The system, apparatus, and/or interface also associates the hot spots a-r with their corresponding features in the 3D environment 710. The trainee/student may then travel in the 3D environment 710 changing viewpoints, looking at features, activating any of the hot spots a-r and reviewing associated content associated therewith and performing any tasks associated with the hot spots a-r. Again, a trainee may travel anywhere within the 3D environment. As the trainee travels through the environment, objects may be expanded and hot spots associated with different aspects of expanded components will change along with the type of information that is presented upon activating one of the hot spots. Hot spot content may also change based on the level of training and each hot spot may have training exercises associated with the feature the hot spot is associated with. The hot spots in all embodiments may provide access into any content regardless of its source so that the hot spots may allow trainees to search the web or other sites for information on a particular aspect of the component with which the hot spot is associated. The web access may be configured so that only information on that particular feature is available to the trainee. The system, apparatus, and/or interface may therefore also include a web pre-interface that acts to restrict access except to the material needed by the trainee to complete the training or to complete a given task associated with the training routine.

Biological Teaching Embodiment

Referring now to FIGS. 8A-D, an embodiment of a system, apparatus, and/or interface of this disclosure, generally 800, illustrates a prokaryotic versus eukaryotic cells image and a set or plurality of hot spots or active areas used in a training routine.

Figure 8A:
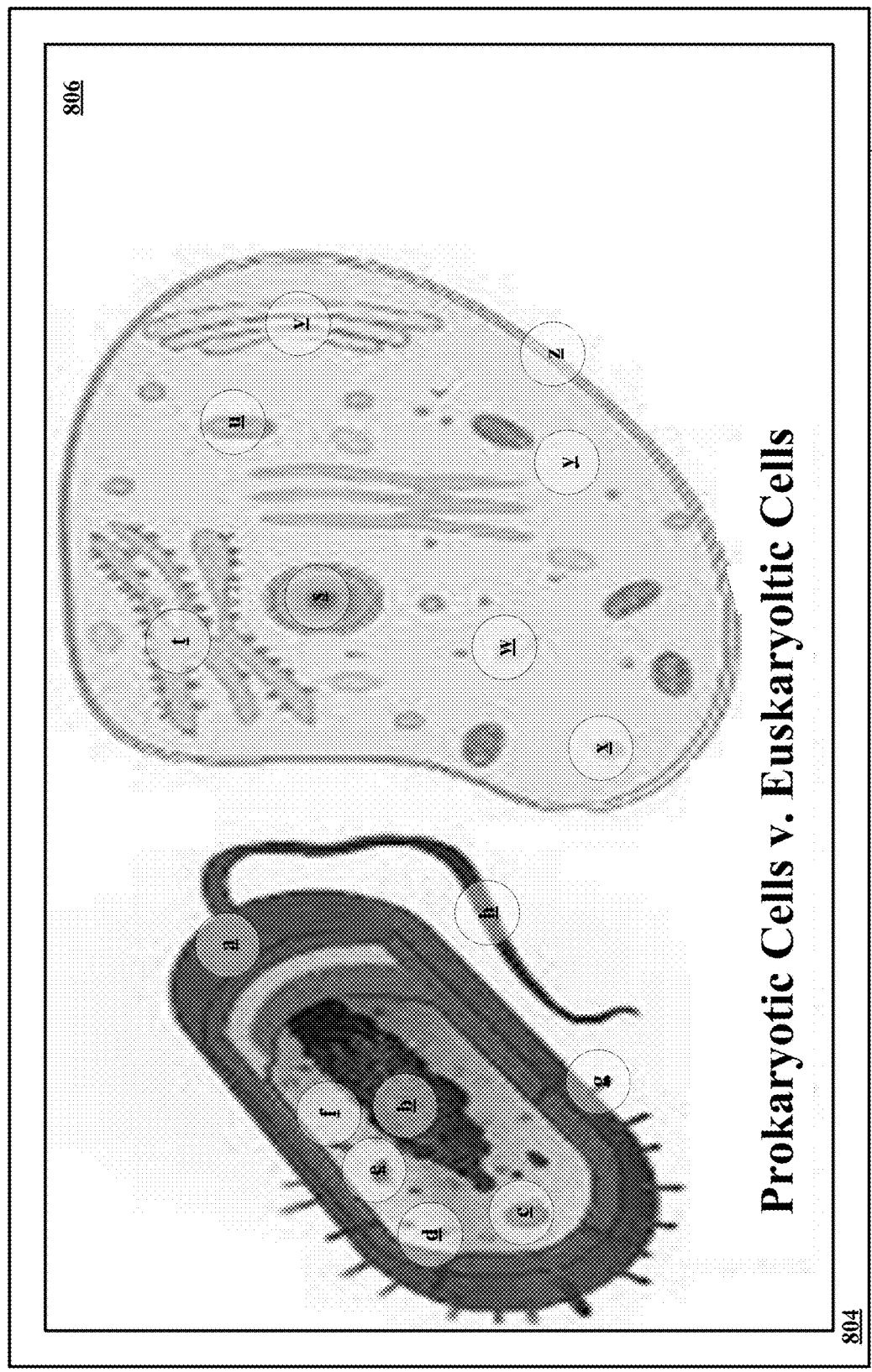

Looking at FIG. 8A, the system, apparatus, and/or interface is shown to include a display device 802 and an image area 804 containing an image 806 of a prokaryotic and eukaryotic cell side by side. The system, apparatus, and/or interface has analyzed the image 806 and hot spots a-h are generated associated with the prokaryotic cell and hot spots s-z are generated associated with the eukaryotic cell. In a like manner, the hot spots a-h and hot spots s-z are represented by transparent circled letters and are associated with relevant feature of the image 806. A trainee/student may activate each of the selectable objects using any selecting procedure including motion, gestures, mouse selecting, touching, etc.

Figure 8B:
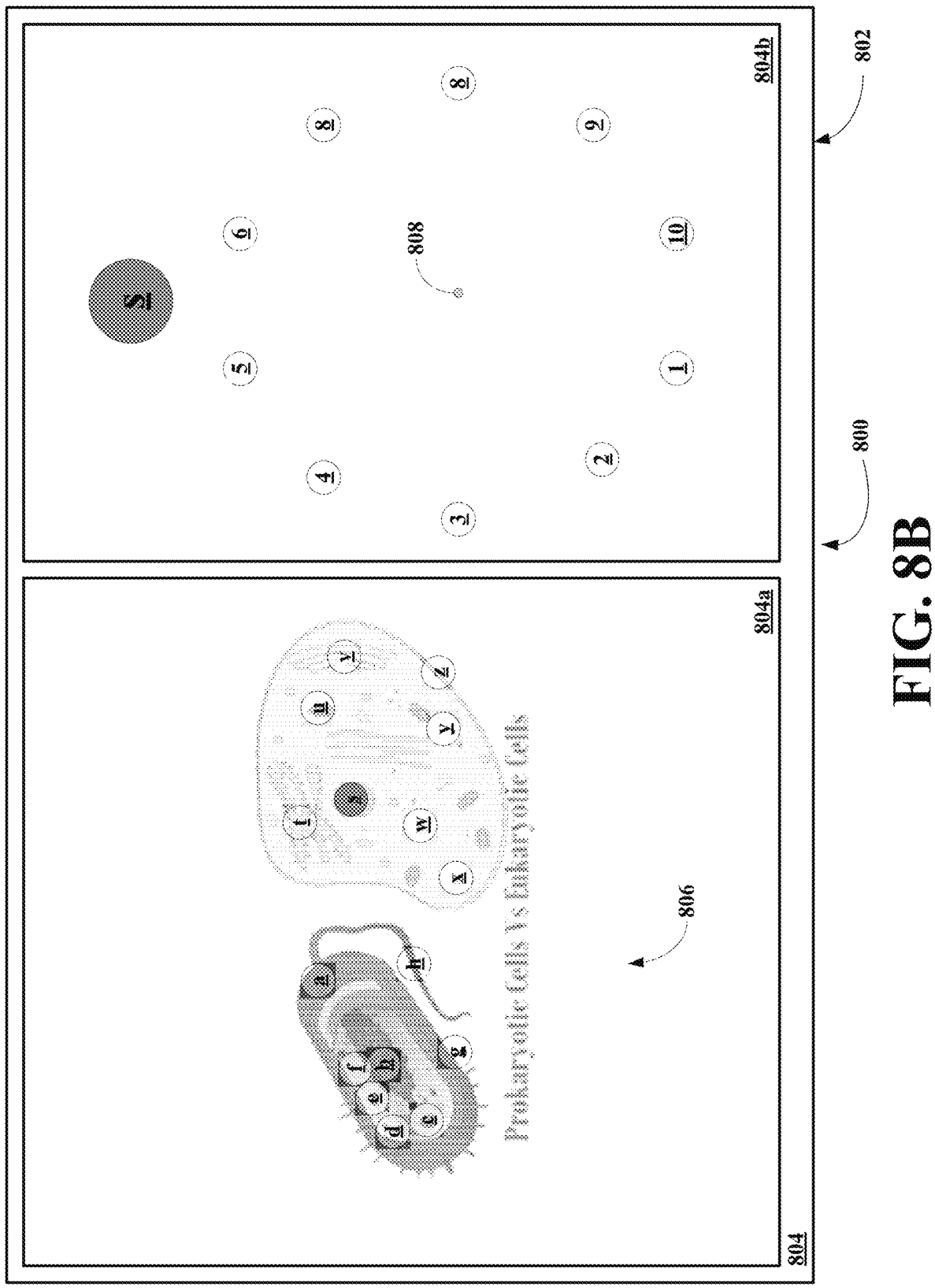

Looking at FIG. 8B, the display area 804 is split into an image display area 804*a* and a content display area 804*b*, when the trainee/student selects hot spot s associated with the eukaryotic cell and indicated by the hot spot s changing color or some other attribute of the hot spot s, which also appears highlighted in the content display area 804*b* along with selectable content objects 1-10 associated with the hot spot s that include relevant information about the hot spot s. The selectable content objects 1-10 are shown here distributed about a central selection object 808, which may or may not be visible. Each one of the selectable objects 1-10 may include information and/or tasks that the trainee/student must master concerning the geological image 806. Of course, it should be recognized that the selectable content objects 1-10 may be distributed in any pattern within the display area 804b, including a random or ordered pattern and the number of selectable content objects may be any number from 1 to 1000 or more depending on the amount of information that may be associated with each hot spot.

Figure 8C:
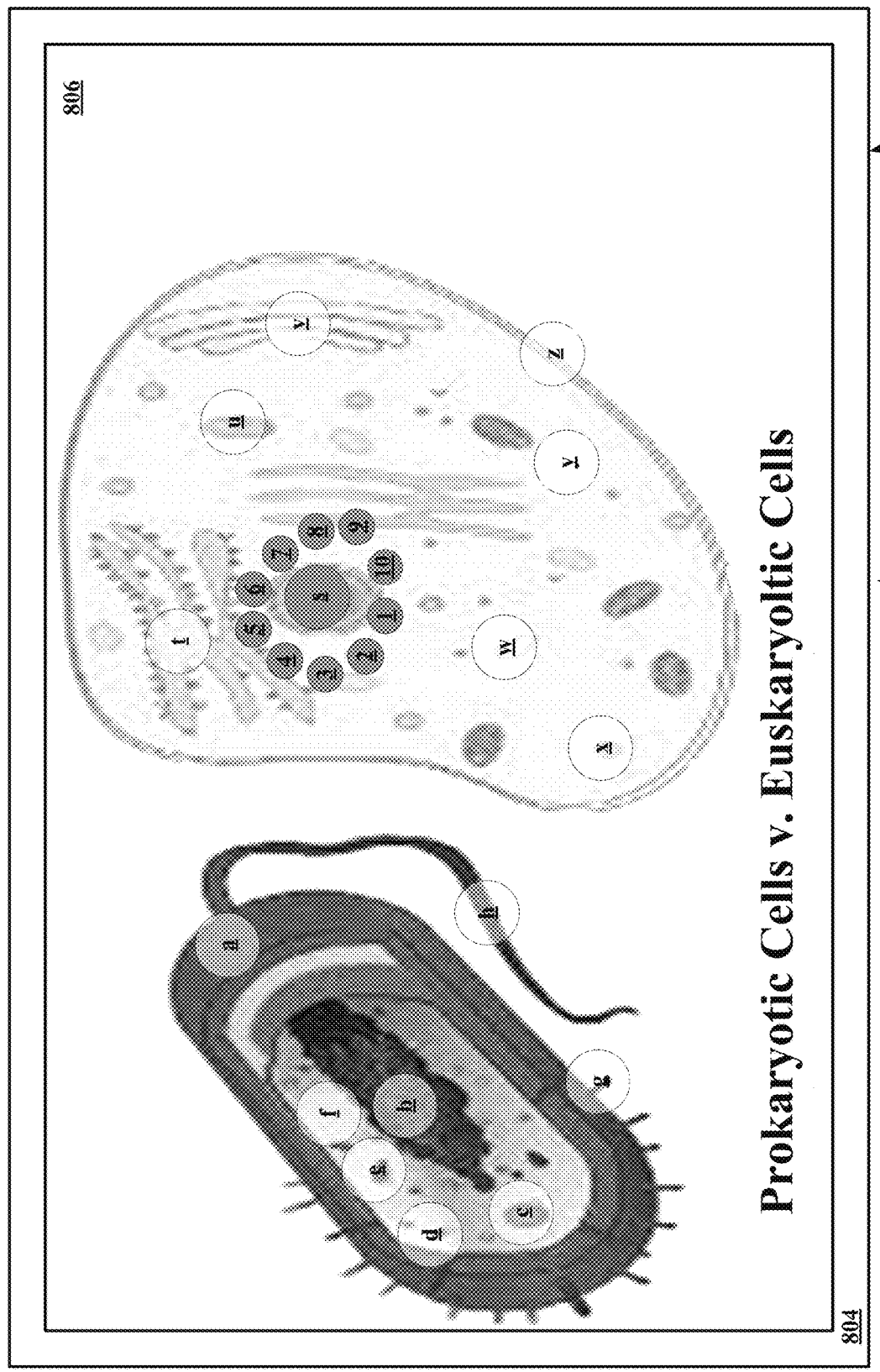

Looking at FIG. 8C, in an alternate embodiment, the system, apparatus, and/or interface changes the color of the hot spot s, when selected and displays the selectable content objects 1-10 associated with the hot spot s distributed above the hot spot s. Of course, the selectable content objects 1-10 may be distributed in any pattern within the display area 804b, including a random or ordered pattern. Moreover, the non-selected hot spot t-z may disappear so that the selectable content objects 1-10 may surround the hot spot s. Selection of the selectable content objects 1-10 may be by any selection methodology.

Figure 8D:
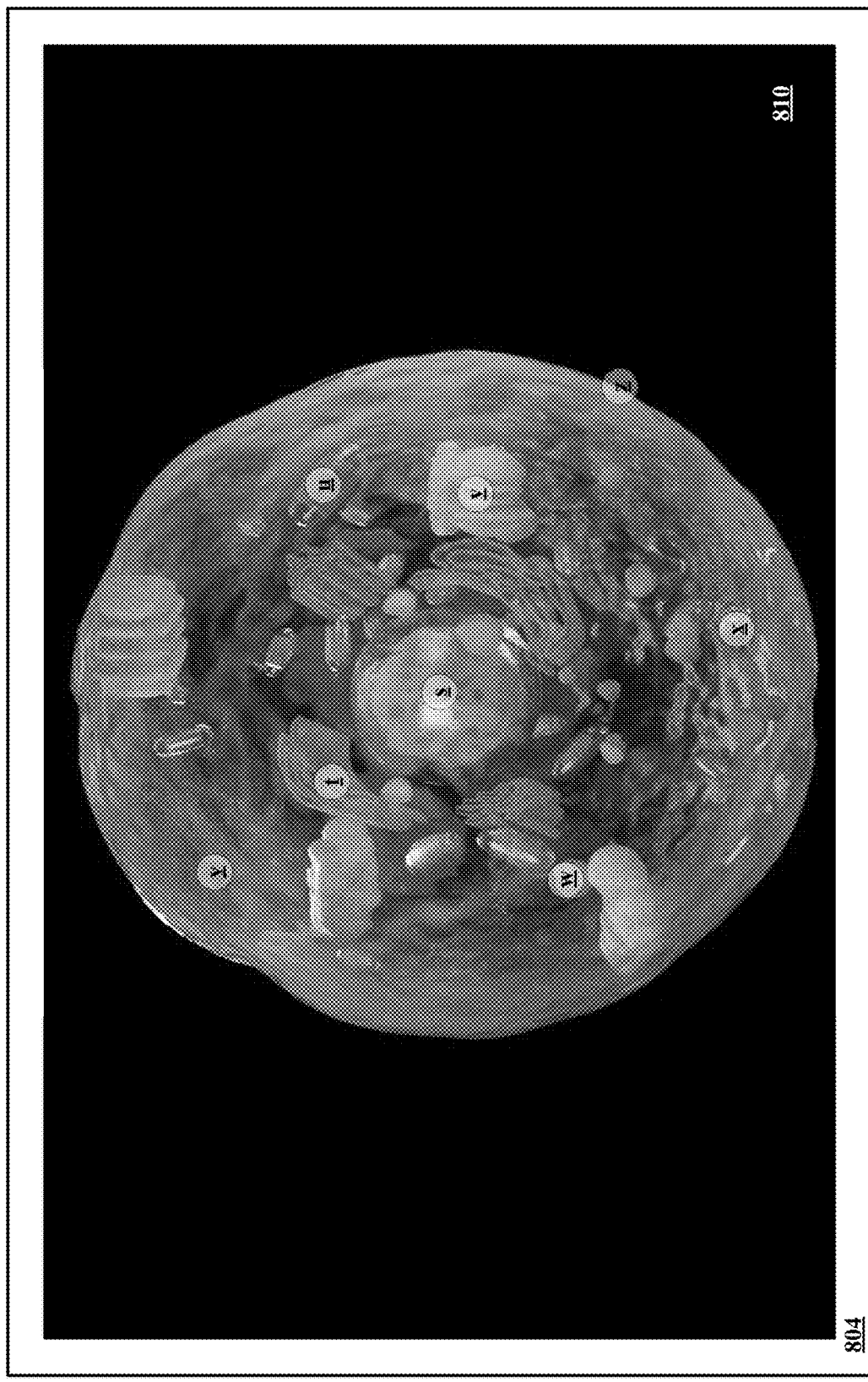

Referring now to FIG. 8D, the system, apparatus, and/or interface generates a 3D environment 810 of the eukaryotic cell of the image 806. The system, apparatus, and/or interface also associates the hot spots s-z with their corresponding features in the 3D environment 810. The trainee/student may then travel in the 3D environment 810 changing viewpoints, looking at features, activating any of the hot spots s-z and reviewing associated content associated therewith and performing any tasks associated with the hot spots s-z. Again, a trainee may travel anywhere within the 3D environment. As the trainee travels through the environment, objects may be expanded and hot spots associated with different aspects of expanded components will change along with the type of information that is presented upon activating one of the hot spots. Hot spot content may also change based on the level of training and each hot spot may have training exercises associated with the feature the hot spot is associated with. The hot spots in all embodiments may provide access into any content regardless of its source so that the hot spots may allow trainees to search the web or other sites for information on a particular aspect of the component with which the hot spot is associated. The web access may be configured so that only information on that particular feature is available to the trainee. The system, apparatus, and/or interface may therefore also include a web pre-interface that acts to restrict access except to the material needed by the trainee to complete the training or to complete a given task associated with the training routine.

Computer Repair Embodiment

Referring now to FIGS. 9A-H, an embodiment of a system, apparatus, and/or interface of this disclosure, generally 900, depicts an embodiment of a virtual computer assembly training routine. Looking at FIG. 9A, the system, apparatus, and/or interface is shown to include a display device 902 includes a computer assembly area 904 containing a desktop cabinet 906. The desktop cabinet 906 includes a motherboard receiving area 908, a power supply receiving area 910, a fan receiving area 912, a receiving unit 914 having bays 916 for CD drives, DVD drives, floppy drives, etc., and a receiving unit 918 including bays 920 for receiving hard drives. Each area 918-914 and 918 include hotpots j-n shown as the letters inside a circle. The hot spots j-n, when activated, show information about the areas and how to install their respective components. The display device 902 also include a computer component area 922 including a Power Supply, a Fan, a Motherboard, a CPU, a CD/DVD drive, a Video Card, a Hard Drive, a Sound Card, and RAM. The components include hot spots a-i shown as the letter inside a circle. The hot spots when activated discloses information about the components and how they are installed and connected to the other components. The training exercise generally starts with a video describing the assembly process. After watching the video, the system, apparatus, and/or interface creates a VR/AR/MR environment that allows a trainee to actually assemble the computer from the components. While the video may show a specific way, generally an optimal way, to assemble the computer, the trainee is free to change the order to learn why the video is optimal. The system, apparatus, and/or interface capture data as the trainee adds each component to the cabinet and then connecting the components together. The system, apparatus, and/or interface analyzes the data and evaluates the trainee at each task and provides the trainee with a proficiency score. The system, apparatus, and/or interface provides feedback to the trainee before, during and after each task and provides information as to proficiency allowing the trainee to repeat tasks until the trainee achieves a desired proficiency.

Figure 9A:
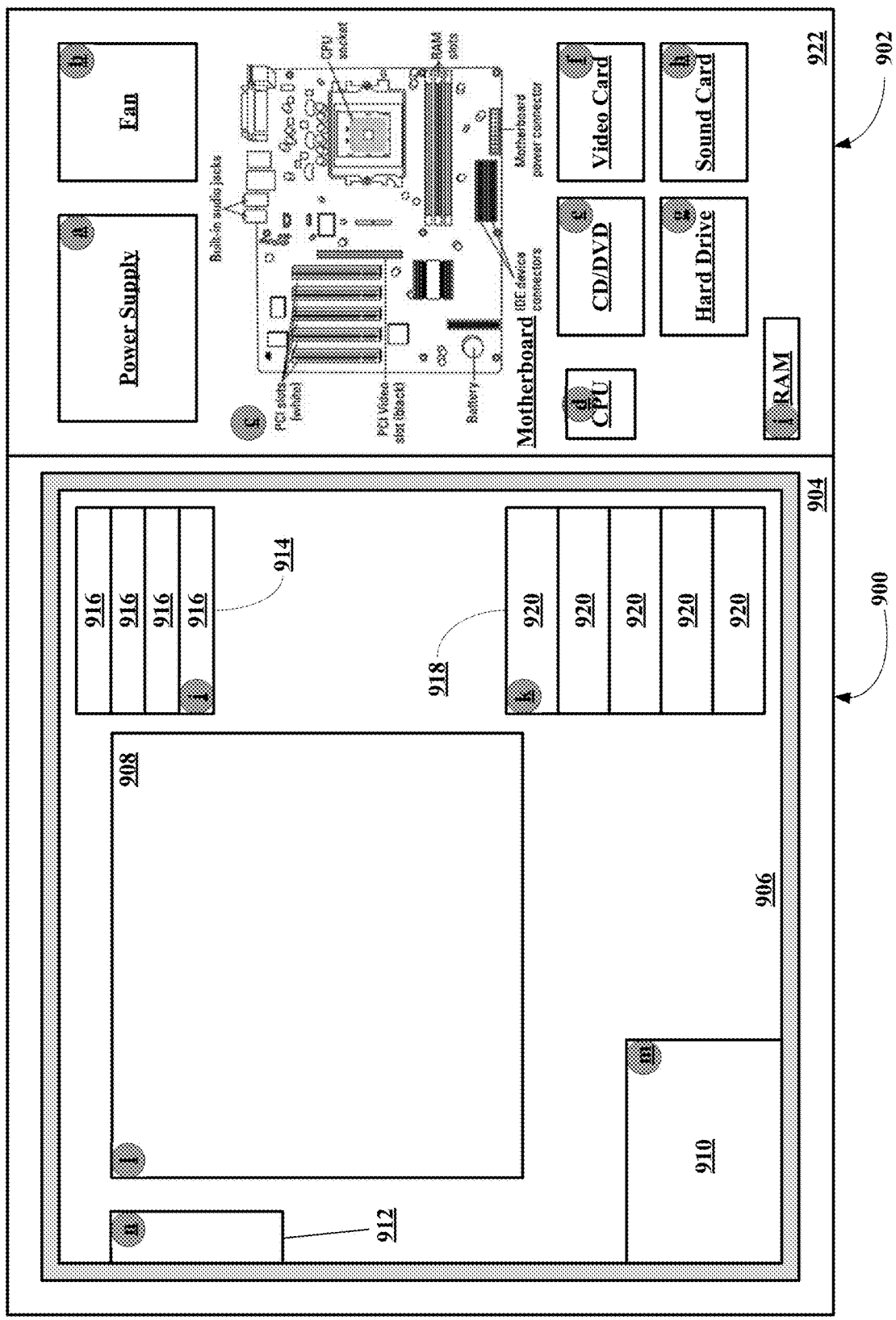
Figure 9B:
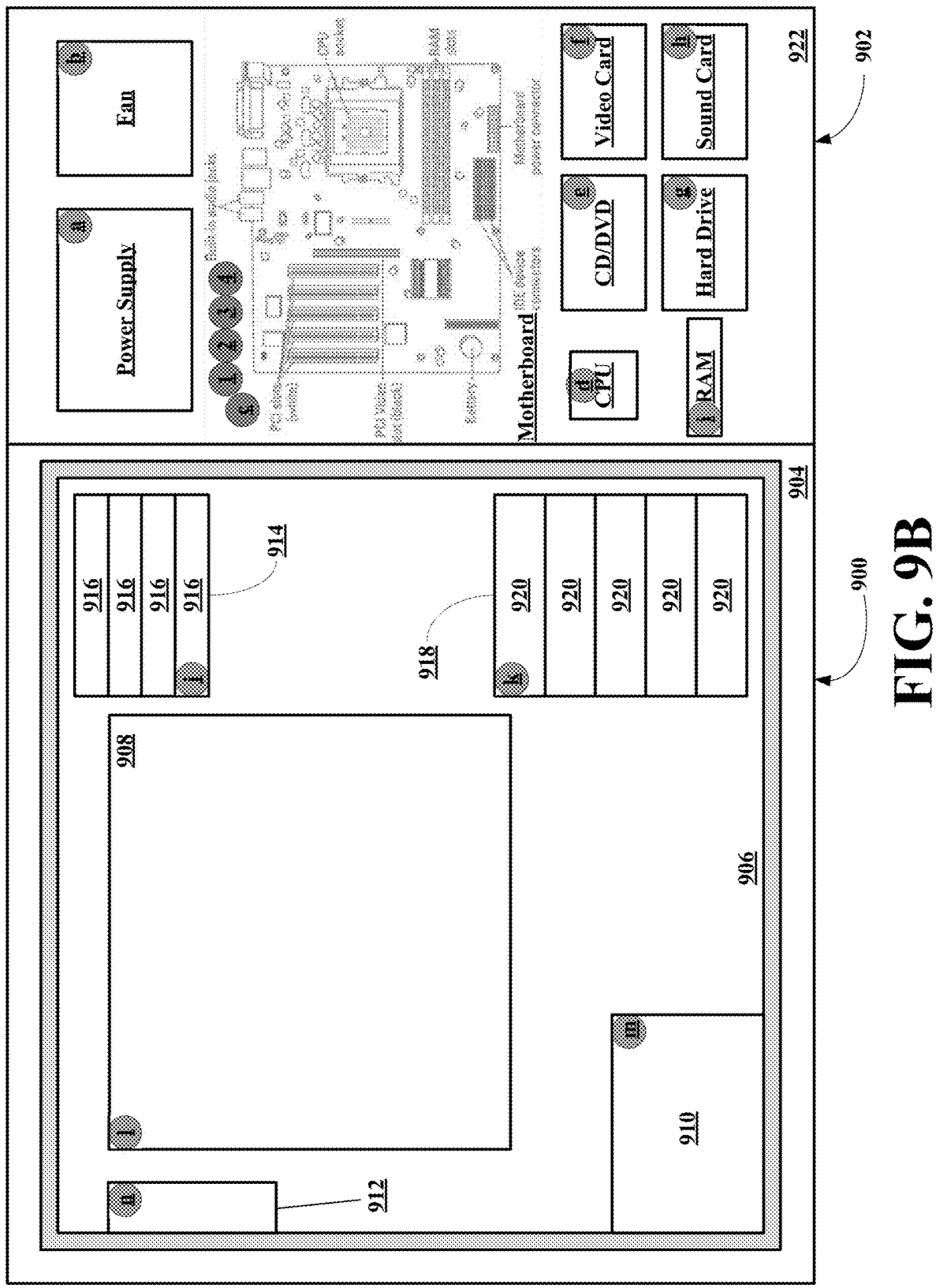

Looking at FIG. 9B, the system, apparatus, and/or interface shows the trainee has activated the Motherboard content object c causing content information items 1-4 to appear. It should be recognized that the number of information items will vary and may be dependent on the component and the training level. These items may be selected using any selection protocol mentioned herein, but especially motion-based scrolling and selecting and activating. Of course, the items 1-4 may be distributed about the object c in any arrangement to provide better selection or the items 1-4 may appear in a separate window or above or below the plane of the displays if the environment is 3D.

Figure 9C:
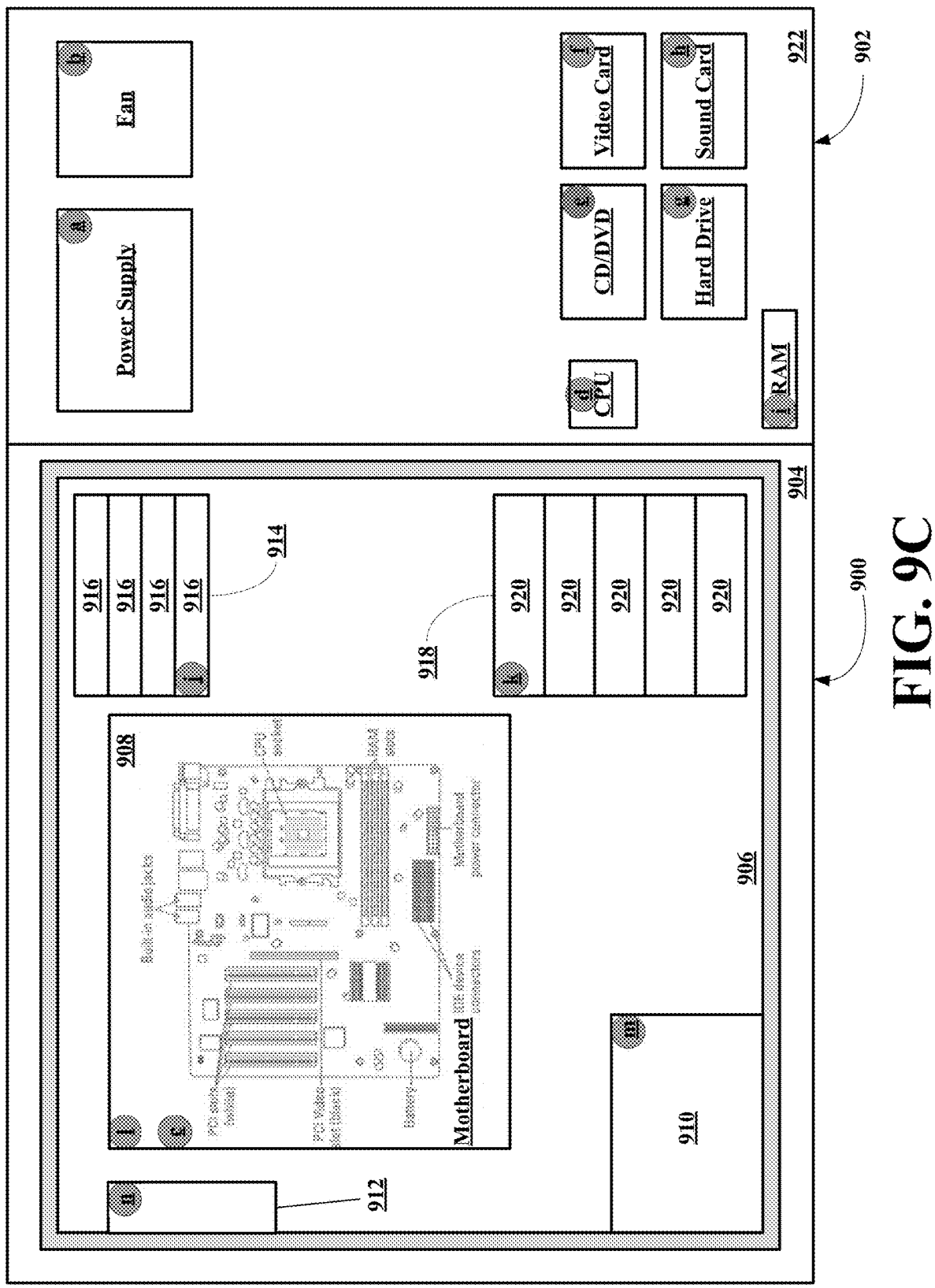

Looking at FIG. 9C, the system, apparatus, and/or interface shows that the trainee has installed the Motherboard into the motherboard area 908 and activated the object e associated with the CD/DVD drive. The hot spots c and 1 remain associated with their respective component or area so that the trainee may be able to review information about the Motherboard and the area motherboard 908, where the information may be level specific.

Figure 9D:
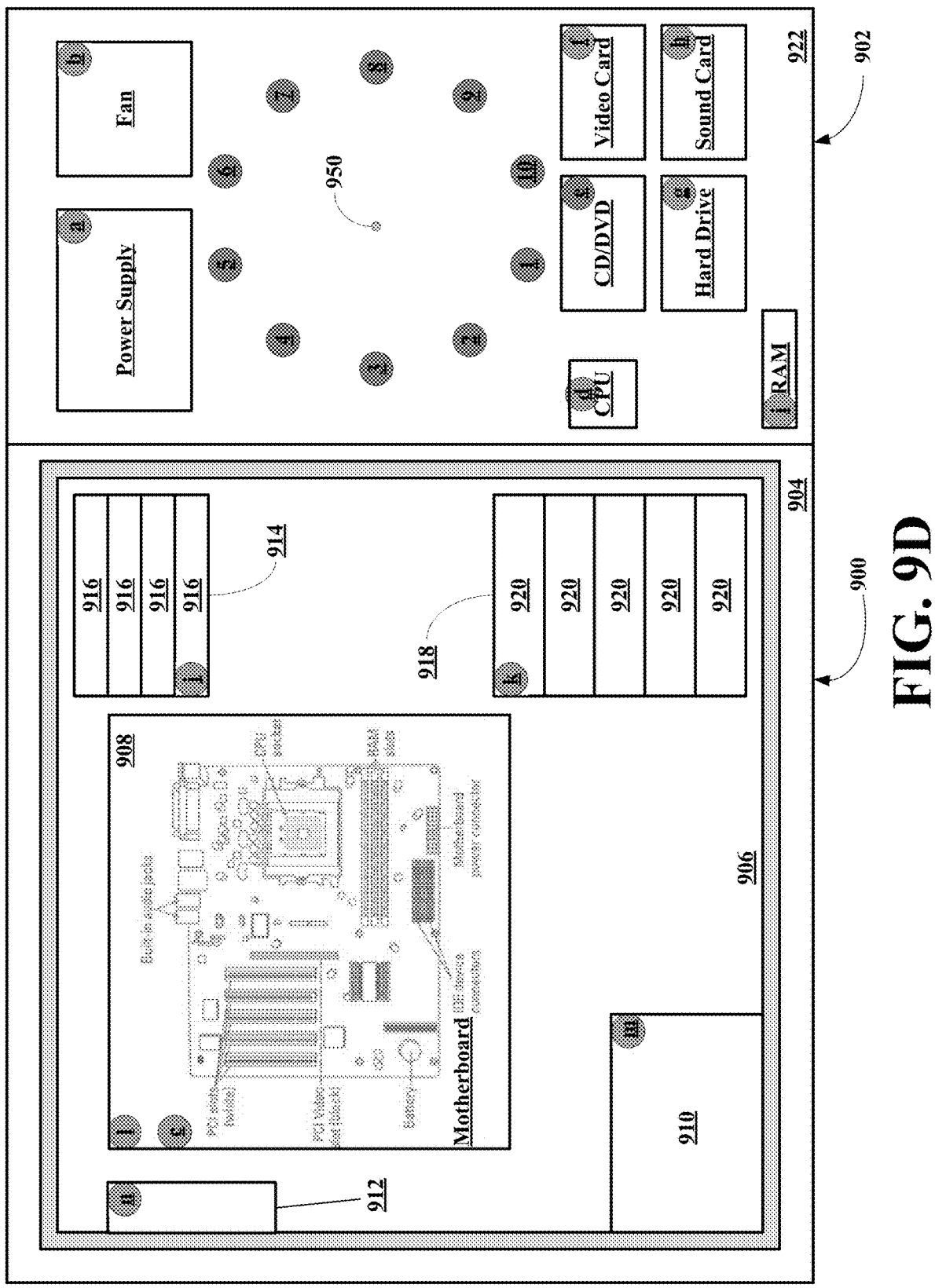

Looking at FIG. 9D, the system, apparatus, and/or interface shows that activating CD/DVD drive content object e causing content information items 1-10 to appear (note that the number of information items will vary and may be dependent on the component and the training level) in the Motherboard space now empty as ten selectable objects distributed about a selection object 950, which may or may not be visible. These items may be selected using any selection protocols mentioned herein, but especially motion-based scrolling and selecting and activating.

Figure 9E:
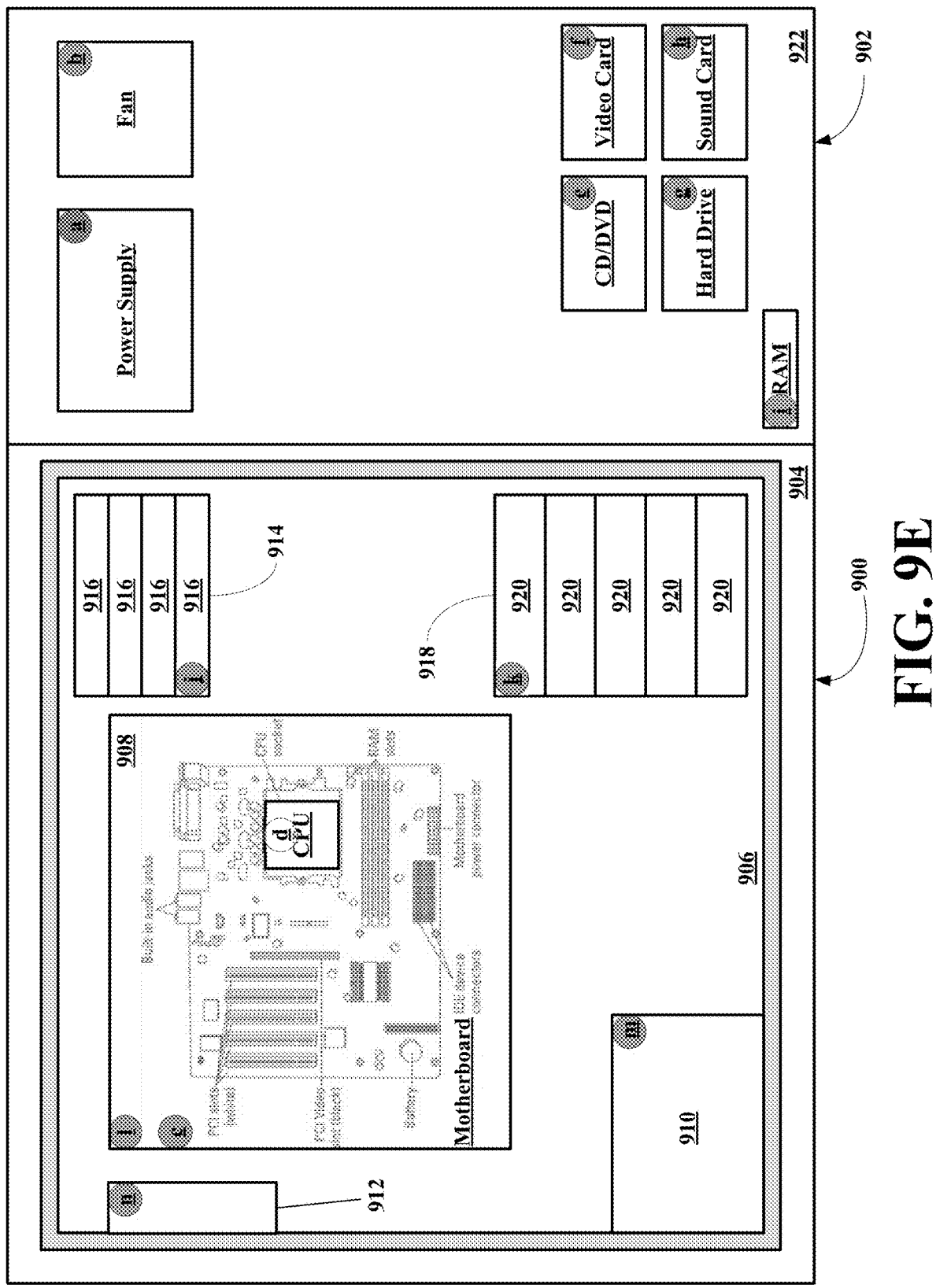

Looking at FIG. 9E, the system, apparatus, and/or interface shows that the trainee has installed the CPU onto the Motherboard. Again, the hot spot d remains associated with the CPU so that the trainee may be able to review information about the CPU, where the information may be level specific. The figure also shows that the trainer has activated the Power Supply object a.

Figure 9F:
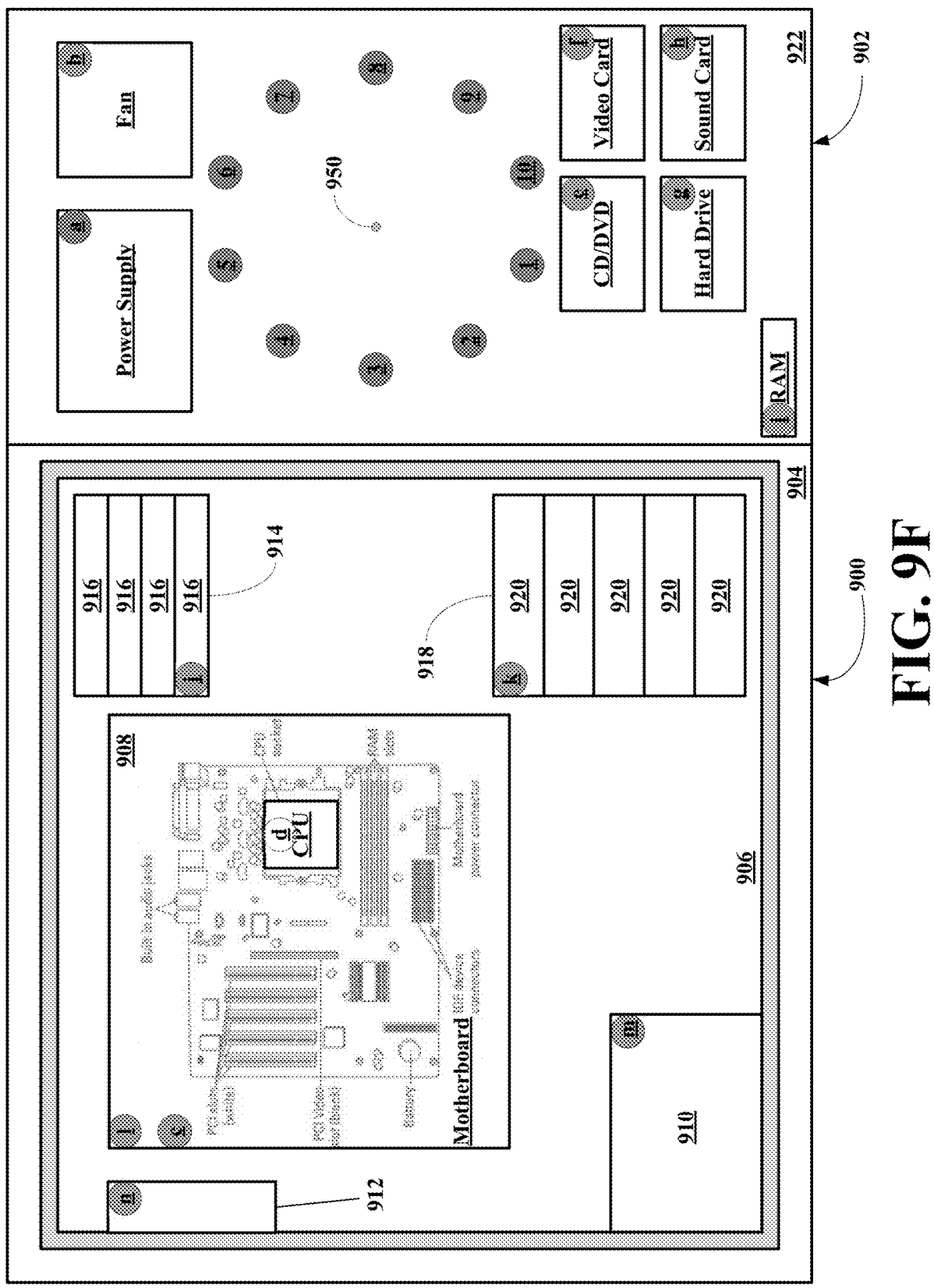

Looking at FIG. 9F, the system, apparatus, and/or interface shows the trainee activating Power Supply content object a causing content information items 1-10 to appear (note that the number of information items will vary and may be dependent on the component and the training level) in the Motherboard space now empty as ten selectable objects distributed about a selection object 950, which may or may not be visible. These items may be selected using any selection protocols mentioned herein, but especially motion-based scrolling and selecting and activating.

Figure 9G:
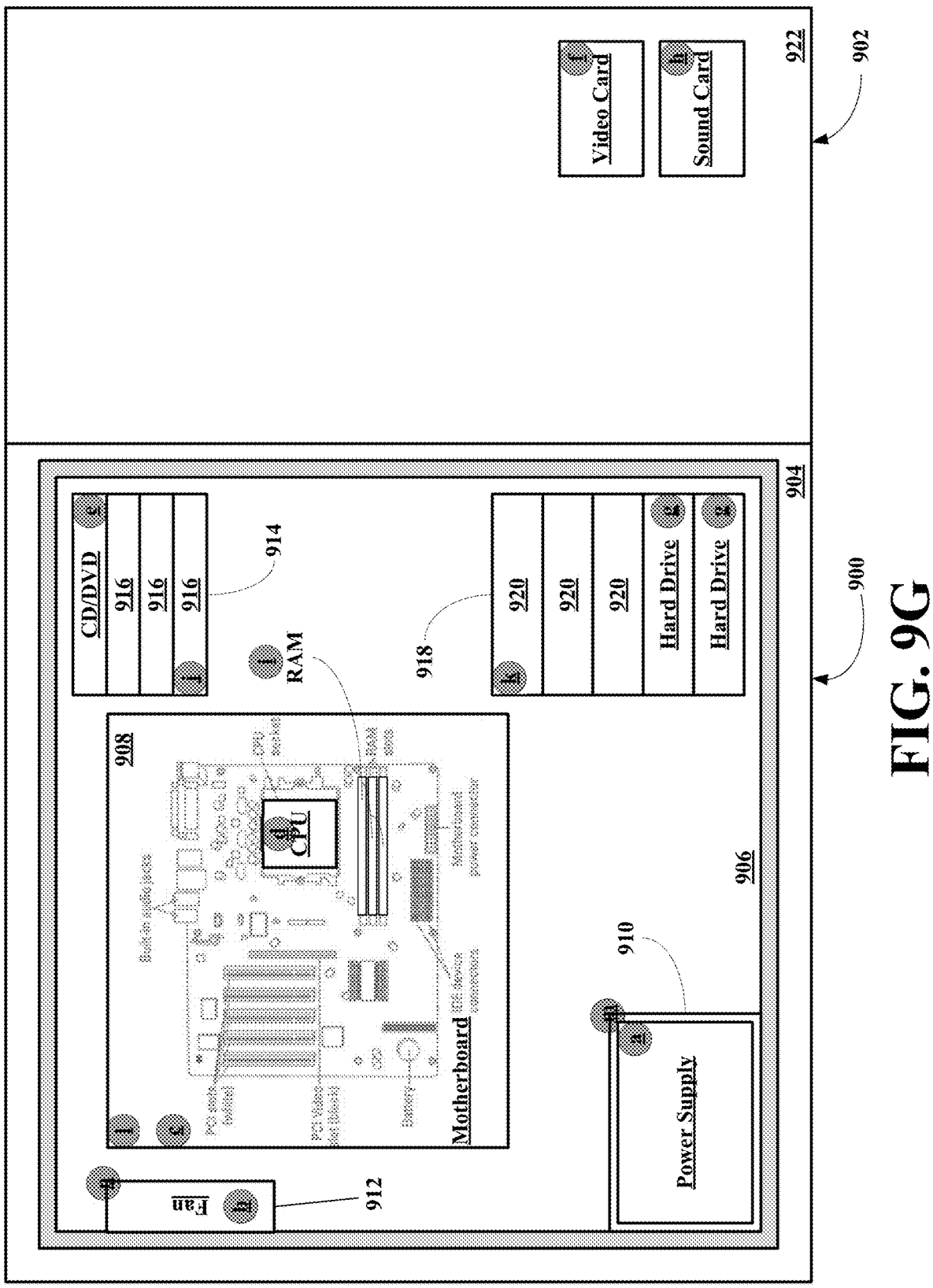

Looking at FIG. 9G, the system, apparatus, and/or interface shows that the trainee has installed the RAM onto the Motherboard, the CD/DVD drive in a bay 916 of the receiving unit 914, and two Hard Drives in two bay 920 of the receiving area 918, and the Fan into the fan area 912. Again, the hot spot i the hot spot b remains associated the RAM so that the trainee may be able to review information about the RAM, the hot spot e with the CD/DVD drive so that the trainee may be able to review information about the CD/DVD drive, the hot spot g with the Hard Drives so that the trainee may be able to review information about the Hard Drives, and the hot spot b with the Fan so that the trainee may be able to review information about the Fan, where the information may be level specific. The figures also show that the trainer has activated the Power Supply object a. Of course, it should be recognized that the installation of these components may have been accomplished by any order, so that the trainee may understand why the optimal assembly order was shown in the training video.

Figure 9H:
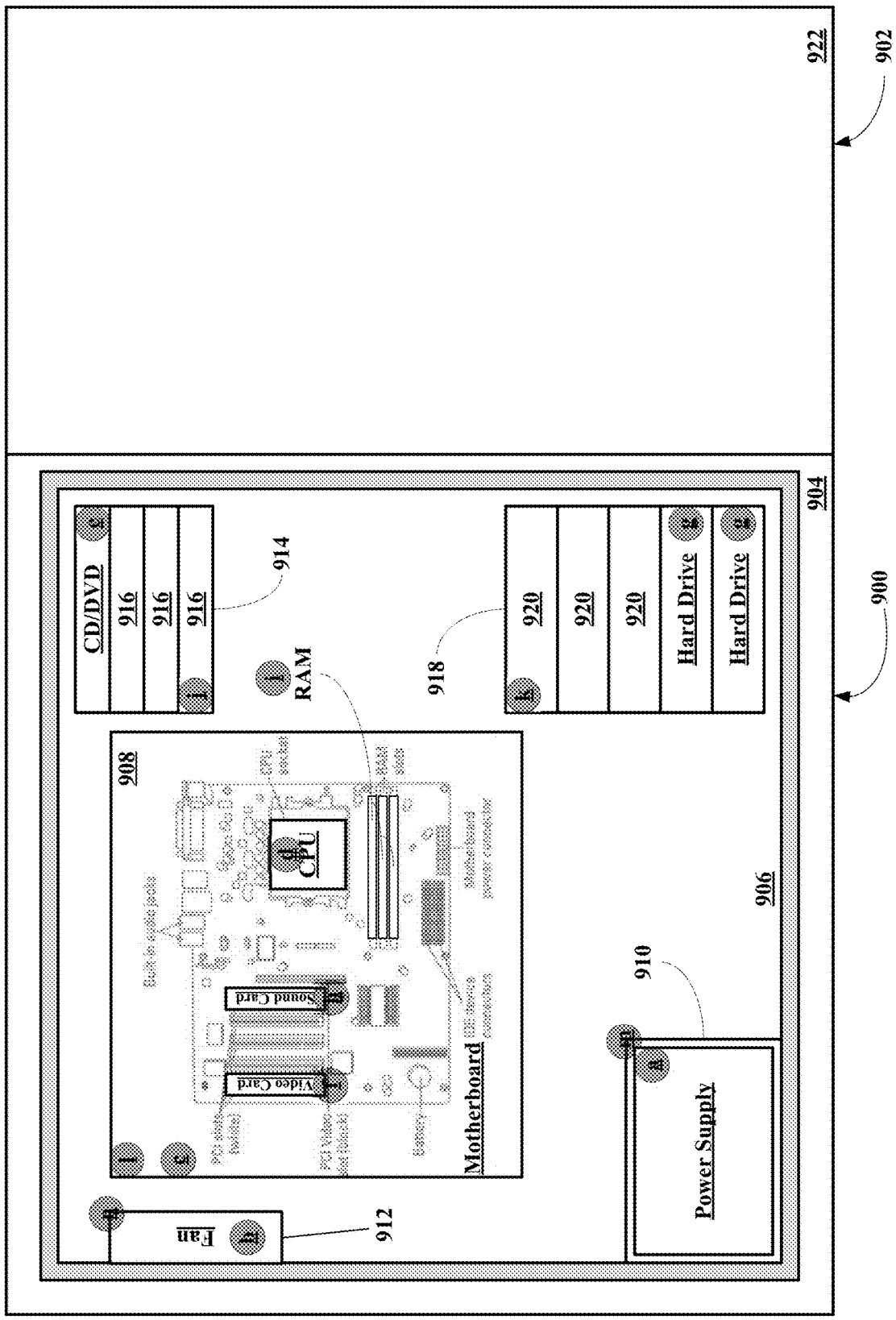

Looking at FIG. 9H, the system, apparatus, and/or interface shows that the trainee has installed the Video Card and the Sound Card onto the Motherboard. Again, the hot spot f remains associated the Video Card so that the trainee may be able to review information about the Video Card, and the hot spot h with the Sound Card drive so that the trainee may be able to review information about the Sound Card, where the information may be level specific. Of course, it should be recognized that the installation of these components may have been accomplished by any order, so that the trainee may understand why the optimal assembly order was shown in the training video.

Figure 9I:
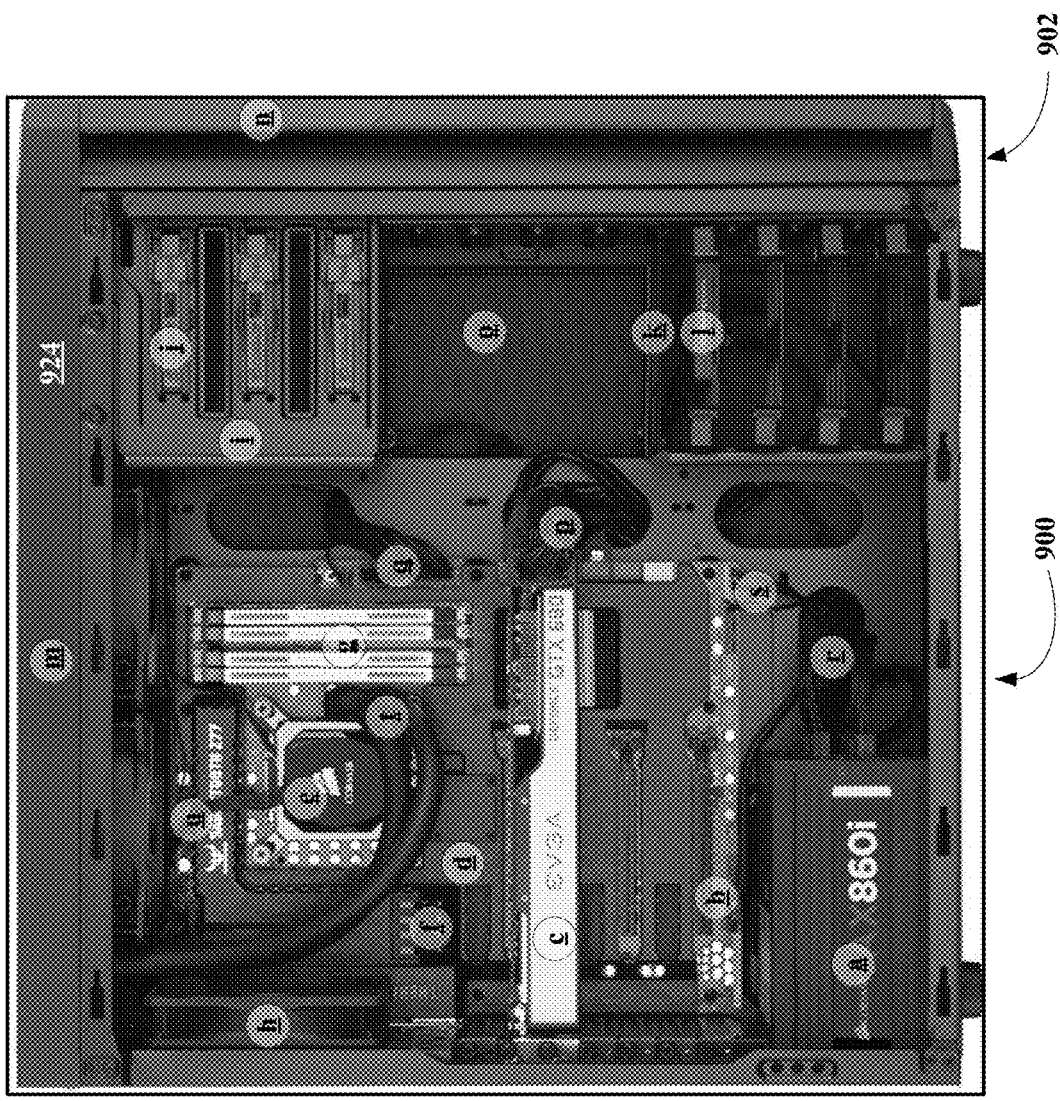

Referring now to FIG. 9I depict the system, apparatus, and/or interface generates a 3D environment 924 based on an assembled desktop computer. The system, apparatus, and/or interface also generated hot spots a-u and associates them with different features of the assembled desktop computer shown in 3D environment 924. The trainee/student may then travel in the environment 924 changing viewpoints, looking at features, activating any of the hot spots a-u and reviewing and performing any tasks associated with the hot spots. The trainee may repeat any and all tasks to until the trainee has achieved a given degree of overall proficiency and a given degree of proficiency or each task associated with the training routine. Again, the system, apparatus, and/or interface is designed to collect/capture trainee data and expert data as they interact with the training environment. Again, the system, apparatus, and/or interface stores the data in system databases locally or remotely. Again, the system, apparatus, and/or interface uses the data to improve the training environment and to improve hot spot content and the manner in which the trainer or expert interact with the overall training routine and each task within the training environment.

Schematic Flow Charts Virtual Training Methods

Referring now to FIG. 10, a schematic flow chart of an embodiment of a method of training, generally 1000, is shown to include a start step 1002. The methods also include identifying a non-animated training task, routine, or program for automation using the systems, apparatuses, and/or interfaces herein in a identifying step 1004. The methods also include developing a VR or AR/MR/XR training routine corresponding to the in a developing step 1006.

The methods may also include generating an avatar assistant in an avatar generating step 1008, wherein the avatar may change form depending on the task, may be generated using user input, may be generated based on past trainee performance, or may adapt a specific form to improve trainer environment and routine interaction. The methods also include: (a) generating information about all important, relevant, meaningful, and/or interesting features, attributes, properties, and/or characteristics associated with the training routine and all important, relevant, meaningful, and/or interesting features, attributes, properties, and/or characteristics associated with any and all equipment used in the training routine or associated with the training routine and/or (b) gathering information about all important, relevant, meaningful, and/or interesting features, attributes, properties, and/or characteristics associated with the training routine and all important, relevant, meaningful, and/or interesting features, attributes, properties, and/or characteristics associated with any and all equipment used in the training routine or associated with the training routine in an information generating and gathering step 1010. The methods also include storing the gathered information in system databases both locally and/or remotely, e.g., databases in the cloud or dedicated servers in a storing step 1012.

The methods also include analyzing the training routine, generating a VR/AR/MR environment for training, and associating/populating hot spots with all relevant, meaningful, or interesting features, attributes, properties, and/or characteristics associated with the training environment and all important, relevant, meaningful, and/or interesting features, attributes, properties, and/or characteristics associated with any and all equipment used in the training environment or associated with the training routine in an analyzing, environment generating, and hot spot associating step 1014.

The methods also include collecting/capturing expert data as an expert goes through the training routine in the training environment, wherein the data includes data on how the expert accomplished each training task, data on what hot spots the trainee activates, data on the duration of time the expert spends in each hot spot and data on the type of information viewed, data indicating a level of competency in each task, data indicating an overall competency, and data associated with ease of using each task, ease of using the entire training routine, and each of using and interacting with the environment in a collecting/capturing expert performance data step 1016. The methods also include processing the expert performance data, overall data and task data and storing the data in the system databases in a processing and storing expert data step 1018. The methods may also include an expert feedback step for providing experts with overall performance and task performance data to gain insight from experts on how to improve the training routine and environment (not shown).

The methods also include collecting/capturing trainee data as a trainee goes through the training routine in the training environment, wherein the data includes data on how the trainee accomplished each training task, data on what hot spots the trainee activates, data on the duration of time the trainee spends in each hot spot and data on the type of information viewed, data indicating a level of competency in each task, data indicating an overall competency, and data associated with ease of using each task, ease of using the entire training routine, and each of using and interacting with the environment in a collecting/capturing trainee performance data step 1020.

The methods also include providing feedback to the trainee and/or to the supervisors before, during, and/or after each task or before, during, and/or after the entire training routine to the trainee and collecting and storing all feedback data and evaluation data made by supervisors in a providing trainee/supervisor feedback step 1022. The methods are continued onto the next page via a next step 1024.

After the next step 1024, the methods also include collecting/capturing and storing the feedback data to the system databases in a collecting/capturing and storing the feedback data step 1026. The methods also include informing the trainee of any deficiencies and providing information on how to improve the trainee performance including showing the trainee performance overlaid on an experts performance for the same task or suggesting way to improve performance in an informing trainee deficiency step 1028. The methods also include providing information to the trainee to improve performance deficiencies in a providing trainee information step 1030.

The methods also include repeating the deficient tasks or the entire routine until proficient at each task and the entire routine to a given level of competency in a trainee repeating step 1032. The methods also include providing feedback to the trainee/supervisor before, during, and/or after the trainee repeats routine/tasks and providing feedback on repeated routine/tasks step 1034. The methods also include processing and storing the trainee repeat performance data in the system databases in a processing and storing step 1036.

The methods also include analyzing performance data and modifying one, some, or all aspects of the training routine, task, avatar, hot spot, and/or environment features, properties, characteristics, attributes, etc. in an analyzing and modifying identified problem tasks and/or aspects step 1038 to improve the routine, tasks, avatars, hot spots, and/or environment.

The methods also include analyzing performance data (expert and trainee) and modifying one, some, and/or all aspects of the routine, the task, the environment, the avatar, and/or the hot spot features, properties, characteristics, attributes, etc. are modified to improve any and all aspects of the training routine, the tasks, the environment, the avatar(s), and/or the hot spots to aid the trainee in those deficient tasks and allowing the trainee to redo the training task or the entire training session in an analyzing and modifying step 1040.

The methods also include continuing the analyzing, determining, and improving the routine, environment, avatar, hot spots, and/or hot spot content, wherein the improving may include revising, adding, deleting, modifying, and/or changing any some or all aspects of the training routine, environment, avatar, hot spots, and/or hot spot content to enhance its effectiveness over time in a continually analyzing and modifying step 1042. The methods terminate in a stop step 1044.

Schematic Flow Chart for Developing a VR and/or AR/MR/XR Training Program

Referring now to FIG. 11, a schematic flow chart of an embodiment of a method of constructing a VR and/or AR/MR/XR training program from a pre-existing training program, generally 1100, is shown to include a start step 1102.

The training program may include, without limitation, one, some, all or any combination of the following components: device explanatory routines, training routines, training tasks, question/answer sessions, information presentation routines, trainee pass/fail routines, performance ranking routines, trainee feedback routines, or etc.

The methods include loading a pre-existing non VR or AR/MR/XR training program into the systems, apparatuses, and/or interfaces of this disclosure in a loading step 1104. The methods also include: (a) generating information about one, some, or all aspects, features, attributes, properties, and/or characteristics associated with the training program and/or one, some, or all aspects, features, attributes, properties, and/or characteristics associated with any and all equipment used in the training program or associated with the training program and/or (b) gathering information about one, some, or all aspects, features, attributes, properties, and/or characteristics associated with the training program and one, some or all aspects, features, attributes, properties, and/or characteristics associated with any and all devices and/or equipment used in the training program or associated with the training program in an information generating and/or gathering step 1106. The methods also include storing the generated and/or gathered information in system databases both locally and/or remotely, e.g., databases located on dedicated servers locally or on dedicated remote servers such as cloud servers—servers located in the cloud, in a storing step 1108.

The methods also include analyzing the pre-existing training program, the generated information, and the gathered information in an analyzing step 1110 and developing VR content, AR/MR/XR content, and/or VR and AR/MR/XR content for the pre-existing training program in a developing step 1112. The VR content and/or AR/MR/XR content may be generated from the training material in whatever form the content is found. If the content is purely textual, then the systems, apparatuses, and/or interfaces analyze the textual information and prepare CG constructs based on the textual content. The CG constructs may be VR and/or AR/MR/XR depending on the nature of the textual content and the best way the systems, apparatuses, and/or interfaces determine the content may be presented to the trainees, which may be modified during expert and trainee performance of the training program. If the content includes textual and non-textual (e.g., images, figures, videos, etc.), then the systems, apparatuses, and/or interfaces analyze the textual and non-textual content and prepare CG constructs based on the textual and non-textual content. Again, the CG constructs may be VR and/or AR/MR/XR depending on the nature of the textual and the non-textual content and the best way the systems, apparatuses, and/or interfaces determine the content may be presented to the trainees, which may be modified during expert and trainee performance of the training program. If the content is purely non-textual, then the systems, apparatuses, and/or interfaces analyze the non-textual content and prepare CG constructs based on non-textual content. Again, the CG constructs may be VR and/or AR/MR/XR depending on the nature of the training program content and the best way the systems, apparatuses, and/or interfaces determine the content may be presented to the trainees, which may be modified during expert and trainee performance of the training program.

If the textual and/or non-textual content relate to one or more devices or one or more pieces of equipment, then the systems, apparatuses, and/or interfaces may construct 2D, 3D, 4D, or nD CG constructs depicting the devices or equipment so that the trainee if interested could see how the devices or equipment were constructed and/or how they operate. Of course, the systems, apparatuses, and/or interfaces makes this content available to a user as a selectable object or a hot spot associated with environment such as a thumbnail of a device or a piece of equipment or a document including information about the device or equipment.

If the training program involves a particular device or piece of equipment, then the VR and/or AR/MR/XR environment would include all types of content associate with the device or piece of equipment and would include all types of formats (e.g., documents, images, videos, recordings, drawings, hot spots, etc.) for interacting with the content including VR and/or AR/MR/XR CG constructs that a trainee interacts with and that behaves as the real-world device or piece of equipment such as an instrument would behave in physical reality. Such VR and/or AR/MR/XR environments include, without limitation, flight simulations, games, unmanned aerial vehicles (UAV), unmanned nautical vehicles, unmanned ground-based vehicles, computer aided surgeries, computer aided instruments, computer aided manufacturing, all other computer aided human endeavors, or any combination thereof.

The methods also include generating a VR environment, an AR/MR/XR environment, or a VR and an AR/MR/XR environment for the training program in a generating step 1114. The environments are designed to be fully interactive based primarily on motion-based processing, but the environment may also include the ability for the user to interact with the environment using: hard select protocol input such as mouse clicking, touching events on a touchscreen or touch pad, button pushing, tactile switches, etc. or voice or utterance input or gesture input or any combination of motion-based, hard select protocol based, utterance based, or gesture based inputs.

The methods also include generating hot spots for one, some or all aspects, features, attributes, properties, and/or characteristics associated with the training environment in a hot spot generating step 1116, and populating the environment with the generated hot spots in a populating step 1118. The hot spots may be associated with (a) specific aspects, features, attributes, properties, and/or characteristics of the training program or (b) may be general information hot spots associated with global environmental aspects, features, attributes, properties, and/or characteristics or (c) aspects, features, attributes, properties, and/or characteristics of training program routines and/or training program tasks. For example, the global aspects, features, attributes, properties, and/or characteristics may include color, lighting, highlighting, day or night, brightness, volume, etc. and the hot spots would provide the user access to these global aspects, features, attributes, properties, and/or characteristics so that the user may preset them. Other hot spots may allow the user to preset aspects, features, attributes, properties, and/or characteristics with specific training program routines and/or tasks.

In certain embodiments, the methods may be divided into parts. The first part involves the construction of a VR environment, an AR/MR/XR environment or a VR and an AR/MR/XR environment for a given training program. The second part involves having experts perform the training program so that the training program, environment, content, hot spots, and/or avatars may be modified to improve the training program. The third part involves having trainees perform the training program so that the training program, environment, content, hot spots, and/or avatars may be modified to improve the training program. The fourth part involves using trainer and trainee data to tailor the training program for different trainee types or for trainees having different learning propensities oral, visual, tactile, etc.

The methods also include a next step 1120 for continuing the flow chart to the next drawing sheet.

After construction of the environment, the methods also include starting an expert training session in a expert or trainer start step 1122.

The methods also include collecting/capturing expert/trainer performance and interaction data as an expert/trainer performs the training program in the constructed training environment in a collect/capture expert/trainer data step 1124. The expert/trainer performance and interaction data includes: (a) data on how the expert accomplishes the entire program, (b) data on how the expert accomplishes each routine and/or task of the program, (c) data on what hot spots the expert activates, (d) data on the duration of time the expert spends in each activated hot spot, (e) data on the type of information viewed, (f) data indicating a level of competency in entire program and each routing and/or task, (g) data associated with ease of performing each of the routine and/or task, (h) data associated with the ease/difficulty of using the entire training program, (i) data associated with the ease/difficulty of using each routine or task, (j) data associated with using and interacting with the entire environment, and/or (k) data associated with using and interacting with one, some, or all aspects, features, attributes, properties, and/or characteristics of the program, environment, routines, tasks, content, and/or hot spots, and/or (l) data that may be used to construct predictive tools or routines for tailoring the training program to individual trainees.

The methods also include processing the expert/trainer performance and interaction data and storing the expert/trainer performance and interaction data in the system databases in an expert/trainer data process and store step 1126. The processing may entail formatting the information for more efficient database storage and retrieval. The methods also include analyzing the collected/captured performance and interaction data in an analyzing step 1128. The methods also include modifying one, some, or all aspects, features, attributes, properties, and/or characteristics of the training program, routines, tasks, environment, and/or hot spots, during training to improve the program in a modifying step 1130. The methods also include updating the program and storing the updated program the system databases in an updating step 1132.

The methods may also include providing feedback to the expert with overall performance and task performance data and interaction to gain insight from experts on how to improve the training program and environment in an expert feedback step 1134. The methods also include a conditional step to permit the expert to repeat the training session or specific routines or tasks therein based on the feedback in a satisfied step 1136. If the expert is not satisfied with any aspect of the performance, then the methods proceed along a NO branch to the collecting/capturing step 1124 so that the expert repeats the entire program or routines or tasks thereof repeating all intermediate steps. The expert may repeat the program or any task thereof as many times as desired until the expert is satisfied at which point the methods proceed along a YES branch to a continuation step 1138 to continue to the next page of the drawings.

The methods may also include generating one or more avatars in an avatar generating step 1140 and providing the avatar with the expert performance and interaction data in a providing step 1142. The systems, apparatuses, and/or interfaces may construct any number of avatars, wherein the avatars may be constructed for specific routines or tasks. Of course, the systems, apparatuses, and/or interfaces may construct any number of avatars, wherein the avatars may be constructed for specific routines or tasks.

After an expert performs the training session and the systems, apparatuses, and/or interfaces have been modified based on the expert performance and interaction data, the methods include a start trainee training session in a starting trainee step 1144. In certain embodiments, the methods may actually start here as the expert session and modifying steps may proceed independent of any trainee activity as the environment constructing may proceed independently.

The methods also include collecting/capturing trainee performance and interaction data as a trainee goes through the training program in the training environment, wherein the performance and interaction data includes data on how the trainee accomplishes the entire program, data on how the trainee accomplishes each task of the program, data on what hot spots the trainee activates, data on the duration of time the trainee spends in each activated hot spot, data on the type of information viewed, data indicating a level of competency in entire routing and each task, and/or data associated with ease of performing each of the routines or tasks, ease/difficulty of using the entire training program and ease/difficulty of using each routine or task thereof, and data associated with using and interacting with the entire environment and/or one, some, or all aspects, features, attributes, properties, and/or characteristics of the environment, routines, tasks, content, and/or hot spots in a collecting/capturing trainee performance and interaction data step 1146.

The methods also include processing the trainee performance and interaction data and storing the trainee performance and interaction data in the system databases in a processing and storing trainee data step 1148, wherein the processing may entail formatting the information for more efficient database storage and retrieval. The methods also includes analyzing the collected/captured trainee performance and interaction data in an analyzing step 1150.

The methods also include modifying one, some, or all aspects, features, attributes, properties, and/or characteristics of the environment, routines, tasks, content, and/or hot spots of the training program, routines, tasks, environment, hot spots, and/or avatars during training to improve the program in a modifying step 1152. The methods also include updating the program and storing the updated program the system databases in an updating step 1154. The methods also include providing feedback to an expert/supervisor before, during, and/or after each task or before, during, and/or after the entire training program of a trainee in a providing expert/supervisor feedback step 1156. The methods also include providing feedback to the trainee including deficient task performance data in a providing trainee feedback step 1158.

The methods also include a conditional step to permit the trainee to repeat the training session or specific routines or tasks therein based on deficient task feedback in a pass step 1160. If the trainee does not pass the training program or any routine or task or aspect of the training program, then the methods proceed along a NO branch to the collecting/capturing step 1146 so that the trainee may repeat the entire program or deficient routines or tasks or aspects thereof and repeating all intermediate steps. The trainee may repeat the program or any task thereof as many times as needed to pass the training program or any routing or task or aspect at which point the methods proceed along a YES branch to a continuation step 1162 for continuing to a next page of the drawings.

The methods also include processing the trainee pass performance and interaction data and storing the trainee pass performance and interaction data in the system databases in a processing and storing expert data step 1164, wherein the processing may entail formatting the information for more efficient database storage and retrieval. The methods also includes analyzing the trainee pass performance and interaction data in an analyzing step 1166. The methods also include modifying one, some, or all aspects of the training program, routines, tasks, environment, hot spots, and/or avatars during training to improve the program in a modifying step 1168. The methods also include updating the program and storing the updated program in the databases in an updating step 1170.

The methods also include continuously, periodically, or intermittently analyzing all of the stored data in an analyze step 1172. The methods also include developing predictive tools or routines to assist all trainees in performing the training program and/or navigating the environment in a develop global predictive tool step 1174 and developing trainee type predictive tools or routines to assist specific types of trainees in performing the training program and/or navigating the environment in a develop trainee type predictive tool step 1176. The methods also include updating the program, routines, tasks, environment, hot spots, and/or avatars and storing the updates in the update and store step 1178. The methods then stop in a stop step 1180.

It should be recognized that the above steps relating to developing predictive tools or routines may be applied to the methods of FIG. 10.

Modifying a Cockpit Virtual Training Program Based on User Interaction

Figure 12A:

Referring now to FIG. 12A, an embodiment of a system, apparatus, and/or interface of this disclosure, generally 1200, is shown to include a display device 1202 including a display area 1204 containing an airplane cockpit 1206, which may be a 2D photographic image or a 3D CG construct. The system, apparatus, and/or interface then: (v) analyzes the airplane cockpit 1206, (w) identifies components for which hot spot information may be generated, (x) generates hot spots a-q, represented by transparent encircled letter selectable objects, for the identified components, and (y) populating the airplane cockpit 1206 with the hot spots a-q, represented by the transparent encircled letter selectable objects. A trainee may activate each of the hot spots a-q via the encircled representative selectable objects using any selecting procedure including motion, gestures, mouse selecting, touching, etc.

Figure 12B:
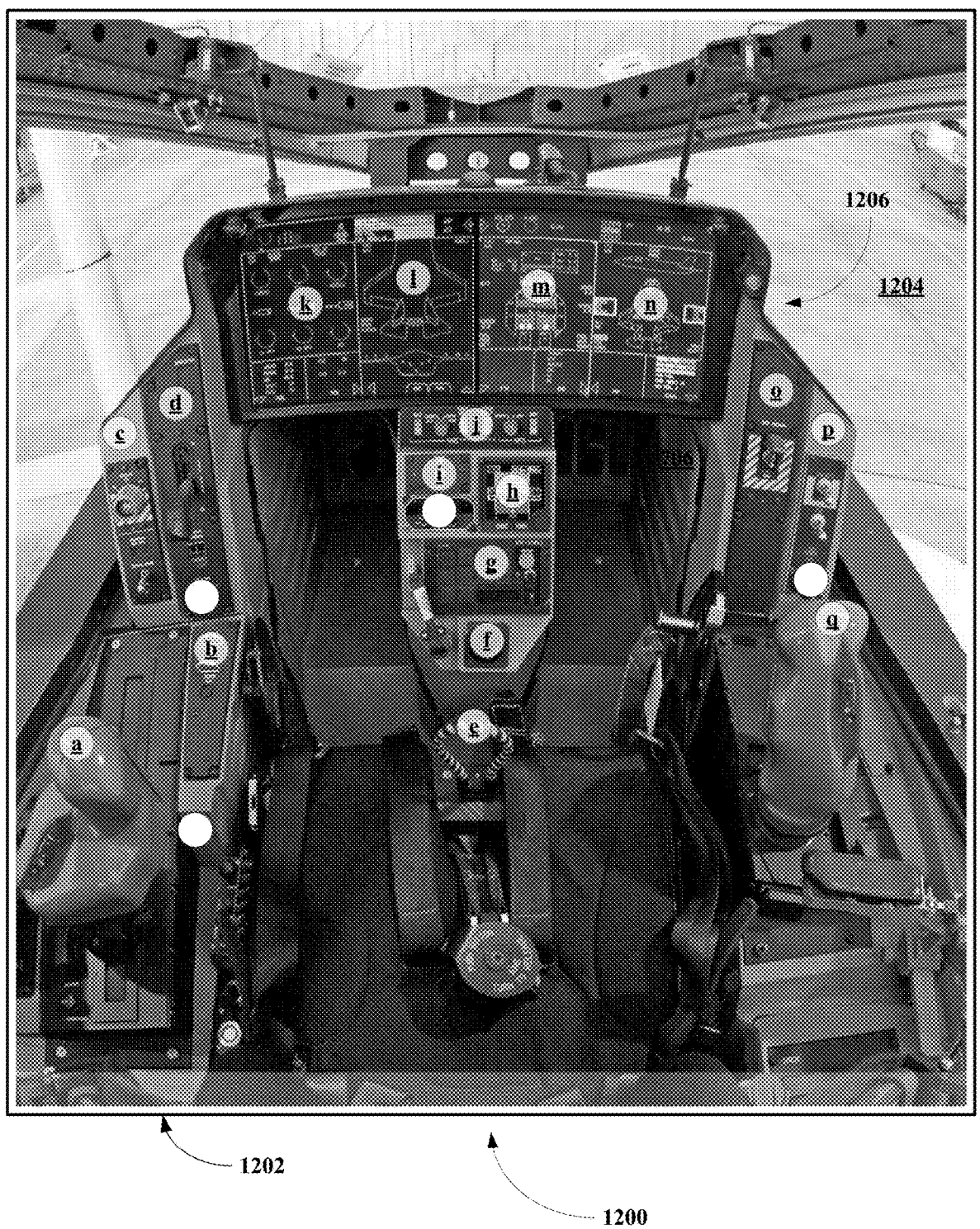

Referring now to FIG. 12B, during trainee interaction with the cockpit 1206, the trainee identified four components for which the trainee wanted additional information indicated by transparent circles associated with the indicated components.

Figure 12C:
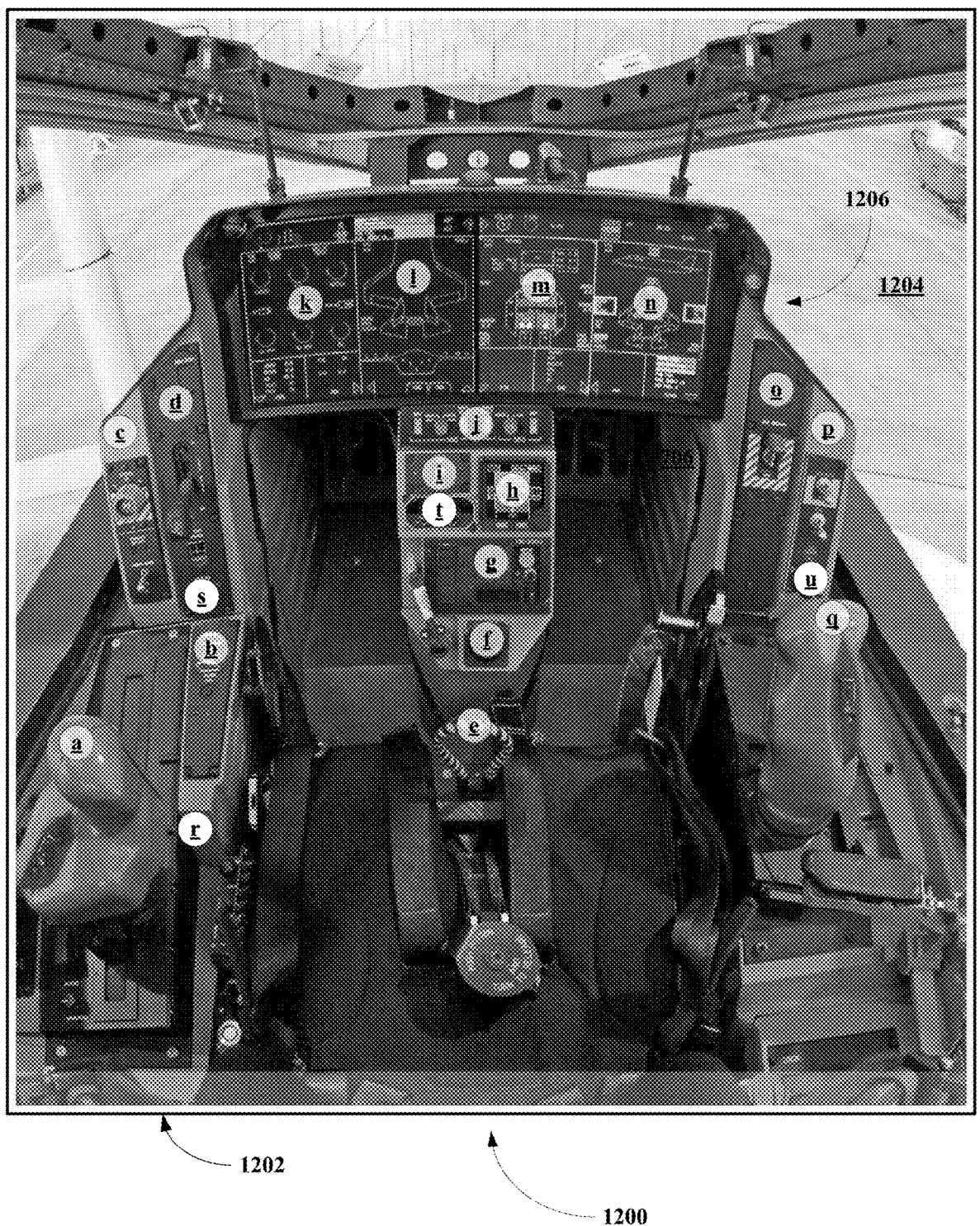

Referring now to FIG. 12C, the cockpit 1206 has been modified to add new hot spots r-u represented by orange encircled letters r-u. Upon system, apparatus, and/or interface updating, the cockpit 1206 would now include hot spots a-u.

Figure 12D:
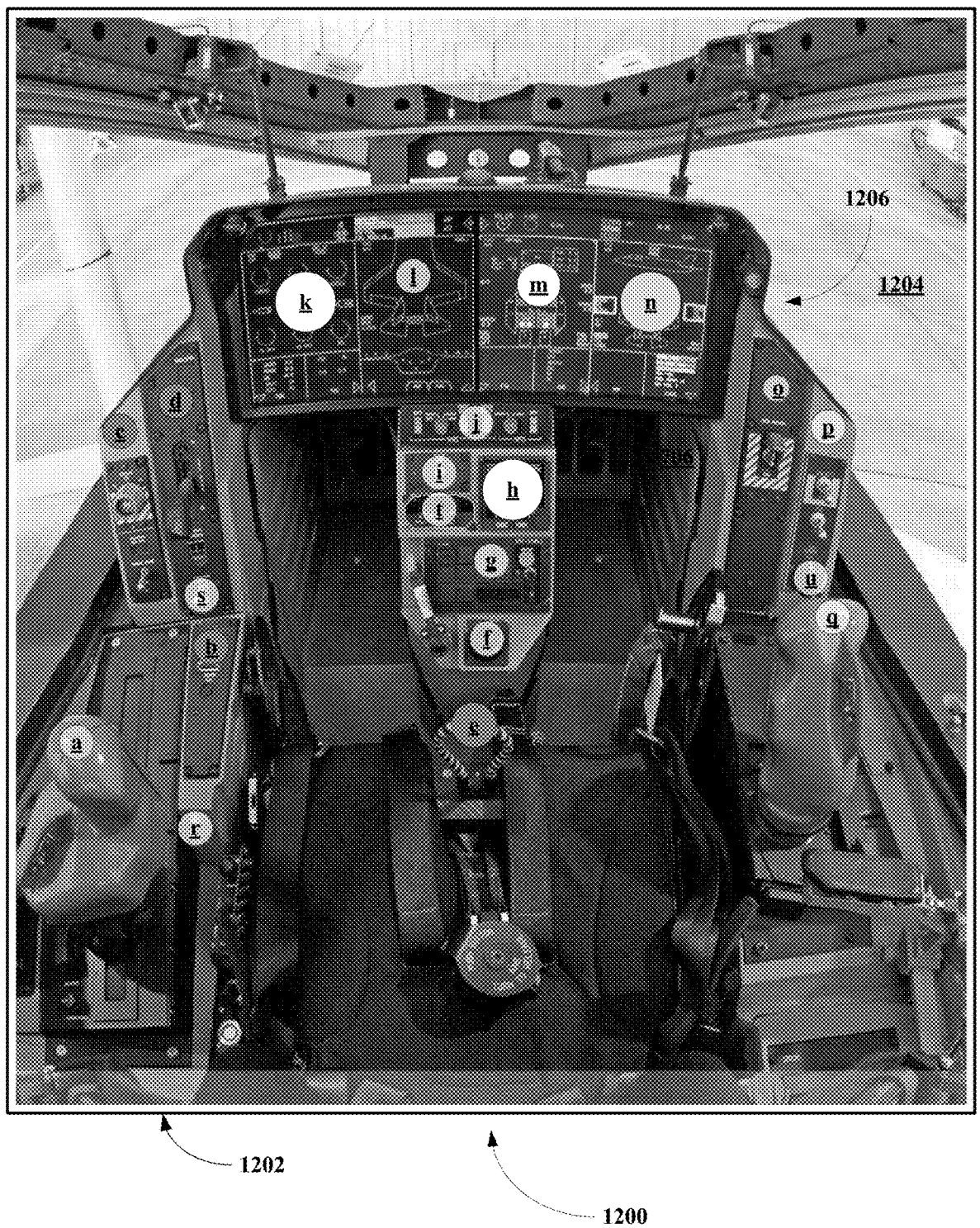

Referring now to FIG. 12D, after collecting data of trainees interacting with the cockpit 1206 over a period of time with, the system, apparatus, and/or interface may prioritize the hot spots a-u either via color, size, or other hot spot characteristics. In this figure, hot spots e, h, k, m, and n have changed size. Hot spots a-e, h, l, and n are color coded. Hot spots a-d have been ranked by color shading. Of course, any ranking or prioritizing format may be used.

Interacting with a Cockpit Virtual Training Routine
Based on User Sensed Motion Referring now to FIGS. 13A-J, an embodiment of a system, apparatus, and/or interface of this disclosure, generally 1300, is shown here in FIG. 13A to include a display device 1302 including an image area 1304 containing an airplane cockpit 1306, which may be a 2D photographic image or a 3D CG construct. The cockpit 1306 includes hot spots a-q, represented by transparent encircled letter a-q selectable objects.

Figure 13A:
Figure 13B:

Looking at FIG. 13B, the system, apparatus, and/or interface receives input from motion sensor indicated by an arrow extending from a selection object 1308. It should be recognized that the system, apparatus, and/or interface may not actually display a selection object or an arrow, the system, apparatus, and/or interface may simply jump to FIG. 13D indicating the selection of hot spot 1 based on motion data received by the system, apparatus, and/or interface from the motion sensor.

Figure 13C:
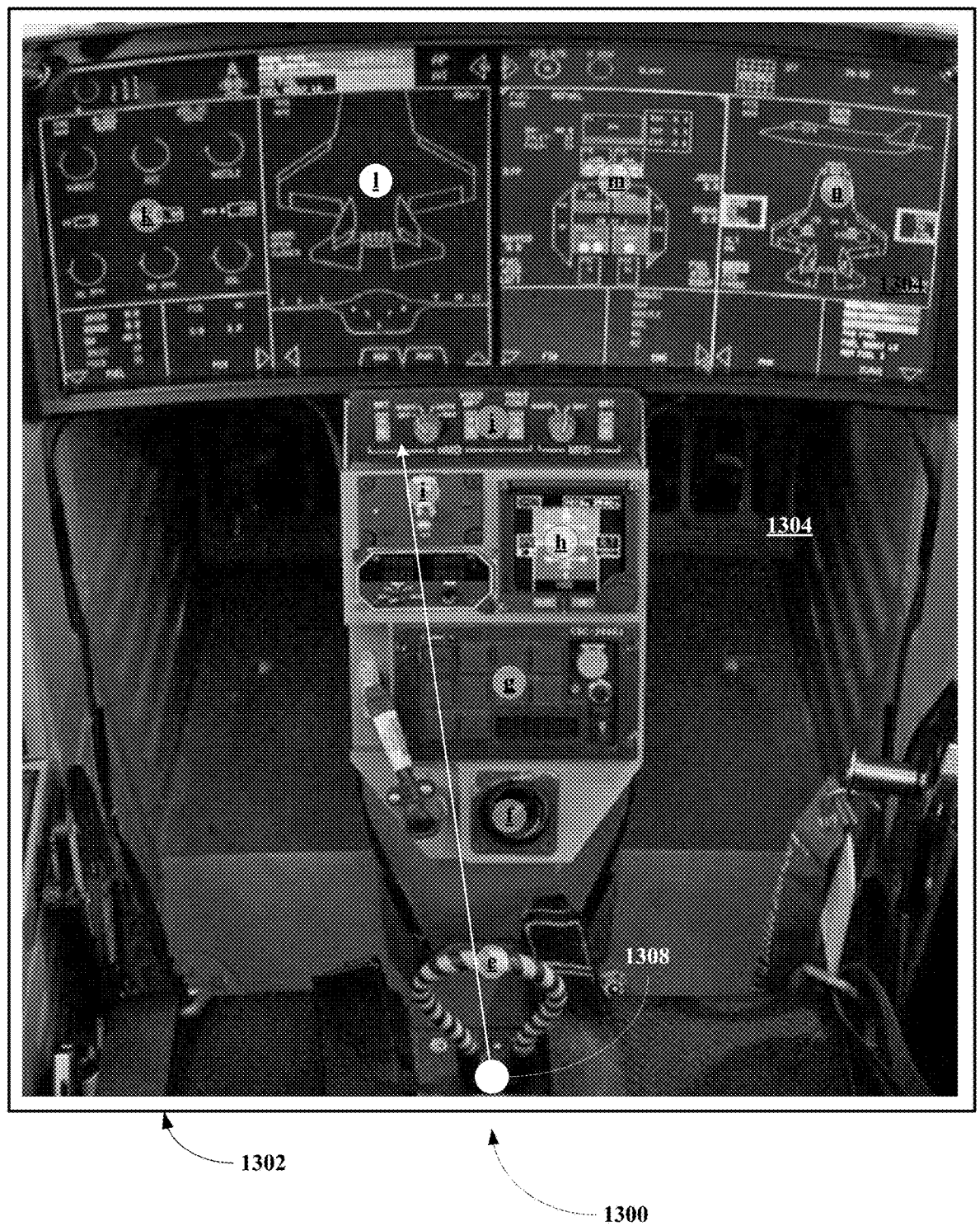

Looking at FIG. 13C, based on the motion, the system, apparatus, and/or interface expands the cockpit 1306 so that further motion aids in hot spot discrimination. The motion sensor then detects further motion of the trainee indicated by an arrow extending from the selection object 1308, which is sufficient to identify the hot spot 1 as the target, which has become highlighted in red.

Figure 13D:
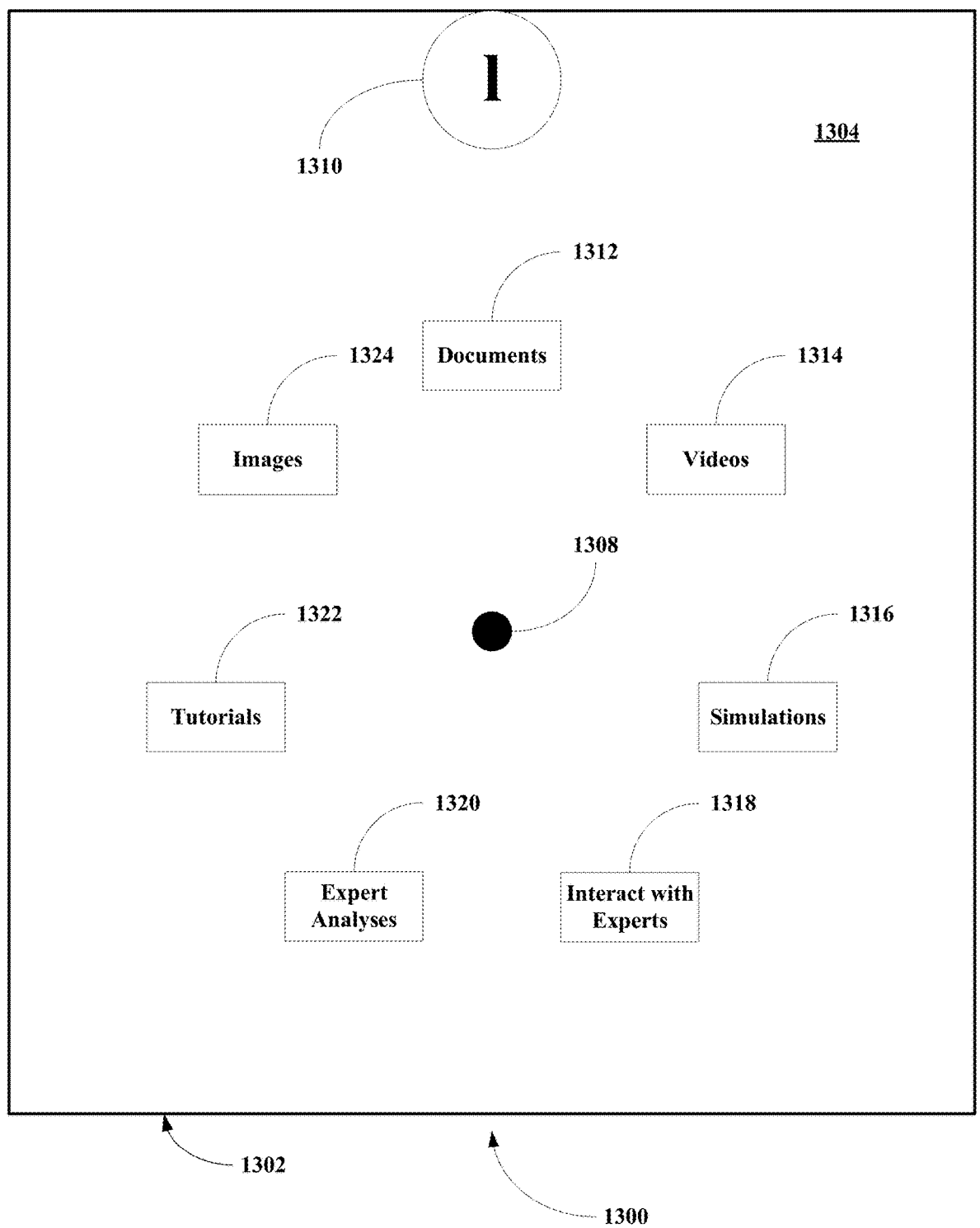

Looking at FIG. 13D, upon the identification of hot spot 1, the system, apparatus, and/or interface clears the display area 1304 and displays an encircled red highlight 1 icon 1310 and the selection object 1308. Surrounding the selection object 1308, the system, apparatus, and/or interface displays a documents box 1312, a videos box 1314, a simulations box 1316, an interact with experts box 1318, an expert analyses box 1320, a tutorials box 1322, and an image 1324.

Figure 13E:
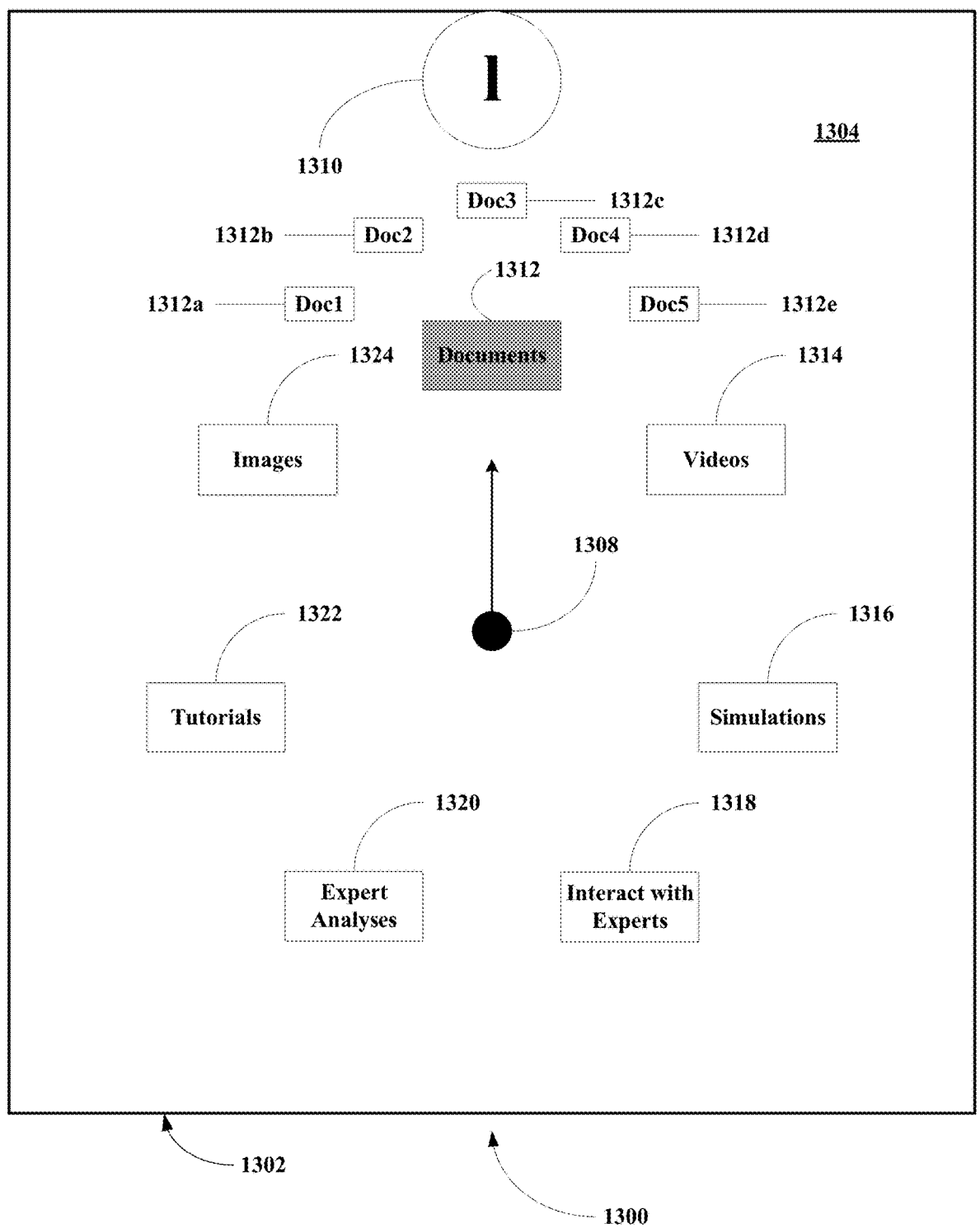

Looking at FIG. 13E, the system, apparatus, and/or interface receives motion input from the motion sensor that the user has moved toward the documents box 1312 resulting in the highlighting of the documents box 1312 and the display of a Doc1 box 1312a, a Doc2 box 1312b, a Doc3 box 1312c, a Doc4 box 1312d, and a Doc5 box 1312e.

Figure 13F:
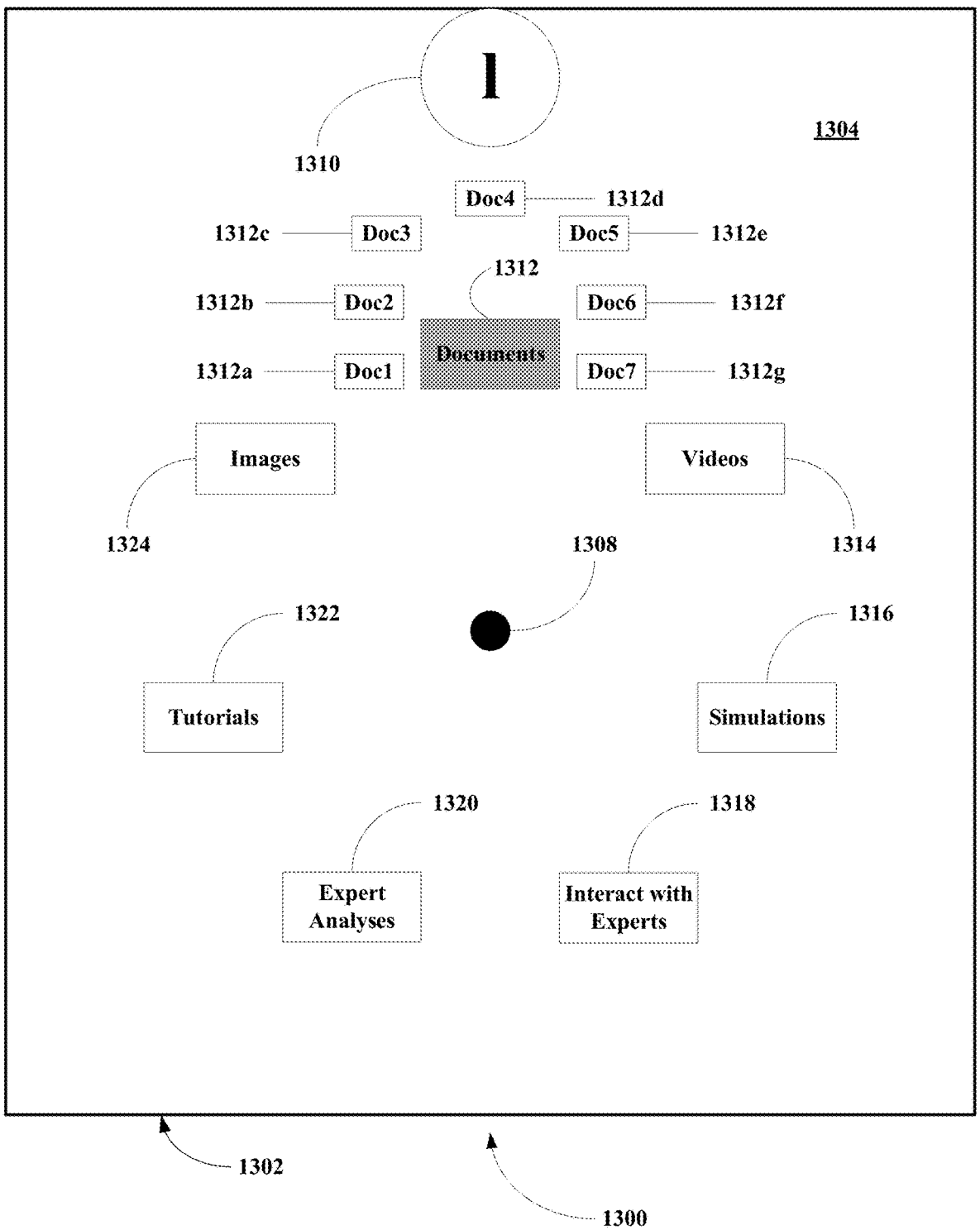

Looking at FIG. 13F, based on analysis of trainee interaction data, the system, apparatus, and/or interface determined that additional documentary information needs to be added to the documents box 1312 as new boxes, a Doc6 box 1312f and a Doc7 box 1312g. The new documents may be specifically directed to specific information based on the trainee interaction data. The system, apparatus, and/or interface would then update and store the updates.

Figure 13G:
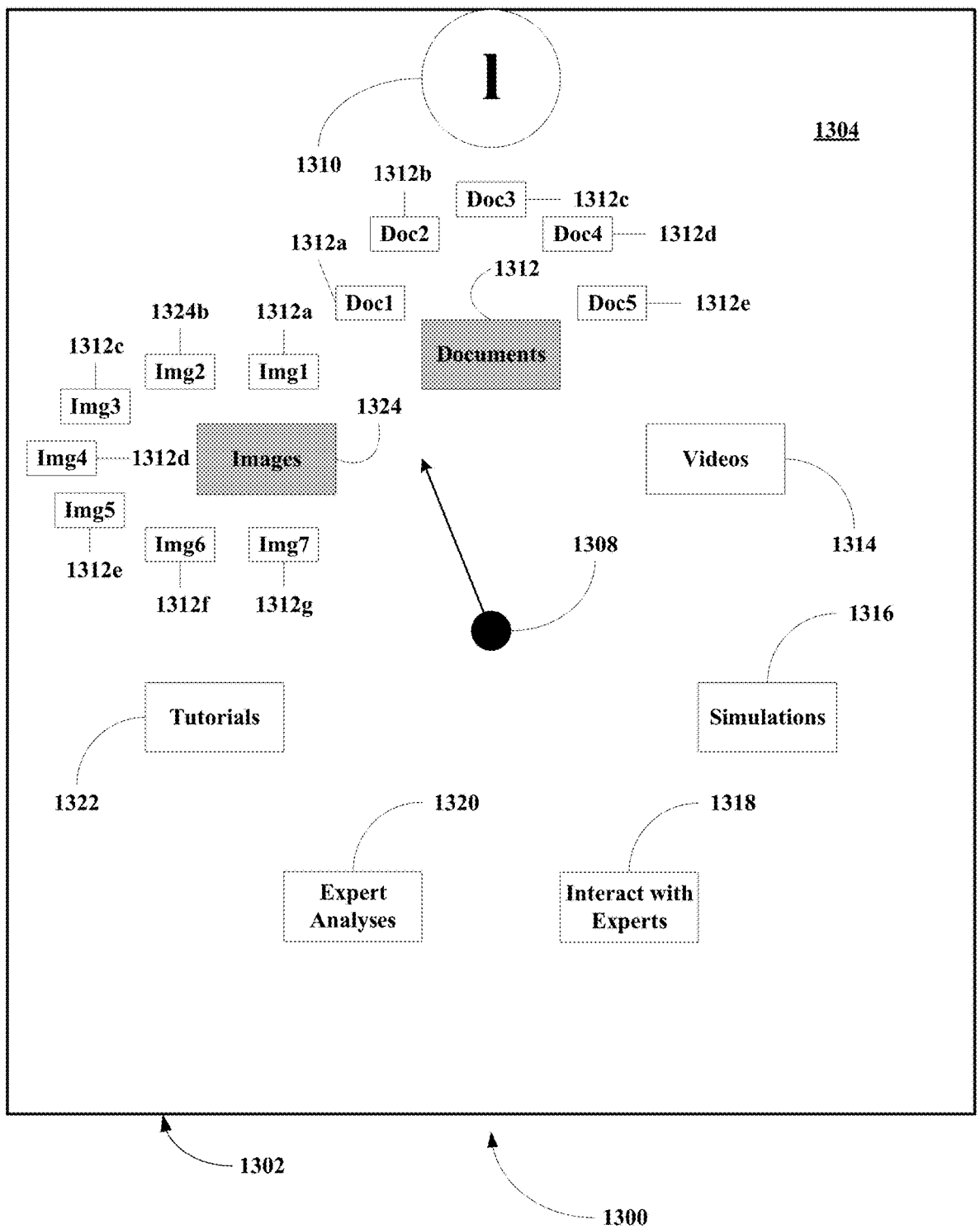

Looking at FIG. 13G, the system, apparatus, and/or interface receives input from motion sensor indicated by an arrow extending from the selection object 1308 in a direction that may indicate the selection of either the documents box 1312 or the images box 1324 causing the two boxes 1312 and 1324 highlighted and documents and images associated with the boxes 1312 and 1324. The documents associated with the documents box 1312 include the Doc1 box 1312a, the Doc2 box 1312b, the Doc3 box 1312c, the Doc4 box 1312d, and the Doc5 box 1312e. The images associated with the images box 1324 include an Img1 box 1324a, an Img2 box 1324b, an Img3 box 1324c, an Img4 box 1324d, an Img5 box 1324e, an Img6 box 1324f, and an Img7 box 1324g.

Figure 13H:
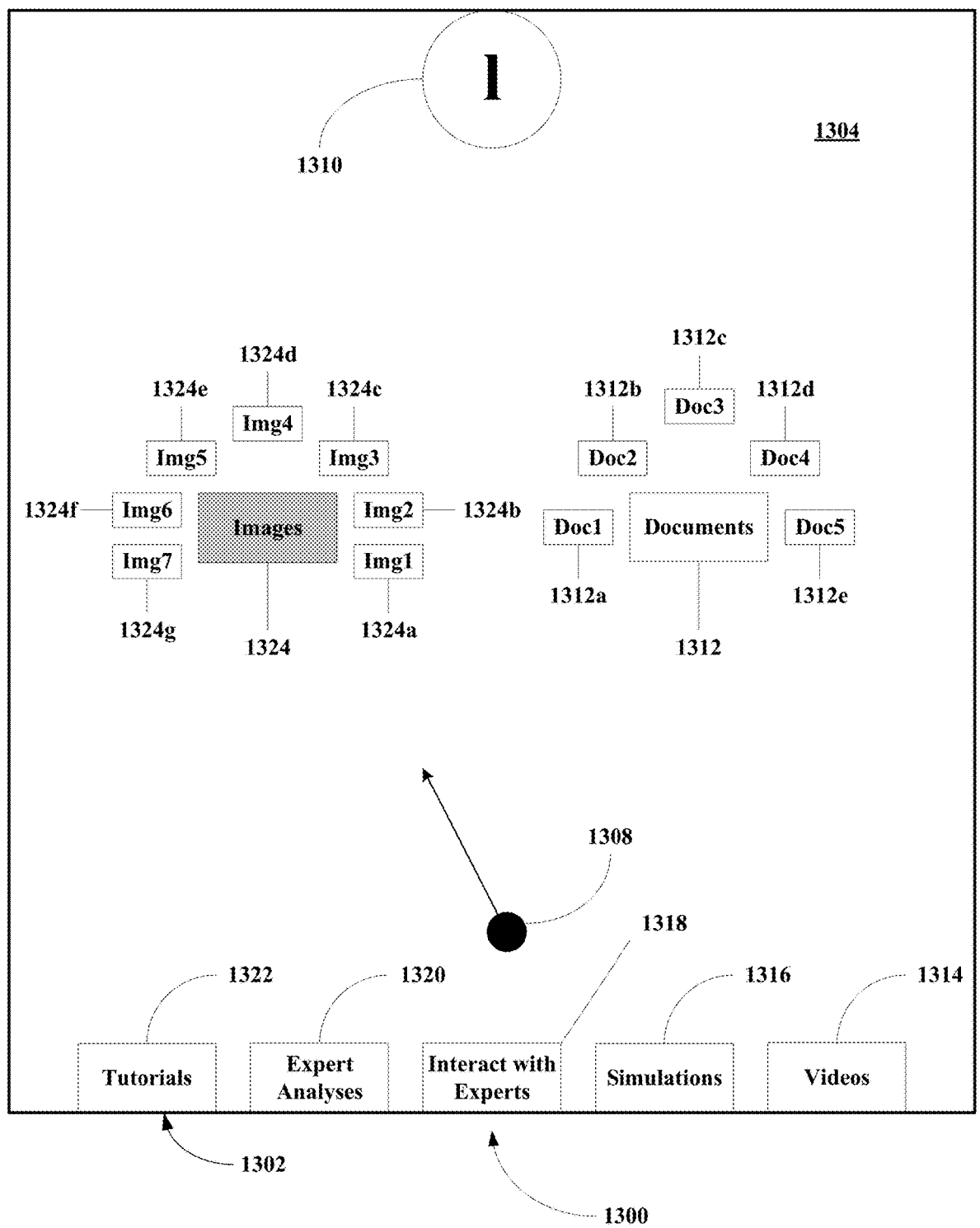

Looking at FIG. 13H, in further response to the motion, the system, apparatus, and/or interface reorganizes the boxes 1312, 1314, 1316, 1318, 1320, and 1322 so that the two aligned boxed 1312 and 1324 are separated and the other boxes are moved away, here to the bottom of the area 1304. Here the two boxes 1312 and 1324 are displayed in the center of the area 1304, with the box 1324 to the left and the box 1312 to the right. The figure also shows that the system, apparatus, and/or interface has received further motion data from the motion sensor indication motion toward the images box 1324 causing the system, apparatus, and/or interface to remove the highlighting on the documents box 1312 indicating the selection of the images box 1324.

Figure 13I:
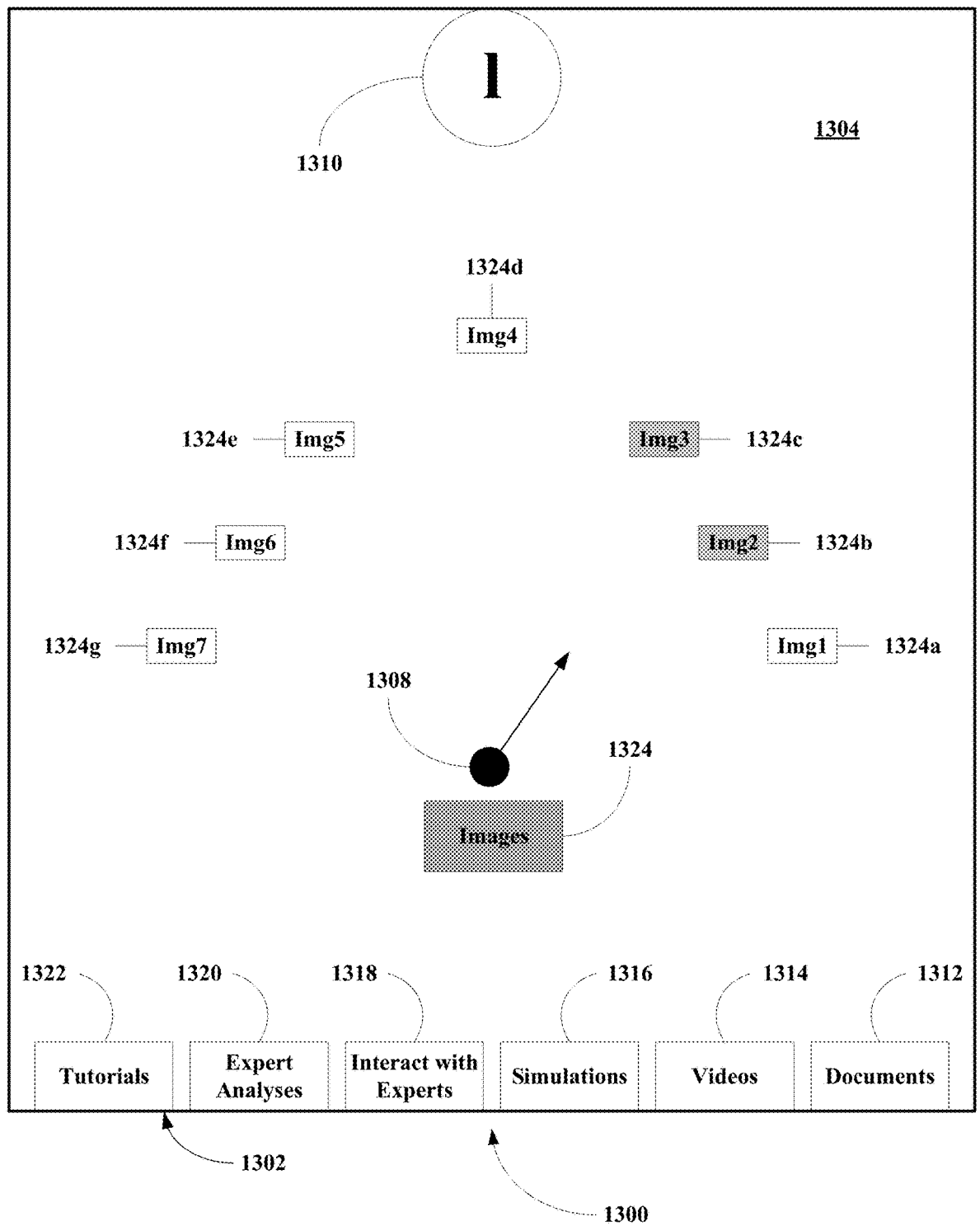

Looking at FIG. 13I, in response to the further motion, the system, apparatus, and/or interface moves the documents box 1312 away, here to the bottom of the area 1304 with the other boxes and centers the images box 1324 with the selection object 1308 above the images box 1324 and displays the Img1 box 1324a, the Img2 box 1324b, the Img3 box 1324c, the Img4 box 1324d, the Img5 box 1324e, the Img6 box 1324f, and the Img7 box 1324g in a radially spaced apart configuration about the selection object 1308. The system, apparatus, and/or interface also receives yet further motion data from the motion sensor as shown by the arrow extending from the selection object 1308 towards two image boxes, Img2 box 1324b and Img3 box 1324b, which are highlighted.

Figure 13J:
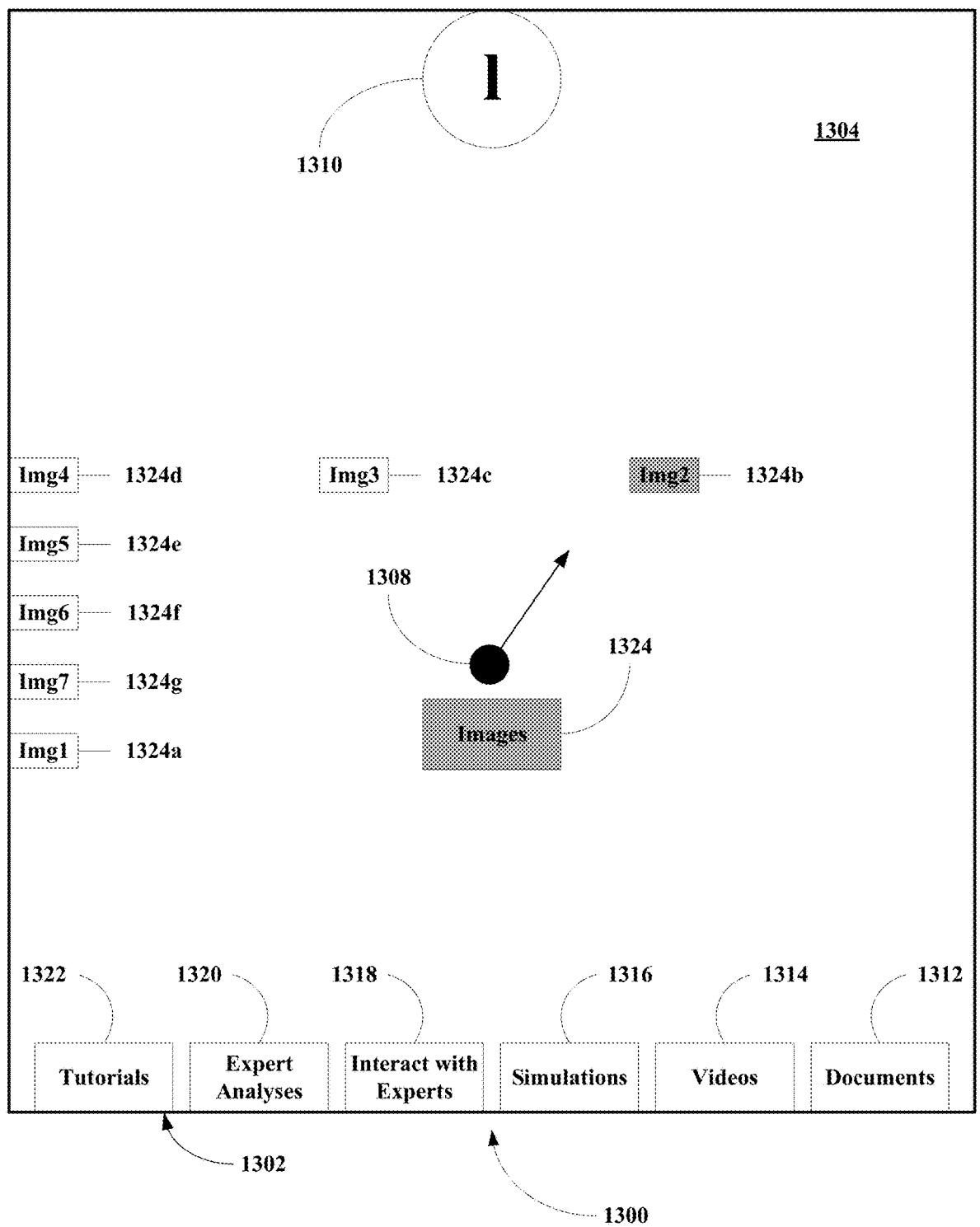

Looking at FIG. 13J, in response to the yet further motion, the system, apparatus, and/or interface moves the Img1 box 1324a, the Img4 box 1324d, the Img5 box 1324e, the Img6 box 1324f, and the Img7 box 1324g away from and centers the Img2 box 1324b and the Img3 box 1324c. The system, apparatus, and/or interface receives input from motion sensor indicated by an arrow extending from the selection object 1308 in a direction that the Img2 box 1324b is selected.

The above illustrated hot spot selection, activation, and modification, although shown in a different display area, may in fact be superimposed up the image or generated within the 3D environments.

Avatar Head and Face Expressions Utilization to
Aid in Training

Referring now to FIGS. 14A-T, an embodiment of a system, apparatus, and/or interface of this disclosure, generally 1400, is shown to include a display area 1402 displaying a CG avatar head 1404 having a variety of facial expressions, wherein the facial expressions are designed to express to the trainee different reactions to user performance.

Looking at FIGS. 14A-C, three different smiling avatar facial expressions. Each smiling facial expression may indicate different degrees of approval. For example, the three smiling expressions may indicate that the systems, apparatuses, and/or interfaces are (a) somewhat happy with the trainee performance as evidenced by downward slanting eyebrows, (b) happy with the trainee performance as evidence by straight eyebrows, and (c) very happy with the trainee performance as evidence by upward slanting eyebrows. It should be recognized that differences in the degree of approval as evidence by the smile may also be evidenced by changing the depth of the smile or may any combination of changes in the smiling facial expression to indicate different degrees of approval or success in performing the entire training program or any aspect of the training program.

Looking at FIGS. 14D-F, three different straight avatar facial expressions. Each straight facial expression may indicate different degrees of approval. For example, the three straight facial expressions may indicate somewhat below average trainer performance as evidenced by downward slanting eyebrows, average trainee performance as evidence by straight eyebrows, and above average trainee performance as evidenced by upward slanting eyebrows. Again, it should be recognized that any combination of changes in the straight facial expression may indicate different degrees of approval or success in performing the entire training program or any aspect of the training program.

Looking at FIGS. 14G-I, three different frowning avatar facial expressions. Each frowning expression may indicate different degrees of disapproval. For example, the three frowning expressions may indicate a very negative trainee performance as evidenced by downward slanting eyebrows, a negative trainee performance as evidence by straight eyebrows, and somewhat negative trainee performance as evidenced by upward slanting eyebrows. Again, it should be recognized that any combination of changes in the frowning facial expression may indicate different degrees of disapproval in performing the entire training program or any aspect of the training program.

Looking at FIGS. 14J-L, three different surprised avatar facial expressions. Each surprised expression may indicate different degrees of surprise. For example, the three surprised expressions may indicate somewhat surprised to user performance as evidenced by downward slanting eyebrows, surprised to user performance as evidence by straight eyebrows, and very surprised to user performance as evidenced by upward slanting eyebrows. Again, it should be recognized that any combination of changes in the surprised facial expression may indicate different degrees of disapproval in performing the entire training program or any aspect of the training program.

Looking at FIGS. 14M-P, four different wide-eyed avatar facial expressions. Each wide-eyed expression may indicate different responses to trainee performance. Here, four wide-eyed expressions are shown: (a) a straight mouth and straight eyebrow expression, (b) a smiling mouth and raised eyebrow expression, (c) a frowning mouth and straight eyebrow expression, and (d) a surprised mouth and lowered eyebrow expression. Each of these expressions may appears after a trainee performs the entire program or at any stage of performing any aspect of the training program.

Looking at FIGS. 14Q-T, four different narrow-eyed avatar facial expressions. Each narrow-eyed expression may indicate different responses to trainee performance. Here, four narrow-eyed expressions are shown: (a) a straight mouth and straight eyebrow expression, (b) a smiling mouth and lowed eyebrow expression, (c) a frowning mouth and raised eyebrow expression, and (d) a surprised mouth and straight eyebrow expression. Each of these expressions may appear after a trainee performs the entire program or at any stage of performing any aspect of the training program.

Avatar Body Posture Utilization to Aid in Training

Referring now to FIGS. 15A-F, embodiments of a system, apparatus, and/or interface of this disclosure, generally 1500, is shown to include a CG avatar body having a variety of body expressions. Each body expression may be combined with any of the facial expressions and may be used to indicate different system responses to trainee performance of the entire training program or any aspect thereof.

Figure 15C:
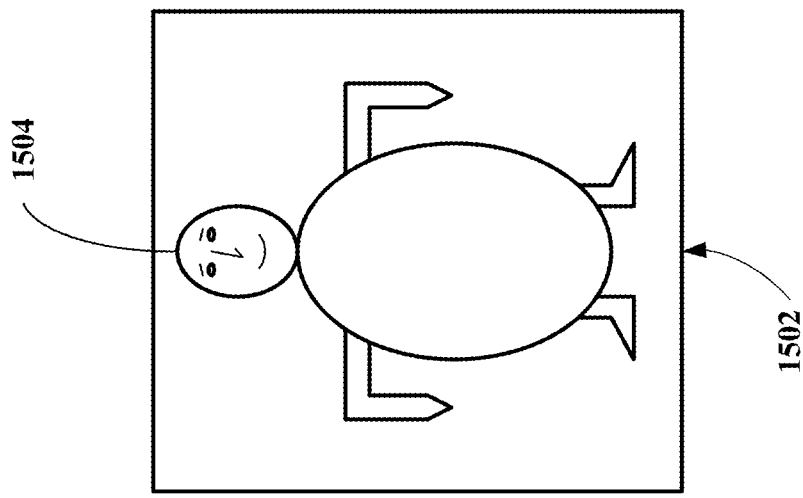
Figure 15B:
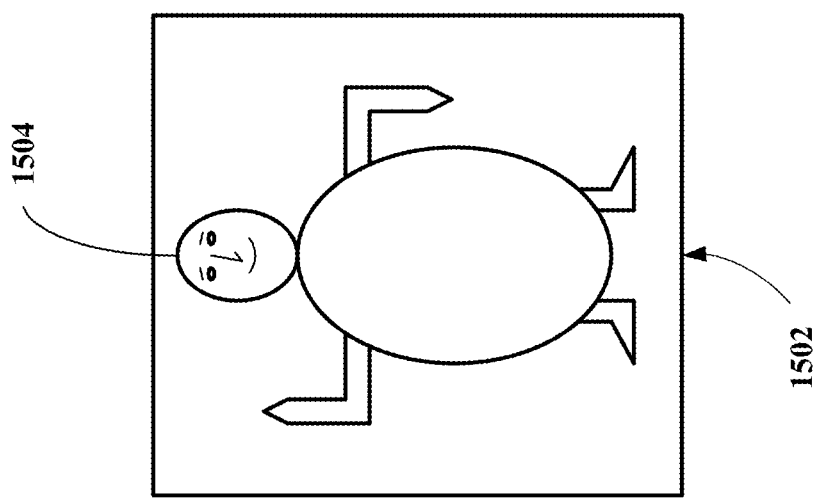
Figure 15A:
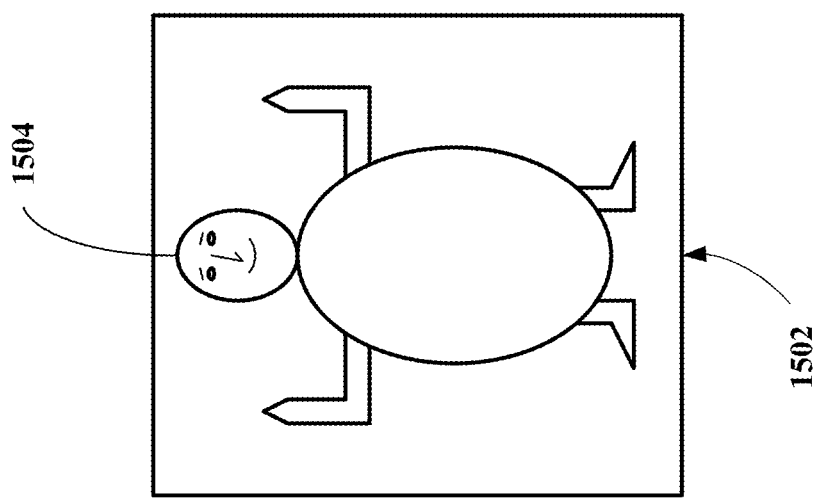

Looking at FIGS. 15A-C, three body expressions are shown here: (a) a body expression with arms raised, (b) a body expression with one arm raised and one arm lowered, and (c) a body expression with both arms lowered. Again, the CG body may have other features and all of the features including the facial features may change to indicate different responses to trainee performance of the entire training program or any aspect thereof and may change at any time during trainee interaction with the training program.

Figure 15D:
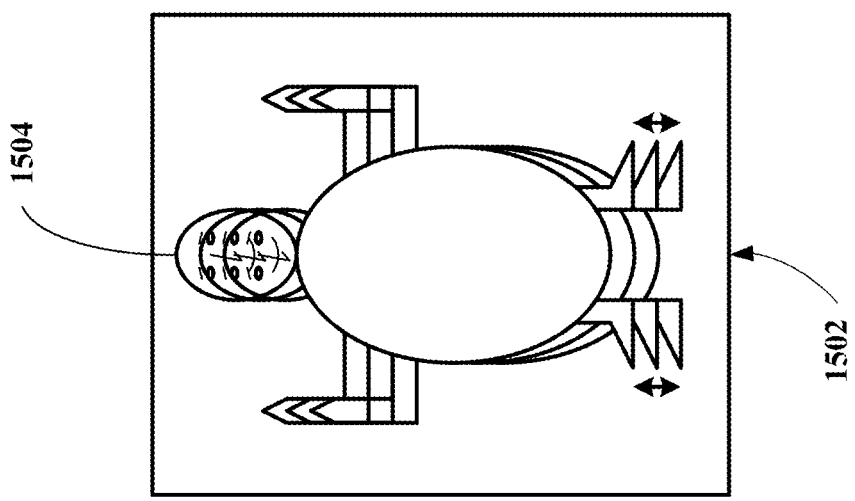
Figure 15E:
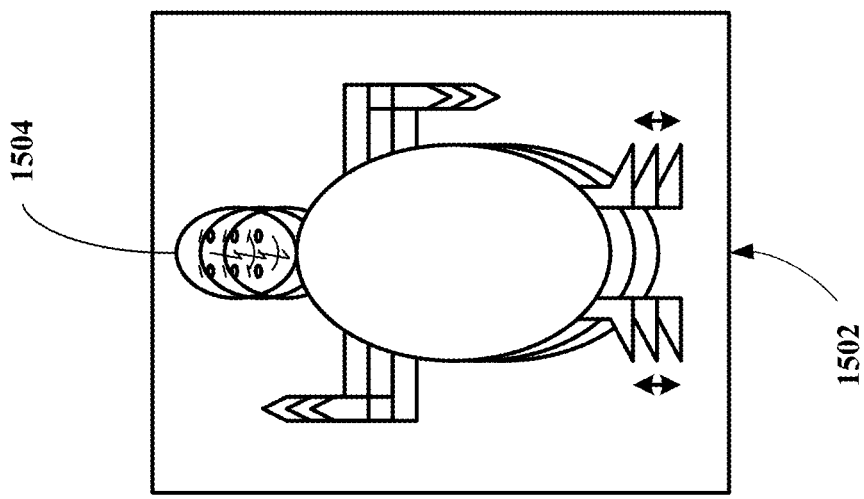
Figure 15F:
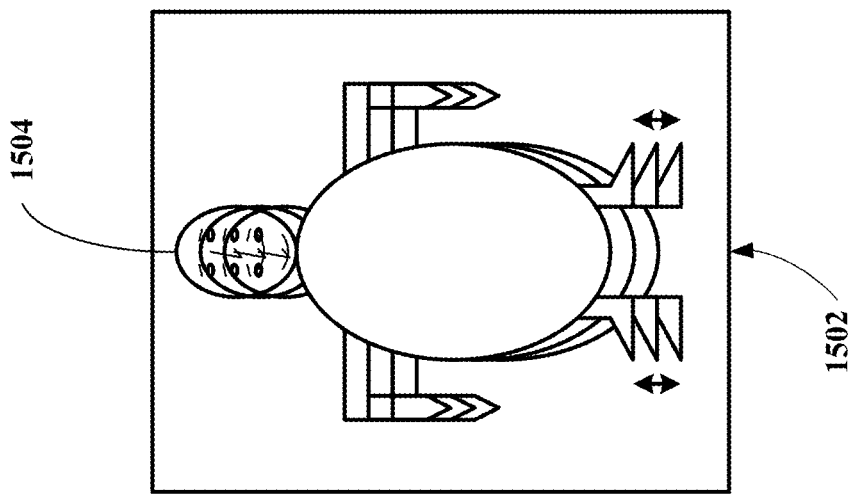

Looking at FIGS. 15D-F, three bouncing body expressions are shown here: (a) a bouncing body expression with arms raised, (b) a bouncing body expression with one arm raised and one arm lowered, and (c) a bouncing body expression with both arms lowered. Again, the CG body may have other features and all of the features including the facial features may change to indicate different responses to trainee performance of the entire training program or any aspect thereof and may change at any time during trainee interaction with the training program. Additionally, the CG body may bound, dance, spin, or perform any activity to evidence a system response to any trainee performance.

It should the recognized that the avatars of this disclosure are designed to assist and encourage trainees in performing the training program or any aspect of the training program. Thus, the systems, apparatuses, and interfaces of this disclosure by include avatars that are capable of expressing all manner of expression or conduct or activity that will assist a trainee in performing the entire training program or any aspect thereof, wherein all avatar expressions, conduct, and/or activities are designed to assist and encourage the trainee to successfully accomplish the entire training program and any and all aspects thereof.

Capturing Images, Showing Constructs Creation, and Performing a Routine

Referring now to FIGS. 16A-AF, systems, apparatuses, interfaces, and implementing methods of this disclosure illustrating the starting a capture session, selecting a desired super hero character, creating a CG construct for the super hero proportioned to the user, and capturing the user performing a series of movements or posture changes and reproducing the movements or posture changes in the construct. These user constructs may then be scaled to a set of movements performed in a super hero movie by an actor with differences illustrated so that the user can adjust user movements until the differences between the user movements and the actor movements are at or below minimum difference criteria.

Looking now at FIG. 16A, the system or apparatus 1600 comprises a touch sensitive screen 1602, which activates when the user 1604 get sufficiently closes to the apparatus 1600. Once activated, the screen 1602 displays a glowing orb selection object 1606 and three super hero selectable objects 1608a-c, along with informational text.

Looking now at FIGS. 16B-G, the user 1604 touches the selection object 1606 and illustrates moving the selection object 1606 towards the different super hero objects 1608a-c until the user 1604 decides to select a particular super hero 1608b, where selection occurs either my moving fully into the object 1608b or lifting off from the screen at the object 1608b.

Figure 16H:
Figure 16I:
Figure 16J:
Figure 16K:
Figure 16L:
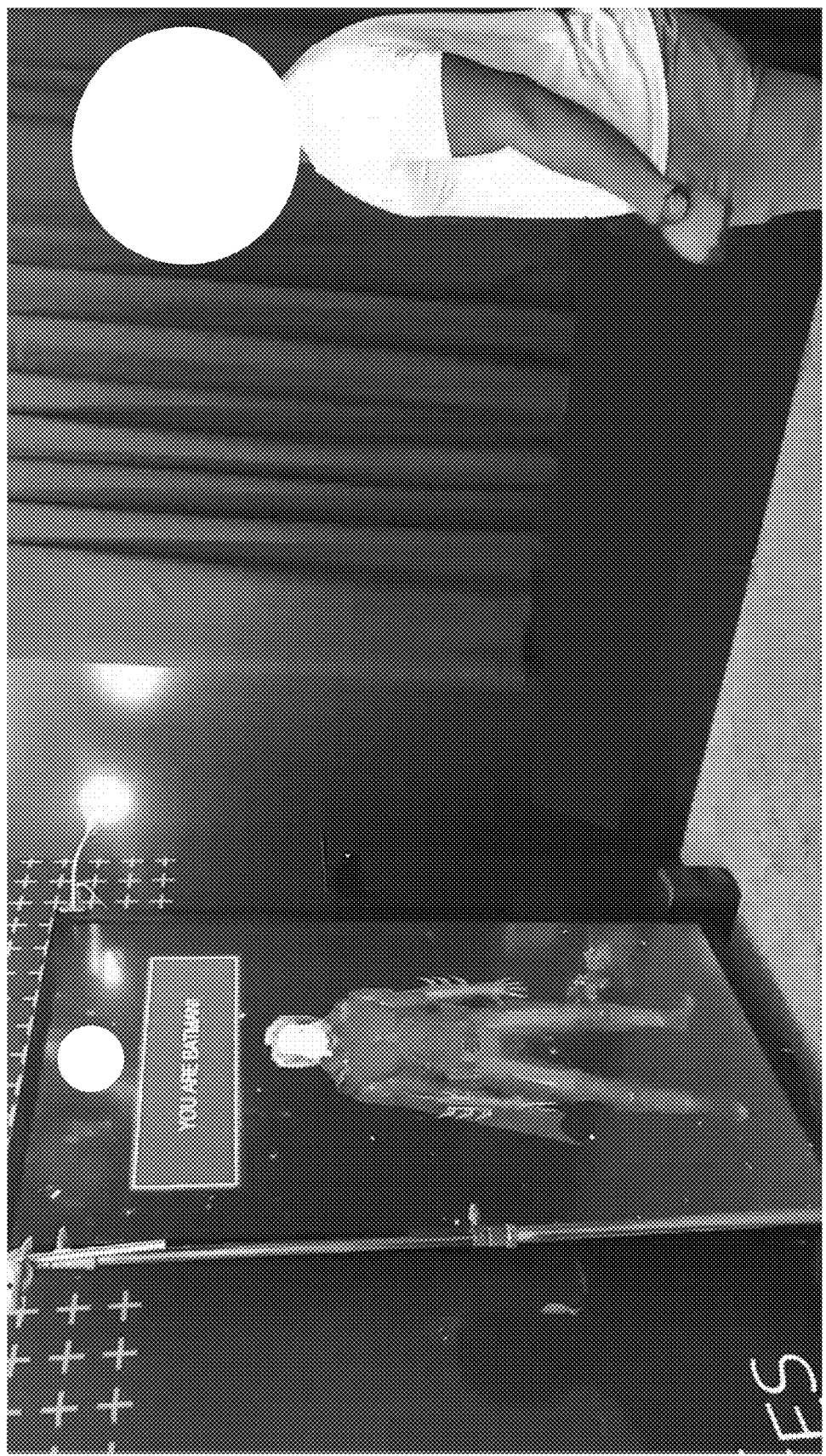
Figure 16M:
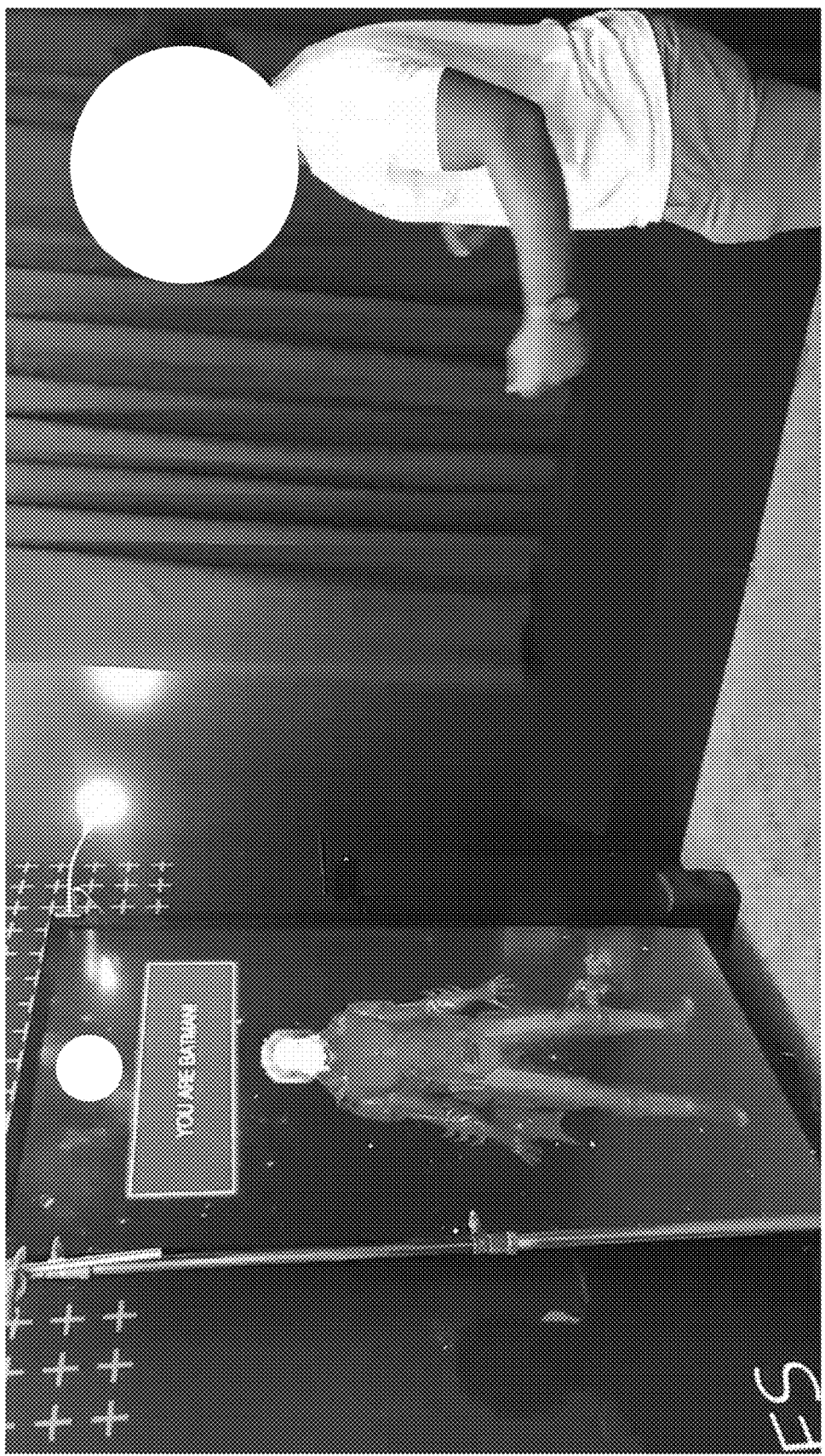
Figure 16N:
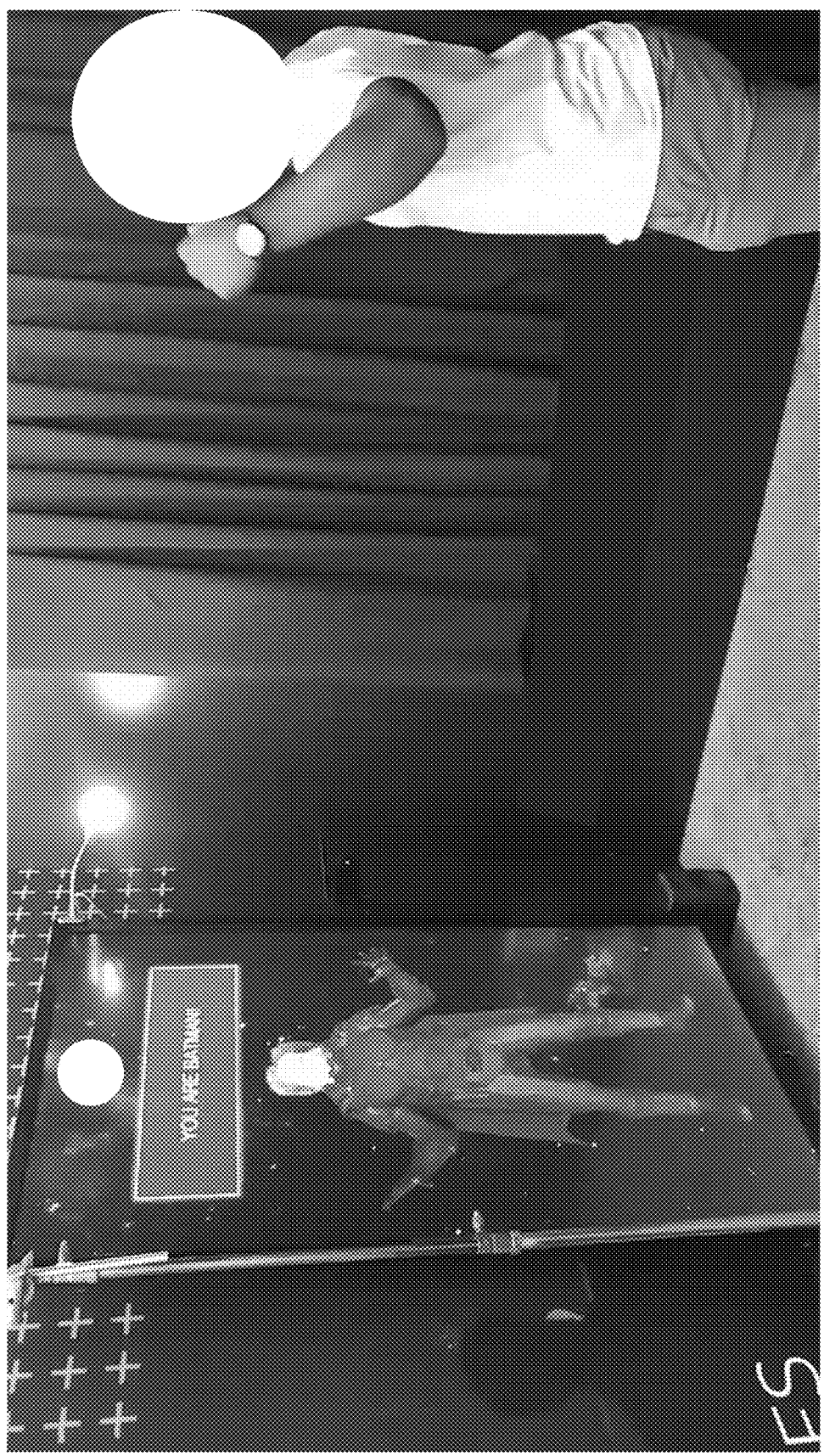
Figure 16O:
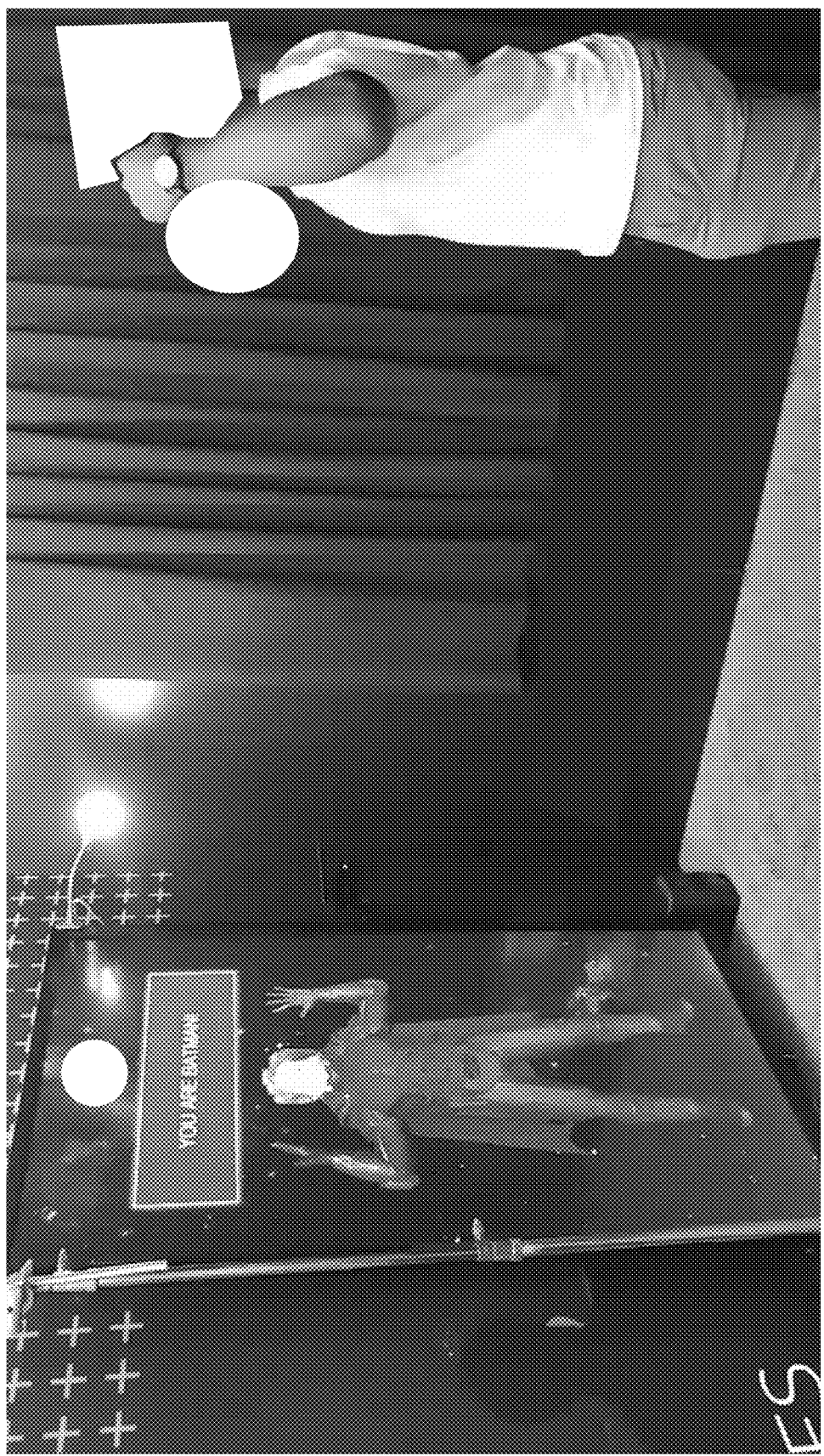
Figure 16P:
Figure 16Q:
Figure 16R:
Figure 16S:
Figure 16T:
Figure 16U:
Figure 16V:
Figure 16W:
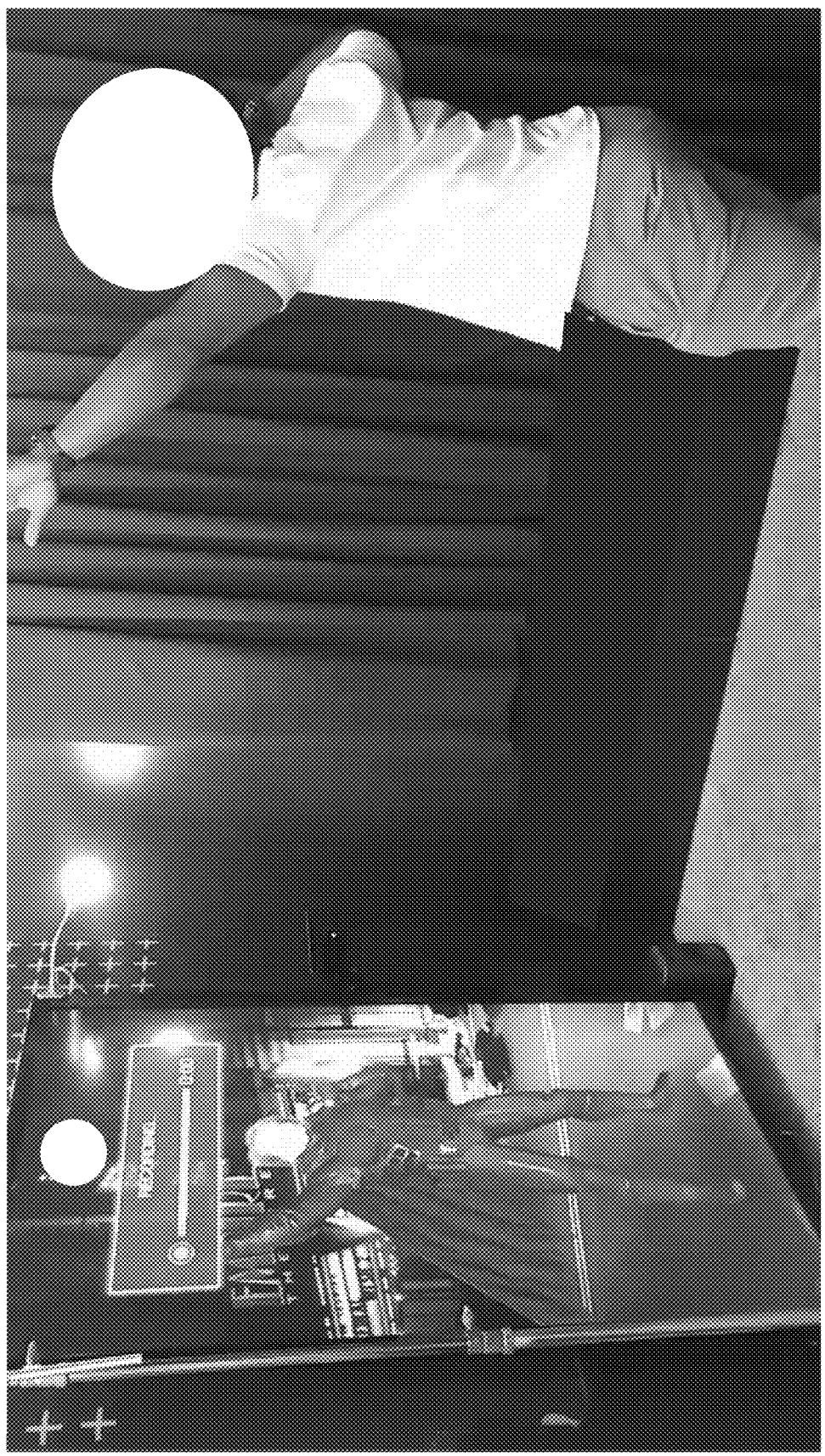
Figure 16X:
Figure 16Y:
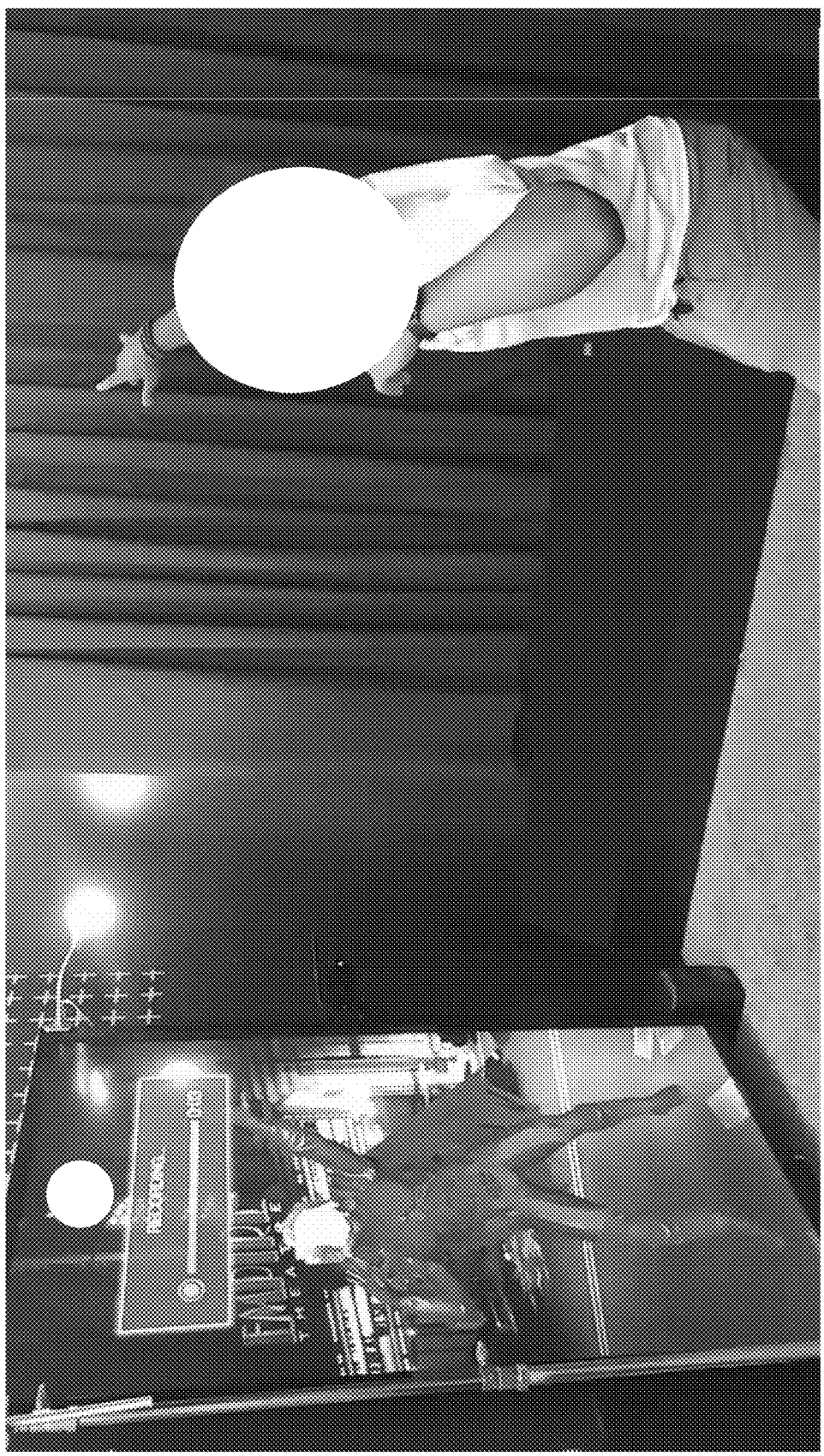
Figure 16Z:
Figure 16A:
Figure 16A:
Figure 16A:
Figure 16A:
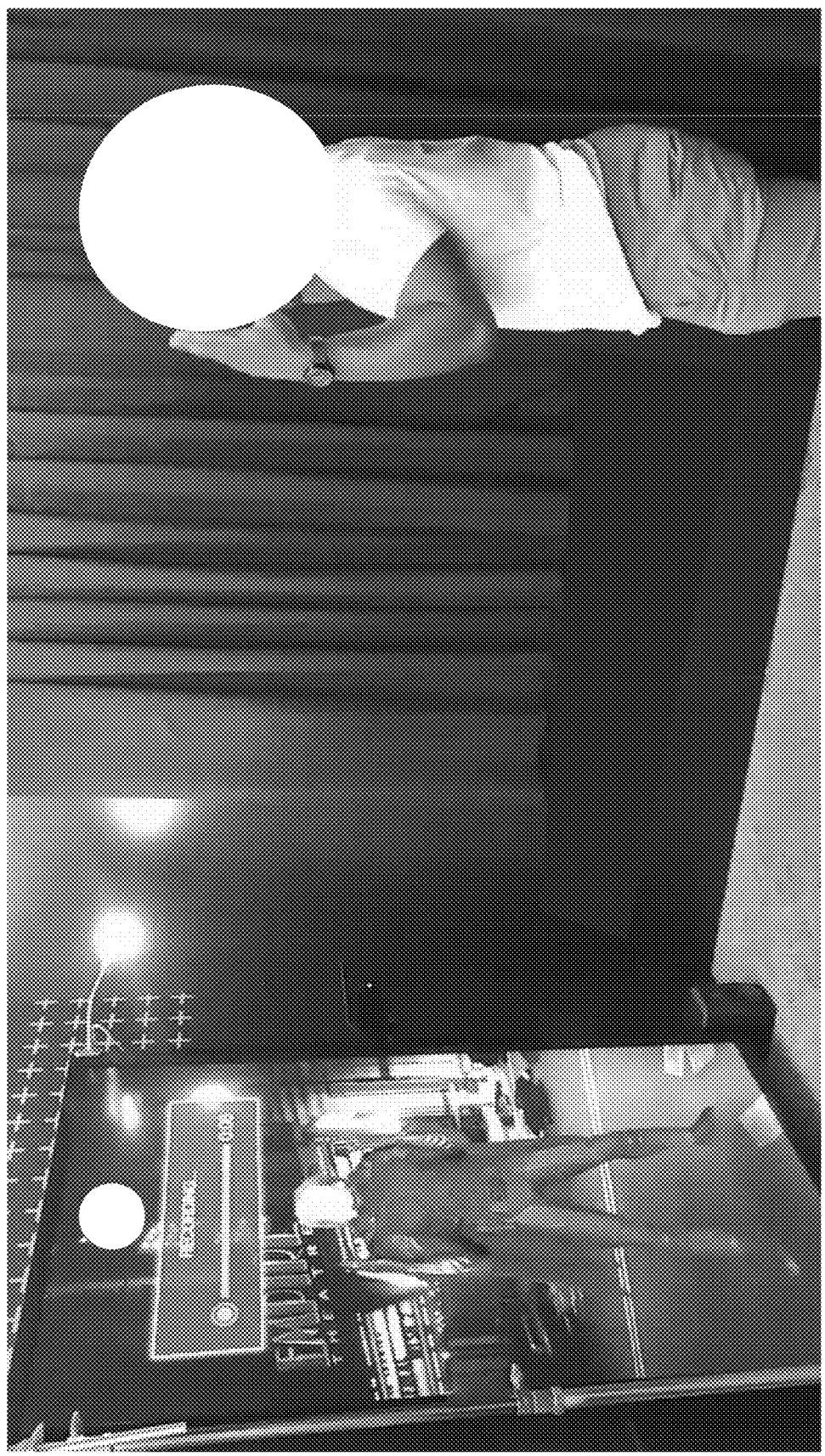
Figure 16A:
Figure 16F:

Looking now at FIGS. 16H-AG, the user 1604 steps back from the screen 1602 placing the apparatus 1600 in image captures mode. FIGS. 16I-AG captures a set of images of the user 1604 performing a set of movements representing changing in body postures. The apparatus 1600 then creates a super hero construct 1610 and displays it on the screen 1602 within a AR 3D environment. The construct 1610 is scaled to the user's proportions and performs the same movements or posture changes displayed within a AR 3D environment in response to the user's movements and body posture changes. Looking now at FIGS. 16Q-AF, the AR 3D environment has been changed based on the user 1604 user selection from a list of environments (not shown) or by the user looking at a particular scene, here the environment displays the construct 1610 in front of a movie theater. While the present above figures illustrate user image capture, construct and AR generation, and environment selection, if the user is performing a training routine, then the user construct may be scaled and superimposed on the user construct so that differences may be shown and the user movement may be repeated until the differences are at or below certain minimum difference criteria.

CLOSING

All references cited herein are incorporated herein by reference for all legal uses including claim support. Although the disclosure has been disclosed with reference to its preferred embodiments, from reading this description those of skill in the art may appreciate changes and modification that may be made which do not depart from the scope and spirit of the disclosure as described above and claimed hereafter.

We claim:

1. A method implemented on an electronic device comprising a process coupled to or associated with a motion sensor, an input device, a display device and an output device, the method comprising:
   loading a pre-existing virtual reality (VR) training program comprising a plurality of routines, tasks, or combinations thereof or an augmented reality/mixed reality/extended reality (AR/MR/XR) training program comprising a plurality of routines, tasks, or combinations thereof;
   gathering information about:
   (a) training program features, attributes, properties, characteristics, or combinations thereof,
   (b) routine features, attributes, properties, characteristics, or combinations thereof,
   (c) task features, attributes, properties, characteristics, or combinations thereof, and
   (d) program equipment features, attributes, properties, characteristics, or combinations thereof associated with equipment used in the pre-existing training program, routines, and tasks;
   analyzing the gathered information;
   creating content from the analyzed and/or gathered information, the content comprising program content, routine content, task content, and equipment content;
   generating hot spots or interactive areas from the created content, the hot spots or interactive areas comprise:
   (a) program content hot spots or interactive areas associated with one, some, or all of the program features, attributes, properties, or characteristics,
   (b) routine content hot spots or interactive areas associated with one, some, or all of the routine features, attributes, properties, or characteristics,
   (c) task content hot spots or interactive areas associated with one, some, or all of the task features, attributes, properties, or characteristics, and
   (d) equipment hot spots or interactive areas associated with one, some, or all of the equipment features, attributes, properties, or characteristics,
   wherein the hot spots or interactive areas comprise documents, images, videos, tutorials, expert analyses, interact with experts, simulations, or any combination thereof and are represented as selectable objects, lists, menus, icons, or any combination thereof;
   populating the pre-existing VR training program or the pre-existing VR/AR/MR training program with the generated hot spots or interactive areas at locations within the pre-existing VR training program or the pre-existing VR/AR/MR training program, the locations are associated with some or all of the features, devices, and/or attributes associated with or forming a part of the pre-existing VR training program or the pre-existing VR/AR/MR training program;
   capturing trainer performance data as a trainer performs the pre-existing VR training program or the pre-existing VR/AR/MR training program, the trainer performance data comprising trainer program competency data, trainer routine competency data, trainer task competency data, trainer hot spot or interact area interaction data, trainer equipment interaction data, or any combination thereof;
   capturing trainee performance data as a trainee performs the generated training program, the trainee performance data includes trainee program competency data, trainee routine competency data, trainee task competency data, trainee hot spot or interact area interaction data, equipment interaction data, or any combination thereof;
   comparing the trainer performance data and the trainee performance data;
   determining differences between the trainer performance data and the trainee performance data;
   testing the differences between the trainer performance data and the trainee performance data, if each of the differences exceeds one or more minimum difference criteria, then:
   displaying the differences; and
   for each of the routines or tasks having differences that exceeds one or more minimum difference criteria, repeating:
   the trainee capturing step,
   the comparing step,
   the determining differences step;
   the testing step;
   until each of the differences is less than or equal to the one or more minimum difference criteria; and
   indicating successful completion of the training program.

2. The method of claim 1, further comprising:
   storing the gathered information on local databases, remote databases, or both;
   storing the analysis on the local databases, remote databases, or both
   storing the generated VR training program or AR/MR/XR training program on local databases, remote databases, or both;
   storing the trainer performance data on the local databases, remote databases, or both;
   storing the trainee performance data on the local databases, remote databases, or both;
   storing the differences on the local databases, remote databases, or both;

providing the trainer with to the trainer and/or a supervisor with the trainer performance data or any part thereof;

during and/or after the trainee performs the generated VR training program or the generated AR/MR/XR training program, providing the trainee performance data and the differences to the trainer and/or the supervisor; and during and/or after the trainee performs the repeating step, providing the trainee performance data and the differences to the trainer and/or the supervisor.

3. The method of claim 1, further comprising:

highlighting the differences according to a highlighting format, wherein the highlighting format comprising visually highlighting the differences, haptic highlighting the differences via a haptic device, audio highlighting the differences via a audio device, neurofeedback highlighting the differences via a neurofeedback device, or any combination thereof.

4. The method of claim 1, further comprising:

before, during, and/or after the repeating step, illustrating to the trainee how to adjust the trainee's body and/or any part thereof in the overlaid construct to improve trainee performance.

5. The method of claim 1, wherein values of the one or more minimum difference criteria are:

less than or equal to a 20% difference between the trainer performance data and the trainee performance data;

less than or equal to a 10% difference between the trainer performance data and the trainee performance data;

less than or equal to a 5% difference between the trainer performance data and the trainee performance data; or less than or equal to a 1% the difference between the trainer performance data and the trainee performance data.

6. The method of claim 1, wherein:

the trainer performance data comprising trainer whole body position features, trainer body part position features, trainer device position features, or any combination thereof;

the trainee performance data comprise trainee whole body position features, trainee body part position features, trainee device position features, or any combination thereof.

7. The method of claim 1, further comprising:

generating one or more avatars, providing the avatar with trainer performance data and trainee performance data, and modifying the one or more avatars based on the training program analysis and modifications.

8. The method of claim 7, wherein the avatar is configured to change form depending on the routine or task being performed and the trainee performance of the routine or task.

9. The method of claim 1, wherein the training program is fully interactive using motion-based processing, hard select processing, gesture processing, voice command processing, neural command processing, or any combination thereof.

10. The method of claim 1, further comprising:

formatting all stored materials for efficient database storage, interaction, and retrieval.

11. The method of claim 1, further comprising:

continuously, periodically, or intermittently analyzing all of the stored data;

developing predictive tools or routines to assist trainees in performing the training program, routines, or tasks;

developing trainee type predictive tools to assist specific types of trainees in performing the training program, routines, or tasks;

modifying one, some, or all aspects, features, attributes, properties, and/or characteristics of the training program, the training routine, the training task, the environment or environments, hot spots or interactive areas, or any combination thereof, during and/or after the trainer performing the generated training program or any part thereof;

updating the training program, routines, tasks, and the hot spots; and storing the updates on the local databases, remote databases, or both.

12. The method of claim 1, wherein, in the constructing or generating steps, the training program, routines, and/or tasks further comprising:

explanatory sessions associated with the program, routines and/or tasks;

explanatory sessions associated with the equipment;

question/answer sessions associated with the routines and/or tasks;

question/answer sessions associated with the equipment;

information presentation sessions associated with the program, routines and/or tasks;

information presentation sessions associated with the equipment;

trainee pass/fail explanatory sessions;

trainee evaluation sessions;

trainee performance ranking sessions;

trainee feedback sessions; or any combination thereof.

13. The method of claim 1, further comprising:

analyzing the trainer performance data, the trainee performance data, the differences, and/or the repeated trainee performance data, the repeated trainee differences, and the trainee completion data; and modifying:

(1) one, some, or all of the generated training program features, attributes, properties, and characteristics;

(2) one, some, or all of the generated training routine features, attributes, properties, and characteristics;

(3) one, some, or all of the generated training task features, attributes, properties, and characteristics;

(4) one, some, or all of the generated program equipment features, attributes, properties, and characteristics;

(5) one, some, or all of the hot spots or interactive areas associated with the program content;

(6) one, some, or all of the hot spots or interactive areas associated with the routine content;

(7) one, some, or all of the hot spots or interactive areas associated with the task content;

(8) one, some, or all of the hot spots or interactive areas associated with the equipment content, wherein the modifications improve the training program; and storing the modifications on the local databases, remote databases, or both.

14. The method of claim 1, wherein, in the generating steps:

the generated VR training program or the generated AR/MR/XR training program or the preexisting VR training program or the preexisting AR/MR/XR training program comprising computer generated 2D, 3D, 4D, or nD components, wherein the nD components include space dimension, time dimensions, sensor data, and object attributes and/or parameters.

15. The method of claim 1, wherein the program content, routine content, task content, and equipment content independently comprising:
textual content;
non-textual content including:
visual content;
audio content;
audiovisual content;
haptic content; or
any combination; or
any combination of textual content and non-textual content.

16. The method of claim 1, further comprising:
analyzing trainer and trainee historical performance data; and
modifying one, some, or all aspects, features, attributes, properties, and/or characteristics of the training program, the training routine, the training task, the environment or environments, hot spots or interactive areas, or any combination thereof, during and/or after the trainer performing the generated training program or any part thereof.

17. A method implemented on an electronic device comprising a process coupled to or associated with a motion sensor, an input device, a display device and an output device, the method comprising:
loading a pre-existing virtual reality (VR) training program comprising a plurality of routines, tasks, or combinations thereof or an augmented reality/mixed reality/extended reality (AR/MR/XR) training program comprising a plurality of routines, tasks, or combinations thereof;
gathering information about:
  (a) training program features, attributes, properties, characteristics, or combinations thereof,
  (b) routine features, attributes, properties, characteristics, or combinations thereof,
  (c) task features, attributes, properties, characteristics, or combinations thereof, and
  (d) program equipment features, attributes, properties, characteristics, or combinations thereof associated with equipment used in the pre-existing training program, routines, and tasks;
analyzing the gathered information;
creating content from the analyzed gathered information, the content comprising program content, routine content, task content, and equipment content;
generating hot spots or interactive areas from the created content, the hot spots or interactive areas comprise:
  (a) program content hot spots or interactive areas associated with one, some, or all of the program features, attributes, properties, or characteristics,
  (b) routine content hot spots or interactive areas associated with one, some, or all of the routine features, attributes, properties, or characteristics,
  (c) task content hot spots or interactive areas associated with one, some, or all of the task features, attributes, properties, or characteristics, and
  (d) equipment hot spots or interactive areas associated with one, some, or all of the equipment features, attributes, properties, or characteristics,
  wherein the hot spots or interactive areas comprise documents, images, videos, tutorials, expert analyses, interact with experts, simulations, or any combination thereof and are represented as selectable objects, lists, menus, icons, or any combination thereof; and
associating, locating, and populating the generated hot spots or interactive areas with features etc within the pre-existing VR training program or the pre-existing VR/AR/MR training program with,
wherein the hot spots or interactive areas may be activated by motion, gesture, or a hard selection protocol.

18. The method of claim 17, further comprising:
analyzing the trainer performance data, the trainee performance data, the differences, and/or the repeated trainee performance data, the repeated trainee differences, and the trainee completion data; and
modifying:
  (1) one, some, or all of the generated training program features, attributes, properties, and characteristics;
  (2) one, some, or all of the generated training routine features, attributes, properties, and characteristics;
  (3) one, some, or all of the generated training task features, attributes, properties, and characteristics;
  (4) one, some, or all of the generated program equipment features, attributes, properties, and characteristics;
  (5) one, some, or all of the hot spots or interactive areas associated with the program content;
  (6) one, some, or all of the hot spots or interactive areas associated with the routine content;
  (7) one, some, or all of the hot spots or interactive areas associated with the task content;
  (8) one, some, or all of the hot spots or interactive areas associated with the equipment content,
  wherein the modifications improve the training program; and
storing the modifications on the local databases, remote databases, or both.

19. The method of claim 17, wherein, in the generating steps:
the generated VR training program or the generated AR/MR/XR training program or the preexisting VR training program or the preexisting AR/MR/XR training program comprising computer generated 2D, 3D, 4D, or nD components, wherein the nD components include space dimension, time dimensions, sensor data, and object attributes and/or parameters.

20. The method of claim 17, wherein the program content, routine content, task content, and equipment content independently comprising:
textual content;
non-textual content including:
visual content;
audio content;
audiovisual content;
haptic content; or
any combination; or
any combination of textual content and non-textual content.

* * * * *